US010359749B2

(12) United States Patent
Bogdan et al.

(10) Patent No.: US 10,359,749 B2
(45) **Date of Patent: *Jul. 23, 2019**

(54) METHOD AND APPARATUS FOR UTILITIES MANAGEMENT VIA GUIDED WAVE COMMUNICATION

(71) Applicant: AT&T INTELLECTUAL PROPERTY I, L.P., Atlanta, GA (US)

(72) Inventors: Pamela A. M. Bogdan, Neptune, NJ (US); George Blandino, Bridgewater, NJ (US); Ken Liu, Edison, NJ (US); Leon Lubranski, Scotch Plains, NJ (US); Eric Myburgh, Bonita Springs, FL (US); Tracy Van Brakle, Colts Neck, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 173 days.

This patent is subject to a terminal disclaimer.

(21) Appl. No.: 15/371,321

(22) Filed: Dec. 7, 2016

(65) Prior Publication Data

US 2018/0157231 A1 Jun. 7, 2018

(51) Int. Cl.
*G05B 19/042* (2006.01)
*H04B 3/54* (2006.01)
(Continued)

(52) U.S. Cl.
CPC .......... *G05B 19/042* (2013.01); *H02J 13/002* (2013.01); *H02J 13/0075* (2013.01);
(Continued)

(58) Field of Classification Search
None
See application file for complete search history.

(56) References Cited

U.S. PATENT DOCUMENTS

| | | |
|---|---|---|
| 395,814 A | 1/1889 | Henry et al. |
| 529,290 A | 11/1894 | Harry et al. |

(Continued)

FOREIGN PATENT DOCUMENTS

| | | |
|---|---|---|
| AU | 565039 B2 | 9/1987 |
| AU | 582630 B2 | 4/1989 |

(Continued)

OTHER PUBLICATIONS

"AirCheck G2 Wireless Tester", NetScout®, enterprise.netscout.com, Dec. 6, 2016, 10 pages.

(Continued)

*Primary Examiner* — Jason Lin
(74) *Attorney, Agent, or Firm* — Ed Guntin; Bruce E. Stuckman

(57) ABSTRACT

Aspects of the subject disclosure may include, for example, a utilities management system operable to receive via a guided wave transceiver a plurality of utility status signals from a plurality of utility sensors located at a plurality of supervised sites. Utility control data is generated based on the plurality of utility status signals. At least one control signal is generated for transmission via the guided wave transceiver to at least one of the plurality of supervised sites, and the at least one control signal includes at least one utility deployment instruction based on the utility control data. Other embodiments are disclosed.

20 Claims, 48 Drawing Sheets

1400

(51) Int. Cl.

| | |
|---|---|
| ***H04L 12/46*** | (2006.01) |
| ***H02J 13/00*** | (2006.01) |
| *H02J 3/38* | (2006.01) |
| *H02J 3/46* | (2006.01) |
| *H04L 12/28* | (2006.01) |
| *H02J 7/00* | (2006.01) |
| *H02J 7/35* | (2006.01) |
| *B60L 53/30* | (2019.01) |

(52) U.S. Cl.

CPC ............ *H02J 13/0086* (2013.01); *H04B 3/54* (2013.01); *H04L 12/4625* (2013.01); *B60L 53/30* (2019.02); *G05B 2219/2642* (2013.01); *H02J 3/383* (2013.01); *H02J 3/386* (2013.01); *H02J 3/46* (2013.01); *H02J 7/0027* (2013.01); *H02J 7/35* (2013.01); *H04L 2012/2843* (2013.01); *Y02E 10/563* (2013.01); *Y02E 10/566* (2013.01); *Y02E 10/763* (2013.01); *Y02E 60/7815* (2013.01); *Y04S 40/121* (2013.01)

(56) References Cited

U.S. PATENT DOCUMENTS 1,721,785 A 7/1929 Meyer
1,798,613 A 3/1931 Manson et al.
1,860,123 A 5/1932 Yagi
2,058,611 A 10/1936 Merkle et al.
2,106,770 A 2/1938 Southworth et al.
2,129,711 A 9/1938 Southworth
2,129,714 A 9/1938 Southworth et al.
2,147,717 A 2/1939 Schelkunoff
2,187,908 A 1/1940 McCreary
2,199,083 A 4/1940 Schelkunoff
2,232,179 A 2/1941 King
2,283,935 A 5/1942 King
2,398,095 A 4/1946 Katzin
2,402,622 A 6/1946 Hansen
2,405,242 A 8/1946 Southworth et al.
2,407,068 A 9/1946 Fiske et al.
2,407,069 A 9/1946 Fiske
2,410,113 A 10/1946 Edwin, Jr.
2,411,338 A 11/1946 Roberts
2,415,089 A 2/1947 Feldman et al.
2,415,807 A 2/1947 Barrow et al.
2,419,205 A 4/1947 Feldman et al.
2,420,007 A 5/1947 Olden
2,422,058 A 6/1947 Whinnery
2,432,134 A 12/1947 Bagnall
2,461,005 A 2/1949 Southworth
2,471,021 A 5/1949 Bradley
2,488,400 A 11/1949 Harder
2,513,205 A 6/1950 Roberts et al.
2,514,679 A 7/1950 Southworth
2,519,603 A 8/1950 Reber
2,540,839 A 2/1951 Southworth
2,541,843 A 2/1951 Tiley et al.
2,542,980 A 2/1951 Barrow
2,557,110 A 6/1951 Jaynes
2,562,281 A 7/1951 Mumford
2,596,190 A 5/1952 Wiley
2,599,864 A 6/1952 Robertson-Shersby-Ha et al.
2,659,817 A 11/1953 Cutler et al.
2,667,578 A 1/1954 Carlson et al.
2,677,055 A 4/1954 Allen
2,685,068 A 7/1954 Goubau
2,688,732 A 9/1954 Kock
2,691,766 A 10/1954 Clapp
2,706,279 A 4/1955 Aron
2,711,514 A 6/1955 Rines
2,723,378 A 11/1955 Clavier et al.
2,727,232 A 12/1955 Pryga
2,735,092 A 2/1956 Brown
2,737,632 A 3/1956 Grieg et al.
2,740,826 A 4/1956 Bondon
2,745,101 A 5/1956 Marie
2,748,350 A 5/1956 Miller et al.
2,749,545 A 6/1956 Kostriza
2,754,513 A 7/1956 Goubau
2,761,137 A 8/1956 Atta et al.
2,769,147 A 10/1956 Black et al.
2,769,148 A 10/1956 Clogston et al.
2,770,783 A 11/1956 Thomas et al.
2,794,959 A 6/1957 Fox
2,805,415 A 9/1957 Berkowitz
2,806,177 A 9/1957 Haeff et al.
2,806,972 A 9/1957 Sensiper
2,810,111 A 10/1957 Cohn
2,819,451 A 1/1958 Sims et al.
2,820,083 A 1/1958 Hendrix
2,825,060 A 2/1958 Ruze et al.
2,835,871 A 5/1958 Raabe
2,851,686 A 9/1958 Hagaman et al.
2,852,753 A * 9/1958 Gent et al. ................ H01P 3/10 333/240
2,867,776 A 1/1959 Wilkinson, Jr.
2,883,135 A 4/1959 Smalley et al.
2,883,136 A 4/1959 Smalley et al.
2,900,558 A 8/1959 Watkins et al.
2,910,261 A 10/1959 Ward et al.
2,912,695 A 11/1959 Cutler
2,914,741 A 11/1959 Unger
2,915,270 A 12/1959 Gladsden et al.
2,921,277 A 1/1960 Goubau
2,925,458 A 2/1960 Lester et al.
2,933,701 A 4/1960 Lanctot et al.
2,946,970 A 7/1960 Hafner et al.
2,949,589 A 8/1960 Hafner
2,960,670 A 11/1960 Marcatili et al.
2,970,800 A 2/1961 Smalley et al.
2,972,148 A 2/1961 Rupp et al.
2,974,297 A 3/1961 Ros
2,981,949 A 4/1961 Elliott et al.
2,990,151 A 6/1961 Phillips et al.
2,993,205 A 7/1961 Cooper et al.
3,016,520 A 1/1962 Adam et al.
3,025,478 A 3/1962 Marcatili et al.
3,028,565 A 4/1962 Walker et al.
3,040,278 A 6/1962 Griemsmann et al.
3,045,238 A 7/1962 Cheston et al.
3,046,550 A 7/1962 Schlaud et al.
3,047,822 A 7/1962 Lakatos et al.
3,065,945 A 11/1962 Newsome et al.
3,072,870 A 1/1963 Walker
3,077,569 A 2/1963 Ikrath et al.
3,096,462 A 7/1963 Joseph et al.
3,101,472 A 8/1963 Goubau
3,109,175 A 10/1963 Lloyd
3,129,356 A 4/1964 Phillips
3,134,951 A 5/1964 Huber et al.
3,146,297 A 8/1964 Hahne
3,146,453 A 8/1964 Hagaman
3,201,724 A 8/1965 Hafner
3,205,462 A 9/1965 Meinke
3,218,384 A 11/1965 Shaw
3,219,954 A 11/1965 Rutelli
3,234,559 A 2/1966 Bartholoma et al.
3,255,454 A 6/1966 Walter et al.
3,296,364 A 1/1967 Jefferson et al.
3,296,685 A 1/1967 Menahem et al.
3,310,808 A 3/1967 Friis et al.
3,316,344 A 4/1967 Toms et al.
3,316,345 A 4/1967 Toms et al.
3,318,561 A 5/1967 Robertson, Jr. et al.
3,321,763 A 5/1967 Ikrath et al.
3,329,958 A 7/1967 Anderson et al.
3,351,947 A 11/1967 Hart et al.
3,355,738 A 11/1967 Algeo et al.
3,369,788 A 2/1968 Eisele
3,389,394 A 6/1968 Lewis et al.
3,392,388 A 7/1968 Tsuneo et al.
3,392,395 A 7/1968 Hannan

(56) References Cited

U.S. PATENT DOCUMENTS 3,411,112 A 11/1968 Honig et al.
3,413,637 A 11/1968 Goebels, Jr. et al.
3,413,642 A 11/1968 Cook
3,414,903 A 12/1968 Bartlett et al.
3,420,596 A 1/1969 Osterberg
3,427,573 A 2/1969 White et al.
3,448,455 A 6/1969 Alfandari et al.
3,453,617 A 7/1969 Brickey et al.
3,459,873 A 8/1969 Harris et al.
3,465,346 A 9/1969 Patterson et al.
3,474,995 A 10/1969 Amidon et al.
3,482,251 A 12/1969 Bowes
3,487,158 A 12/1969 Killian
3,495,262 A 2/1970 Robert et al.
3,500,422 A 3/1970 Grady et al.
3,509,463 A 4/1970 Woodward et al.
3,522,560 A 8/1970 Hayany
3,524,192 A 8/1970 Sakiotis et al.
3,529,205 A 9/1970 Miller
3,530,481 A 9/1970 Tanaka et al.
3,531,803 A 9/1970 Hudspeth et al.
3,536,800 A 10/1970 Hubbard
3,555,553 A 1/1971 Boyns
3,557,341 A 1/1971 Sochilin et al.
3,566,317 A 2/1971 Theodore
3,568,204 A 3/1971 Blaisdell
3,569,979 A 3/1971 Munk et al.
3,573,838 A 4/1971 Ajioka
3,588,754 A 6/1971 Theodore
3,588,755 A 6/1971 Kunio et al.
3,589,121 A 6/1971 Mulvey
3,594,494 A 7/1971 Ross et al.
3,599,219 A 8/1971 Hansen et al.
3,603,904 A 9/1971 Hafner
3,603,951 A 9/1971 Bracken et al.
3,609,247 A 9/1971 Halstead
3,623,114 A 11/1971 Seaton
3,624,655 A 11/1971 Yamada et al.
3,638,224 A 1/1972 Bailey et al.
3,653,622 A 4/1972 Farmer
3,666,902 A 5/1972 Owen et al.
3,668,459 A 6/1972 Symons et al.
3,668,574 A 6/1972 Barlow
3,672,202 A 6/1972 Barber et al.
3,686,596 A 8/1972 Albee
3,693,922 A 9/1972 Gueguen
3,699,574 A 10/1972 Plunk et al.
3,703,690 A 11/1972 Ravenscroft et al.
3,704,001 A 11/1972 Sloop
3,725,937 A 4/1973 Schreiber
3,753,086 A 8/1973 Shoemaker et al.
3,760,127 A 9/1973 Grossi et al.
3,765,021 A 10/1973 Chiron et al.
3,772,528 A 11/1973 Anderson et al.
3,775,769 A 11/1973 Heeren et al.
3,787,872 A 1/1974 Kauffman
3,796,970 A 3/1974 Snell
3,806,931 A 4/1974 Wright
3,833,909 A 9/1974 Schaufelberger
3,835,407 A 9/1974 Yariv et al.
3,845,426 A 10/1974 Barlow
3,858,214 A 12/1974 Jones
3,877,032 A 4/1975 Rosa
3,888,446 A 6/1975 O'Brien et al.
3,896,380 A 7/1975 Martin
3,906,508 A 9/1975 Foldes
3,911,415 A 10/1975 Whyte
3,921,949 A 11/1975 Coon
3,925,763 A 12/1975 Wadhwani
3,935,577 A 1/1976 Hansen et al.
3,936,836 A 2/1976 Wheeler et al.
3,936,838 A 2/1976 Foldes et al.
3,952,984 A 4/1976 Dimitry et al.
3,956,751 A 5/1976 Herman
3,959,794 A 5/1976 Chrepta et al.
3,973,087 A 8/1976 Fong et al.
3,973,240 A 8/1976 Fong et al.
3,976,358 A 8/1976 Thompson et al.
3,983,560 A 9/1976 MacDougall et al.
4,010,799 A 3/1977 Kern et al.
4,012,743 A 3/1977 Maciejewski et al.
4,020,431 A 4/1977 Saunders et al.
4,026,632 A 5/1977 Hill et al.
4,030,048 A 6/1977 Foldes et al.
4,030,953 A 6/1977 Rutschow et al.
4,031,536 A 6/1977 Alford et al.
4,035,054 A 7/1977 Lattanzi et al.
4,047,180 A 9/1977 Kuo et al.
4,079,361 A 3/1978 Woode et al.
4,080,600 A 3/1978 Toman et al.
4,099,184 A 7/1978 Rapshys et al.
4,114,121 A 9/1978 Barlow et al.
4,115,782 A 9/1978 Han et al.
4,123,759 A 10/1978 Hines et al.
4,125,768 A 11/1978 Jackson et al.
4,129,872 A 12/1978 Toman et al.
4,141,015 A 2/1979 Wong et al.
4,149,170 A 4/1979 Campbell et al.
4,155,108 A 5/1979 Tuttle et al.
4,156,241 A 5/1979 Mobley et al.
4,166,669 A 9/1979 Leonberger et al.
4,175,257 A 11/1979 Smith et al.
4,188,595 A 2/1980 Cronson et al.
4,190,137 A 2/1980 Shimada et al.
4,191,953 A 3/1980 Woode et al.
4,195,302 A 3/1980 Leupelt et al.
4,210,357 A 7/1980 Adachi et al.
4,216,449 A 8/1980 Kach
4,220,957 A 9/1980 Britt et al.
4,231,042 A 10/1980 Turrin et al.
4,234,753 A 11/1980 Clutter
4,238,974 A 12/1980 Fawcett et al.
4,246,584 A 1/1981 Noerpel et al.
4,247,858 A 1/1981 Eichweber et al.
4,250,489 A 2/1981 Dudash et al.
4,268,804 A 5/1981 Spinner et al.
4,274,097 A 6/1981 Krall et al.
4,274,112 A 6/1981 Leysieffer et al.
4,278,955 A 7/1981 Lunden et al.
4,293,833 A 10/1981 Popa et al.
4,298,877 A 11/1981 Sletten et al.
4,300,242 A 11/1981 Nava et al.
4,307,938 A 12/1981 Dyott et al.
4,316,646 A 2/1982 Siebens et al.
4,319,074 A 3/1982 Yaste et al.
4,329,690 A 5/1982 Parker et al.
4,333,082 A 6/1982 Susman et al.
4,335,613 A 6/1982 Luukkala et al.
4,336,719 A 6/1982 Lynnworth
4,345,256 A 8/1982 Rainwater et al.
4,366,565 A 12/1982 Herskowitz
4,367,446 A 1/1983 Hall et al.
4,378,143 A 3/1983 Winzer et al.
4,384,289 A 5/1983 Fernandes et al.
4,398,058 A 8/1983 Gerth et al.
4,398,121 A 8/1983 Chodorow et al.
4,413,263 A 11/1983 Amitay et al.
4,447,811 A 5/1984 Hamid et al.
4,458,250 A 7/1984 Bodnar et al.
4,463,329 A 7/1984 Suzuki et al.
4,468,672 A 8/1984 Dragone et al.
4,475,209 A 10/1984 Udren
4,477,814 A 10/1984 Brumbaugh et al.
4,482,899 A 11/1984 Dragone et al.
4,488,156 A 12/1984 DuFort et al.
4,491,386 A 1/1985 Negishi et al.
4,495,498 A 1/1985 Petrelis et al.
4,516,130 A 5/1985 Dragone
4,525,432 A 6/1985 Saito et al.
4,525,693 A 6/1985 Suzuki et al.
4,533,875 A 8/1985 Lau et al.
4,541,303 A 9/1985 Kuzunishi et al.
4,550,271 A 10/1985 Lau et al.
4,553,112 A 11/1985 Saad et al.

(56) References Cited

U.S. PATENT DOCUMENTS 4,556,271 A 12/1985 Hubbard
4,558,325 A 12/1985 Stroem et al.
4,565,348 A 1/1986 Larsen
4,566,012 A 1/1986 Choung et al.
4,567,401 A 1/1986 Barnett et al.
4,568,943 A 2/1986 Bowman
4,573,215 A 2/1986 Oates et al.
4,589,424 A 5/1986 Vaguine
4,598,262 A 7/1986 Chen et al.
4,599,598 A 7/1986 Komoda et al.
4,604,551 A 8/1986 Moeller et al.
4,604,624 A 8/1986 Amitay et al.
4,604,627 A 8/1986 Saad et al.
4,618,867 A 10/1986 Gans et al.
4,636,753 A 1/1987 Geller et al.
4,638,322 A 1/1987 Lamberty et al.
4,641,916 A 2/1987 Oestreich et al.
4,642,651 A 2/1987 Kuhn et al.
4,644,365 A 2/1987 Horning et al.
4,647,329 A 3/1987 Oono et al.
4,660,050 A 4/1987 Phillips et al.
4,665,660 A 5/1987 Krall et al.
4,672,384 A 6/1987 Roy et al.
4,673,943 A 6/1987 Hannan
4,680,558 A 7/1987 Ghosh et al.
4,694,599 A 9/1987 Hart et al.
4,704,611 A 11/1987 Edwards et al.
4,715,695 A 12/1987 Nishimura et al.
4,717,974 A 1/1988 Baumeister et al.
4,728,910 A 3/1988 Owens et al.
4,730,172 A 3/1988 Bengeult
4,730,888 A 3/1988 Darcie et al.
4,731,810 A 3/1988 Watkins
4,735,097 A 4/1988 Lynnworth et al.
4,743,915 A 5/1988 Rammos et al.
4,743,916 A 5/1988 Bengeult
4,745,377 A 5/1988 Stern et al.
4,746,241 A 5/1988 Burbank, III
4,749,244 A 6/1988 Luh
4,755,830 A 7/1988 Plunk et al.
4,757,324 A 7/1988 Dhanjal et al.
4,758,962 A 7/1988 Fernandes
4,764,738 A 8/1988 Fried et al.
4,772,891 A 9/1988 Svy
4,777,457 A 10/1988 Ghosh et al.
4,785,304 A 11/1988 Stern et al.
4,786,913 A 11/1988 Barendregt et al.
4,788,553 A 11/1988 Phillips et al.
4,792,771 A 12/1988 Siu et al.
4,792,812 A 12/1988 Rinehart et al.
4,799,031 A 1/1989 Lang et al.
4,800,350 A 1/1989 Bridges et al.
4,801,937 A 1/1989 Fernandes
4,818,963 A 4/1989 Green et al.
4,818,990 A 4/1989 Fernandes
4,821,006 A 4/1989 Ishikawa et al.
4,825,221 A 4/1989 Suzuki et al.
4,829,310 A 5/1989 Losee et al.
4,829,314 A 5/1989 Barbier et al.
4,831,346 A 5/1989 Brooker et al.
4,832,148 A 5/1989 Becker et al.
4,835,517 A 5/1989 Van Der Gracht et al.
4,839,659 A 6/1989 Stern et al.
4,845,508 A 7/1989 Krall et al.
4,847,610 A 7/1989 Ozawa et al.
4,849,611 A 7/1989 Whitney et al.
4,851,788 A 7/1989 Ives et al.
4,855,749 A 8/1989 DeFonzo et al.
4,866,454 A 9/1989 Droessler et al.
4,873,534 A 10/1989 Wohlleben et al.
4,879,544 A 11/1989 Maki et al.
4,881,028 A 11/1989 Bright et al.
4,886,980 A 12/1989 Fernandes et al.
4,897,663 A 1/1990 Kusano et al.
4,904,996 A 2/1990 Fernandes
4,915,468 A 4/1990 Kim et al.
4,916,460 A 4/1990 Powell et al.
4,922,180 A 5/1990 Saffer et al.
4,929,962 A 5/1990 Begout et al.
4,931,808 A 6/1990 Munson et al.
4,932,620 A 6/1990 Foy
4,946,202 A 8/1990 Perricone et al.
4,956,620 A 9/1990 Moeller et al.
4,965,856 A 10/1990 Swanic
4,977,593 A 12/1990 Ballance
4,977,618 A 12/1990 Allen
4,989,011 A 1/1991 Rosen et al.
4,998,095 A 3/1991 Shields
5,003,318 A 3/1991 Hall et al.
5,006,846 A 4/1991 Granville et al.
5,006,859 A 4/1991 Wong et al.
5,015,914 A 5/1991 Ives et al.
5,017,936 A 5/1991 Massey et al.
5,017,937 A 5/1991 Newham et al.
5,018,180 A 5/1991 Shoulders
5,019,832 A 5/1991 Ekdahl et al.
5,036,335 A 7/1991 Jairam et al.
H956 H 8/1991 Reindel
5,042,903 A 8/1991 Jakubowski et al.
5,043,538 A 8/1991 Hughey et al.
5,043,629 A 8/1991 Doane et al.
5,044,722 A 9/1991 Voser et al.
5,045,820 A 9/1991 Oehlerking et al.
5,057,106 A 10/1991 Kasevich et al.
5,065,760 A 11/1991 Krause et al.
5,065,969 A 11/1991 McLean et al.
5,072,228 A 12/1991 Kuwahara et al.
5,082,349 A 1/1992 Cordova-Plaza et al.
5,086,467 A 2/1992 Malek
5,107,231 A 4/1992 Knox et al.
5,109,232 A 4/1992 Monte et al.
5,113,197 A 5/1992 Luh et al.
5,117,237 A 5/1992 Legg
5,121,129 A 6/1992 Lee et al.
5,126,750 A 6/1992 Wang et al.
5,132,968 A 7/1992 Cephus
5,134,251 A 7/1992 Martin et al.
5,134,423 A 7/1992 Haupt et al.
5,134,965 A 8/1992 Tokuda et al.
5,136,671 A 8/1992 Dragone et al.
5,142,767 A 9/1992 Adams et al.
5,148,509 A 9/1992 Kannabiran et al.
5,152,861 A 10/1992 Hann
5,153,676 A 10/1992 Bergh et al.
5,166,698 A 11/1992 Ashbaugh et al.
5,174,164 A 12/1992 Wilheim et al.
5,175,560 A 12/1992 Lucas et al.
5,182,427 A 1/1993 McGaffigan et al.
5,187,409 A 2/1993 Ito et al.
5,193,774 A 3/1993 Rogers et al.
5,198,823 A 3/1993 Litchford et al.
5,212,755 A 5/1993 Holmberg et al.
5,214,394 A 5/1993 Wong et al.
5,214,438 A 5/1993 Smith et al.
5,216,616 A 6/1993 Masters
5,218,657 A 6/1993 Tokudome et al.
5,235,662 A 8/1993 Prince et al.
5,239,537 A 8/1993 Sakauchi
5,241,321 A 8/1993 Tsao et al.
5,241,701 A 8/1993 Andoh et al.
5,248,876 A 9/1993 Kerstens et al.
5,254,809 A 10/1993 Martin
5,265,266 A 11/1993 Trinh
5,266,961 A 11/1993 Milroy et al.
5,276,455 A 1/1994 Fitzsimmons et al.
5,278,687 A 1/1994 Jannson et al.
5,280,297 A 1/1994 Profera et al.
5,291,211 A 3/1994 Tropper et al.
5,298,911 A 3/1994 Li et al.
5,299,773 A 4/1994 Bertrand et al.
5,304,999 A 4/1994 Roberts et al.
5,311,596 A 5/1994 Scott et al.
5,327,149 A 7/1994 Kuffer et al.
5,329,285 A 7/1994 McCandless et al.

(56) References Cited

U.S. PATENT DOCUMENTS 5,341,088 A 8/1994 David
5,345,522 A 9/1994 Vali et al.
5,347,287 A 9/1994 Speciale et al.
5,352,984 A 10/1994 Piesinger et al.
5,353,036 A 10/1994 Baldry
5,359,338 A 10/1994 Hatcher et al.
5,371,623 A 12/1994 Eastmond et al.
5,379,455 A 1/1995 Koschek et al.
5,380,224 A 1/1995 DiCicco
5,381,160 A 1/1995 Landmeier
5,389,442 A 2/1995 Kathiresan et al.
5,400,040 A 3/1995 Lane et al.
5,402,140 A 3/1995 Rodeffer et al.
5,402,151 A 3/1995 Duwaer
5,404,146 A 4/1995 Rutledge et al.
5,410,318 A 4/1995 Wong et al.
5,412,654 A 5/1995 Perkins
5,428,364 A 6/1995 Lee et al.
5,428,818 A 6/1995 Meidan et al.
5,434,575 A 7/1995 Jelinek et al.
5,440,660 A 8/1995 Dombrowski et al.
5,451,969 A 9/1995 Toth et al.
5,457,469 A 10/1995 Diamond et al.
5,479,176 A 12/1995 Zayrel et al.
5,481,268 A 1/1996 Higgins
5,482,525 A 1/1996 Kajioka et al.
5,486,839 A 1/1996 Rodeffer et al.
5,488,380 A 1/1996 Harvey et al.
5,495,546 A 2/1996 Bottoms et al.
5,499,308 A 3/1996 Arai et al.
5,499,311 A 3/1996 DeCusatis et al.
5,502,392 A 3/1996 Arjavalingam et al.
5,512,906 A 4/1996 Speciale et al.
5,513,176 A 4/1996 Dean et al.
5,514,965 A 5/1996 Westwood
5,515,059 A 5/1996 How et al.
5,519,408 A 5/1996 Schnetzer
5,528,208 A 6/1996 Kobayashi et al.
5,539,421 A 7/1996 Hong et al.
5,543,000 A 8/1996 Lique
5,557,283 A 9/1996 Sheen
5,559,359 A 9/1996 Reyes
5,566,022 A 10/1996 Segev
5,566,196 A 10/1996 Scifres
5,576,721 A 11/1996 Hwang et al.
5,586,054 A 12/1996 Jensen et al.
5,592,183 A 1/1997 Henf
5,600,630 A 2/1997 Takahashi et al.
5,603,089 A 2/1997 Searle et al.
5,619,015 A 4/1997 Kirma
5,621,421 A 4/1997 Kolz et al.
5,627,879 A 5/1997 Russell et al.
5,628,050 A 5/1997 McGraw et al.
5,630,223 A 5/1997 Bahu et al.
5,637,521 A 6/1997 Rhodes et al.
5,640,168 A 6/1997 Heger et al.
5,646,936 A 7/1997 Shah et al.
5,650,788 A 7/1997 Jha
5,652,554 A 7/1997 Krieg et al.
5,663,693 A 9/1997 Doughty et al.
5,671,304 A 9/1997 Duguay
5,677,699 A 10/1997 Strickland
5,677,909 A 10/1997 Heide
5,680,139 A 10/1997 Huguenin et al.
5,682,256 A 10/1997 Motley et al.
5,684,495 A 11/1997 Dyott et al.
5,686,930 A 11/1997 Brydon
5,724,168 A 3/1998 Oschmann et al.
5,726,980 A 3/1998 Rickard et al.
5,748,153 A 5/1998 McKinzie et al.
5,750,941 A 5/1998 Ishikawa et al.
5,757,323 A 5/1998 Spencer et al.
5,767,807 A 6/1998 Pritchett et al.
5,768,689 A 6/1998 Borg
5,769,879 A 6/1998 Levay et al.
5,784,033 A 7/1998 Boldissar, Jr. et al.
5,784,034 A 7/1998 Konishi et al.
5,784,683 A 7/1998 Sistanizadeh et al.
5,787,673 A 8/1998 Noble
5,793,334 A 8/1998 Harrison et al.
5,800,494 A 9/1998 Campbell et al.
5,805,983 A 9/1998 Naidu et al.
5,809,395 A 9/1998 Hamilton-Piercy et al.
5,812,524 A 9/1998 Moran et al.
5,818,390 A 10/1998 Hill
5,818,396 A 10/1998 Harrison Douglas et al.
5,818,512 A 10/1998 Fuller
5,845,391 A 12/1998 Miklosko et al.
5,848,054 A 12/1998 Mosebrook et al.
5,850,199 A 12/1998 Wan et al.
5,854,608 A 12/1998 Leisten
5,859,618 A 1/1999 Miller, II et al.
5,861,843 A 1/1999 Sorace et al.
5,867,763 A 2/1999 Dean et al.
5,870,060 A 2/1999 Chen et al.
5,872,544 A 2/1999 Schay et al.
5,872,547 A 2/1999 Martek
5,873,324 A 2/1999 Kaddas et al.
5,886,666 A 3/1999 Schellenberg et al.
5,889,449 A 3/1999 Fiedziuszko
5,890,055 A 3/1999 Chu et al.
5,892,480 A 4/1999 Killen et al.
5,898,133 A 4/1999 Bleich et al.
5,898,830 A 4/1999 Wesinger, Jr. et al.
5,900,847 A 5/1999 Ishikawa et al.
5,903,373 A 5/1999 Welch et al.
5,905,438 A 5/1999 Weiss et al.
5,905,949 A 5/1999 Hawkes et al.
5,910,790 A 6/1999 Ohmuro et al.
5,917,977 A 6/1999 Barrett et al.
5,922,081 A 7/1999 Seewig et al.
5,926,128 A 7/1999 Brash et al.
5,933,422 A 8/1999 Suzuki et al.
5,936,589 A 8/1999 Kawahata
5,948,044 A 9/1999 Varley et al.
5,948,108 A 9/1999 Lu et al.
5,952,964 A 9/1999 Chan et al.
5,952,972 A 9/1999 Ittipiboon et al.
5,952,984 A 9/1999 Kuramoto et al.
5,955,992 A 9/1999 Shattil
5,959,578 A 9/1999 Kreutel et al.
5,959,590 A 9/1999 Sanford et al.
5,973,641 A 10/1999 Smith et al.
5,977,650 A 11/1999 Rickard et al.
5,978,738 A 11/1999 Brown et al.
5,982,276 A 11/1999 Stewart
5,986,331 A 11/1999 Letavic et al.
5,987,099 A 11/1999 O'Neill et al.
5,990,848 A 11/1999 Annamaa et al.
5,994,984 A 11/1999 Stancil et al.
5,994,998 A 11/1999 Fisher et al.
6,005,694 A 12/1999 Liu
6,005,758 A 12/1999 Spencer et al.
6,009,124 A 12/1999 Smith
6,011,520 A 1/2000 Howell et al.
6,011,524 A 1/2000 Jervis et al.
6,014,110 A 1/2000 Bridges et al.
6,018,659 A 1/2000 Ayyagari et al.
6,023,619 A 2/2000 Kaminsky
6,026,173 A 2/2000 Svenson et al.
6,026,208 A 2/2000 Will et al.
6,026,331 A 2/2000 Feldberg et al.
6,031,455 A 2/2000 Grube et al.
6,034,638 A 3/2000 Thiel et al.
6,037,894 A 3/2000 Pfizenmaier et al.
6,038,425 A 3/2000 Jeffrey et al.
6,049,647 A 4/2000 Register et al.
6,057,802 A 5/2000 Nealy
6,061,035 A 5/2000 Kinasewitz et al.
6,063,234 A 5/2000 Chen et al.
6,075,451 A 6/2000 Lebowitz et al.
6,075,493 A 6/2000 Sugawara et al.
6,076,044 A 6/2000 Brown et al.
6,078,297 A 6/2000 Kormanyos et al.

(56) References Cited

U.S. PATENT DOCUMENTS 6,088,001 A 7/2000 Burger et al.
6,095,820 A 8/2000 Luxon et al.
6,100,846 A 8/2000 Li et al.
6,103,031 A 8/2000 Aeschbacher et al.
6,107,897 A 8/2000 Hewett et al.
6,111,553 A 8/2000 Steenbuck et al.
6,114,998 A 9/2000 Schefte et al.
6,121,885 A 9/2000 Masone et al.
6,122,753 A 9/2000 Masuo et al.
6,140,911 A 10/2000 Fisher et al.
6,140,976 A 10/2000 Locke et al.
6,142,434 A 11/2000 Brinkman et al.
6,146,330 A 11/2000 Tujino et al.
6,150,612 A 11/2000 Grandy et al.
6,151,145 A 11/2000 Srivastava et al.
6,154,488 A 11/2000 Hunt
6,158,383 A 12/2000 Watanabe et al.
6,163,296 A 12/2000 Lier et al.
6,166,694 A 12/2000 Ying et al.
6,167,055 A 12/2000 Ganek et al.
6,175,917 B1 1/2001 Arrow et al.
6,177,801 B1 1/2001 Chong et al.
6,184,828 B1 2/2001 Shoki et al.
6,195,058 B1 2/2001 Nakamura et al.
6,195,395 B1 2/2001 Frodsham et al.
6,198,440 B1 3/2001 Krylov et al.
6,208,161 B1 3/2001 Suda et al.
6,208,308 B1 3/2001 Lemons et al.
6,208,903 B1 3/2001 Richards et al.
6,211,836 B1 4/2001 Manasson et al.
6,211,837 B1 4/2001 Crouch et al.
6,215,443 B1 4/2001 Komatsu et al.
6,219,006 B1 4/2001 Rudish et al.
6,222,503 B1 4/2001 Gietema et al.
6,225,960 B1 5/2001 Collins et al.
6,229,327 B1 5/2001 Boll et al.
6,236,365 B1 5/2001 Karr et al.
6,239,377 B1 5/2001 Nishikawa et al.
6,239,379 B1 5/2001 Cotter et al.
6,239,761 B1 5/2001 Guo et al.
6,241,045 B1 6/2001 Reeve et al.
6,243,049 B1 6/2001 Chandler et al.
6,246,821 B1 6/2001 Hemken et al.
6,252,553 B1 6/2001 Solomon et al.
6,259,337 B1 7/2001 Wen et al.
6,266,016 B1 7/2001 Bergstedt et al.
6,266,025 B1 7/2001 Popa et al.
6,268,835 B1 7/2001 Toland et al.
6,271,790 B2 8/2001 Smith et al.
6,271,799 B1 8/2001 Rief et al.
6,271,952 B1 8/2001 Epworth et al.
6,278,357 B1 8/2001 Croushore et al.
6,278,370 B1 8/2001 Underwood et al.
6,281,855 B1 8/2001 Aoki et al.
6,282,354 B1 8/2001 Jones et al.
6,283,425 B1 9/2001 Liljevik
6,285,325 B1 9/2001 Nalbandian et al.
6,292,139 B1 9/2001 Yamamoto et al.
6,292,143 B1 9/2001 Romanofsky et al.
6,292,153 B1 9/2001 Aiello et al.
6,300,898 B1 10/2001 Schneider et al.
6,300,906 B1 10/2001 Rawnick et al.
6,301,420 B1 10/2001 Greenaway et al.
6,308,085 B1 10/2001 Shoki et al.
6,311,288 B1 10/2001 Heeren et al.
6,317,028 B1 11/2001 Valiulis et al.
6,317,092 B1 11/2001 de Schweinitz et al.
6,320,509 B1 11/2001 Brady et al.
6,320,553 B1 11/2001 Ergene et al.
6,323,819 B1 11/2001 Ergene et al.
6,329,959 B1 12/2001 Varadan et al.
6,348,683 B1 2/2002 Verghese et al.
6,351,247 B1 2/2002 Linstrom et al.
6,357,709 B1 3/2002 Parduhn et al.
6,362,788 B1 3/2002 Louzir
6,362,789 B1 3/2002 Trumbull et al.
6,366,238 B1 4/2002 DeMore et al.
6,373,436 B1 4/2002 Chen et al.
6,373,441 B1 4/2002 Porath et al.
6,376,824 B1 4/2002 Michenfelder et al.
6,388,564 B1 5/2002 Piercy et al.
6,396,440 B1 5/2002 Chen
6,404,773 B1 6/2002 Williams et al.
6,404,775 B1 6/2002 Leslie
6,421,021 B1 7/2002 Rupp et al.
6,433,736 B1 8/2002 Timothy et al.
6,433,741 B2 8/2002 Tanizaki et al.
6,436,536 B2 8/2002 Peruzzotti et al.
6,441,723 B1 8/2002 Mansfield, Jr. et al.
6,445,351 B1 9/2002 Baker et al.
6,445,774 B1 9/2002 Kidder et al.
6,448,850 B1 * 9/2002 Yamada ................ H01S 3/0903 315/4
6,452,467 B1 9/2002 McEwan
6,452,569 B1 9/2002 Park et al.
6,452,923 B1 9/2002 Gerszberg et al.
6,455,769 B1 9/2002 Belli et al.
6,456,251 B1 9/2002 Rao et al.
6,462,700 B1 10/2002 Schmidt et al.
6,463,295 B1 10/2002 Yun et al.
6,469,676 B1 10/2002 Fehrenbach et al.
6,473,049 B2 10/2002 Takeuchi et al.
6,480,168 B1 11/2002 Lam et al.
6,483,470 B1 11/2002 Hohnstein et al.
6,489,928 B2 12/2002 Sakurada
6,489,931 B2 12/2002 Liu et al.
6,492,957 B2 12/2002 Carillo, Jr. et al.
6,501,433 B2 12/2002 Popa et al.
6,507,573 B1 1/2003 Brandt et al.
6,510,152 B1 1/2003 Gerszberg et al.
6,515,635 B2 2/2003 Chiang et al.
6,522,305 B2 2/2003 Sharman et al.
6,531,991 B2 3/2003 Adachi et al.
6,532,215 B1 3/2003 Muntz et al.
6,534,996 B1 3/2003 Amrany et al.
6,535,169 B2 3/2003 Fourdeux et al.
6,542,739 B1 4/2003 Garner
6,549,106 B2 4/2003 Martin et al.
6,549,173 B1 4/2003 King et al.
6,552,693 B1 4/2003 Leisten et al.
6,559,811 B1 5/2003 Cash et al.
6,563,981 B2 5/2003 Weisberg et al.
6,567,573 B1 5/2003 Domash et al.
6,573,803 B1 6/2003 Ziegner et al.
6,573,813 B1 6/2003 Joannopoulos et al.
6,580,295 B2 6/2003 Takekuma et al.
6,584,084 B1 6/2003 Barany et al.
6,584,252 B1 6/2003 Schier et al.
6,587,077 B2 7/2003 Vail et al.
6,593,893 B2 7/2003 Hou et al.
6,594,238 B1 7/2003 Wallentin et al.
6,596,944 B1 7/2003 Clark et al.
6,600,456 B2 7/2003 Gothard et al.
6,606,057 B2 8/2003 Chiang et al.
6,606,066 B1 8/2003 Fawcett et al.
6,606,077 B2 8/2003 Ebling et al.
6,611,252 B1 8/2003 DuFaux et al.
6,614,237 B2 9/2003 Ademian et al.
6,628,859 B2 9/2003 Huang et al.
6,631,229 B1 10/2003 Norris et al.
6,634,225 B1 10/2003 Reime et al.
6,639,484 B2 10/2003 Tzuang et al.
6,639,566 B2 10/2003 Knop et al.
6,642,887 B2 11/2003 Owechko et al.
6,643,254 B1 11/2003 Abe et al.
6,650,296 B2 11/2003 Wong et al.
6,653,598 B2 11/2003 Sullivan et al.
6,653,848 B2 11/2003 Adamian et al.
6,657,437 B1 12/2003 LeCroy et al.
6,659,655 B2 12/2003 Dair et al.
6,661,391 B2 12/2003 Ohara et al.
6,668,104 B1 12/2003 Mueller-Fiedler et al.
6,670,921 B2 12/2003 Sievenpiper et al.
6,671,824 B1 12/2003 Hyland et al.

(56) References Cited

U.S. PATENT DOCUMENTS 6,677,899 B1 1/2004 Lee et al.
6,680,903 B1 1/2004 Moriguchi et al.
6,683,580 B2 1/2004 Kuramoto
6,686,832 B2 2/2004 Abraham et al.
6,686,873 B2 2/2004 Patel et al.
6,686,875 B1 2/2004 Wolfson et al.
6,697,027 B2 2/2004 Mahon et al.
6,697,030 B2 2/2004 Gleener
6,703,981 B2 3/2004 Meitzler et al.
6,714,165 B2 3/2004 Verstraeten
6,720,935 B2 4/2004 Lamensdorf et al.
6,725,035 B2 4/2004 Jochim et al.
6,727,470 B2 4/2004 Reichle et al.
6,727,891 B2 4/2004 Moriya et al.
6,728,439 B2 4/2004 Weisberg et al.
6,728,552 B2 4/2004 Chatain et al.
6,731,210 B2 5/2004 Swanson et al.
6,731,649 B1 5/2004 Silverman
6,741,705 B1 5/2004 Nelson et al.
6,747,557 B1 6/2004 Petite et al.
6,750,827 B2 6/2004 Manasson et al.
6,754,470 B2 6/2004 Hendrickson et al.
6,755,312 B2 6/2004 Dziedzic et al.
6,756,538 B1 6/2004 Murga-Gonzalez et al.
6,765,479 B2 7/2004 Stewart et al.
6,768,454 B2 7/2004 Kingsley et al.
6,768,456 B1 7/2004 Lalezari et al.
6,768,471 B2 7/2004 Bostwick et al.
6,768,474 B2 7/2004 Hunt et al.
6,771,216 B2 8/2004 Patel et al.
6,771,225 B2 8/2004 Tits et al.
6,771,739 B1 8/2004 Beamon et al.
6,774,859 B2 8/2004 Schantz et al.
6,788,865 B2 9/2004 Kawanishi et al.
6,788,951 B2 9/2004 Aoki et al.
6,789,119 B1 9/2004 Zhu et al.
6,792,290 B2 9/2004 Proctor, Jr. et al.
6,798,223 B2 9/2004 Huang et al.
6,806,710 B1 10/2004 Renz et al.
6,809,633 B2 10/2004 Cern et al.
6,809,695 B2 10/2004 Le Bayon et al.
6,812,895 B2 11/2004 Anderson et al.
6,819,744 B1 11/2004 Galli et al.
6,822,615 B2 11/2004 Quan et al.
6,839,032 B2 1/2005 Teshirogi et al.
6,839,160 B2 1/2005 Tsuda et al.
6,839,846 B2 1/2005 Mangold et al.
6,842,157 B2 1/2005 Phelan et al.
6,842,430 B1 1/2005 Melnik et al.
6,850,128 B2 2/2005 Park
6,853,351 B1 2/2005 Mohuchy et al.
6,856,273 B1 2/2005 Bognar et al.
6,859,185 B2 2/2005 Royalty et al.
6,859,187 B2 2/2005 Ohlsson et al.
6,859,590 B1 2/2005 Zaccone
6,861,998 B2 3/2005 Louzir
6,864,851 B2 3/2005 McGrath et al.
6,864,853 B2 3/2005 Judd et al.
6,867,744 B2 3/2005 Toncich et al.
6,868,258 B2 3/2005 Hayata et al.
6,870,465 B1 3/2005 Song et al.
6,873,265 B2 3/2005 Bleier et al.
6,885,674 B2 4/2005 Hunt et al.
6,886,065 B2 4/2005 Sides et al.
6,888,623 B2 5/2005 Clements
6,901,064 B2 5/2005 Billhartz et al.
6,904,218 B2 6/2005 Sun et al.
6,906,676 B2 6/2005 Killen et al.
6,906,681 B2 6/2005 Hoppenstein et al.
6,909,893 B2 6/2005 Aoki et al.
6,917,974 B1 7/2005 Stytz et al.
6,920,289 B2 7/2005 Zimmerman et al.
6,920,315 B1 7/2005 Wilcox et al.
6,920,407 B2 7/2005 Phillips et al.
6,922,135 B2 7/2005 Abraham et al.
6,924,732 B2 8/2005 Yokoo et al.
6,924,776 B2 8/2005 Le et al.
6,928,194 B2 8/2005 Mai et al.
6,933,887 B2 8/2005 Regnier et al.
6,934,655 B2 8/2005 Jones et al.
6,937,595 B2 8/2005 Barzegar et al.
6,943,553 B2 9/2005 Zimmermann et al.
6,944,555 B2 9/2005 Blackett et al.
6,947,147 B2 9/2005 Motamedi et al.
6,947,376 B1 9/2005 Deng et al.
6,947,635 B2 9/2005 Kohns et al.
6,948,371 B2 9/2005 Tanaka et al.
6,950,567 B2 9/2005 Kline et al.
6,952,143 B2 10/2005 Kinayman et al.
6,952,183 B2 10/2005 Yuanzhu et al.
6,956,506 B2 10/2005 Koivumaeki et al.
6,958,729 B1 10/2005 Metz et al.
6,965,302 B2 11/2005 Mollenkopf et al.
6,965,355 B1 11/2005 Durham et al.
6,965,784 B2 11/2005 Kanamaluru et al.
6,967,627 B2 11/2005 Roper et al.
6,970,502 B2 11/2005 Kim et al.
6,970,682 B2 11/2005 Crilly, Jr. et al.
6,972,729 B2 12/2005 Wang et al.
6,980,091 B2 12/2005 White, II et al.
6,982,611 B2 1/2006 Cope et al.
6,982,679 B2 1/2006 Kralovec et al.
6,983,174 B2 1/2006 Hoppenstein et al.
6,985,118 B2 1/2006 Killen et al.
6,992,639 B1 1/2006 Lier et al.
6,999,667 B2 2/2006 Jang et al.
7,008,120 B2 3/2006 Zaborsky et al.
7,009,471 B2 3/2006 Elmore
7,012,489 B2 3/2006 Fisher et al.
7,012,572 B1 3/2006 Schaffner et al.
7,016,585 B2 3/2006 Diggle, III et al.
7,019,704 B2 3/2006 Weiss et al.
7,023,400 B2 4/2006 Hill et al.
7,026,917 B2 4/2006 Berkman et al.
7,027,003 B2 4/2006 Sasaki et al.
7,027,454 B2 4/2006 Dent et al.
7,032,016 B2 4/2006 Cerami et al.
7,038,636 B2 5/2006 Larouche et al.
7,039,048 B1 5/2006 Monta et al.
7,042,403 B2 5/2006 Sievenpiper et al.
7,042,416 B2 5/2006 Kingsley et al.
7,042,420 B2 5/2006 Ebling et al.
7,043,271 B1 5/2006 Seto et al.
7,054,286 B2 5/2006 Ertel et al.
7,054,376 B1 5/2006 Rubinstain et al.
7,054,513 B2 5/2006 Herz et al.
7,055,148 B2 5/2006 Marsh et al.
7,057,558 B2 6/2006 Yasuho et al.
7,057,573 B2 6/2006 Ohira et al.
7,058,524 B2 6/2006 Hayes et al.
7,061,370 B2 6/2006 Cern et al.
7,061,891 B1 6/2006 Kilfoyle et al.
7,064,726 B2 6/2006 Kitamori et al.
7,068,998 B2 6/2006 Zavidniak et al.
7,069,163 B2 6/2006 Gunther et al.
7,075,414 B2 7/2006 Giannini et al.
7,075,485 B2 7/2006 Song et al.
7,075,496 B2 7/2006 Hidai et al.
7,082,321 B2 7/2006 Kuwahara et al.
7,084,742 B2 8/2006 Haines et al.
7,088,221 B2 8/2006 Chan
7,088,306 B2 8/2006 Chiang et al.
7,098,405 B2 8/2006 Glew et al.
7,098,773 B2 8/2006 Berkman et al.
7,102,581 B1 9/2006 West et al.
7,106,265 B2 9/2006 Robertson et al.
7,106,270 B2 9/2006 Iigusa et al.
7,106,273 B1 9/2006 Brunson et al.
7,109,939 B2 9/2006 Lynch et al.
7,113,002 B2 9/2006 Otsuka et al.
7,113,134 B1 9/2006 Berkman et al.
7,119,755 B2 10/2006 Harvey et al.
7,120,338 B2 10/2006 Gunn, III et al.
7,120,345 B2 10/2006 Naitou et al.

(56) References Cited

U.S. PATENT DOCUMENTS 7,122,012 B2 10/2006 Bouton et al.
7,123,191 B2 10/2006 Goldberg et al.
7,123,801 B2 10/2006 Fitz et al.
7,125,512 B2 10/2006 Crump et al.
7,126,557 B2 10/2006 Warnagiris et al.
7,126,711 B2 10/2006 Fruth
7,127,348 B2 10/2006 Smitherman et al.
7,130,516 B2 10/2006 Wu et al.
7,132,950 B2 11/2006 Stewart et al.
7,133,930 B2 11/2006 Sabio et al.
7,134,012 B2 11/2006 Doyle et al.
7,134,135 B2 11/2006 Cerami et al.
7,136,397 B2 11/2006 Sharma et al.
7,136,772 B2 11/2006 Duchi et al.
7,137,605 B1 11/2006 Guertler et al.
7,138,767 B2 11/2006 Chen et al.
7,138,958 B2 11/2006 Syed et al.
7,139,328 B2 11/2006 Thomas et al.
7,145,440 B2 12/2006 Gerszberg et al.
7,145,552 B2 12/2006 Hollingsworth et al.
7,151,497 B2 12/2006 Crystal et al.
7,151,508 B2 12/2006 Schaffner et al.
7,155,238 B2 12/2006 Katz et al.
7,161,934 B2 1/2007 Buchsbaum et al.
7,164,354 B1 1/2007 Panzer et al.
7,167,139 B2 1/2007 Kim et al.
7,171,087 B2 1/2007 Takahashi et al.
7,171,308 B2 1/2007 Campbell et al.
7,171,493 B2 1/2007 Shu et al.
7,176,589 B2 2/2007 Rouquette et al.
7,180,459 B2 2/2007 Damini et al.
7,180,467 B2 2/2007 Fabrega-Sanchez
7,183,922 B2 2/2007 Mendolia et al.
7,183,991 B2 2/2007 Bhattacharyya et al.
7,183,998 B2 2/2007 Wilhelm et al.
7,193,562 B2 3/2007 Kish et al.
7,194,528 B1 3/2007 Davidow et al.
7,199,680 B2 4/2007 Fukunaga et al.
7,200,391 B2 4/2007 Chung et al.
7,200,658 B2 4/2007 Goeller et al.
7,205,950 B2 4/2007 Imai et al.
7,212,163 B2 5/2007 Huang et al.
7,215,220 B1 5/2007 Jia et al.
7,215,928 B2 5/2007 Gage et al.
7,218,285 B2 5/2007 Davis et al.
7,224,170 B2 5/2007 Graham et al.
7,224,243 B2 5/2007 Cope et al.
7,224,272 B2 5/2007 White, II et al.
7,224,320 B2 5/2007 Cook et al.
7,224,985 B2 5/2007 Caci et al.
7,228,123 B2 6/2007 Moursund et al.
7,234,413 B2 6/2007 Suzuki et al.
7,234,895 B2 6/2007 Richardson et al.
7,239,284 B1 7/2007 Staal et al.
7,243,610 B2 7/2007 Ishii et al.
7,248,148 B2 7/2007 Kline et al.
7,250,772 B2 7/2007 Furse et al.
7,255,821 B2 8/2007 Priedeman, Jr. et al.
7,259,657 B2 8/2007 Mollenkopf et al.
7,260,424 B2 8/2007 Schmidt et al.
7,266,154 B2 9/2007 Gundrum et al.
7,266,275 B2 9/2007 Hansen et al.
7,272,281 B2 9/2007 Stahulak et al.
7,272,362 B2 9/2007 Jeong et al.
7,274,305 B1 9/2007 Luttrell
7,274,936 B2 9/2007 Stern-Berkowitz et al.
7,276,990 B2 10/2007 Sievenpiper et al.
7,280,033 B2 10/2007 Berkman et al.
7,280,803 B2 10/2007 Nelson et al.
7,282,922 B2 10/2007 Lo et al.
7,286,099 B1 10/2007 Lier et al.
7,289,449 B1 10/2007 Rubinstein et al.
7,289,704 B1 10/2007 Wagman et al.
7,289,828 B2 10/2007 Cha et al.
7,292,125 B2 11/2007 Mansour et al.
7,292,196 B2 11/2007 Waterhouse et al.
7,295,161 B2 11/2007 Gaucher et al.
7,297,869 B2 11/2007 Hiller et al.
7,301,440 B2 11/2007 Mollenkopf
7,301,508 B1 11/2007 O'Loughlin et al.
7,307,357 B2 12/2007 Kopp et al.
7,307,596 B1 12/2007 West et al.
7,308,264 B2 12/2007 Stern-Berkowitz et al.
7,308,370 B2 12/2007 Mason, Jr. et al.
7,309,873 B2 12/2007 Ishikawa
7,310,065 B2 12/2007 Anguera et al.
7,310,335 B1 12/2007 Garcia-Luna-Aceves et al.
7,311,605 B2 12/2007 Moser
7,312,686 B2 12/2007 Bruno
7,313,087 B2 12/2007 Patil et al.
7,313,312 B2 12/2007 Kimball et al.
7,315,224 B2 1/2008 Gurovich et al.
7,315,678 B2 1/2008 Siegel
7,318,564 B1 1/2008 Marshall et al.
7,319,717 B2 1/2008 Zitting et al.
7,321,291 B2 1/2008 Gidge et al.
7,321,707 B2 1/2008 Noda et al.
7,324,046 B1 1/2008 Wu et al.
7,324,817 B2 1/2008 Iacono et al.
7,329,815 B2 2/2008 Johnston et al.
7,333,064 B1 2/2008 Timothy et al.
7,333,593 B2 2/2008 Beamon et al.
7,339,466 B2 3/2008 Mansfield et al.
7,339,897 B2 3/2008 Larsson et al.
7,340,768 B2 3/2008 Rosenberger et al.
7,345,623 B2 3/2008 McEwan et al.
7,346,244 B2 3/2008 Gowan et al.
7,346,359 B2 3/2008 Damarla et al.
7,353,293 B2 4/2008 Hipfinger et al.
7,355,560 B2 4/2008 Nagai et al.
7,358,808 B2 4/2008 Berkman et al.
7,358,921 B2 4/2008 Snyder et al.
7,369,085 B1 5/2008 Jacomb-Hood
7,369,095 B2 5/2008 Thudor et al.
7,376,191 B2 5/2008 Melick et al.
7,380,272 B2 5/2008 Sharp et al.
7,381,089 B2 6/2008 Hosler, Sr.
7,382,232 B2 6/2008 Gidge et al.
7,383,577 B2 6/2008 Hrastar et al.
7,388,450 B2 6/2008 Camiade et al.
7,397,422 B2 7/2008 Tekawy et al.
7,398,946 B1 7/2008 Marshall
7,400,304 B2 7/2008 Lewis et al.
7,403,169 B2 7/2008 Svensson et al.
7,406,337 B2 7/2008 Kim et al.
7,408,426 B2 8/2008 Broyde et al.
7,408,507 B1 8/2008 Paek et al.
7,408,923 B1 8/2008 Khan et al.
7,410,606 B2 8/2008 Atkinson et al.
7,417,587 B2 8/2008 Iskander et al.
7,418,178 B2 8/2008 Kudou et al.
7,418,273 B2 8/2008 Suyama et al.
7,420,474 B1 9/2008 Elks et al.
7,420,525 B2 9/2008 Colburn et al.
7,423,604 B2 9/2008 Nagai et al.
7,426,554 B2 9/2008 Kennedy et al.
7,427,927 B2 9/2008 Borleske et al.
7,430,257 B1 9/2008 Shattil et al.
7,430,932 B2 10/2008 Mekhanoshin et al.
7,443,334 B2 10/2008 Rees et al.
7,444,404 B2 10/2008 Wetherall et al.
7,446,567 B2 11/2008 Otsuka et al.
7,450,000 B2 11/2008 Gidge et al.
7,450,001 B2 11/2008 Berkman
7,453,352 B2 11/2008 Kline et al.
7,453,393 B2 11/2008 Duivenvoorden et al.
7,456,650 B2 11/2008 Lee et al.
7,459,834 B2 12/2008 Knowles et al.
7,460,834 B2 12/2008 Johnson et al.
7,463,877 B2 12/2008 Iwamura
7,465,879 B2 12/2008 Glew et al.
7,466,225 B2 12/2008 White, II et al.
7,468,657 B2 12/2008 Yaney
7,477,285 B1 1/2009 Johnson et al.

(56) References Cited

U.S. PATENT DOCUMENTS 7,479,776 B2 1/2009 Renken et al.
7,479,841 B2 1/2009 Stenger et al.
7,486,247 B2 2/2009 Ridgway et al.
7,490,275 B2 2/2009 Zerbe et al.
7,492,317 B2 2/2009 Tinsley et al.
7,496,674 B2 2/2009 Jorgensen et al.
7,498,822 B2 3/2009 Lee et al.
7,502,619 B1 3/2009 Katz et al.
7,504,938 B2 3/2009 Eiza et al.
7,508,834 B2 3/2009 Berkman et al.
7,509,009 B2 3/2009 Suzuki et al.
7,509,675 B2 3/2009 Aaron et al.
7,511,662 B2 3/2009 Mathews et al.
7,512,090 B2 3/2009 Benitez Pelaez et al.
7,515,041 B2 4/2009 Eisold et al.
7,516,487 B1 4/2009 Szeto et al.
7,518,529 B2 4/2009 O'Sullivan et al.
7,518,952 B1 4/2009 Padden et al.
7,519,323 B2 4/2009 Mohebbi et al.
7,522,115 B2 4/2009 Waltman et al.
7,522,812 B2 4/2009 Zitting
7,525,501 B2 4/2009 Black et al.
7,525,504 B1 4/2009 Song et al.
7,531,803 B2 5/2009 Mittleman et al.
7,532,792 B2 5/2009 Skovgaard et al.
7,535,867 B1 5/2009 Kilfoyle et al.
7,539,381 B2 5/2009 Li et al.
7,541,981 B2 6/2009 Piskun et al.
7,545,818 B2 6/2009 Chen et al.
7,546,214 B2 6/2009 Rivers, Jr. et al.
7,548,212 B2 6/2009 Chekroun et al.
7,551,921 B2 6/2009 Petermann et al.
7,554,998 B2 6/2009 Simonsson et al.
7,555,182 B2 6/2009 Martin et al.
7,555,186 B2 6/2009 De Montmorillon et al.
7,555,187 B2 6/2009 Rickham et al.
7,557,563 B2 7/2009 Cowan et al.
7,561,025 B2 7/2009 Gerszberg et al.
7,567,154 B2 7/2009 Elmore
7,567,740 B2 7/2009 Bayindir et al.
7,570,137 B2 8/2009 Kintis et al.
7,570,470 B2 8/2009 Holley
7,577,398 B2 8/2009 Tennant et al.
7,580,643 B2 8/2009 Moore et al.
7,581,702 B2 9/2009 Wheeler et al.
7,583,074 B1 9/2009 Lynch et al.
7,583,233 B2 9/2009 Goldberg et al.
7,584,470 B2 9/2009 Barker et al.
7,589,470 B2 9/2009 Oksuz et al.
7,589,630 B2 9/2009 Drake et al.
7,589,686 B2 9/2009 Balzovsky et al.
7,590,404 B1 9/2009 Johnson
7,591,020 B2 9/2009 Kammer et al.
7,591,792 B2 9/2009 Bouton et al.
7,593,067 B2 9/2009 Taguchi et al.
7,596,222 B2 9/2009 Jonas et al.
7,598,844 B2 10/2009 Corcoran et al.
7,602,333 B2 10/2009 Hiramatsu et al.
7,602,815 B2 10/2009 Houghton et al.
7,605,768 B2 10/2009 Ebling et al.
7,620,370 B2 11/2009 Barak et al.
7,625,131 B2 12/2009 Zienkewicz et al.
7,626,489 B2 12/2009 Berkman et al.
7,626,542 B2 12/2009 Kober et al.
7,627,300 B2 12/2009 Abramov et al.
7,633,442 B2 12/2009 Lynch et al.
7,634,250 B1 12/2009 Prasad et al.
7,639,201 B2 12/2009 Marklein et al.
7,640,562 B2 12/2009 Bouilloux-Lafont et al.
7,640,581 B1 12/2009 Brenton et al.
7,653,363 B2 1/2010 Karr et al.
RE41,147 E 2/2010 Pang et al.
7,656,167 B1 2/2010 McLean et al.
7,656,358 B2 2/2010 Haziza et al.
7,660,244 B2 2/2010 Kadaba et al.
7,660,252 B1 2/2010 Huang et al.
7,660,328 B1 2/2010 Oz et al.
7,664,117 B2 2/2010 Lou et al.
7,669,049 B2 2/2010 Wang et al.
7,671,701 B2 3/2010 Radtke
7,671,820 B2 3/2010 Tokoro et al.
7,672,271 B2 3/2010 Lee et al.
7,676,679 B2 3/2010 Weis et al.
7,680,478 B2 3/2010 Willars et al.
7,680,516 B2 3/2010 Lovberg et al.
7,680,561 B2 3/2010 Rodgers et al.
7,683,848 B2 3/2010 Musch et al.
7,684,383 B1 3/2010 Thompson et al.
7,693,079 B2 4/2010 Cerami et al.
7,693,162 B2 4/2010 McKenna et al.
7,693,939 B2 4/2010 Wu et al.
7,697,417 B2 4/2010 Chen et al.
7,701,931 B2 4/2010 Kajiwara
7,705,747 B2 4/2010 Twitchell, Jr.
7,710,346 B2 5/2010 Bloss et al.
7,714,536 B1 5/2010 Silberg et al.
7,714,709 B1 5/2010 Daniel
7,714,725 B2 5/2010 Medve et al.
7,715,672 B2 5/2010 Dong et al.
7,716,660 B2 5/2010 Mackay
7,724,782 B2 5/2010 Wang et al.
7,728,772 B2 6/2010 Mortazawi et al.
7,729,285 B2 6/2010 Yoon et al.
7,733,094 B2 6/2010 Bright et al.
7,734,717 B2 6/2010 Saarimäki et al.
7,737,903 B1 6/2010 Rao et al.
7,739,402 B2 6/2010 Graham et al.
7,743,403 B2 6/2010 McCarty et al.
7,747,356 B2 6/2010 Andarawis et al.
7,747,774 B2 6/2010 Aaron et al.
7,750,244 B1 7/2010 Melding et al.
7,750,763 B2 7/2010 Praβmayer et al.
7,751,054 B2 7/2010 Backes et al.
7,760,978 B2 7/2010 Fishteyn et al.
7,761,079 B2 7/2010 Mollenkopf et al.
7,764,943 B2 7/2010 Radtke et al.
7,773,664 B2 8/2010 Myers et al.
7,782,156 B2 8/2010 Woods et al.
7,783,195 B2 8/2010 Riggsby et al.
7,786,894 B2 8/2010 Polk et al.
7,786,945 B2 8/2010 Baldauf et al.
7,786,946 B2 8/2010 Diaz et al.
7,791,549 B2 9/2010 Clymer et al.
7,792,016 B2 9/2010 Arai et al.
7,795,877 B2 9/2010 Radtke et al.
7,795,994 B2 9/2010 Radtke et al.
7,796,025 B2 9/2010 Berkman et al.
7,796,122 B2 9/2010 Shih et al.
7,796,890 B1 9/2010 Johnson
7,797,367 B1 9/2010 Girod et al.
7,805,029 B2 9/2010 Bayindir et al.
7,808,441 B2 10/2010 Parsche et al.
7,809,223 B2 10/2010 Miyabe et al.
7,812,686 B2 10/2010 Woods et al.
7,812,778 B2 10/2010 Hasegawa et al.
7,813,344 B2 10/2010 Cheswick
7,817,063 B2 10/2010 Hawkins et al.
7,825,793 B1 11/2010 Spillman et al.
7,825,867 B2 11/2010 Tuttle et al.
7,826,602 B1 11/2010 Hunyady et al.
7,827,610 B2 11/2010 Wang et al.
7,830,228 B2 11/2010 Evans et al.
7,835,128 B2 11/2010 Divan et al.
7,835,600 B1 11/2010 Yap et al.
7,843,375 B1 11/2010 Rennie et al.
7,844,081 B2 11/2010 McMakin et al.
7,848,517 B2 12/2010 Britz et al.
7,852,752 B2 12/2010 Kano
7,852,837 B1 12/2010 Au et al.
7,853,267 B2 12/2010 Jensen et al.
7,855,612 B2 12/2010 Zienkewicz et al.
7,856,007 B2 12/2010 Corcoran et al.
7,869,391 B2 1/2011 Lee et al.
7,872,610 B2 1/2011 Motzer et al.

(56) References Cited

U.S. PATENT DOCUMENTS

| | | | |
|---|---|---|---|
| 7,873,249 | B2 | 1/2011 | Kachmar et al. |
| 7,876,174 | B2 | 1/2011 | Radtke et al. |
| 7,884,285 | B2 | 2/2011 | Spencer |
| 7,884,648 | B2 | 2/2011 | Broyde et al. |
| 7,885,542 | B2 | 2/2011 | Riggsby et al. |
| 7,889,129 | B2 | 2/2011 | Fox et al. |
| 7,889,148 | B2 | 2/2011 | Diaz et al. |
| 7,889,149 | B2 | 2/2011 | Peebles et al. |
| 7,890,053 | B2 | 2/2011 | Washiro |
| 7,893,789 | B2 | 2/2011 | Paynter et al. |
| 7,894,770 | B2 | 2/2011 | Washiro et al. |
| 7,898,480 | B2 | 3/2011 | Rebeiz et al. |
| 7,899,403 | B2 | 3/2011 | Aaron |
| 7,903,918 | B1 | 3/2011 | Bickham et al. |
| 7,903,972 | B2 | 3/2011 | Riggsby et al. |
| 7,906,973 | B1 | 3/2011 | Orr et al. |
| 7,907,097 | B2 | 3/2011 | Syed et al. |
| 7,915,980 | B2 | 3/2011 | Hardacker et al. |
| 7,916,081 | B2 | 3/2011 | Lakkis et al. |
| 7,928,750 | B2 | 4/2011 | Miller et al. |
| 7,929,940 | B1 | 4/2011 | Dianda et al. |
| 7,930,750 | B1 | 4/2011 | Gauvin et al. |
| 7,937,699 | B2 | 5/2011 | Schneider et al. |
| 7,940,207 | B1 | 5/2011 | Kienzle et al. |
| 7,940,731 | B2 | 5/2011 | Gao et al. |
| 7,956,818 | B1 | 6/2011 | Hsu et al. |
| 7,958,120 | B2 | 6/2011 | Muntz et al. |
| 7,961,710 | B2 | 6/2011 | Lee et al. |
| 7,962,957 | B2 | 6/2011 | Keohane et al. |
| 7,965,842 | B2 | 6/2011 | Whelan et al. |
| 7,970,365 | B2 | 6/2011 | Martin et al. |
| 7,970,937 | B2 | 6/2011 | Shuster et al. |
| 7,971,053 | B2 | 6/2011 | Gibson, Sr. et al. |
| 7,973,296 | B2 | 7/2011 | Quick et al. |
| 7,974,387 | B2 | 7/2011 | Lutz et al. |
| 7,983,740 | B2 | 7/2011 | Culver et al. |
| 7,986,711 | B2 | 7/2011 | Horvath et al. |
| 7,990,146 | B2 | 8/2011 | Lazar et al. |
| 7,990,329 | B2 | 8/2011 | Deng et al. |
| 7,991,877 | B2 | 8/2011 | Keohane et al. |
| 7,992,014 | B2 | 8/2011 | Langgood et al. |
| 7,994,996 | B2 | 8/2011 | Rebeiz et al. |
| 7,994,999 | B2 | 8/2011 | Maeda et al. |
| 7,997,546 | B1 | 8/2011 | Andersen et al. |
| 8,010,116 | B2 | 8/2011 | Scheinert |
| 8,013,694 | B2 | 9/2011 | Sagala et al. |
| 8,019,288 | B2 | 9/2011 | Yu et al. |
| 8,022,885 | B2 | 9/2011 | Smoyer et al. |
| 8,022,887 | B1 | 9/2011 | Zarnaghi et al. |
| 8,023,410 | B2 | 9/2011 | O'Neill et al. |
| 8,027,391 | B2 | 9/2011 | Matsubara et al. |
| 8,036,207 | B2 | 10/2011 | Chen et al. |
| 8,049,576 | B2 | 11/2011 | Broyde et al. |
| 8,054,199 | B2 | 11/2011 | Addy et al. |
| 8,059,576 | B2 | 11/2011 | Vavik et al. |
| 8,059,593 | B2 | 11/2011 | Shih et al. |
| 8,060,308 | B2 | 11/2011 | Breed et al. |
| 8,063,832 | B1 | 11/2011 | Weller et al. |
| 8,064,744 | B2 | 11/2011 | Atkins et al. |
| 8,064,944 | B2 | 11/2011 | Yun et al. |
| 8,065,099 | B2 | 11/2011 | Gibala et al. |
| 8,069,483 | B1 | 11/2011 | Matlock et al. |
| 8,072,323 | B2 | 12/2011 | Kodama et al. |
| 8,072,386 | B2 | 12/2011 | Lier et al. |
| 8,073,810 | B2 | 12/2011 | Maes |
| 8,077,049 | B2 | 12/2011 | Yaney et al. |
| 8,077,113 | B2 | 12/2011 | Renilson et al. |
| 8,081,854 | B2 | 12/2011 | Yoon et al. |
| 8,089,356 | B2 | 1/2012 | Moore et al. |
| 8,089,404 | B2 | 1/2012 | Nichols et al. |
| 8,089,952 | B2 | 1/2012 | Spade et al. |
| 8,090,258 | B2 | 1/2012 | DeLew et al. |
| 8,090,379 | B2 | 1/2012 | Lambert et al. |
| 8,094,081 | B1 | 1/2012 | Boone et al. |
| 8,094,985 | B2 | 1/2012 | Imamura et al. |
| 8,095,093 | B2 | 1/2012 | Takinami et al. |
| 8,098,198 | B2 | 1/2012 | Thiesen et al. |
| 8,102,324 | B2 | 1/2012 | Tuau et al. |
| 8,102,779 | B2 | 1/2012 | Kim et al. |
| 8,106,749 | B2 | 1/2012 | Ina et al. |
| 8,106,849 | B2 | 1/2012 | Suddath et al. |
| RE43,163 | E | 2/2012 | Anderson |
| 8,111,148 | B2 | 2/2012 | Parker et al. |
| 8,112,649 | B2 | 2/2012 | Potkonjak et al. |
| 8,116,598 | B2 | 2/2012 | Shutter et al. |
| 8,120,488 | B2 | 2/2012 | Bloy et al. |
| 8,121,624 | B2 | 2/2012 | Cai et al. |
| 8,125,282 | B2 | 2/2012 | Bao et al. |
| 8,125,399 | B2 | 2/2012 | McKinzie et al. |
| 8,126,393 | B2 | 2/2012 | Wu et al. |
| 8,129,817 | B2 | 3/2012 | Jou et al. |
| 8,131,125 | B2 | 3/2012 | Molin et al. |
| 8,131,266 | B2 | 3/2012 | Cai et al. |
| 8,132,239 | B2 | 3/2012 | Wahl |
| 8,134,424 | B2 | 3/2012 | Kato et al. |
| 8,134,458 | B2 | 3/2012 | Lund |
| 8,135,050 | B1 | 3/2012 | Stadler et al. |
| 8,140,113 | B2 | 3/2012 | Rofougaran et al. |
| 8,150,311 | B2 | 4/2012 | Hart et al. |
| 8,151,306 | B2 | 4/2012 | Rakib |
| 8,156,520 | B2 | 4/2012 | Casagrande et al. |
| 8,159,316 | B2 | 4/2012 | Miyazato et al. |
| 8,159,342 | B1 | 4/2012 | Medina, III et al. |
| 8,159,385 | B2 | 4/2012 | Farneth et al. |
| 8,159,394 | B2 | 4/2012 | Hayes et al. |
| 8,159,742 | B2 | 4/2012 | McKay et al. |
| 8,159,933 | B2 | 4/2012 | Henry |
| 8,159,955 | B2 | 4/2012 | Larsson et al. |
| 8,160,064 | B2 | 4/2012 | Kokernak et al. |
| 8,160,530 | B2 | 4/2012 | Corman et al. |
| 8,160,825 | B1 | 4/2012 | Roe, Jr. et al. |
| 8,164,531 | B2 | 4/2012 | Lier et al. |
| 8,171,146 | B2 | 5/2012 | Chen et al. |
| 8,172,173 | B2 | 5/2012 | Carlson |
| 8,173,943 | B2 | 5/2012 | Vilo et al. |
| 8,175,535 | B2 | 5/2012 | Mu et al. |
| 8,175,649 | B2 | 5/2012 | Harel et al. |
| 8,179,787 | B2 | 5/2012 | Knapp |
| 8,180,917 | B1 | 5/2012 | Yan et al. |
| 8,184,015 | B2 | 5/2012 | Lilien et al. |
| 8,184,059 | B2 | 5/2012 | Bunch et al. |
| 8,184,311 | B2 | 5/2012 | Sakai et al. |
| 8,185,062 | B2 | 5/2012 | Rofougaran et al. |
| 8,188,855 | B2 | 5/2012 | Sharma et al. |
| 8,199,762 | B2 | 6/2012 | Michelson et al. |
| 8,203,501 | B2 | 6/2012 | Kim et al. |
| 8,212,635 | B2 | 7/2012 | Miller, II et al. |
| 8,212,722 | B2 | 7/2012 | Ngo et al. |
| 8,213,758 | B2 | 7/2012 | Dong et al. |
| 8,218,929 | B2 | 7/2012 | Bickham et al. |
| 8,222,919 | B2 | 7/2012 | Broyde et al. |
| 8,222,977 | B2 | 7/2012 | Oyama et al. |
| 8,225,379 | B2 | 7/2012 | van de Groenendaal et al. |
| 8,233,905 | B2 | 7/2012 | Vaswani et al. |
| 8,237,617 | B1 | 8/2012 | Johnson et al. |
| 8,238,824 | B2 | 8/2012 | Washiro |
| 8,238,840 | B2 | 8/2012 | Iio et al. |
| 8,242,358 | B2 | 8/2012 | Park et al. |
| 8,243,603 | B2 | 8/2012 | Gossain et al. |
| 8,249,028 | B2 | 8/2012 | Porras et al. |
| 8,251,307 | B2 | 8/2012 | Goossen et al. |
| 8,253,516 | B2 | 8/2012 | Miller, II et al. |
| 8,255,952 | B2 | 8/2012 | Boylan, III et al. |
| 8,258,743 | B2 | 9/2012 | Tyler et al. |
| 8,259,028 | B2 | 9/2012 | Hills et al. |
| 8,264,417 | B2 | 9/2012 | Snow et al. |
| 8,269,583 | B2 | 9/2012 | Miller, II et al. |
| 8,284,102 | B2 | 10/2012 | Hayes et al. |
| 8,287,323 | B2 | 10/2012 | Kiesow et al. |
| 8,295,301 | B2 | 10/2012 | Yonge, III et al. |
| 8,300,538 | B2 | 10/2012 | Kim et al. |
| 8,300,640 | B2 | 10/2012 | Al-Banna et al. |
| 8,316,228 | B2 | 11/2012 | Winslow et al. |
| 8,316,364 | B2 | 11/2012 | Stein et al. |

(56) References Cited

U.S. PATENT DOCUMENTS 8,324,990 B2 12/2012 Vouloumanos
8,325,034 B2 12/2012 Moore et al.
8,325,636 B2 12/2012 Binder
8,325,693 B2 12/2012 Binder et al.
8,330,259 B2 12/2012 Soler et al.
8,335,596 B2 12/2012 Raman et al.
8,340,438 B2 12/2012 Anderson et al.
8,343,145 B2 1/2013 Brannan et al.
8,344,829 B2 1/2013 Miller, II et al.
8,354,970 B2 1/2013 Armbrecht et al.
8,359,124 B2 1/2013 Zhou et al.
8,362,775 B2 1/2013 Speckner et al.
8,363,313 B2 1/2013 Nakaguma et al.
8,369,667 B2 2/2013 Rose et al.
8,373,095 B2 2/2013 Huynh et al.
8,373,597 B2 2/2013 Schadler et al.
8,374,821 B2 2/2013 Rousselle et al.
8,384,600 B2 2/2013 Huang et al.
8,385,978 B2 2/2013 Leung et al.
8,386,198 B2 2/2013 Lancaster
8,390,307 B2 3/2013 Slupsky et al.
8,390,402 B2 3/2013 Kunes et al.
8,405,567 B2 3/2013 Park et al.
8,406,239 B2 3/2013 Hurwitz et al.
8,406,593 B2 3/2013 Molin et al.
8,407,687 B2 3/2013 Moshir et al.
8,412,130 B2 4/2013 Suematsu et al.
8,414,326 B2 4/2013 Bowman
8,415,884 B2 4/2013 Chen et al.
8,428,033 B2 4/2013 Hettstedt et al.
8,433,168 B2 4/2013 Filippov et al.
8,433,338 B1 4/2013 Flynn et al.
8,434,103 B2 4/2013 Tsuchida et al.
8,437,383 B2 5/2013 Wiwel et al.
8,452,101 B2 5/2013 Ishikawa et al.
8,452,555 B2 5/2013 Hayward et al.
8,457,027 B2 6/2013 Dougherty et al.
8,458,453 B1 6/2013 Mahalingaiah et al.
8,462,063 B2 6/2013 Gummalla et al.
8,467,363 B2 6/2013 Lea et al.
8,468,244 B2 6/2013 Redlich et al.
8,471,513 B2 6/2013 Han
8,472,327 B2 6/2013 DelRegno et al.
8,484,137 B2 7/2013 Johnson et al.
8,484,511 B2 7/2013 Tidwell et al.
8,495,718 B2 7/2013 Han et al.
8,497,749 B2 7/2013 Elmore
8,503,845 B2 8/2013 Winzer et al.
8,504,135 B2 8/2013 Bourqui et al.
8,505,057 B2 8/2013 Rogers
8,509,114 B1 8/2013 Szajdecki
8,514,980 B2 8/2013 Kuhtz
8,515,383 B2 8/2013 Prince et al.
8,516,129 B1 8/2013 Skene et al.
8,516,470 B1 8/2013 Joshi et al.
8,516,474 B2 8/2013 Lamba et al.
8,519,892 B2 8/2013 Ding et al.
8,520,578 B2 8/2013 Rayment et al.
8,520,636 B2 8/2013 Xu
8,520,931 B2 8/2013 Tateno et al.
8,528,059 B1 9/2013 Saluzzo et al.
8,532,023 B2 9/2013 Buddhikot et al.
8,532,046 B2 9/2013 Hu et al.
8,532,492 B2 9/2013 Sadowski et al.
8,536,857 B2 9/2013 Nero, Jr. et al.
8,537,068 B2 9/2013 Call et al.
8,537,705 B2 9/2013 Afkhamie et al.
8,538,428 B2 9/2013 Bartlett et al.
8,539,540 B2 9/2013 Zenoni
8,539,569 B2 9/2013 Mansour
8,542,968 B2 9/2013 Dong et al.
8,545,322 B2 10/2013 George et al.
8,548,294 B2 10/2013 Toge et al.
8,553,646 B2 10/2013 Kumar
8,561,104 B1 10/2013 Dow et al.
8,561,181 B1 10/2013 Sobel et al.
8,565,568 B2 10/2013 Bigot-Astruc et al.
8,566,058 B2 10/2013 Pupalaikis et al.
8,572,247 B2 10/2013 Larson et al.
8,572,639 B2 10/2013 Ficco
8,572,661 B2 10/2013 Strong et al.
8,578,076 B2 11/2013 van der Linden et al.
8,578,486 B2 11/2013 Lifliand et al.
8,582,502 B2 11/2013 Conte et al.
8,584,195 B2 11/2013 Sherlock et al.
8,587,490 B2 11/2013 Niver et al.
8,587,492 B2 11/2013 Runyon et al.
8,588,567 B2 11/2013 Kamps et al.
8,588,840 B2 11/2013 Truong et al.
8,588,991 B1 11/2013 Forbes, Jr.
8,593,238 B2 11/2013 Miller, II et al.
8,594,956 B2 11/2013 McBee et al.
8,595,141 B2 11/2013 Hao et al.
8,599,150 B2 12/2013 Philipp
8,600,602 B1 12/2013 Watson et al.
8,604,982 B2 12/2013 Gummalla et al.
8,604,999 B2 12/2013 Abumrad et al.
8,605,361 B2 12/2013 Batchko et al.
8,605,579 B2 12/2013 Abraham et al.
8,612,550 B2 12/2013 Yoo et al.
8,613,020 B2 12/2013 Knudson et al.
8,615,190 B2 12/2013 Lu
8,625,547 B1 1/2014 Miller et al.
8,629,811 B2 1/2014 Gaynor et al.
8,639,260 B2 1/2014 Fox et al.
8,639,390 B2 1/2014 Tamarkin et al.
8,639,934 B2 1/2014 Kruglick
8,644,219 B2 2/2014 Nishizaka et al.
8,653,906 B2 2/2014 Mahon et al.
8,655,396 B2 2/2014 Malladi et al.
8,656,458 B2 2/2014 Heffez et al.
8,660,526 B1 2/2014 Heiderscheit et al.
8,660,698 B2 2/2014 Phillips et al.
8,665,102 B2 3/2014 Salewske et al.
8,666,553 B2 3/2014 Phillips et al.
8,670,946 B2 3/2014 Salazar et al.
8,674,630 B1 3/2014 Cornelius et al.
8,676,186 B2 3/2014 Niu
8,680,450 B2 3/2014 Pritchard et al.
8,680,706 B2 3/2014 Zyren et al.
8,681,463 B2 3/2014 Franks et al.
8,686,911 B2 4/2014 Kim et al.
8,687,650 B2 4/2014 King
8,688,153 B2 4/2014 Komori et al.
8,699,454 B2 4/2014 Hapsari et al.
8,699,461 B2 4/2014 Qian et al.
8,705,925 B2 4/2014 Terada et al.
8,706,026 B2 4/2014 Truong et al.
8,707,432 B1 4/2014 Rathi et al.
8,711,538 B2 4/2014 Woodworth et al.
8,711,732 B2 4/2014 Johnson et al.
8,711,806 B2 4/2014 Lim et al.
8,711,857 B2 4/2014 Jackson et al.
8,712,200 B1 4/2014 Abernathy et al.
8,719,938 B2 5/2014 Demeter et al.
8,723,730 B2 5/2014 Lu et al.
8,724,102 B2 5/2014 Urban et al.
8,729,857 B2 5/2014 Stählin et al.
8,731,358 B2 5/2014 Pare et al.
8,732,476 B1 5/2014 Van et al.
8,736,502 B1 5/2014 Mehr et al.
8,737,793 B2 5/2014 Imamura et al.
8,738,318 B2 5/2014 Spillane
8,742,997 B2 6/2014 McPeak et al.
8,743,004 B2 6/2014 Haziza
8,749,449 B2 6/2014 Caldwell et al.
8,750,097 B2 6/2014 Maenpaa et al.
8,750,664 B2 6/2014 Huang et al.
8,754,852 B2 6/2014 Lee et al.
8,755,659 B2 6/2014 Imamura et al.
8,760,354 B2 6/2014 Flannery et al.
8,761,792 B2 6/2014 Sennett et al.
8,763,097 B2 6/2014 Bhatnagar et al.
8,766,657 B2 7/2014 DeJean et al.

(56) References Cited

U.S. PATENT DOCUMENTS

| | | | |
|---|---|---|---|
| 8,767,071 B1 | 7/2014 | Marshall | |
| 8,769,622 B2 | 7/2014 | Chang et al. | |
| 8,773,312 B1 | 7/2014 | Diaz et al. | |
| 8,780,012 B2 | 7/2014 | Llombart Juan et al. | |
| 8,782,195 B2 | 7/2014 | Foti | |
| 8,786,284 B2 | 7/2014 | Sirigiri et al. | |
| 8,786,514 B2 | 7/2014 | Dickie et al. | |
| 8,789,091 B2 | 7/2014 | Eldering et al. | |
| 8,792,760 B2 | 7/2014 | Choi et al. | |
| 8,792,933 B2 | 7/2014 | Chen et al. | |
| 8,793,363 B2 | 7/2014 | Sater et al. | |
| 8,793,742 B2 | 7/2014 | Macrae et al. | |
| 8,797,207 B2 | 8/2014 | Kienzle et al. | |
| 8,804,667 B2 | 8/2014 | Wang | |
| 8,806,202 B2 | 8/2014 | Shoemake et al. | |
| 8,810,404 B2 | 8/2014 | Bertoncini et al. | |
| 8,810,421 B2 | 8/2014 | Deaver, Sr. et al. | |
| 8,810,468 B2 | 8/2014 | Cannon et al. | |
| 8,811,278 B2 | 8/2014 | Hori et al. | |
| 8,811,912 B2 | 8/2014 | Austin et al. | |
| 8,812,050 B1 | 8/2014 | Bencheikh et al. | |
| 8,812,154 B2 | 8/2014 | Vian et al. | |
| 8,817,741 B2 | 8/2014 | Shaheen | |
| 8,824,380 B2 | 9/2014 | Jetcheva et al. | |
| 8,825,239 B2 | 9/2014 | Cooper et al. | |
| 8,829,934 B2 | 9/2014 | Sellathamby et al. | |
| 8,830,112 B1 | 9/2014 | Buehler et al. | |
| 8,831,506 B2 | 9/2014 | Claret et al. | |
| 8,836,503 B2 | 9/2014 | Girod et al. | |
| 8,836,607 B2 | 9/2014 | Cook et al. | |
| 8,839,350 B1 | 9/2014 | Shapcott et al. | |
| 8,847,840 B1 | 9/2014 | Diaz et al. | |
| 8,847,846 B1 | 9/2014 | Diaz et al. | |
| 8,856,239 B1 | 10/2014 | Oliver et al. | |
| 8,856,530 B2 | 10/2014 | Lamberg et al. | |
| 8,863,245 B1 | 10/2014 | Abhyanker | |
| 8,866,691 B2 | 10/2014 | Montgomery et al. | |
| 8,866,695 B2 | 10/2014 | Jefferson et al. | |
| 8,867,226 B2 | 10/2014 | Colomb et al. | |
| 8,867,798 B2 | 10/2014 | Shuster | |
| 8,872,032 B2 | 10/2014 | Su et al. | |
| 8,875,224 B2 | 10/2014 | Gross et al. | |
| 8,878,740 B2 | 11/2014 | Coupland et al. | |
| 8,880,765 B2 | 11/2014 | Seal et al. | |
| 8,881,588 B2 | 11/2014 | Baer et al. | |
| 8,885,689 B2 | 11/2014 | Blasco et al. | |
| 8,886,229 B2 | 11/2014 | Agrawal et al. | |
| 8,887,212 B2 | 11/2014 | Dua | |
| 8,890,759 B2 | 11/2014 | Pantea et al. | |
| 8,893,246 B2 | 11/2014 | El-Moussa et al. | |
| 8,897,215 B2 | 11/2014 | Hazani et al. | |
| 8,897,499 B2 | 11/2014 | Rekimoto | |
| 8,897,695 B2 | 11/2014 | Becker et al. | |
| 8,897,697 B1 * | 11/2014 | Bennett | H04B 7/022 455/14 |
| 8,901,916 B2 | 12/2014 | Rodriguez et al. | |
| 8,903,214 B2 | 12/2014 | Alkeskjold | |
| 8,907,222 B2 | 12/2014 | Stranskky | |
| 8,907,845 B2 | 12/2014 | Jones | |
| 8,908,502 B2 | 12/2014 | Hayashitani | |
| 8,908,573 B1 | 12/2014 | Wang et al. | |
| 8,913,862 B1 | 12/2014 | Emmerich et al. | |
| 8,917,210 B2 | 12/2014 | Shamim et al. | |
| 8,917,215 B2 | 12/2014 | Pohl | |
| 8,917,964 B2 | 12/2014 | Blew et al. | |
| 8,918,108 B2 | 12/2014 | Van et al. | |
| 8,918,135 B2 | 12/2014 | Kang et al. | |
| 8,922,447 B2 | 12/2014 | Gao et al. | |
| 8,925,079 B2 | 12/2014 | Miyake et al. | |
| 8,929,841 B2 | 1/2015 | Rofougaran et al. | |
| 8,934,747 B2 | 1/2015 | Smith et al. | |
| 8,937,577 B2 | 1/2015 | Gerini et al. | |
| 8,938,144 B2 | 1/2015 | Hennink et al. | |
| 8,938,255 B2 | 1/2015 | Dalla et al. | |
| 8,941,912 B2 | 1/2015 | Ichii et al. | |
| 8,947,258 B2 | 2/2015 | Reid et al. | |
| 8,948,235 B2 | 2/2015 | Proctor, Jr. et al. | |
| 8,948,690 B2 | 2/2015 | Duerksen et al. | |
| 8,952,678 B2 | 2/2015 | Giboney et al. | |
| 8,955,051 B2 | 2/2015 | Marzii | |
| 8,955,075 B2 | 2/2015 | Smith et al. | |
| 8,957,818 B2 | 2/2015 | Chen et al. | |
| 8,957,821 B1 | 2/2015 | Matyas et al. | |
| 8,958,356 B2 | 2/2015 | Lu et al. | |
| 8,958,665 B2 | 2/2015 | Ziari et al. | |
| 8,958,812 B2 | 2/2015 | Weiguo | |
| 8,958,980 B2 | 2/2015 | Hagan et al. | |
| 8,963,424 B1 | 2/2015 | Neilson et al. | |
| 8,963,790 B2 | 2/2015 | Brown et al. | |
| 8,964,433 B2 | 2/2015 | Hai-Maharsi | |
| 8,966,609 B2 | 2/2015 | Lee et al. | |
| 8,968,287 B2 | 3/2015 | Shroff et al. | |
| 8,970,438 B2 | 3/2015 | Hager et al. | |
| 8,984,113 B2 | 3/2015 | Li et al. | |
| 8,989,788 B2 | 3/2015 | Kim et al. | |
| 8,994,473 B2 | 3/2015 | Levi et al. | |
| 8,994,474 B2 | 3/2015 | Mahon et al. | |
| 8,996,188 B2 | 3/2015 | Frader-thompson et al. | |
| 8,996,728 B2 | 3/2015 | Cochinwala et al. | |
| 9,000,353 B2 | 4/2015 | Seo et al. | |
| 9,001,689 B1 | 4/2015 | Ponnampalam et al. | |
| 9,001,717 B2 | 4/2015 | Chun et al. | |
| 9,003,492 B2 | 4/2015 | Katar | |
| 9,008,208 B2 | 4/2015 | Khandani | |
| 9,008,513 B2 | 4/2015 | Kim et al. | |
| 9,009,460 B2 | 4/2015 | Chen | |
| 9,013,361 B1 | 4/2015 | Lam et al. | |
| 9,014,621 B2 | 4/2015 | Mohebbi | |
| 9,015,139 B2 | 4/2015 | Wong | |
| 9,015,467 B2 | 4/2015 | Buer | |
| 9,019,164 B2 | 4/2015 | Syed et al. | |
| 9,019,595 B2 | 4/2015 | Jain et al. | |
| 9,019,846 B2 | 4/2015 | Shetty et al. | |
| 9,019,892 B2 | 4/2015 | Zhou et al. | |
| 9,020,555 B2 | 4/2015 | Sheikh et al. | |
| 9,021,251 B2 | 4/2015 | Chawla | |
| 9,021,575 B2 | 4/2015 | Martini | |
| RE45,514 E | 5/2015 | Brown | |
| 9,024,831 B2 | 5/2015 | Wang et al. | |
| 9,031,725 B1 | 5/2015 | Diesposti et al. | |
| 9,037,516 B2 | 5/2015 | Abhyanker | |
| 9,042,245 B2 | 5/2015 | Tzannes et al. | |
| 9,042,812 B1 | 5/2015 | Bennett et al. | |
| 9,065,172 B2 | 6/2015 | Lewry et al. | |
| 9,065,177 B2 | 6/2015 | Alexopoulos | |
| 9,066,224 B2 | 6/2015 | Schwengler | |
| 9,070,962 B2 | 6/2015 | Kobayashi | |
| 9,070,964 B1 | 6/2015 | Schuss et al. | |
| 9,079,349 B2 | 7/2015 | Slafer | |
| 9,082,307 B2 | 7/2015 | Sharawi | |
| 9,083,083 B2 | 7/2015 | Hills et al. | |
| 9,083,425 B1 | 7/2015 | Moussouris et al. | |
| 9,083,581 B1 | 7/2015 | Addepalli et al. | |
| 9,084,124 B2 | 7/2015 | Nickel et al. | |
| 9,092,962 B1 | 7/2015 | Merrill et al. | |
| 9,092,963 B2 | 7/2015 | Fetzer et al. | |
| 9,094,407 B1 | 7/2015 | Matthieu | |
| 9,094,840 B2 | 7/2015 | Liu et al. | |
| 9,098,325 B2 | 8/2015 | Reddin | |
| 9,099,787 B2 | 8/2015 | Blech | |
| 9,103,864 B2 | 8/2015 | Ali | |
| 9,105,981 B2 | 8/2015 | Syed | |
| 9,106,617 B2 | 8/2015 | Kshirsagar et al. | |
| 9,112,281 B2 | 8/2015 | Bresciani et al. | |
| 9,113,347 B2 | 8/2015 | Paul Shala | |
| 9,119,127 B1 | 8/2015 | Henry | |
| 9,119,179 B1 | 8/2015 | Firoiu et al. | |
| 9,128,941 B2 | 9/2015 | Shulman | |
| 9,130,641 B2 | 9/2015 | Mohebbi | |
| 9,134,945 B2 | 9/2015 | Husain | |
| 9,137,485 B2 | 9/2015 | Bar-Niv et al. | |
| 9,142,334 B2 | 9/2015 | Muto et al. | |
| 9,143,084 B2 | 9/2015 | Perez et al. | |
| 9,143,196 B2 | 9/2015 | Schwengler | |

(56) References Cited

U.S. PATENT DOCUMENTS 9,148,186 B1 9/2015 Murphy et al.
9,154,641 B2 10/2015 Shaw
9,157,954 B2 10/2015 Nickel
9,158,418 B2 10/2015 Oda et al.
9,158,427 B1 10/2015 Wang
9,167,535 B2 10/2015 Christoffersson et al.
9,171,458 B2 10/2015 Salter
9,173,217 B2 10/2015 Teng et al.
9,178,282 B2 11/2015 Mittleman et al.
9,194,930 B2 11/2015 Pupalaikis
9,201,556 B2 12/2015 Free et al.
9,202,371 B2 12/2015 Jain
9,203,149 B2 12/2015 Henderson et al.
9,204,112 B2 12/2015 Pasteris et al.
9,204,418 B2 12/2015 Siomina et al.
9,207,168 B2 12/2015 Lovely et al.
9,209,902 B2 12/2015 Willis, III et al.
9,210,192 B1 12/2015 Pathuri et al.
9,210,586 B2 12/2015 Catovic et al.
9,213,905 B2 12/2015 Lange et al.
9,219,307 B2 12/2015 Takahashi et al.
9,219,594 B2 12/2015 Khlat
9,225,396 B2 12/2015 Maltsev et al.
9,229,956 B2 1/2016 Ke et al.
9,235,763 B2 1/2016 Brown et al.
9,240,835 B2 1/2016 Cune et al.
9,244,117 B2 1/2016 Khan et al.
9,246,231 B2 1/2016 Ju
9,246,334 B2 1/2016 Lo et al.
9,253,588 B2 2/2016 Schmidt et al.
9,260,244 B1 2/2016 Cohn
9,264,204 B2 2/2016 Seo et al.
9,265,078 B2 2/2016 Lim et al.
9,270,013 B2 2/2016 Ley
9,271,185 B2 2/2016 Abdelmonem et al.
9,276,303 B2 3/2016 Chang et al.
9,276,304 B2 3/2016 Behan
9,277,331 B2 3/2016 Chao et al.
9,281,564 B2 3/2016 Vincent
9,282,144 B2 3/2016 Tebay et al.
9,285,461 B2 3/2016 Townley et al.
9,287,605 B2 3/2016 Daughenbaugh et al.
9,288,844 B1 3/2016 Akhavan-saraf et al.
9,289,177 B2 3/2016 Samsudin et al.
9,293,798 B2 3/2016 Ye
9,293,801 B2 3/2016 Courtney et al.
9,302,770 B2 4/2016 Cohen et al.
9,306,682 B2 4/2016 Singh
9,312,919 B1 4/2016 Barzegar et al.
9,312,929 B2 4/2016 Forenza et al.
9,315,663 B2 4/2016 Appleby
9,319,311 B2 4/2016 Wang et al.
9,324,003 B2 4/2016 France et al.
9,324,020 B2 4/2016 Nazarov
9,325,067 B2 4/2016 Ali et al.
9,325,516 B2 4/2016 Frei et al.
9,326,316 B2 4/2016 Yonge et al.
9,334,052 B2 5/2016 Ubhi et al.
9,338,823 B2 5/2016 Saban et al.
9,346,560 B2 5/2016 Wang
9,350,063 B2 5/2016 Herbsommer et al.
9,351,182 B2 5/2016 Elliott et al.
9,356,358 B2 5/2016 Hu et al.
9,362,629 B2 6/2016 Miller et al.
9,363,333 B2 6/2016 Basso et al.
9,363,690 B1 6/2016 Suthar et al.
9,363,761 B2 6/2016 Venkatraman
9,366,743 B2 6/2016 Doshi et al.
9,368,275 B2 6/2016 McBee et al.
9,369,177 B2 6/2016 Hui et al.
9,372,228 B2 6/2016 Gavin et al.
9,379,527 B2 6/2016 Jean et al.
9,379,556 B2 7/2016 Haensgen et al.
9,380,857 B2 7/2016 Davis et al.
9,391,874 B2 7/2016 Corti et al.
9,393,683 B2 7/2016 Kimberlin et al.
9,394,716 B2 7/2016 Butler et al.
9,397,380 B2 7/2016 Kudela et al.
9,400,941 B2 7/2016 Meier et al.
9,401,863 B2 7/2016 Hui et al.
9,404,750 B2 8/2016 Rios et al.
9,413,519 B2 8/2016 Khoshnood et al.
9,414,126 B1 8/2016 Zinevich
9,417,731 B2 8/2016 Premont et al.
9,419,712 B2 8/2016 Heidler
9,421,869 B1 8/2016 Ananthanarayanan et al.
9,422,139 B1 8/2016 Bialkowski et al.
9,432,478 B2 8/2016 Gibbon et al.
9,432,865 B1 8/2016 Jadunandan et al.
9,439,092 B1 9/2016 Chukka et al.
9,443,417 B2 9/2016 Wang
9,458,974 B2 10/2016 Townsend, Jr. et al.
9,459,746 B2 10/2016 Zarraga et al.
9,461,706 B1 10/2016 Bennett et al.
9,465,397 B2 10/2016 Forbes, Jr. et al.
9,467,219 B2 10/2016 Vilhar
9,467,870 B2 10/2016 Bennett
9,476,932 B2 10/2016 Furse et al.
9,478,865 B1 10/2016 Willis et al.
9,479,241 B2 10/2016 Pabla
9,479,266 B2 10/2016 Henry et al.
9,479,299 B2 10/2016 Kim et al.
9,479,392 B2 10/2016 Anderson et al.
9,479,535 B2 10/2016 Cohen et al.
9,490,869 B1 11/2016 Henry
9,490,913 B2 11/2016 Berlin
9,495,037 B2 11/2016 King-Smith
9,496,921 B1 11/2016 Corum
9,497,572 B2 11/2016 Britt et al.
9,503,170 B2 11/2016 Vu
9,503,189 B2 11/2016 Henry et al.
9,509,415 B1 11/2016 Henry et al.
9,510,203 B2 11/2016 Jactat et al.
9,515,367 B2 12/2016 Herbsommer et al.
9,520,945 B2 12/2016 Gerszberg et al.
9,525,524 B2 12/2016 Barzegar et al.
9,544,006 B2 1/2017 Henry et al.
9,564,947 B2 2/2017 Stuckman et al.
9,608,740 B2 3/2017 Henry et al.
9,627,768 B2 4/2017 Henry et al.
9,640,850 B2 5/2017 Henry et al.
9,653,770 B2 5/2017 Henry et al.
9,680,670 B2 6/2017 Henry et al.
9,705,561 B2 7/2017 Henry et al.
9,705,571 B2 7/2017 Gerszberg et al.
9,742,462 B2 8/2017 Bennett et al.
9,748,626 B2 8/2017 Henry et al.
9,749,053 B2 8/2017 Henry et al.
9,768,833 B2 9/2017 Fuchs et al.
9,769,020 B2 9/2017 Henry et al.
9,780,834 B2 10/2017 Henry et al.
9,793,951 B2 10/2017 Henry et al.
9,793,954 B2 10/2017 Bennett et al.
9,847,566 B2 12/2017 Henry et al.
9,853,342 B2 12/2017 Henry et al.
9,860,075 B1 1/2018 Gerszberg et al.
9,865,911 B2 1/2018 Henry et al.
9,866,309 B2 1/2018 Bennett et al.
9,871,282 B2 1/2018 Henry et al.
9,871,283 B2 1/2018 Henry et al.
9,876,264 B2 1/2018 Barnickel et al.
9,876,570 B2 1/2018 Henry et al.
9,876,605 B1 1/2018 Henry et al.
9,882,257 B2 1/2018 Henry et al.
9,893,795 B1 2/2018 Willis et al.
9,912,381 B2 3/2018 Bennett et al.
9,917,341 B2 3/2018 Henry et al.
9,991,580 B2 6/2018 Henry et al.
9,997,819 B2 6/2018 Bennett et al.
9,998,172 B1 6/2018 Barzegar et al.
9,998,870 B1 6/2018 Bennett et al.
9,999,038 B2 6/2018 Barzegar et al.
10,003,364 B1 6/2018 Willis, III et al.
10,009,063 B2 6/2018 Gerszberg et al.

(56) References Cited

U.S. PATENT DOCUMENTS 10,009,065 B2 6/2018 Henry et al.
10,009,901 B2 6/2018 Gerszberg
10,027,397 B2 7/2018 Kim
10,027,427 B2 7/2018 Vannucci et al.
10,033,107 B2 7/2018 Henry et al.
10,033,108 B2 7/2018 Henry et al.
10,044,409 B2 8/2018 Barzegar et al.
10,051,483 B2 8/2018 Barzegar et al.
10,051,488 B1 8/2018 Vannucci et al.
10,062,970 B1 8/2018 Vannucci et al.
10,069,535 B2 9/2018 Vannucci et al.
10,079,661 B2 9/2018 Gerszberg et al.
10,090,606 B2 10/2018 Henry et al.
10,096,883 B2 10/2018 Henry et al.
10,103,777 B1 10/2018 Henry et al.
10,103,801 B2 10/2018 Bennett et al.
2001/0030789 A1 10/2001 Jiang et al.
2002/0002040 A1 1/2002 Kline et al.
2002/0008672 A1 1/2002 Gothard et al.
2002/0011960 A1 1/2002 Yuanzhu et al.
2002/0021716 A1 2/2002 Terk et al.
2002/0024424 A1 2/2002 Burns et al.
2002/0027481 A1 3/2002 Fiedziuszko et al.
2002/0040439 A1 4/2002 Kellum et al.
2002/0057223 A1 5/2002 Hook
2002/0061217 A1 5/2002 Hillman et al.
2002/0069417 A1 6/2002 Kliger et al.
2002/0083194 A1 6/2002 Bak et al.
2002/0091807 A1 7/2002 Goodman et al.
2002/0099949 A1 7/2002 Fries et al.
2002/0101852 A1 8/2002 Say et al.
2002/0111997 A1 8/2002 Herlihy et al.
2002/0156917 A1 10/2002 Nye et al.
2002/0186694 A1 12/2002 Mahajan et al.
2002/0197979 A1 12/2002 Vanderveen et al.
2003/0002125 A1 1/2003 Fuse et al.
2003/0002476 A1 1/2003 Chung et al.
2003/0010528 A1 1/2003 Niles
2003/0022694 A1 1/2003 Olsen et al.
2003/0038753 A1 2/2003 Mahon et al.
2003/0049003 A1 3/2003 Ahmad et al.
2003/0054793 A1 3/2003 Manis et al.
2003/0054811 A1 3/2003 Han et al.
2003/0061346 A1 3/2003 Pekary et al.
2003/0094976 A1 5/2003 Miyashita et al.
2003/0095208 A1 5/2003 Chouraqui et al.
2003/0137464 A1 7/2003 Foti et al.
2003/0151548 A1 8/2003 Kingsley et al.
2003/0152331 A1 8/2003 Dair et al.
2003/0164794 A1 9/2003 Haynes et al.
2003/0188308 A1 10/2003 Kizuka
2003/0190110 A1 10/2003 Kline et al.
2003/0202756 A1 10/2003 Hurley et al.
2003/0210197 A1 11/2003 Cencich et al.
2003/0224784 A1 12/2003 Hunt et al.
2004/0015725 A1 1/2004 Boneh et al.
2004/0023640 A1 2/2004 Ballai et al.
2004/0024913 A1 2/2004 Ikeda et al.
2004/0048596 A1 3/2004 Wyrzykowska et al.
2004/0054425 A1 3/2004 Elmore
2004/0084582 A1 5/2004 Kralic
2004/0085153 A1 5/2004 Fukunaga
2004/0088083 A1* 5/2004 Davis ........................ H02J 3/14 700/295
2004/0090312 A1 5/2004 Manis et al.
2004/0091032 A1 5/2004 Duchi et al.
2004/0100343 A1 5/2004 Tsu et al.
2004/0104410 A1 6/2004 Gilbert et al.
2004/0109608 A1 6/2004 Love et al.
2004/0113756 A1 6/2004 Mollenkopf et al.
2004/0113757 A1 6/2004 White, II et al.
2004/0119564 A1 6/2004 Itoh et al.
2004/0131310 A1 7/2004 Walker et al.
2004/0163135 A1 8/2004 Giaccherini et al.
2004/0165669 A1 8/2004 Otsuka et al.
2004/0169572 A1 9/2004 Elmore et al.
2004/0196784 A1 10/2004 Larsson et al.
2004/0198228 A1 10/2004 Raghothaman et al.
2004/0212481 A1 10/2004 Abraham et al.
2004/0213147 A1 10/2004 Wiese et al.
2004/0213189 A1 10/2004 Alspaugh et al.
2004/0213294 A1 10/2004 Hughes et al.
2004/0242185 A1 12/2004 Lee et al.
2004/0250069 A1 12/2004 Kosamo et al.
2005/0002408 A1 1/2005 Lee et al.
2005/0005854 A1 1/2005 Suzuki et al.
2005/0017825 A1 1/2005 Hansen
2005/0031267 A1 2/2005 Sumimoto et al.
2005/0042989 A1 2/2005 Ho et al.
2005/0063422 A1 3/2005 Lazar et al.
2005/0068223 A1 3/2005 Vavik et al.
2005/0069321 A1 3/2005 Sullivan et al.
2005/0074208 A1 4/2005 Badcock et al.
2005/0097396 A1 5/2005 Wood
2005/0102185 A1 5/2005 Barker et al.
2005/0111533 A1 5/2005 Berkman et al.
2005/0141808 A1 6/2005 Cheben et al.
2005/0143868 A1 6/2005 Whelan et al.
2005/0151659 A1 7/2005 Donovan et al.
2005/0159187 A1 7/2005 Mendolia et al.
2005/0164666 A1 7/2005 Lang et al.
2005/0168326 A1 8/2005 White et al.
2005/0169056 A1 8/2005 Berkman et al.
2005/0169401 A1 8/2005 Abraham et al.
2005/0177463 A1 8/2005 Crutchfield et al.
2005/0190101 A1 9/2005 Hiramatsu et al.
2005/0208949 A1 9/2005 Chiueh et al.
2005/0212626 A1 9/2005 Takamatsu et al.
2005/0219126 A1 10/2005 Rebeiz et al.
2005/0219135 A1 10/2005 Lee et al.
2005/0220180 A1 10/2005 Barlev
2005/0226353 A1 10/2005 Gebara et al.
2005/0249245 A1 11/2005 Hazani et al.
2005/0258920 A1 11/2005 Elmore
2006/0034724 A1 2/2006 Hamano et al.
2006/0038660 A1 2/2006 Doumuki et al.
2006/0053486 A1 3/2006 Wesinger et al.
2006/0071776 A1 4/2006 White et al.
2006/0077906 A1 4/2006 Maegawa et al.
2006/0082516 A1 4/2006 Strickland et al.
2006/0085813 A1 4/2006 Giraldin et al.
2006/0094439 A1 5/2006 Christian et al.
2006/0106741 A1 5/2006 Janarthanan et al.
2006/0111047 A1 5/2006 Louberg et al.
2006/0113425 A1 6/2006 Rader et al.
2006/0114925 A1 6/2006 Gerszberg et al.
2006/0119528 A1 6/2006 Bhattacharyya et al.
2006/0120399 A1 6/2006 Claret et al.
2006/0128322 A1 6/2006 Igarashi et al.
2006/0132380 A1 6/2006 Imai et al.
2006/0153878 A1 7/2006 Savarino et al.
2006/0172781 A1 8/2006 Mohebbi et al.
2006/0176124 A1 8/2006 Mansour et al.
2006/0181394 A1 8/2006 Clarke et al.
2006/0187023 A1 8/2006 Iwamura et al.
2006/0192672 A1 8/2006 Gidge et al.
2006/0220833 A1 10/2006 Berkman et al.
2006/0221995 A1 10/2006 Berkman et al.
2006/0232493 A1 10/2006 Huang et al.
2006/0238347 A1 10/2006 Parkinson et al.
2006/0239501 A1 10/2006 Petrovic et al.
2006/0244672 A1 11/2006 Avakian et al.
2006/0249622 A1 11/2006 Steele et al.
2006/0255930 A1 11/2006 Berkman et al.
2006/0286927 A1 12/2006 Berkman et al.
2007/0002771 A1 1/2007 Berkman et al.
2007/0022475 A1 1/2007 Rossi et al.
2007/0025265 A1 2/2007 Marcotullio et al.
2007/0025386 A1 2/2007 Riedel et al.
2007/0040628 A1 2/2007 Kanno et al.
2007/0041464 A1 2/2007 Kim et al.
2007/0041554 A1 2/2007 Newman
2007/0054622 A1 3/2007 Berkman
2007/0063914 A1 3/2007 Becker et al.

(56) References Cited

U.S. PATENT DOCUMENTS

2007/0090185 A1 4/2007 Lewkowitz et al.
2007/0105508 A1 5/2007 Tong et al.
2007/0135044 A1 6/2007 Rhodes et al.
2007/0144779 A1 6/2007 Vicente et al.
2007/0164908 A1 7/2007 Turchinetz et al.
2007/0189182 A1 8/2007 Berkman et al.
2007/0201540 A1 8/2007 Berkman et al.
2007/0202913 A1 8/2007 Ban et al.
2007/0211689 A1 9/2007 Campero et al.
2007/0211786 A1 9/2007 Shattil et al.
2007/0216596 A1 9/2007 Lewis et al.
2007/0222579 A1* 9/2007 Berkman ................ H04B 3/54 340/538
2007/0223381 A1 9/2007 Radtke et al.
2007/0226779 A1 9/2007 Yokomitsu et al.
2007/0229184 A1 10/2007 Liu et al.
2007/0229231 A1 10/2007 Hurwitz et al.
2007/0252998 A1 11/2007 Berthold et al.
2007/0257858 A1 11/2007 Liu et al.
2007/0258484 A1 11/2007 Tolaio et al.
2007/0268124 A1 11/2007 Berkman et al.
2007/0268846 A1 11/2007 Proctor et al.
2007/0300280 A1 12/2007 Turner et al.
2008/0002652 A1 1/2008 Gupta et al.
2008/0003872 A1 1/2008 Chen et al.
2008/0007416 A1 1/2008 Cern et al.
2008/0008116 A1 1/2008 Buga et al.
2008/0043655 A1 2/2008 Lee et al.
2008/0055149 A1 3/2008 Rees et al.
2008/0060832 A1 3/2008 Razavi et al.
2008/0064331 A1 3/2008 Washiro et al.
2008/0077336 A1 3/2008 Fernandes et al.
2008/0080389 A1 4/2008 Hart et al.
2008/0084937 A1 4/2008 Barthold et al.
2008/0094298 A1 4/2008 Kralovec et al.
2008/0120667 A1 5/2008 Zaltsman
2008/0122723 A1 5/2008 Rofougaran
2008/0130639 A1 6/2008 Costa-Requena et al.
2008/0143491 A1 6/2008 Deaver et al.
2008/0150790 A1 6/2008 Voigtlaender et al.
2008/0153416 A1 6/2008 Washiro et al.
2008/0167756 A1* 7/2008 Golden .................. G05B 15/02 700/297
2008/0177678 A1 7/2008 Di Martini et al.
2008/0191851 A1 8/2008 Koga et al.
2008/0211727 A1 9/2008 Elmore et al.
2008/0247716 A1 10/2008 Thomas et al.
2008/0252522 A1 10/2008 Asbridge et al.
2008/0253723 A1 10/2008 Stokes et al.
2008/0255782 A1 10/2008 Bilac et al.
2008/0258993 A1 10/2008 Gummalla et al.
2008/0266060 A1 10/2008 Takei et al.
2008/0267076 A1 10/2008 Laperi et al.
2008/0279199 A1 11/2008 Park et al.
2008/0280574 A1 11/2008 Rofougaran et al.
2008/0313691 A1 12/2008 Cholas
2009/0002137 A1 1/2009 Radtke et al.
2009/0007189 A1 1/2009 Gutknecht
2009/0007190 A1 1/2009 Weber et al.
2009/0007194 A1 1/2009 Brady, Jr. et al.
2009/0009408 A1 1/2009 Rofougaran et al.
2009/0015239 A1 1/2009 Georgiou et al.
2009/0054056 A1 2/2009 Gil et al.
2009/0054737 A1 2/2009 Magar et al.
2009/0061940 A1 3/2009 Scheinert et al.
2009/0067441 A1 3/2009 Ansari et al.
2009/0079660 A1 3/2009 Elmore
2009/0085726 A1 4/2009 Radtke et al.
2009/0088907 A1 4/2009 Lewis et al.
2009/0093267 A1 4/2009 Ariyur et al.
2009/0109981 A1 4/2009 Keselman
2009/0125351 A1 5/2009 Davis, Jr. et al.
2009/0129301 A1 5/2009 Belimpasakis et al.
2009/0135848 A1 5/2009 Chan et al.
2009/0138931 A1 5/2009 Lin et al.
2009/0140852 A1 6/2009 Stolarczyk et al.
2009/0144417 A1 6/2009 Kisel et al.
2009/0171780 A1 7/2009 Aldrey et al.
2009/0175195 A1 7/2009 Macauley et al.
2009/0181664 A1 7/2009 Kuruvilla et al.
2009/0201133 A1 8/2009 Bruns et al.
2009/0202020 A1 8/2009 Hafeez et al.
2009/0210901 A1 8/2009 Hawkins et al.
2009/0212938 A1 8/2009 Swaim et al.
2009/0250449 A1 10/2009 Petrenko et al.
2009/0254971 A1 10/2009 Herz et al.
2009/0258652 A1 10/2009 Lambert et al.
2009/0284435 A1 11/2009 Elmore et al.
2009/0286482 A1 11/2009 Gorokhov et al.
2009/0289863 A1 11/2009 Lier et al.
2009/0304124 A1 12/2009 Graef et al.
2009/0311960 A1 12/2009 Farahani et al.
2009/0315668 A1 12/2009 Leete, III et al.
2009/0320058 A1 12/2009 Wehmeyer et al.
2009/0325479 A1 12/2009 Chakrabarti et al.
2009/0325628 A1 12/2009 Becker et al.
2010/0002618 A1 1/2010 Eichinger et al.
2010/0002731 A1 1/2010 Kimura et al.
2010/0013696 A1 1/2010 Schmitt et al.
2010/0026607 A1 2/2010 Imai et al.
2010/0039339 A1 2/2010 Kuroda et al.
2010/0045447 A1 2/2010 Mollenkopf et al.
2010/0052799 A1 3/2010 Watanabe et al.
2010/0053019 A1 3/2010 Ikawa et al.
2010/0057894 A1 3/2010 Glasser
2010/0080203 A1 4/2010 Reynolds et al.
2010/0085036 A1 4/2010 Banting et al.
2010/0090887 A1 4/2010 Cooper et al.
2010/0091712 A1 4/2010 Lu et al.
2010/0100918 A1 4/2010 Egan, Jr. et al.
2010/0111521 A1 5/2010 Kim et al.
2010/0119234 A1 5/2010 Suematsu et al.
2010/0121945 A1 5/2010 Gerber et al.
2010/0127848 A1 5/2010 Mustapha et al.
2010/0141527 A1 6/2010 Lalezari et al.
2010/0142435 A1 6/2010 Kim et al.
2010/0150215 A1 6/2010 Black et al.
2010/0153990 A1 6/2010 Ress et al.
2010/0169937 A1 7/2010 Atwal et al.
2010/0175080 A1 7/2010 Yuen et al.
2010/0176894 A1 7/2010 Tahara et al.
2010/0177894 A1 7/2010 Yasuma et al.
2010/0185614 A1 7/2010 O'Brien et al.
2010/0201313 A1 8/2010 Vorenkamp et al.
2010/0214183 A1 8/2010 Stoneback et al.
2010/0214185 A1 8/2010 Sammoura et al.
2010/0220024 A1 9/2010 Snow et al.
2010/0224732 A1 9/2010 Olson et al.
2010/0225426 A1 9/2010 Unger et al.
2010/0232539 A1 9/2010 Han et al.
2010/0243633 A1 9/2010 Huynh et al.
2010/0253450 A1 10/2010 Kim et al.
2010/0256955 A1 10/2010 Pupalaikis et al.
2010/0265877 A1 10/2010 Foxworthy et al.
2010/0266063 A1 10/2010 Harel et al.
2010/0277003 A1 11/2010 Von et al.
2010/0283693 A1 11/2010 Xie et al.
2010/0284446 A1 11/2010 Mu et al.
2010/0319068 A1 12/2010 Abbadessa et al.
2010/0327880 A1 12/2010 Stein et al.
2011/0018704 A1 1/2011 Burrows et al.
2011/0040861 A1 2/2011 Van der Merwe et al.
2011/0042120 A1 2/2011 Otsuka et al.
2011/0043051 A1 2/2011 Meskens et al.
2011/0053498 A1 3/2011 Nogueira-Nine
2011/0068893 A1 3/2011 Lahiri et al.
2011/0068988 A1 3/2011 Monte et al.
2011/0080301 A1 4/2011 Chang et al.
2011/0083399 A1 4/2011 Lettkeman et al.
2011/0103274 A1 5/2011 Vavik et al.
2011/0107364 A1 5/2011 Lajoie et al.
2011/0109936 A1 5/2011 Coffee et al.
2011/0110404 A1 5/2011 Washiro
2011/0118888 A1 5/2011 White et al.

(56) References Cited

U.S. PATENT DOCUMENTS

| | | | | |
|---|---|---|---|---|
| 2011/0132658 | A1 | 6/2011 | Miller, II et al. | |
| 2011/0133865 | A1 | 6/2011 | Miller, II et al. | |
| 2011/0133867 | A1 | 6/2011 | Miller, II et al. | |
| 2011/0136432 | A1 | 6/2011 | Miller, II et al. | |
| 2011/0140911 | A1 | 6/2011 | Pant et al. | |
| 2011/0141555 | A1 | 6/2011 | Fermann et al. | |
| 2011/0143673 | A1 | 6/2011 | Landesman et al. | |
| 2011/0148578 | A1 | 6/2011 | Aloi et al. | |
| 2011/0148687 | A1 | 6/2011 | Wright et al. | |
| 2011/0164514 | A1 | 7/2011 | Afkhamie et al. | |
| 2011/0165847 | A1 | 7/2011 | Kawasaki et al. | |
| 2011/0169336 | A1 | 7/2011 | Yerazunis et al. | |
| 2011/0172000 | A1 | 7/2011 | Quigley et al. | |
| 2011/0173447 | A1 | 7/2011 | Zhang et al. | |
| 2011/0175451 | A1 * | 7/2011 | Moon .................... | H02J 9/062 307/66 |
| 2011/0187578 | A1 | 8/2011 | Farneth et al. | |
| 2011/0199265 | A1 | 8/2011 | Lin et al. | |
| 2011/0201269 | A1 | 8/2011 | Hobbs et al. | |
| 2011/0208450 | A1 | 8/2011 | Salka et al. | |
| 2011/0214176 | A1 | 9/2011 | Burch et al. | |
| 2011/0219402 | A1 | 9/2011 | Candelore et al. | |
| 2011/0220394 | A1 | 9/2011 | Szylakowski et al. | |
| 2011/0225046 | A1 | 9/2011 | Eldering et al. | |
| 2011/0228814 | A1 | 9/2011 | Washiro et al. | |
| 2011/0235536 | A1 | 9/2011 | Nishizaka et al. | |
| 2011/0268085 | A1 | 11/2011 | Barany et al. | |
| 2011/0274396 | A1 | 11/2011 | Nakajima et al. | |
| 2011/0286506 | A1 | 11/2011 | Libby et al. | |
| 2011/0291878 | A1 | 12/2011 | McLaughlin et al. | |
| 2011/0294509 | A1 | 12/2011 | Kim et al. | |
| 2011/0311231 | A1 | 12/2011 | Ridgway et al. | |
| 2011/0316645 | A1 | 12/2011 | Takeuchi et al. | |
| 2012/0002973 | A1 | 1/2012 | Bruzzi et al. | |
| 2012/0015382 | A1 | 1/2012 | Weitz et al. | |
| 2012/0015654 | A1 | 1/2012 | Palanki et al. | |
| 2012/0019420 | A1 | 1/2012 | Caimi et al. | |
| 2012/0019427 | A1 | 1/2012 | Ishikawa et al. | |
| 2012/0038520 | A1 | 2/2012 | Cornwell et al. | |
| 2012/0039366 | A1 | 2/2012 | Wood et al. | |
| 2012/0046891 | A1 | 2/2012 | Yaney et al. | |
| 2012/0054571 | A1 | 3/2012 | Howard et al. | |
| 2012/0068903 | A1 | 3/2012 | Thevenard et al. | |
| 2012/0077485 | A1 | 3/2012 | Shin et al. | |
| 2012/0078452 | A1 | 3/2012 | Daum et al. | |
| 2012/0084807 | A1 | 4/2012 | Thompson et al. | |
| 2012/0091820 | A1 | 4/2012 | Campanella et al. | |
| 2012/0092161 | A1 | 4/2012 | West et al. | |
| 2012/0093078 | A1 | 4/2012 | Perlman et al. | |
| 2012/0102568 | A1 | 4/2012 | Tarbotton et al. | |
| 2012/0105246 | A1 | 5/2012 | Sexton et al. | |
| 2012/0105637 | A1 | 5/2012 | Yousefi et al. | |
| 2012/0109545 | A1 | 5/2012 | Meynardi et al. | |
| 2012/0109566 | A1 | 5/2012 | Adamian et al. | |
| 2012/0117584 | A1 | 5/2012 | Gordon | |
| 2012/0129566 | A1 | 5/2012 | Lee et al. | |
| 2012/0133373 | A1 | 5/2012 | Ali et al. | |
| 2012/0137332 | A1 | 5/2012 | Kumar | |
| 2012/0144420 | A1 | 6/2012 | Del Sordo et al. | |
| 2012/0146861 | A1 | 6/2012 | Armbrecht et al. | |
| 2012/0153087 | A1 | 6/2012 | Collette et al. | |
| 2012/0154239 | A1 | 6/2012 | Bar-Sade et al. | |
| 2012/0161543 | A1 | 6/2012 | Reuven et al. | |
| 2012/0176906 | A1 | 7/2012 | Hartenstein et al. | |
| 2012/0181258 | A1 | 7/2012 | Shan et al. | |
| 2012/0190386 | A1 | 7/2012 | Anderson | |
| 2012/0197558 | A1 | 8/2012 | Henig et al. | |
| 2012/0201145 | A1 | 8/2012 | Ree et al. | |
| 2012/0214538 | A1 | 8/2012 | Kim et al. | |
| 2012/0224807 | A1 | 9/2012 | Winzer et al. | |
| 2012/0226394 | A1 | 9/2012 | Marcus et al. | |
| 2012/0235864 | A1 | 9/2012 | Lu et al. | |
| 2012/0235881 | A1 | 9/2012 | Pan et al. | |
| 2012/0245744 | A1 * | 9/2012 | Prosser .................... | H02J 3/46 700/286 |
| 2012/0250534 | A1 | 10/2012 | Langer et al. | |
| 2012/0250752 | A1 | 10/2012 | McHann et al. | |
| 2012/0263152 | A1 | 10/2012 | Fischer et al. | |
| 2012/0267863 | A1 | 10/2012 | Kiest et al. | |
| 2012/0268340 | A1 | 10/2012 | Capozzoli et al. | |
| 2012/0270507 | A1 | 10/2012 | Qin et al. | |
| 2012/0272741 | A1 | 11/2012 | Xiao et al. | |
| 2012/0274528 | A1 | 11/2012 | McMahon et al. | |
| 2012/0287922 | A1 | 11/2012 | Heck et al. | |
| 2012/0299671 | A1 | 11/2012 | Ikeda et al. | |
| 2012/0304294 | A1 | 11/2012 | Fujiwara et al. | |
| 2012/0306587 | A1 | 12/2012 | Strid et al. | |
| 2012/0306708 | A1 | 12/2012 | Henderson et al. | |
| 2012/0313895 | A1 | 12/2012 | Haroun et al. | |
| 2012/0319903 | A1 | 12/2012 | Huseth et al. | |
| 2012/0322380 | A1 | 12/2012 | Nannarone et al. | |
| 2012/0322492 | A1 | 12/2012 | Koo et al. | |
| 2012/0324018 | A1 | 12/2012 | Metcalf et al. | |
| 2012/0327908 | A1 | 12/2012 | Gupta et al. | |
| 2012/0329523 | A1 | 12/2012 | Stewart et al. | |
| 2012/0330756 | A1 | 12/2012 | Morris et al. | |
| 2013/0002409 | A1 | 1/2013 | Molina et al. | |
| 2013/0003876 | A1 | 1/2013 | Bennett | |
| 2013/0010679 | A1 | 1/2013 | Ma et al. | |
| 2013/0015922 | A1 | 1/2013 | Liu et al. | |
| 2013/0016022 | A1 | 1/2013 | Heiks et al. | |
| 2013/0023302 | A1 | 1/2013 | Sivanesan et al. | |
| 2013/0039624 | A1 | 2/2013 | Scherer et al. | |
| 2013/0064178 | A1 | 3/2013 | Cs et al. | |
| 2013/0064311 | A1 | 3/2013 | Turner et al. | |
| 2013/0070621 | A1 | 3/2013 | Marzetta et al. | |
| 2013/0077612 | A1 | 3/2013 | Khorami et al. | |
| 2013/0077664 | A1 | 3/2013 | Lee et al. | |
| 2013/0080290 | A1 | 3/2013 | Kamm | |
| 2013/0086639 | A1 | 4/2013 | Sondhi et al. | |
| 2013/0093638 | A1 | 4/2013 | Shoemaker et al. | |
| 2013/0095875 | A1 | 4/2013 | Reuven et al. | |
| 2013/0108206 | A1 | 5/2013 | Sasaoka et al. | |
| 2013/0109317 | A1 | 5/2013 | Kikuchi et al. | |
| 2013/0117852 | A1 | 5/2013 | Stute et al. | |
| 2013/0120548 | A1 | 5/2013 | Li et al. | |
| 2013/0122828 | A1 | 5/2013 | Choi et al. | |
| 2013/0124365 | A1 | 5/2013 | Pradeep | |
| 2013/0127678 | A1 | 5/2013 | Chandler et al. | |
| 2013/0136410 | A1 | 5/2013 | Sasaoka et al. | |
| 2013/0144750 | A1 | 6/2013 | Brown | |
| 2013/0148194 | A1 | 6/2013 | Altug et al. | |
| 2013/0159153 | A1 | 6/2013 | Lau et al. | |
| 2013/0159856 | A1 | 6/2013 | Ferren | |
| 2013/0160122 | A1 | 6/2013 | Choi et al. | |
| 2013/0162490 | A1 | 6/2013 | Blech et al. | |
| 2013/0166690 | A1 | 6/2013 | Shatzkamer et al. | |
| 2013/0169499 | A1 | 7/2013 | Lin et al. | |
| 2013/0173807 | A1 | 7/2013 | De et al. | |
| 2013/0178998 | A1 | 7/2013 | Gadiraju et al. | |
| 2013/0182804 | A1 | 7/2013 | Yutaka et al. | |
| 2013/0185552 | A1 | 7/2013 | Steer et al. | |
| 2013/0187636 | A1 | 7/2013 | Kast et al. | |
| 2013/0191052 | A1 | 7/2013 | Fernandez et al. | |
| 2013/0201006 | A1 | 8/2013 | Kummetz et al. | |
| 2013/0201904 | A1 | 8/2013 | Toskala et al. | |
| 2013/0205370 | A1 | 8/2013 | Kalgi et al. | |
| 2013/0207681 | A1 | 8/2013 | Slupsky et al. | |
| 2013/0207859 | A1 | 8/2013 | Legay et al. | |
| 2013/0219308 | A1 | 8/2013 | Britton et al. | |
| 2013/0230235 | A1 | 9/2013 | Tateno et al. | |
| 2013/0234904 | A1 | 9/2013 | Blech et al. | |
| 2013/0234961 | A1 | 9/2013 | Garfinkel et al. | |
| 2013/0235845 | A1 | 9/2013 | Kovvali et al. | |
| 2013/0235871 | A1 | 9/2013 | Brzozowski et al. | |
| 2013/0245852 | A1 * | 9/2013 | Sanders ................ | G05B 15/02 700/295 |
| 2013/0262656 | A1 | 10/2013 | Cao et al. | |
| 2013/0262857 | A1 | 10/2013 | Neuman et al. | |
| 2013/0263263 | A1 | 10/2013 | Narkolayev et al. | |
| 2013/0265732 | A1 | 10/2013 | Herbsommer et al. | |
| 2013/0268414 | A1 | 10/2013 | Lehtiniemi et al. | |
| 2013/0271349 | A1 | 10/2013 | Wright et al. | |
| 2013/0278464 | A1 | 10/2013 | Xia et al. | |

(56) References Cited

U.S. PATENT DOCUMENTS

2013/0279523 A1 10/2013 Denney et al.
2013/0279561 A1 10/2013 Jin et al.
2013/0279868 A1 10/2013 Zhang et al.
2013/0285864 A1 10/2013 Clymer et al.
2013/0303089 A1 11/2013 Wang et al.
2013/0305369 A1 11/2013 Karta et al.
2013/0306351 A1 11/2013 Lambert et al.
2013/0307645 A1 11/2013 Mita et al.
2013/0311661 A1 11/2013 McPhee
2013/0314182 A1 11/2013 Takeda et al.
2013/0321225 A1 12/2013 Pettus et al.
2013/0326063 A1 12/2013 Burch et al.
2013/0326494 A1 12/2013 Nunez et al.
2013/0330050 A1 12/2013 Yang et al.
2013/0335165 A1 12/2013 Arnold et al.
2013/0336370 A1 12/2013 Jovanovic et al.
2013/0336418 A1 12/2013 Tomeba et al.
2013/0341094 A1 12/2013 Taherian et al.
2013/0342287 A1 12/2013 Randall et al.
2013/0343213 A1 12/2013 Reynolds et al.
2013/0343351 A1 12/2013 Sambhwani et al.
2014/0003394 A1 1/2014 Rubin et al.
2014/0003775 A1 1/2014 Ko et al.
2014/0007076 A1 1/2014 Kim et al.
2014/0009270 A1 1/2014 Yamazaki et al.
2014/0009822 A1 1/2014 Dong et al.
2014/0015705 A1 1/2014 Ebihara et al.
2014/0019576 A1 1/2014 Lobo et al.
2014/0026170 A1 1/2014 Francisco et al.
2014/0028184 A1 1/2014 Voronin et al.
2014/0028190 A1 1/2014 Voronin et al.
2014/0028532 A1 1/2014 Ehrenberg et al.
2014/0032005 A1 1/2014 Iwamura
2014/0036694 A1 2/2014 Courtice et al.
2014/0041925 A1 2/2014 Siripurapu et al.
2014/0043189 A1 2/2014 Lee et al.
2014/0043977 A1 2/2014 Wiley et al.
2014/0044139 A1 2/2014 Dong et al.
2014/0050212 A1 2/2014 Braz et al.
2014/0052810 A1 2/2014 Osorio et al.
2014/0056130 A1 2/2014 Grayson et al.
2014/0057576 A1 2/2014 Liu et al.
2014/0062784 A1 3/2014 Rison et al.
2014/0071818 A1 3/2014 Wang et al.
2014/0072064 A1 3/2014 Lemson et al.
2014/0072299 A1 3/2014 Stapleton et al.
2014/0077995 A1 3/2014 Artemenko et al.
2014/0081472 A1* 3/2014 Bates .................. H02J 13/0006
700/286
2014/0086080 A1 3/2014 Hui et al.
2014/0086152 A1 3/2014 Bontu et al.
2014/0112184 A1 4/2014 Chai
2014/0124236 A1 5/2014 Vu et al.
2014/0126914 A1 5/2014 Berlin et al.
2014/0130111 A1 5/2014 Nulty et al.
2014/0132728 A1 5/2014 Verano et al.
2014/0139375 A1 5/2014 Faragher et al.
2014/0143055 A1 5/2014 Johnson
2014/0143578 A1* 5/2014 Cenizal ................... H02J 13/00
713/340
2014/0146902 A1 5/2014 Liu et al.
2014/0148107 A1 5/2014 Maltsev et al.
2014/0155054 A1 6/2014 Henry et al.
2014/0165145 A1 6/2014 Baentsch et al.
2014/0169186 A1 6/2014 Zhu et al.
2014/0177692 A1 6/2014 Yu et al.
2014/0179302 A1 6/2014 Polehn et al.
2014/0189677 A1 7/2014 Curzi et al.
2014/0189732 A1 7/2014 Shkedi et al.
2014/0191913 A1 7/2014 Ge et al.
2014/0204000 A1 7/2014 Sato et al.
2014/0204754 A1 7/2014 Jeong et al.
2014/0207844 A1 7/2014 Mayo et al.
2014/0208272 A1 7/2014 Vats et al.
2014/0222997 A1 8/2014 Mermoud et al.
2014/0223527 A1 8/2014 Bortz et al.
2014/0225129 A1 8/2014 Inoue et al.
2014/0227905 A1 8/2014 Knott et al.
2014/0227966 A1 8/2014 Artemenko et al.
2014/0233900 A1 8/2014 Hugonnot et al.
2014/0241718 A1 8/2014 Jiang et al.
2014/0254516 A1 9/2014 Lee et al.
2014/0254896 A1 9/2014 Zhou et al.
2014/0254979 A1 9/2014 Zhang et al.
2014/0266946 A1 9/2014 Stevenson et al.
2014/0266953 A1 9/2014 Yen et al.
2014/0267700 A1 9/2014 Wang et al.
2014/0269260 A1 9/2014 Xue et al.
2014/0269691 A1 9/2014 Xue et al.
2014/0269972 A1 9/2014 Rada et al.
2014/0273873 A1 9/2014 Huynh et al.
2014/0277788 A1* 9/2014 Forbes, Jr. ................ G05F 1/66
700/286
2014/0285277 A1 9/2014 Herbsommer et al.
2014/0285293 A1 9/2014 Schuppener et al.
2014/0285373 A1 9/2014 Kuwahara et al.
2014/0285389 A1 9/2014 Fakharzadeh et al.
2014/0286189 A1 9/2014 Kang et al.
2014/0286235 A1 9/2014 Chang et al.
2014/0286284 A1 9/2014 Lim et al.
2014/0287702 A1 9/2014 Schuppener et al.
2014/0299349 A1 10/2014 Yamaguchi et al.
2014/0304498 A1 10/2014 Gonuguntla et al.
2014/0317229 A1 10/2014 Hughes et al.
2014/0320364 A1 10/2014 Gu et al.
2014/0321273 A1 10/2014 Morrill et al.
2014/0325594 A1 10/2014 Klein et al.
2014/0334773 A1 11/2014 Mathai et al.
2014/0334789 A1 11/2014 Matsuo et al.
2014/0340271 A1 11/2014 Petkov et al.
2014/0343883 A1 11/2014 Libby et al.
2014/0349696 A1 11/2014 Hyde et al.
2014/0351571 A1 11/2014 Jacobs
2014/0355525 A1 12/2014 Barzegar et al.
2014/0355989 A1 12/2014 Finckelstein
2014/0357269 A1 12/2014 Zhou et al.
2014/0359275 A1 12/2014 Murugesan et al.
2014/0362374 A1 12/2014 Santori
2014/0362694 A1 12/2014 Rodrigues
2014/0368301 A1 12/2014 Herbsommer et al.
2014/0369430 A1 12/2014 Parnell
2014/0372068 A1 12/2014 Seto et al.
2014/0373053 A1 12/2014 Leley et al.
2014/0376655 A1 12/2014 Ruan et al.
2015/0008996 A1 1/2015 Jessup et al.
2015/0009089 A1 1/2015 Pesa
2015/0016260 A1 1/2015 Chow et al.
2015/0017473 A1 1/2015 Verhoeven et al.
2015/0022399 A1 1/2015 Clymer et al.
2015/0026460 A1 1/2015 Walton
2015/0029065 A1 1/2015 Cheng
2015/0036610 A1 2/2015 Kim et al.
2015/0042526 A1 2/2015 Zeine
2015/0048238 A1 2/2015 Kawai
2015/0049998 A1 2/2015 Dumais
2015/0061859 A1 3/2015 Matsuoka et al.
2015/0065166 A1 3/2015 Ward et al.
2015/0070231 A1 3/2015 Park et al.
2015/0071594 A1 3/2015 Register
2015/0073594 A1 3/2015 Trujillo et al.
2015/0077740 A1 3/2015 Fuse
2015/0078756 A1 3/2015 Soto
2015/0084660 A1 3/2015 Knierim et al.
2015/0084703 A1 3/2015 Sanduleanu
2015/0084814 A1 3/2015 Rojanski et al.
2015/0091650 A1 4/2015 Nobbe
2015/0094104 A1 4/2015 Wilmhoff et al.
2015/0098387 A1 4/2015 Garg et al.
2015/0099555 A1 4/2015 Krishnaswamy et al.
2015/0102972 A1 4/2015 Scire-Scappuzzo et al.
2015/0103685 A1 4/2015 Butchko et al.
2015/0104005 A1 4/2015 Holman
2015/0105115 A1 4/2015 Hata et al.
2015/0109178 A1 4/2015 Hyde et al.

(56) References Cited

U.S. PATENT DOCUMENTS

2015/0116154 A1 4/2015 Artemenko
2015/0185425 A1 4/2015 Gundel et al.
2015/0122886 A1 5/2015 Koch
2015/0126107 A1 5/2015 Bennett et al.
2015/0130675 A1 5/2015 Parsche
2015/0138022 A1 5/2015 Takahashi
2015/0138144 A1 5/2015 Tanabe
2015/0153248 A1 6/2015 Hayward et al.
2015/0156266 A1 6/2015 Gupta
2015/0162988 A1 6/2015 Henry et al.
2015/0171522 A1 6/2015 Liu et al.
2015/0172036 A1 6/2015 Katar et al.
2015/0181449 A1 6/2015 Didenko et al.
2015/0195349 A1 7/2015 Cardamore
2015/0195719 A1 7/2015 Rahman
2015/0201228 A1 7/2015 Hasek
2015/0207527 A1 7/2015 Eliaz et al.
2015/0214615 A1 7/2015 Patel et al.
2015/0215268 A1 7/2015 Dinha
2015/0223078 A1 8/2015 Bennett et al.
2015/0223113 A1 8/2015 Matsunaga
2015/0223160 A1 8/2015 Ho
2015/0230109 A1 8/2015 Turner et al.
2015/0236778 A1 8/2015 Jalali
2015/0236779 A1 8/2015 Jalali
2015/0237519 A1 8/2015 Ghai
2015/0249965 A1 9/2015 Dussmann et al.
2015/0263424 A1 9/2015 Sanford
2015/0271830 A1 9/2015 Shin et al.
2015/0276577 A1 10/2015 Ruege et al.
2015/0277569 A1 10/2015 Sprenger
2015/0280328 A1 10/2015 Sanford et al.
2015/0284079 A1 10/2015 Matsuda
2015/0288532 A1 10/2015 Veyseh et al.
2015/0289247 A1 10/2015 Liu et al.
2015/0303892 A1 10/2015 Desclos
2015/0304045 A1 10/2015 Henry et al.
2015/0304869 A1 10/2015 Johnson et al.
2015/0311951 A1 10/2015 Hariz
2015/0312774 A1 10/2015 Lau
2015/0318610 A1 11/2015 Lee et al.
2015/0323948 A1 11/2015 Jeong
2015/0325913 A1 11/2015 Vagman
2015/0326274 A1 11/2015 Flood
2015/0326287 A1 11/2015 Kazmi et al.
2015/0333386 A1 11/2015 Kaneda et al.
2015/0333804 A1 11/2015 Yang et al.
2015/0334769 A1 11/2015 Kim et al.
2015/0339912 A1 11/2015 Farrand et al.
2015/0344136 A1 12/2015 Dahlstrom
2015/0349415 A1 12/2015 Iwanaka
2015/0356482 A1 12/2015 Whipple et al.
2015/0356848 A1 12/2015 Hatch
2015/0369660 A1 12/2015 Yu
2015/0370251 A1 12/2015 Siegel et al.
2015/0373557 A1 12/2015 Bennett et al.
2015/0380814 A1 12/2015 Boutayeb et al.
2015/0382208 A1 12/2015 Elliott et al.
2015/0382363 A1 12/2015 Wang et al.
2016/0006129 A1 1/2016 Haziza
2016/0012460 A1 1/2016 Kruglick
2016/0014749 A1 1/2016 Kang et al.
2016/0021545 A1 1/2016 Shaw
2016/0026301 A1 1/2016 Zhou et al.
2016/0029009 A1 1/2016 Lu et al.
2016/0038074 A1 2/2016 Brown et al.
2016/0043478 A1 2/2016 Hartenstein
2016/0044705 A1 2/2016 Gao
2016/0050028 A1 2/2016 Henry et al.
2016/0056543 A1 2/2016 Kwiatkowski
2016/0063642 A1 3/2016 Luciani et al.
2016/0064794 A1 3/2016 Henry et al.
2016/0065252 A1 3/2016 Preschutti
2016/0065335 A1 3/2016 Koo et al.
2016/0066191 A1 3/2016 Li
2016/0068265 A1 3/2016 Hoareau et al.
2016/0068277 A1 3/2016 Manitta
2016/0069934 A1 3/2016 Saxby et al.
2016/0070265 A1 3/2016 Liu et al.
2016/0072173 A1 3/2016 Herbsommer et al.
2016/0072191 A1 3/2016 Iwai
2016/0072287 A1 3/2016 Jia
2016/0079769 A1 3/2016 Corum et al.
2016/0079771 A1 3/2016 Corum
2016/0079809 A1 3/2016 Corum et al.
2016/0080035 A1 3/2016 Fuchs et al.
2016/0080839 A1 3/2016 Fuchs et al.
2016/0082460 A1 3/2016 McMaster et al.
2016/0087344 A1 3/2016 Artemenko et al.
2016/0088498 A1 3/2016 Sharawi
2016/0094420 A1 3/2016 Clemm et al.
2016/0094879 A1 3/2016 Gerszberg et al.
2016/0069935 A1 4/2016 Kreikebaum et al.
2016/0099749 A1 4/2016 Bennett et al.
2016/0100324 A1 4/2016 Henry et al.
2016/0103199 A1 4/2016 Rappaport
2016/0105218 A1 4/2016 Henry et al.
2016/0105233 A1 4/2016 Jalali
2016/0105239 A1 4/2016 Henry et al.
2016/0105255 A1 4/2016 Henry et al.
2016/0111890 A1 4/2016 Corum et al.
2016/0112092 A1 4/2016 Henry et al.
2016/0112093 A1 4/2016 Barzegar
2016/0112094 A1 4/2016 Stuckman et al.
2016/0112115 A1 4/2016 Henry et al.
2016/0112132 A1 4/2016 Henry et al.
2016/0112133 A1 4/2016 Henry et al.
2016/0112135 A1 4/2016 Henry et al.
2016/0112263 A1 4/2016 Henry et al.
2016/0116914 A1 4/2016 Mucci
2016/0118717 A1 4/2016 Britz et al.
2016/0124071 A1 5/2016 Baxley et al.
2016/0127931 A1 5/2016 Baxley et al.
2016/0131347 A1 5/2016 Hill et al.
2016/0134006 A1 5/2016 Ness et al.
2016/0135132 A1 5/2016 Donepudi et al.
2016/0135184 A1 5/2016 Zavadsky et al.
2016/0137311 A1 5/2016 Peverill et al.
2016/0139731 A1 5/2016 Kim
2016/0149312 A1 5/2016 Henry et al.
2016/0149614 A1 5/2016 Barzegar
2016/0149636 A1 5/2016 Gerszberg et al.
2016/0149665 A1 5/2016 Henry et al.
2016/0149731 A1 5/2016 Henry et al.
2016/0149753 A1 5/2016 Gerszberg et al.
2016/0150427 A1 5/2016 Ramanath
2016/0153938 A1 6/2016 Balasubramaniam et al.
2016/0164571 A1 6/2016 Bennett et al.
2016/0164573 A1 6/2016 Birk et al.
2016/0165472 A1 6/2016 Gopalakrishnan et al.
2016/0165478 A1 6/2016 Yao et al.
2016/0174040 A1 6/2016 Roberts et al.
2016/0179134 A1 6/2016 Ryu
2016/0181701 A1 6/2016 Sangaran et al.
2016/0182096 A1 6/2016 Panioukov et al.
2016/0182161 A1 6/2016 Barzegar
2016/0182981 A1 6/2016 Minarik et al.
2016/0188291 A1 6/2016 Vilermo et al.
2016/0189101 A1 6/2016 Kantor et al.
2016/0197392 A1 7/2016 Henry et al.
2016/0197409 A1 7/2016 Henry et al.
2016/0197630 A1 7/2016 Kawasaki
2016/0197642 A1 7/2016 Henry et al.
2016/0207627 A1 7/2016 Hoareau et al.
2016/0212065 A1 7/2016 To et al.
2016/0212641 A1 7/2016 Kong et al.
2016/0214717 A1 7/2016 De Silva
2016/0218407 A1 7/2016 Henry et al.
2016/0218437 A1 7/2016 Guntupalli
2016/0221039 A1 8/2016 Fuchs et al.
2016/0224235 A1 8/2016 Forsstrom
2016/0226681 A1 8/2016 Henry et al.
2016/0244165 A1 8/2016 Patrick et al.
2016/0248149 A1 8/2016 Kim et al.

(56) References Cited

U.S. PATENT DOCUMENTS

2016/0248165 A1 8/2016 Henry
2016/0248509 A1 8/2016 Henry
2016/0249233 A1 8/2016 Murray
2016/0252970 A1 9/2016 Dahl
2016/0261309 A1 9/2016 Henry
2016/0261310 A1 9/2016 Fuchs et al.
2016/0261311 A1 9/2016 Henry et al.
2016/0261312 A1 9/2016 Fuchs et al.
2016/0269156 A1 9/2016 Barzegar et al.
2016/0276725 A1 9/2016 Barnickel et al.
2016/0277939 A1 9/2016 Olcott et al.
2016/0278094 A1 9/2016 Henry et al.
2016/0285508 A1 9/2016 Bennett et al.
2016/0285512 A1 9/2016 Henry et al.
2016/0294444 A1 10/2016 Gerszberg et al.
2016/0294517 A1 10/2016 Barzegar et al.
2016/0295431 A1 10/2016 Henry et al.
2016/0306361 A1 10/2016 Shalom et al.
2016/0315659 A1 10/2016 Henry
2016/0315660 A1 10/2016 Henry
2016/0315661 A1 10/2016 Henry
2016/0315662 A1 10/2016 Henry
2016/0322691 A1 11/2016 Bennett et al.
2016/0323015 A1 11/2016 Henry et al.
2016/0329957 A1 11/2016 Schmid et al.
2016/0336091 A1 11/2016 Henry et al.
2016/0336092 A1 11/2016 Henry et al.
2016/0336636 A1 11/2016 Henry et al.
2016/0336996 A1 11/2016 Henry
2016/0336997 A1 11/2016 Henry
2016/0351987 A1 12/2016 Henry
2016/0359523 A1 12/2016 Bennett
2016/0359524 A1 12/2016 Bennett et al.
2016/0359529 A1 12/2016 Bennett et al.
2016/0359530 A1 12/2016 Bennett
2016/0359541 A1 12/2016 Bennett
2016/0359542 A1 12/2016 Bennett
2016/0359543 A1 12/2016 Bennett et al.
2016/0359544 A1 12/2016 Bennett
2016/0359546 A1 12/2016 Bennett
2016/0359547 A1 12/2016 Bennett
2016/0359649 A1 12/2016 Bennett et al.
2016/0360511 A1 12/2016 Barzegar
2016/0360533 A1 12/2016 Bennett et al.
2016/0365175 A1 12/2016 Bennett et al.
2016/0365893 A1 12/2016 Bennett et al.
2016/0365894 A1 12/2016 Bennett et al.
2016/0365897 A1 12/2016 Gross
2016/0365916 A1 12/2016 Bennett et al.
2016/0365943 A1 12/2016 Henry et al.
2016/0365966 A1 12/2016 Bennett et al.
2016/0366586 A1 12/2016 Gross et al.
2016/0366587 A1 12/2016 Gross et al.
2016/0373937 A1 12/2016 Bennett et al.
2016/0380327 A1 12/2016 Henry
2016/0380328 A1 12/2016 Henry
2016/0380358 A1 12/2016 Henry
2016/0380701 A1 12/2016 Henry et al.
2016/0380702 A1 12/2016 Henry et al.
2017/0005515 A1* 1/2017 Sanders .................. H02J 3/381
2017/0012667 A1 1/2017 Bennett
2017/0018174 A1 1/2017 Gerszberg
2017/0018332 A1 1/2017 Barzegar et al.
2017/0018830 A1 1/2017 Henry et al.
2017/0018831 A1 1/2017 Henry et al.
2017/0018832 A1 1/2017 Henry et al.
2017/0018833 A1 1/2017 Henry et al.
2017/0018851 A1 1/2017 Hnery et al.
2017/0018852 A1 1/2017 Adriazola et al.
2017/0018856 A1 1/2017 Henry et al.
2017/0019130 A1 1/2017 Hnery et al.
2017/0019131 A1 1/2017 Henry et al.
2017/0019150 A1 1/2017 Henry
2017/0019189 A1 1/2017 Henry et al.
2017/0025728 A1 1/2017 Henry et al.
2017/0025732 A1 1/2017 Henry et al.
2017/0025734 A1 1/2017 Henry et al.
2017/0025839 A1 1/2017 Henry et al.
2017/0026063 A1 1/2017 Henry
2017/0026082 A1 1/2017 Henry et al.
2017/0026084 A1 1/2017 Henry et al.
2017/0026129 A1 1/2017 Henry
2017/0033464 A1 2/2017 Henry et al.
2017/0033465 A1 2/2017 Henry et al.
2017/0033466 A1 2/2017 Henry et al.
2017/0033834 A1 2/2017 Gross
2017/0033835 A1 2/2017 Bennett et al.
2017/0033953 A1 2/2017 Henry et al.
2017/0033954 A1 2/2017 Henry et al.
2017/0034042 A1 2/2017 Gross et al.
2017/0041081 A1 2/2017 Henry et al.
2017/0047662 A1 2/2017 Henry et al.
2017/0174090 A1* 6/2017 Lakamp .............. B60L 11/1816
2018/0048497 A1 2/2018 Henry et al.
2018/0054232 A1 2/2018 Henry et al.
2018/0054233 A1 2/2018 Henry et al.
2018/0054234 A1 2/2018 Stuckman et al.
2018/0062886 A1 3/2018 Paul et al.
2018/0069594 A1 3/2018 Henry et al.
2018/0069731 A1 3/2018 Henry et al.
2018/0076982 A1 3/2018 Henry et al.
2018/0076988 A1 3/2018 Willis, III et al.
2018/0077709 A1 3/2018 Gerszberg
2018/0108997 A1 4/2018 Henry et al.
2018/0108998 A1 4/2018 Henry et al.
2018/0108999 A1 4/2018 Henry et al.
2018/0115040 A1 4/2018 Bennett et al.
2018/0115058 A1 4/2018 Henry et al.
2018/0115060 A1 4/2018 Bennett et al.
2018/0115075 A1 4/2018 Bennett et al.
2018/0115081 A1 4/2018 Johnson et al.
2018/0123207 A1 5/2018 Henry et al.
2018/0123208 A1 5/2018 Henry et al.
2018/0123643 A1 5/2018 Henry et al.
2018/0123836 A1 5/2018 Henry et al.
2018/0151957 A1 5/2018 Bennett et al.
2018/0159195 A1 6/2018 Henry et al.
2018/0159196 A1 6/2018 Henry et al.
2018/0159228 A1 6/2018 Britz et al.
2018/0159229 A1 6/2018 Britz
2018/0159230 A1 6/2018 Henry et al.
2018/0159232 A1 6/2018 Henry et al.
2018/0159235 A1 6/2018 Wolniansky
2018/0159238 A1 6/2018 Wolniansky
2018/0159240 A1 6/2018 Henry et al.
2018/0159243 A1 6/2018 Britz et al.
2018/0166761 A1 6/2018 Henry et al.
2018/0166784 A1 6/2018 Johnson et al.
2018/0166785 A1 6/2018 Henry et al.
2018/0166787 A1 6/2018 Johnson et al.
2018/0167130 A1 6/2018 Vannucci
2018/0167927 A1 6/2018 Beattie, Jr. et al.

FOREIGN PATENT DOCUMENTS

AU 606303 B2 1/1991
AU 7261000 A 4/2001
AU 760272 B2 5/2003
AU 2005227368 B2 2/2009
AU 2010101079 A4 11/2010
AU 2007215252 B2 1/2011
AU 2014200748 A1 3/2014
CA 1136267 A1 11/1982
CA 1211813 A1 9/1986
CA 1328009 C 3/1994
CA 2260380 C 12/2000
CA 2348614 A1 3/2001
CA 2449596 A1 6/2005
CA 2515560 A1 2/2007
CA 2664573 A1 4/2008
CA 2467988 C 11/2010
CA 2777147 A1 4/2011
CA 2814529 A1 4/2012
CA 2787580 A1 2/2013

(56) References Cited

FOREIGN PATENT DOCUMENTS

| | | | |
|---|---|---|---|
| CA | 2927054 | A1 | 5/2015 |
| CA | 2940976 | | 9/2015 |
| CN | 2116969 | U | 9/1992 |
| CN | 1155354 | C | 7/1997 |
| CN | 1411563 | A | 4/2003 |
| CN | 1126425 | C | 10/2003 |
| CN | 2730033 | Y | 9/2005 |
| CN | 1833397 | A | 9/2006 |
| CN | 1885736 | A | 12/2006 |
| CN | 201048157 | Y | 4/2008 |
| CN | 201146495 | Y | 11/2008 |
| CN | 201207179 | Y | 3/2009 |
| CN | 100502181 | C | 6/2009 |
| CN | 201282193 | Y | 7/2009 |
| CN | 101834011 | U | 4/2010 |
| CN | 1823275 | B | 5/2010 |
| CN | 101785201 | A | 7/2010 |
| CN | 1820482 | B | 12/2010 |
| CN | 101075702 | B | 2/2011 |
| CN | 101978613 | A | 2/2011 |
| CN | 102130698 | A | 7/2011 |
| CN | 102136634 | A | 7/2011 |
| CN | 201985870 | U | 9/2011 |
| CN | 102208716 | A | 10/2011 |
| CN | 102280704 | A | 12/2011 |
| CN | 102280709 | A | 12/2011 |
| CN | 202093126 | U | 12/2011 |
| CN | 102351415 | A | 2/2012 |
| CN | 102396111 | A | 3/2012 |
| CN | 202253536 | U | 5/2012 |
| CN | 102544736 | A | 7/2012 |
| CN | 102590893 | A | 7/2012 |
| CN | 102694351 | A | 9/2012 |
| CN | 202424729 | U | 9/2012 |
| CN | 101662076 | B | 11/2012 |
| CN | 102780058 | A | 11/2012 |
| CN | 102017692 | B | 4/2013 |
| CN | 103078673 | A | 5/2013 |
| CN | 103117118 | A | 5/2013 |
| CN | 103163881 | A | 6/2013 |
| CN | 203204743 | U | 9/2013 |
| CN | 1863244 | B | 10/2013 |
| CN | 101958461 | B | 11/2013 |
| CN | 103700442 | A | 4/2014 |
| CN | 103943925 | A | 7/2014 |
| CN | 104052742 | A | 9/2014 |
| CN | 104064844 | A | 9/2014 |
| CN | 203813973 | U | 9/2014 |
| CN | 104091987 | A | 10/2014 |
| CN | 104092028 | A | 10/2014 |
| CN | 203931626 | U | 11/2014 |
| CN | 203950607 | U | 11/2014 |
| CN | 104181552 | A | 12/2014 |
| CN | 204538183 | | 8/2015 |
| CN | 102412442 | B | 10/2015 |
| CN | 204760545 | U | 11/2015 |
| CN | 105262551 | A | 1/2016 |
| CN | 205265924 | | 1/2016 |
| CN | 105359572 | A | 2/2016 |
| CN | 105453340 | | 3/2016 |
| CN | 105594138 | A | 5/2016 |
| CN | 104162995 | B | 6/2016 |
| CN | 105813193 | A | 7/2016 |
| DE | 10043761 | C2 | 11/1928 |
| DE | 3504546 | A1 | 8/1986 |
| DE | 3533204 | A1 | 3/1987 |
| DE | 3533211 | A1 | 3/1987 |
| DE | 3827956 | A1 | 3/1989 |
| DE | 4027367 | C1 | 7/1991 |
| DE | 4225595 | C1 | 9/1993 |
| DE | 19501448 | A1 | 7/1996 |
| DE | 19939832 | A1 | 2/2001 |
| DE | 102004024356 | A1 | 9/2005 |
| DE | 69732676 | T2 | 4/2006 |
| DE | 4337835 | B4 | 5/2008 |
| DE | 102007049914 | A1 | 4/2009 |
| DE | 102012004998 | A1 | 7/2013 |
| DE | 102012203816 | A1 | 9/2013 |
| EP | 0102846 | | 3/1984 |
| EP | 0110478 | | 6/1984 |
| EP | 0136818 | | 4/1985 |
| EP | 0280379 | | 8/1988 |
| EP | 0330303 | | 8/1989 |
| EP | 0331248 | | 9/1989 |
| EP | 0342149 | | 11/1989 |
| EP | 0391719 | | 4/1990 |
| EP | 425979 | A2 | 5/1991 |
| EP | 0485467 | | 5/1992 |
| EP | 272785 | B1 | 2/1994 |
| EP | 0651487 | | 10/1994 |
| EP | 0371660 | | 4/1996 |
| EP | 0756392 | | 1/1997 |
| EP | 834722 | A2 | 4/1998 |
| EP | 0840464 | | 5/1998 |
| EP | 0871241 | B1 | 10/1998 |
| EP | 0890132 | | 1/1999 |
| EP | 755092 | A3 | 4/1999 |
| EP | 0896380 | | 10/1999 |
| EP | 676648 | B1 | 5/2000 |
| EP | 1085599 | A2 | 3/2001 |
| EP | 0907983 | B1 | 6/2001 |
| EP | 0756786 | | 8/2001 |
| EP | 1127283 | A1 | 8/2001 |
| EP | 1129550 | A1 | 9/2001 |
| EP | 1184930 | A1 | 3/2002 |
| EP | 1195847 | A2 | 4/2002 |
| EP | 1237303 | A2 | 9/2002 |
| EP | 1296146 | A1 | 3/2003 |
| EP | 0772061 | | 7/2003 |
| EP | 1346431 | A1 | 9/2003 |
| EP | 1249056 | B1 | 1/2004 |
| EP | 1376755 | A1 | 1/2004 |
| EP | 1401048 | A1 | 3/2004 |
| EP | 1454422 | A1 | 9/2004 |
| EP | 1488397 | A1 | 12/2004 |
| EP | 1509970 | | 3/2005 |
| EP | 1371108 | B1 | 6/2005 |
| EP | 1550327 | A2 | 7/2005 |
| EP | 1341255 | B8 | 8/2005 |
| EP | 1577687 | A1 | 9/2005 |
| EP | 1312135 | B1 | 11/2005 |
| EP | 1608110 | A1 | 12/2005 |
| EP | 1624685 | A2 | 2/2006 |
| EP | 1642468 | A2 | 4/2006 |
| EP | 1647072 | A1 | 4/2006 |
| EP | 1608110 | B1 | 10/2006 |
| EP | 1793508 | A1 | 6/2007 |
| EP | 1842265 | A1 | 10/2007 |
| EP | 1898532 | A2 | 3/2008 |
| EP | 1930982 | A1 | 6/2008 |
| EP | 1953940 | A1 | 8/2008 |
| EP | 1696509 | B1 | 10/2009 |
| EP | 2159749 | A1 | 3/2010 |
| EP | 2165550 | A1 | 3/2010 |
| EP | 1166599 | B1 | 5/2010 |
| EP | 1807950 | A4 | 1/2011 |
| EP | 2404347 | A2 | 1/2012 |
| EP | 2472671 | A1 | 7/2012 |
| EP | 1817855 | B1 | 1/2013 |
| EP | 2568528 | A2 | 3/2013 |
| EP | 2302735 | B1 | 9/2013 |
| EP | 2472737 | B1 | 9/2013 |
| EP | 2640115 | A1 | 9/2013 |
| EP | 2016643 | B1 | 7/2014 |
| EP | 2760081 | A1 | 7/2014 |
| EP | 2804259 | A1 | 11/2014 |
| EP | 2507939 | B1 | 12/2014 |
| EP | 2680452 | B1 | 1/2015 |
| EP | 2838155 | A1 | 2/2015 |
| EP | 2846480 | A1 | 3/2015 |
| EP | 2849524 | A1 | 3/2015 |
| EP | 2850695 | A1 | 3/2015 |
| EP | 2853902 | A1 | 4/2015 |
| EP | 2854361 | A1 | 4/2015 |

(56) References Cited

FOREIGN PATENT DOCUMENTS

| | | | |
|---|---|---|---|
| EP | 2870802 | A1 | 5/2015 |
| EP | 2710400 | A4 | 6/2015 |
| EP | 3076482 | A1 | 10/2016 |
| ES | 2120893 | A1 | 11/1998 |
| FR | 2119804 | A1 | 8/1972 |
| FR | 2214161 | A1 | 8/1974 |
| FR | 2416562 | A1 | 8/1979 |
| FR | 2583226 | A1 | 12/1986 |
| FR | 2691602 | A1 | 11/1993 |
| FR | 2849728 | A1 | 7/2004 |
| FR | 2841387 | B1 | 4/2006 |
| FR | 2893717 | A1 | 5/2007 |
| FR | 2946466 | B1 | 3/2012 |
| FR | 2986376 | B1 | 10/2014 |
| FR | 3034203 | | 9/2016 |
| GB | 175489 | A | 2/1922 |
| GB | 462804 | A | 3/1937 |
| GB | 529290 | A | 11/1940 |
| GB | 603119 | A | 10/1945 |
| GB | 589603 | A | 6/1947 |
| GB | 640181 | A | 7/1950 |
| GB | 663166 | A | 12/1951 |
| GB | 667290 | A | 2/1952 |
| GB | 668827 | A | 3/1952 |
| GB | 682115 | A | 11/1952 |
| GB | 682817 | A | 11/1952 |
| GB | 731473 | A | 6/1955 |
| GB | 746111 | A | 3/1956 |
| GB | 751153 | A | 6/1956 |
| GB | 767506 | A | 2/1957 |
| GB | 835976 | A | 6/1960 |
| GB | 845492 | A | 8/1960 |
| GB | 859951 | A | 1/1961 |
| GB | 889856 | A | 2/1962 |
| GB | 905417 | A | 9/1962 |
| GB | 926958 | A | 5/1963 |
| GB | 993561 | A | 5/1965 |
| GB | 1004318 | A | 9/1965 |
| GB | 1076772 | A | 7/1967 |
| GB | 1141390 | A | 1/1969 |
| GB | 1298387 | A | 11/1972 |
| GB | 1383549 | A | 2/1974 |
| GB | 1370669 | A | 10/1974 |
| GB | 1422956 | A | 1/1976 |
| GB | 1424351 | A | 2/1976 |
| GB | 1468310 | A | 3/1977 |
| GB | 1469840 | A | 4/1977 |
| GB | 1527228 | A | 10/1978 |
| GB | 2010528 | A | 6/1979 |
| GB | 2045055 | A | 10/1980 |
| GB | 1580627 | A | 12/1980 |
| GB | 1584193 | A | 2/1981 |
| GB | 2227369 | A | 7/1990 |
| GB | 2247990 | A | 3/1992 |
| GB | 2368468 | A | 5/2002 |
| GB | 2362472 | B | 10/2003 |
| GB | 2393370 | A | 3/2004 |
| GB | 2394364 | B | 6/2005 |
| GB | 2414862 | A | 12/2005 |
| GB | 2411554 | B | 1/2006 |
| GB | 705192 | | 4/2007 |
| GB | 714974 | | 9/2007 |
| GB | 718597 | | 10/2007 |
| GB | 2474037 | A | 4/2011 |
| GB | 2476787 | A | 7/2011 |
| GB | 2474605 | B | 9/2011 |
| GB | 2485355 | A | 5/2012 |
| GB | 2481715 | B | 1/2014 |
| GB | 2507269 | A | 4/2014 |
| GB | 2476149 | B | 7/2014 |
| GB | 2532207 | A | 5/2016 |
| IN | 261253 | A1 | 6/2014 |
| IN | 7352/CHENP/2015 | A | 7/2016 |
| IN | 201647015348 | A | 8/2016 |
| JP | S50109642 | | 9/1975 |
| JP | 55124303 | U | 9/1980 |
| JP | 55138902 | U | 10/1980 |
| JP | 574601 | | 1/1982 |
| JP | 61178682 | U | 11/1986 |
| JP | 61260702 | A | 11/1986 |
| JP | 62110303 | U | 7/1987 |
| JP | 62190903 | U | 8/1987 |
| JP | 02214307 | A | 8/1990 |
| JP | 03167906 | A | 7/1991 |
| JP | 0653894 | | 8/1991 |
| JP | 04369905 | A | 12/1992 |
| JP | 3001844 | U | 9/1994 |
| JP | 077769 | | 1/1995 |
| JP | 7212126 | | 11/1995 |
| JP | 0829545 | | 2/1996 |
| JP | 08167810 | A | 6/1996 |
| JP | 08196022 | A | 7/1996 |
| JP | 08316918 | A | 11/1996 |
| JP | 2595339 | B2 | 4/1997 |
| JP | 2639531 | B2 | 8/1997 |
| JP | 10206183 | A | 8/1998 |
| JP | 10271071 | A | 10/1998 |
| JP | 116928 | A | 1/1999 |
| JP | 1114749 | A | 1/1999 |
| JP | 11239085 | A | 8/1999 |
| JP | 11313022 | A | 11/1999 |
| JP | 2000077889 | A | 3/2000 |
| JP | 2000216623 | A | 8/2000 |
| JP | 2000244238 | A | 9/2000 |
| JP | 2001217634 | A | 8/2001 |
| JP | 2002029247 | A | 1/2002 |
| JP | 2002236174 | A | 8/2002 |
| JP | 200328219 | A | 1/2003 |
| JP | 2003008336 | A | 1/2003 |
| JP | 2003057464 | A | 2/2003 |
| JP | 2003511677 | A | 3/2003 |
| JP | 3411428 | B2 | 6/2003 |
| JP | 2003324309 | A | 11/2003 |
| JP | 3480153 | B2 | 12/2003 |
| JP | 2003344883 | A | 12/2003 |
| JP | 2004521379 | A | 7/2004 |
| JP | 2004253853 | A | 9/2004 |
| JP | 2004274656 | A | 9/2004 |
| JP | 2004297107 | A | 10/2004 |
| JP | 2004304659 | A | 10/2004 |
| JP | 2005110231 | A | 4/2005 |
| JP | 2005182469 | A | 7/2005 |
| JP | 3734975 | B2 | 1/2006 |
| JP | 2006153878 | A | 6/2006 |
| JP | 2006163886 | A | 6/2006 |
| JP | 2006166399 | A | 6/2006 |
| JP | 2007042009 | A | 2/2007 |
| JP | 2007072945 | A | 3/2007 |
| JP | 3938315 | B2 | 6/2007 |
| JP | 2007174017 | A | 7/2007 |
| JP | 2007259001 | A | 10/2007 |
| JP | 4025674 | B2 | 12/2007 |
| JP | 2008017263 | A | 1/2008 |
| JP | 2008021483 | A | 1/2008 |
| JP | 4072280 | B2 | 4/2008 |
| JP | 4142062 | B2 | 8/2008 |
| JP | 2008209965 | A | 9/2008 |
| JP | 2008218362 | A | 9/2008 |
| JP | 2009004986 | A | 1/2009 |
| JP | 4252573 | B2 | 4/2009 |
| JP | 4259760 | B2 | 4/2009 |
| JP | 2009124229 | A | 6/2009 |
| JP | 2010045471 | A | 2/2010 |
| JP | 2010192992 | A | 9/2010 |
| JP | 2010541468 | A | 12/2010 |
| JP | 2011160446 | A | 8/2011 |
| JP | 2012058162 | A | 3/2012 |
| JP | 2012090242 | A | 5/2012 |
| JP | 2012175680 | A | 9/2012 |
| JP | 2012205104 | A | 10/2012 |
| JP | 2012248035 | A | 12/2012 |
| JP | 2013046412 | A | 3/2013 |
| JP | 2013110503 | A | 6/2013 |
| JP | 5230779 | B2 | 7/2013 |

(56) References Cited

FOREIGN PATENT DOCUMENTS

| | | | |
|---|---|---|---|
| JP | 2014045237 | A | 3/2014 |
| JP | 5475475 | B2 | 4/2014 |
| JP | 5497348 | B2 | 5/2014 |
| JP | 5618072 | B2 | 11/2014 |
| JP | 2015095520 | A | 5/2015 |
| JP | 2015188174 | | 10/2015 |
| KR | 20000074034 | | 12/2000 |
| KR | 20020091917 | | 12/2002 |
| KR | 100624049 | B1 | 9/2006 |
| KR | 200425873 | Y1 | 9/2006 |
| KR | 100636388 | B1 | 10/2006 |
| KR | 100725002 | B1 | 6/2007 |
| KR | 100849702 | B1 | 7/2008 |
| KR | 100916077 | B1 | 8/2009 |
| KR | 100952976 | B1 | 4/2010 |
| KR | 100989064 | B1 | 10/2010 |
| KR | 101060584 | B1 | 8/2011 |
| KR | 101070364 | B1 | 9/2011 |
| KR | 101212354 | B1 | 12/2012 |
| KR | 101259715 | B1 | 4/2013 |
| KR | 101288770 | B1 | 7/2013 |
| KR | 20140104097 | A | 8/2014 |
| KR | 101435538 | B1 | 9/2014 |
| KR | 101447809 | B1 | 10/2014 |
| KR | 20150087455 | | 7/2015 |
| KR | 101549622 | | 9/2015 |
| KR | 200479199 | Y1 | 12/2015 |
| KR | 101586236 | B1 | 1/2016 |
| KR | 101606803 | | 1/2016 |
| KR | 101607420 | B1 | 3/2016 |
| NL | 69072 | | 1/1945 |
| RU | 2129746 | C1 | 4/1999 |
| RU | 2432647 | C1 | 10/2011 |
| TW | 201537432 | | 10/2015 |
| WO | 8301711 | A1 | 5/1983 |
| WO | 9116770 | A1 | 10/1991 |
| WO | 9210014 | | 6/1992 |
| WO | 9323928 | | 11/1993 |
| WO | 9424467 | A1 | 10/1994 |
| WO | 9523440 | A1 | 8/1995 |
| WO | 9529537 | A1 | 11/1995 |
| WO | 199529537 | | 11/1995 |
| WO | 9603801 | A1 | 2/1996 |
| WO | 199619089 | | 6/1996 |
| WO | 9639729 | A1 | 12/1996 |
| WO | 9641157 | | 12/1996 |
| WO | 9735387 | A1 | 9/1997 |
| WO | 9737445 | A1 | 10/1997 |
| WO | 9829853 | A1 | 7/1998 |
| WO | 9857207 | | 12/1998 |
| WO | 9859254 | A1 | 12/1998 |
| WO | 9923848 | A2 | 5/1999 |
| WO | 9948230 | A1 | 9/1999 |
| WO | 199945310 | | 9/1999 |
| WO | 9967903 | A1 | 12/1999 |
| WO | 0070891 | A1 | 11/2000 |
| WO | 2000/74428 | A1 | 12/2000 |
| WO | 2001014985 | A1 | 3/2001 |
| WO | 0128159 | A2 | 4/2001 |
| WO | 0131746 | A1 | 5/2001 |
| WO | 0145206 | A1 | 6/2001 |
| WO | 0192910 | A2 | 12/2001 |
| WO | 02061467 | A2 | 8/2002 |
| WO | 02061971 | A1 | 8/2002 |
| WO | 03/005629 | | 1/2003 |
| WO | 2003009083 | | 1/2003 |
| WO | 03012614 | A1 | 2/2003 |
| WO | 200326166 | | 3/2003 |
| WO | 03026462 | A1 | 4/2003 |
| WO | 03044981 | A1 | 5/2003 |
| WO | 2003088418 | | 10/2003 |
| WO | 03099740 | A1 | 12/2003 |
| WO | 2004011995 | A1 | 2/2004 |
| WO | 2004038891 | A2 | 5/2004 |
| WO | 2004/051804 | | 6/2004 |
| WO | 2004/054159 | A2 | 6/2004 |
| WO | 2004077746 | A1 | 9/2004 |
| WO | 2005015686 | A1 | 2/2005 |
| WO | 2005072469 | A2 | 8/2005 |
| WO | 2006012610 | A2 | 2/2006 |
| WO | 2006061865 | A1 | 6/2006 |
| WO | 2006085804 | A1 | 8/2006 |
| WO | 2006102419 | A2 | 9/2006 |
| WO | 2006111809 | A1 | 10/2006 |
| WO | 2006116396 | A2 | 11/2006 |
| WO | 2006122041 | A2 | 11/2006 |
| WO | 2006125279 | A1 | 11/2006 |
| WO | 2007000777 | B1 | 2/2007 |
| WO | 2006050331 | A3 | 3/2007 |
| WO | 2007031435 | A1 | 3/2007 |
| WO | 2007071797 | A1 | 6/2007 |
| WO | 2007148097 | A2 | 12/2007 |
| WO | 2008003939 | A1 | 1/2008 |
| WO | 2007094944 | A3 | 3/2008 |
| WO | 2007149746 | A3 | 4/2008 |
| WO | 2008044062 | A1 | 4/2008 |
| WO | 2008055084 | A2 | 5/2008 |
| WO | 2008061107 | A2 | 5/2008 |
| WO | 2008069358 | A1 | 6/2008 |
| WO | 2008070957 | A1 | 6/2008 |
| WO | 2008102987 | A1 | 8/2008 |
| WO | 2008117973 | A1 | 10/2008 |
| WO | 2008155769 | A2 | 12/2008 |
| WO | 2009014704 | A1 | 1/2009 |
| WO | 2007098061 | A3 | 2/2009 |
| WO | 2009031794 | A1 | 3/2009 |
| WO | 2009035285 | A2 | 3/2009 |
| WO | 2009090602 | A1 | 7/2009 |
| WO | 2009123404 | A4 | 10/2009 |
| WO | 2009131316 | A2 | 10/2009 |
| WO | 2010017549 | A1 | 2/2010 |
| WO | 2010050892 | A1 | 5/2010 |
| WO | 2010147806 | A1 | 12/2010 |
| WO | 2011006210 | A1 | 1/2011 |
| WO | 2011032605 | A1 | 3/2011 |
| WO | 2011085650 | A1 | 7/2011 |
| WO | 2011137793 | A1 | 11/2011 |
| WO | 2012/007831 | | 1/2012 |
| WO | 2012038816 | A1 | 3/2012 |
| WO | 2012050069 | A1 | 4/2012 |
| WO | 2012064333 | A1 | 5/2012 |
| WO | 2012113219 | A1 | 8/2012 |
| WO | 2012171205 | A1 | 12/2012 |
| WO | 2012172565 | A1 | 12/2012 |
| WO | 2013013162 | A2 | 1/2013 |
| WO | 2013013465 | A1 | 1/2013 |
| WO | 2013017822 | | 2/2013 |
| WO | 2013023226 | A1 | 2/2013 |
| WO | 2013028197 | A1 | 2/2013 |
| WO | 2013035110 | A2 | 3/2013 |
| WO | 2013073548 | A1 | 5/2013 |
| WO | 2013100912 | A1 | 7/2013 |
| WO | 2013112353 | A1 | 8/2013 |
| WO | 2013115802 | A1 | 8/2013 |
| WO | 2013121682 | A1 | 8/2013 |
| WO | 2013123445 | A1 | 8/2013 |
| WO | 2013/138627 | | 9/2013 |
| WO | 2013136213 | A1 | 9/2013 |
| WO | 2013157978 | A1 | 10/2013 |
| WO | 2013172502 | A1 | 11/2013 |
| WO | 2014/018434 | | 1/2014 |
| WO | 2014011438 | A1 | 1/2014 |
| WO | 2014/045236 | | 3/2014 |
| WO | 2014065952 | A1 | 5/2014 |
| WO | 2014069941 | A1 | 5/2014 |
| WO | 2014083500 | A1 | 6/2014 |
| WO | 2014092644 | A1 | 6/2014 |
| WO | 2014094559 | A1 | 6/2014 |
| WO | 2014096868 | A1 | 6/2014 |
| WO | 2014099340 | A2 | 6/2014 |
| WO | 2013076499 | A3 | 7/2014 |
| WO | 2014112994 | A1 | 7/2014 |
| WO | 2014128253 | A1 | 8/2014 |
| WO | 2014137546 | A1 | 9/2014 |

(56) References Cited

FOREIGN PATENT DOCUMENTS

| | | | |
|---|---|---|---|
| WO | 2014145862 | A2 | 9/2014 |
| WO | 2014147002 | A1 | 9/2014 |
| WO | 2014197926 | A1 | 12/2014 |
| WO | 2015002658 | A1 | 1/2015 |
| WO | 2015006636 | A1 | 1/2015 |
| WO | 2015008442 | A1 | 1/2015 |
| WO | 2015024006 | A1 | 2/2015 |
| WO | 2015027033 | A1 | 2/2015 |
| WO | 2015035463 | A1 | 3/2015 |
| WO | 2015/055230 | | 4/2015 |
| WO | 2015052478 | | 4/2015 |
| WO | 2015052480 | | 4/2015 |
| WO | 2015069090 | A1 | 5/2015 |
| WO | 2015069431 | A2 | 5/2015 |
| WO | 2015077644 | | 5/2015 |
| WO | 2015088650 | A1 | 6/2015 |
| WO | 2015120626 | | 8/2015 |
| WO | 2015123623 | A1 | 8/2015 |
| WO | 2015132618 | A1 | 9/2015 |
| WO | 2015167566 | A1 | 11/2015 |
| WO | 2015175054 | A2 | 11/2015 |
| WO | 2015197580 | A1 | 12/2015 |
| WO | 2016003291 | A1 | 1/2016 |
| WO | 2016004003 | | 1/2016 |
| WO | 2016009402 | A2 | 1/2016 |
| WO | 2016012889 | | 1/2016 |
| WO | 2016027007 | A1 | 2/2016 |
| WO | 2016028767 | | 2/2016 |
| WO | 2016/043949 | | 3/2016 |
| WO | 2016032592 | A1 | 3/2016 |
| WO | 2016036951 | A1 | 3/2016 |
| WO | 2016043949 | A1 | 3/2016 |
| WO | 2016048214 | A1 | 3/2016 |
| WO | 2016048257 | A1 | 3/2016 |
| WO | 2016/064502 | | 4/2016 |
| WO | 2016053572 | A1 | 4/2016 |
| WO | 2016053573 | A1 | 4/2016 |
| WO | 2016060761 | A1 | 4/2016 |
| WO | 2016060762 | A1 | 4/2016 |
| WO | 2016061021 | A1 | 4/2016 |
| WO | 2016064505 | A1 | 4/2016 |
| WO | 2016064516 | A1 | 4/2016 |
| WO | 2016064700 | A2 | 4/2016 |
| WO | 2016073072 | A1 | 5/2016 |
| WO | 2016081125 | | 5/2016 |
| WO | 2016081128 | | 5/2016 |
| WO | 2016081129 | A1 | 5/2016 |
| WO | 2016081134 | | 5/2016 |
| WO | 2016081136 | | 5/2016 |
| WO | 2015090382 | | 6/2016 |
| WO | 2016086306 | A1 | 6/2016 |
| WO | 2016089491 | | 6/2016 |
| WO | 2016089492 | A1 | 6/2016 |
| WO | 2016096029 | A1 | 6/2016 |
| WO | 2016/125161 | | 8/2016 |
| WO | 2016/133509 | | 8/2016 |
| WO | 2016122409 | A1 | 8/2016 |
| WO | 2016133672 | A1 | 8/2016 |
| WO | 2016/137982 | | 9/2016 |
| WO | 2016145411 | | 9/2016 |
| WO | 2016161637 | A1 | 10/2016 |
| WO | 2016169058 | A1 | 10/2016 |
| WO | 2016171907 | | 10/2016 |
| WO | 2016176030 | | 11/2016 |
| WO | 2016200492 | | 12/2016 |
| WO | 2016200579 | | 12/2016 |
| WO | 2017/011099 | | 1/2017 |
| WO | 2017011100 | | 1/2017 |
| WO | 2017011101 | | 1/2017 |
| WO | 2017011102 | | 1/2017 |
| WO | 2017011103 | | 1/2017 |
| WO | 2017011227 | | 1/2017 |
| WO | 2017014840 | | 1/2017 |
| WO | 2017014842 | | 1/2017 |
| WO | 2017023412 | | 2/2017 |
| WO | 2017023413 | | 2/2017 |
| WO | 2017023417 | | 2/2017 |
| WO | 2018106455 | A1 | 6/2018 |
| WO | 2018106684 | A1 | 6/2018 |
| WO | 2018106915 | A1 | 6/2018 |

OTHER PUBLICATIONS

"Brackets, Conduit Standoff", Hubbell Power Systems, Inc., hubbellpowersystems.com, Dec. 2, 2010, 2 pages.

"Broadband Negligible Loss Metamaterials", Computer Electmagnetics and Antennas Research Laboratory, cearl.ee.psu.edu., May 15, 2012, 3 pages.

"Broadband Over Power Lines (BPL): Developments and Policy Issues", Organisation for Economic Co-operation and Development, Directorate for Science, Technology and Industry, Committee for Information, Computer and Communications Policy, Jun. 2, 2009, 35 pages.

"Broadband: Bringing Home the Bits: Chapter 4 Technology Options and Economic Factors", The National Academies Press, nap.edu, 2002, 61 pages.

"Cisco Aironet 1500 Series Access Point Large Pole Mounting Kit Instructions", www.cisco.com/c/en/us/td/docs/wireless/antenna/installation/guide/18098.html, 2008, 9 pages.

"Cisco IP VSAT Satellite WAN Network Module for Cisco Integrated Services Routers", www.cisco.com/c/en/us/products/collateral/interfaces-modules/ip-vsatsatellite-wan-module/product_data_sheet0900aecd804bbf6f.html, Jul. 23, 2014, 6 pages.

"Cloud Management", Cisco Meraki, cisco.com., Sep. 11, 2015, 2 pages.

"Decryption: Identify & Control Encrypted Traffic", Palo Alto Networks, paloaltonetworks.com, Mar. 7, 2011, 4 pages.

"Delivering broadband over existing wiring", Cabling Installation & Maintenance, cablinginstall.com, May 1, 2002, 6 pages.

"Directional Couplers—Coaxial and Waveguide", Connecticut Microwave Corporation, http://connecticutmicrowave.com, Accessed Aug. 2016, 21 pages.

"Doubly-fed Cage-cone Combined Broadband Antennas for Marine Applications", http://www.edatop.com/down/paper/antenna/%E5%A4%A9%E7%BA%BF%E8%AE%BE%E8%AE%A1-890w5nebp5ilpq.pdf, 2007, 7 pages.

"Dual Band Switched-Parasitic Wire Antennas for Communications and Direction Finding", www.researchgate.net/profile/David_Thiel2/publication/3898574_Dual_band_switched-parasitic_wire_antennas_for_communications_and_direction_finding/links/0fcfd5091b4273ce54000000.pdf, 2000, 5 pages.

"Electronic Countermeasure (ECM) Antennas", vol. 8, No. 2, Apr. 2000, 2 pages.

"Elliptical Polarization", Wikipedia, http://en.wikipedia.org/wiki/Elliptical_polarization, Apr. 21, 2015, 3 pages.

"Harvest energy from powerline", www.physicsforums.com/threads/harvest-energy-from-powerline.685148/, Discussion thread about harvesting power from powerlines that includes the suggestion of clamping a device to the power line., 2013, 8 pages.

"Identity Management", Tuomas Aura CSE-C3400 Information Security, Aalto University, Autumn 2014, 33 pgs.

"IEEE Standard for Information technology—Local and metropolitan area networks—Specific requirements", Part 15.4: Wireless Medium Access Control (MAC) and Physical Layer (PHY) Specifications for Low Rate Wireless Personal Area Networks (WPANs), in IEEE Std 802.15.4, (Revision of IEEE Std 802.15.4-2003), Sep. 7, 2006, 1-320.

"International Preliminary Report on Patentability", PCT/US2014/039746, dated Dec. 10, 2015.

"International Preliminary Report on Patentability", PCT/US2014/060841, dated May 19, 2016, 8 pages.

"International Preliminary Report on Patentability & Written Opinion", PCT/US2014/061445, dated Jun. 23, 2016, 9 pages.

"International Search Report & Written Opinion", PCT/US2015/034827, dated Sep. 30, 2015.

"International Search Report & Written Opinion", PCT/US2015/056316, dated Jan. 21, 2016.

(56) References Cited

OTHER PUBLICATIONS

"International Search Report & Written Opinion", PCT/US2015/056320, dated Jan. 29, 2016.
"International Search Report & Written Opinion", PCT/US2015/056365, dated Jan. 22, 2016.
"International Search Report & Written Opinion", PCT/US2015/056368, dated Jan. 25, 2016.
"International Search Report & Written Opinion", PCT/US2015/056598, dated Jan. 28, 2016.
"International Search Report & Written Opinion", PCT/US2015/056615, dated Jan. 21, 2016.
"International Search Report & Written Opinion", PCT/US2015/056626, dated Jan. 21, 2016.
"International Search Report & Written Opinion", PCT/US2015/056632, dated Jan. 26, 2016.
"International Search Report & Written Opinion", PCT/US2016/013988, dated Apr. 8, 2016.
"International Search Report & Written Opinion", PCT/US2016/035384, dated Oct. 31, 2016.
"International Search Report & Written Opinion", PCT/US2016/020001, dated May 23, 2016.
"International Search Report & Written Opinion", PCT/US2016/026193, dated Jun. 1, 2016.
"International Search Report & Written Opinion", PCT/US2016/026860, dated Jun. 1, 2016.
"International Search Report & Written Opinion", PCT/US2016/026318, dated Jun. 15, 2016.
"International Search Report & Written Opinion", PCT/US16/027397, dated Jun. 24, 2016.
"International Search Report & Written Opinion", PCT/US2016/028412, dated Jun. 27, 2016.
"International Search Report & Written Opinion", PCT/US2016/028206, dated Jun. 29, 2016.
"International Search Report & Written Opinion", PCT/US16/033182, dated Jul. 12, 2016.
"International Search Report & Written Opinion", PCT/US2016/036290, dated Aug. 11, 2016.
"International Search Report & Written Opinion", PCT/US2016/036551, dated Aug. 11, 2016.
"International Search Report & Written Opinion", PCT/US2016/036798, dated Aug. 11, 2016.
"International Search Report & Written Opinion", PCT/US2016/028205, dated Aug. 16, 2016.
"International Search Report & Written Opinion", PCT/US2016/032460, dated Aug. 17, 2016.
"International Search Report & Written Opinion", PCT/US2016/036303, dated Aug. 24, 2016.
"International Search Report & Written Opinion", PCT/US2016/036288, dated Sep. 1, 2016.
"International Search Report & Written Opinion", PCT/2016/035383, dated Sep. 2, 2016.
"International Search Report & Written Opinion", PCT/US16/036284, dated Sep. 8, 2016.
"International Search Report & Written Opinion", PCT/US2016/036286, dated Sep. 13, 2016.
"International Search Report & Written Opinion", PCT/US2016/036293, dated Sep. 15, 2016.
"International Search Report & Written Opinion", PCT/US2014/039746, dated Jan. 12, 2015.
"International Search Report & Written Opinion", PCT/US2014/060841, dated Jan. 7, 2015.
"International Search Report & Written Opinion", PCT/US2016/040992, dated Oct. 17, 2006.
"International Search Report & Written Opinion", PCT/US2015/039848, dated Oct. 20, 2015.
"International Search Report & Written Opinion", PCT/US2015/047315, dated Oct. 30, 2015.
"International Search Report & Written Opinion", PCT/US2015/048454, dated Nov. 11, 2015.
"International Search Report & Written Opinion", PCT/US16/050488, dated Nov. 11, 2016.
"International Search Report & Written Opinion", PCT/US16/50345, dated Nov. 15, 2016.
"International Search Report & Written Opinion", PCT/US2015/049928, dated Nov. 16, 2015.
"International Search Report & Written Opinion", PCT/US2015/049932, dated Nov. 16, 2015.
"International Search Report & Written Opinion", PCT/US2016/050346, dated Nov. 17, 2016.
"International Search Report & Written Opinion", PCT/US2015/049927, dated Nov. 24, 2015.
"International Search Report & Written Opinion", PCT/US2015/051193, dated Nov. 27, 2015.
"International Search Report & Written Opinion", PCT/US2015/051146, dated Dec. 15, 2015.
"International Search Report & Written Opinion", PCT/US2015/051183, dated Dec. 15, 2015.
"International Search Report & Written Opinion", PCT/US2015/051194, dated Dec. 15, 2015.
"International Search Report & Written Opinion", PCT/US2015/051578, dated Dec. 17, 2015.
"International Search Report & Written Opinion", PCT/US2015/051583, dated Dec. 21, 2015.
"International Search Report & Written Opinion", PCT/US2015/048458, dated Dec. 23, 2015.
"International Search Report & Written Opinion", PCT/US2015/051213, dated Dec. 4, 2015.
"International Search Report & Written Opinion", PCT/US2015/051163, dated Dec. 7, 2015.
"International Search Report & Written Opinion", PCT/US2014/061445, dated Feb. 10, 2015.
"International Search Report & Written Opinion", PCT/US16/28207, dated Jun. 15, 2016.
"International Search Report & Written Opinion", PCT/US16/027403, dated Jun. 22, 2016.
"International Search Report & Written Opinion", PCT/US2016/015501, dated Apr. 29, 2016, 11 pages.
"International Search Report & Written Opinion", PCT/US2016/050860, dated Nov. 17, 2016, 11 pages.
"International Search Report & Written Opinion", PCT/US2016/050344, dated Nov. 25, 2016, 16 pages.
"International Search Report & Written Opinion", PCT/US2015/047225, dated Nov. 6, 2015, dated Nov. 6, 2015.
"International Search Report and Written Opinion", PCT/US16/027398, dated Jun. 24, 2016.
"International Search Report and Written Opinion", PCT/US16/028395, dated Jun. 29, 2016.
"International Search Report and Written Opinion", PCT/US2016/028417, Authorized officer Brigitte Bettiol, dated Jul. 5, 2016.
"International Search Report and Written Opinion", PCT/US16/032441, dated Jul. 29, 2016.
"International Search Report and Written Opinion", PCT/US2016/036285, dated Aug. 23, 2016.
"International Search Report and Written Opinion", PCT/US16/036388, dated Aug. 30, 2016.
"International Search Report and Written Opinion", PCT/US2016/036297, dated Sep. 5, 2016.
"International Search Report and Written Opinion", PCT/US2016/036292, dated Sep. 13, 2016.
"International Search Report and Written Opinion", PCT/US2016/046315, dated Nov. 3, 2016.
"International Search Report and Written Opinion", PCT/US2016/050039, dated Nov. 14, 2016.
"International Search Report and Written Opinion", PCT/US2016/050347, dated Nov. 15, 2016.
"International Search Report and Written Opinion", PCT/US2016/051217, dated Nov. 29, 2016.
"International Search Report and Written Opinion", PCT/US2016/028197, dated Jun. 24, 2016.
"International Search Report and Written Opinion", PCT/US2016/036289, dated Aug. 11, 2016.

(56) References Cited

OTHER PUBLICATIONS

"International Search Report and Written Opinion", PCT/US2016/036295, dated Aug. 30, 2016.
"International Search Report and Written Opinion", PCT/US2016/030964, dated Aug. 4, 2016.
"International Search Report and Written Opinion", PCT/US2016/036553, dated Aug. 30, 2016, 1-14.
"International Search Report and Written opinion", PCT/US2016/036556, dated Sep. 22, 2016.
"International Searching Authority", International Search Report and Written Opinion, dated Sep. 28, 2016, 1-12.
"Invitation to Pay Additional Fees & Partial Search Report", PCT/US2016/028205, dated Jun. 22, 2016.
"Invitation to Pay Additional Fees & Partial Search Report", PCT/US2016/032430, dated Jun. 22, 2016.
"Invitation to Pay Additional Fees and, Where Applicable, Protest Fee", PCT/US2016/035384, Aug. 31, 2016, 7 pages.
"Ipitek All-Optical Sensors", www.ipitek.com/solutions-by-industry/all-optical-sensors, Jun. 2, 2014, 3 pages.
"Micromem Demonstrates UAV Installation of Power Line Monitoring Mounting System", MicroMem, micromem.com, Mar. 4, 2015, 1-3.
"Newsletter 4.4—Antenna Magus version 4.4 released!", antennamagus.com, Aug. 10, 2013, 8 pages.
"PCT International Search Report", PCT/US2016/057161, PCT International Search Report and Written Opinion, dated Jan. 12, 2017, 1-13, Jan. 12, 2017, 1-13.
"PCT/US2016/041561, PCT International Search Report and Written Opinion", dated Oct. 10, 2016, 1-15.
"PCT/US2016/046323, PCT International Search Report", dated Oct. 24, 2016, 1-13.
"Quickly identify malicious traffics: Detect", lancope.com, Mar. 15, 2015, 8 pages.
"Radar at St Andrews", mmwaves.epr, st-andrews.ac.uk, Feb. 4, 2011, 2 pages.
"Resilience to Smart Meter Disconnect Attacks", ADSC Illinois at Singapore PTE Ltd., http://publish.illinois.edu/integrativesecurityassessment/resiliencetosmartmeterdisconnectattacks, 2015, 2 pages.
"RF Sensor Node Development Platform for 6LoWPAN and 2.4 GHz Applications", www.ti.com/tool/TIDM-RF-SENSORNODE, Jun. 2, 2014, 3 pages.
"Technology Brief 13: Touchscreens and Active Digitizers", https://web.archive.org/web/20100701004625/http://web.engr.oregonstate.edu/~moon/engr203/read/read4.pdf, 2010, 289-311.
"The world's first achievement of microwave electric-field measurement utilizing an optical electric-field sensor mounted on an optical fiber, within a microwave discharge ion engine boarded on asteroid explorers etc.", Investigation of internal phenomena and performance improvement in microwave discharge ion engines, Japan Aerospace Exploration Agency (JAXA), Nippon Telegraph and Telephone Corporation, Aug. 7, 2013, 4 pages.
"Transducer", IEEE Std 100-2000, Sep. 21, 2015, 1154.
"Wireless powerline sensor", wikipedia.org, http://en.wikipedia.org/wiki/Wireless_powerline_sensor, 2014, 3 pages.
Ace, "Installing Satellite Accessories", www.acehardware.com, May 8, 2006, 4 pages.
Adabo, Geraldo J. "Long Range Unmanned Aircraft System for Power Line Inspection of Brazilian Electrical System", Journal of Energy and Power Engineering 8 (2014), Feb. 28, 2014, 394-398.
Aerohive Networks, "HiveManager Network Management System", www.aerohive.com, Sep. 2015, 3 pages.
Akiba, Shigeyuki et al., "Photonic Architecture for Beam Forming of RF Phased Array Antenna", Optical Fiber Communication Conference, Optical Society of America, Abstract Only, 2014, 1 page.
Al-Ali, A.R. et al., "Mobile RFID Tracking System", Information and Communication Technologies: From Theory to Applications, ICTTA 2008, 3rd International Conference on IEEE, 2008, 4 pages.
Alam, M. N. et al., "Novel Surface Wave Exciters for Power Line Fault Detection and Communications", Department of Electrical Engineering, University of South Carolina, Antennas and Propagation (APSURSI), 2011 IEEE International Symposium, IEEE, 2011, 1-4.
Alam, MD N. et al., "Design and Application of Surface Wave Sensors for nonintrusive Power Line Fault Detection", IEEE Sensors Journal, IEEE Service Center, New York, NY, US, vol. 13, No. 1, Jan. 1, 2013, 339-347.
Alaridhee, T. et al., "Transmission properties of slanted annular aperture arrays. Giant energy deviation over sub-wavelength distance", Optics express 23.9, 2015, 11687-11701.
Ali, Muhammad Q. et al., "Randomizing AMI configuration for proactive defense in smart grid", Smart Grid Communications (SmartGridComm), IEEE International Conference on. IEEE, Abstract Only, 2013, 2 pages.
Ali, Tariq et al., "Diagonal and Vertical Routing Protocol for Underwater Wireless Sensor Network", Procedia-Social and Behavioral Sciences 129, 2014, 372-379.
Allen, Jeffrey et al., "New Concepts in Electromagnetic Materials and Antennas", Air Force Research Laboratory, Jan. 2015, 80 pages.
Amirshahi, P. et al., "Transmission channel model and capacity of overhead multiconductor mediumvoltage powerlines for broadband communications", Consumer Communications and Networking Conference, 2005, 5 pages.
Amt, John H. et al., "Flight Testing of a Pseudolite Navigation System on a UAV", Air Force Institute of Technology: ION Conference, Jan. 2007, 9 pages.
Angove, Alex "How the NBN Differs from ADSL2+, Cable and Wireless", www.whistleout.com.au/Broadband/Guides/How-the-NBN-Differs-from-ADSL2-Cable-and-Wireless, Jul. 30, 2014, 4 pages.
Antenna Magus, "Waveguide-fed Conical Horn", www.antennamagus.com, Aug. 2015, 1 page.
Antennamagus, "Parabolic focus pattern fed reflector with shroud", antennamagus.com, Jul. 4, 2014, 2 pages.
Arage, Alebel et al., "Measurement of wet antenna effects on millimetre wave propagation", 2006 IEEE Conference on Radar, Abstract Only, 2006, 1 page.
Ares-Pena, Francisco J. et al., "A simple alternative for beam reconfiguration of array antennas", Progress in Electromagnetics Research 88, 2008, 227-240.
Arthur, Joseph Kweku et al., "Improving QoS in UMTS Network in ACCRA Business District Using Tower-Less Towers", IPASJ International Journal of Electrical Engineering (IIJEE), vol. 2, Issue 11, Nov. 2014, 11 pages.
Asadallahi, Sina et al., "Performance comparison of CSMA/CA Advanced Infrared (Alr) and a new pointtomultipoint optical MAC protocol", 2012 8th International Wireless Communications and Mobile Computing Conference (IWCMC), Abstract Only, Aug. 2012, 2 pages.
Ascom, "TEMS Pocket—a Complete Measurement Smartphone System in your Hand", http://www.ascom.us/us-en/tems_pocket_14.0_feature_specific_datasheet.pdf, 2014, 2 pages.
A-Tech Fabrication, "Dual Antenna Boom Assembly", http://web.archive.org/web/20090126192215/http://atechfabrication.com/products/dual_antenna_boom.htm, 2009, 2 pages.
Atlas Sound, "Bi-Axial PA Horn with Gimbal Mount", MCM Electronics, mcmelectronics.com, 2011, 555-13580.
Atmel, "Power Line Communications", www.atmel.com/products/smartenergy/powerlinecommunications/default.aspx, 2015, 3 pages.
Atwater, Harry A. "The promise of plasmonics", Scientific American 296.4, 2007, 56-62.
Baanto, "Surface Acoustive Wave (SAW) Touch Screen", http://baanto.com/surface-acoustic-wave-saw-touch-screen, 2016, 4 pages.
Babakhani, Aydin "Direct antenna modulation (DAM) for on-chip mm-wave transceivers", Diss. California Institute of Technology, 2008, 2 pages.
Bach, Christian "Current Sensor—Power Line Monitoring for Energy Demand Control", Application Note 308, http://www.enocean.com/fileadmin/redaktion/pdf/app_notes/AN308_CURRENT_SENSOR_Jan09.pdf, Jan. 2009, 4 pages.
Barlow, H. M. et al., "Surface Waves", 621.396.11 : 538.566, Paper No. 1482 Radio Section, 1953, pp. 329-341.

(56) References Cited

OTHER PUBLICATIONS

Barnes, Heidi et al., "DeMystifying the 28 Gb/s PCB Channel: Design to Measurement", Design Con. 2014, Feb. 28, 2014, 54 pages.
Barron, Ashleigh L. "Integrated Multicore Fibre Devices for Optical Trapping", Diss. Heriot-Watt University, 2014, 11-15.
Beal, J.C. et al., "Coaxial-slot surface-wave launcher", Electronics Letters 4.25: 557559, Abstract Only, Dec. 13, 1968, 1 page.
Benevent, Evangéline "Transmission lines in MMIC technology", Universitá Mediterranea di Reggio Calabria, Jan. 28, 2010, 63 pages.
Beninca, "Flashing Light: IR Lamp", www.beninca.com/en/news/2015/02/23/lampeggiante-irlamp.html, Feb. 23, 2015, 4 pages.
Benkhelifa, Elhadj "User Profiling for Energy Optimisation in Mobile Cloud Computing", 2015, 1159-1165.
Berweger, Samuel et al., "Light on the Tip of a Needle: Plasmonic Nanofocusing for Spectroscopy on the Nanoscale", The Journal of Physical Chemistry Letters; pubs.acs.org/JPCL, 2012, 945-952.
Bhushan, Naga et al., "Network densification: the dominant theme for wireless evolution into 5G", IEEE Communications Magazine, 52.2:, Feb. 2014, 82-89.
Bing, Benny "Ubiquitous Broadband Access Networks with Peer-to-Peer Application Support", Evolving the Access Network, 2006, 27-36.
Blanco-Redondo, Andrea et al., "Coupling midinfrared light from a photonic crystal waveguide to metallic transmission lines", Applied Physics Letters 104.1, 2014, 6 pages.
Blattenberger, Kirt "DroneBased Field Measurement System (dBFMS)", RF Cafe, rfcafe.com, Jul. 29, 2014, 3 pages.
Bock, James et al., "Optical coupling", Journal of Physics: Conference Series. vol. 155. No. 1, IOP Publishing, 2009, 32 pages.
Bowen, Leland H. et al., "A Solid Dielectric Lens Impulse Radiating Antenna with High Dielectric Constant Surrounded by a Cylindrical Shroud", Sensor and Simulation Note 498, Introduction, Apr. 2005, 3 pages.
Brambilla, Gilberto et al., "Ultra-low-loss optical fiber nanotapers", Optoelectronics Research Centre, University of Southampton; http://www.orc.soton.ac.uk, vol. 12, No. 10, May 7, 2004, 2258-2263.
Bridges, Greg E. et al., "Plane wave coupling to multiple conductor transmission lines above a lossy earth", Compatibility, IEEE Transactions on 31.1, Abstract Only, 1989, 21-33.
Bridges, William B. "Low-Loss Flexible Dielectric Waveguide for Millimeter-Wave Transmission and its Application to Devices", California Institute of Technology, Office of Naval Research, Mar. 1981, 91 pages.
Briso-Rodriguez, "Measurements and Modeling of Distributed Antenna Systems in Railway Tunnels", IEEE Transactions on Vehicular Technology, vol. 56, No. 5, Sep. 2007, 2870-2879.
Brooke, Gary H. "Properties of surface waveguides with discontinuities and perturbations in cross-section", Diss. University of British Columbia, 1977, 42 pages.
Brown, J. et al., "The launching of radial cylindrical surface waves by a circumferential slot", Proceedings of the IEEE Part B: Radio and Electronic Engineering, vol. 106, Issue 26, Abstract Only, Mar. 1959, 1 page.
Brown-Iposs, "Integrated Radio Masts Fully camouflaged Outdoor-W-Fi APs in GRP-lamp poles", www.brown-iposs.com, Mar. 21, 2014, 4 pages.
Bruno, Joseph "Interference Reduction in Wireless Networks", Computing Research Topics, Computing Sciences Department, Villanova University, Nov. 14, 2007, 8 pages.
Budde, Matthias "Using a 2DST Waveguide for Usable, Physically Constrained Out-of-Band Wi-Fi Authentication", https://pdfs.semanticscholar.org/282e/826938ab7170c198057f9236799e92e21219.pdf, 2013, 8 pages.
Burkhart, Martin et al., "Does Topology Control Reduce Interference?", Department of Computer Science, ETH Zurich, Proceedings of the 5th ACM international symposium on Mobile ad hoc networking and computing, 2004, 11 pages.
Callis, R.W. et al., "An In-Line Power Monitor for HE11 Low Loss Transmission Lines", Proceedings of the 29th International Conference on Infrared and Millimeter Waves (IRMMW), Karlsruhe, Germany, Jun. 2004, 7 pages.
Campista, Miguel E. et al., "Improving the Data Transmission Throughput Over the Home Electrical Wiring", The IEEE Conference on Local Computer Networks 30th Anniversary, 2005, 1-8.
Capece, P. et al., "FDTD Analysis of a Circular Coaxial Feeder for Reflector Antenna", Antennas and Propagation Society International Symposium, IEEE Digest, vol. 3, 1997, pp. 1570-1573.
Carroll, John M. et al., "Developing the Blacksburg Electronic Village", Communications of the ACM, vol. 39, No. 12, Dec. 1996, 69-74.
Chaimae, Elmakfalji et al., "New Way of Passive RFID Deployment for Smart Grid", Journal of Theoretical and Applied Information Technology 82.1, Dec. 10, 2015, 81-84.
Chen, Dong et al., "A trust management model based on fuzzy reputation for internet of things", Computer Science and Information Systems 8.4: 12071228, Abstract Only, 2011, 1 page.
Chen, Ke et al., "Geometric phase coded metasurface: from polarization dependent directive electromagnetic wave scattering to diffusionlike scattering", Scientific Reports 6, 2016, 1-10.
Chen, Yingying "Detecting and Localizing Wireless Spoofing Attacks", Sensor, Mesh and Ad Hoc Communications and Networks, SECON'07, 4th Annual IEEE Communications Society Conference on IEEE, 2007, 10 pages.
Chiba, Jiro "Experimental Studies of the Losses and Radiations Due to Bends in the Goubau Line", IEEE Transactions on Microwave Theory and Techniques, Feb. 1977, 94-100.
Chiba, Jiro "On the Equivalent Circuit for the G-Line Above Ground", International Wroclaw Symposium on Electromagnetic Compatibility, 1998, 78-82.
Choudhury, Romit R. "Utilizing Beamforming Antennas for Wireless Mult-hop Networks", www.slideserve.com, Sep. 20, 2012, 4 pages.
Chu, Eunmi et al., "Self-organizing and self-healing mechanisms in cooperative small cell networks", PIMRC, 2013, 6 pages.
Cimini, Carlos Alberto et al., "Temperature profile of progressive damaged overhead electrical conductors", Journal of Electrical Power & Energy Systems 49, 2013, 280-286.
CIPO, "Office Action dated Feb. 3, 2017 for Canadian application 2,928,355", 1-4.
Cisco, "Troubleshooting Problems Affecting Radio Frequency Communication", cisco.com, Oct. 19, 2009, 5 pages.
Cliff, Oliver M. et al., "Online localization of radio-tagged wildlife with an autonomous aerial robot system", Proceedings of Robotics Science and Systems XI, 2015, 1317.
Collins, D.D. et al., "Final Report on Advanced Antenna Design Techniques", GER 11246, Report No. 4, Sep. 6, 1963, 1-70.
Communication Power Solutions, I, "Power Communication", www.cpspower.biz/services/powercommunications, Oct. 2013, 6 pages.
Comsol, "Fast Numerical Modeling of a Conical Horns Lens Antenna", comsol.com, Application ID: 18695, Sep. 16, 2016, 3 pages.
Corridor Systems, "A New Approach to Outdoor DAS Network Physical Layer Using E-Line Technology", Mar. 2011, 5 pages.
Costantine, Joseph et al., "The analysis of a reconfigurable antenna with a rotating feed using graph models", Antennas and Wireless Propagation Letters, vol. 8, 2009, 943-946.
Covington, Michael J. et al., "Threat implications of the internet of things", 2013 5th International Conference on IEEE Cyber Conflict (CyCon), Abstract Only, 2013, 1 page.
Cradle Point, "Out-of-Band Management", www.cradlepoint.com, Sep. 2015, 7 pages.
Crane, Robert K. "Analysis of the effects of water on the ACTS propagation terminal antenna", Antennas and Propagation, IEEE Transactions on 50.7: 954965, Abstract Only, 2002, 1 page.
Crisp, "Uplink and Downlink Coverage Improvements of 802.11g Signals Using a Distributed Antenna Network", Journal of Lightwave Technology ( vol. 25, Issue: 11), Dec. 6, 2007, 1-4.
Crosswell, "Aperture excited dielectric antennas", http://ntrs.nasa.gov/archive/nasa/casi.ntrs.nasa.gov/19740017567.pdf, 1974, 128 pages.

(56) References Cited

OTHER PUBLICATIONS

CST, "A Dielectric Lens Antenna with Enhanced Aperture Efficiency for Industrial Radar Applications", Computer Simulation Technology, cst.com, May 10, 2011, 3 pages.
Curry, James M. "A Web of Drones: A 2040 Strategy to Reduce the United States Dependance on Space Based Capabilities", Air War College, Feb. 17, 2015, 34 pages.
Cypress Perform, "Powerline Communication", www.cypress.com, Apr. 23, 2015, 2 pages.
Daniel, Kai et al., "Using Public Network Infrastructures for UAV Remote Sensing in Civilian Security Operations", Homeland Security Affairs, Supplement 3, Mar. 2011, 11 pages.
Darktrace, "www.darktrace.com", Jul. 10, 2014, 4 pages.
De Freitas, Carvalho et al., "Unmanned Air Vehicle Based Localization and Range Estimation of WiFi Nodes", 2014, 109 pages.
De Sabata, Aldo et al., "Universitatea "Politehnica"", din Timişoara Facultatea de Electronicăşi Telecomunicaţii, 2012, 149 pages.
DEA+, "24 Volt D.C Flashing Light With Built-in Antenna 433Mhz, DEA+ Product Guide", Meteor electrical, meteorelectrical.com, Code: LUMY/24A, Jul. 28, 2010, 3 pages.
Debord, Benoit et al., "Generation and confinement of microwave gas-plasma in photonic dielectric microstructure", Optics express 21.21, 2013, 25509-25516.
Deilmann, Michael "Silicon oxide permeation barrier coating and sterilization of PET bottles by pulsed low-pressure microwave plasmas", Dissertation, 2008, 142 pages.
Deng, Chuang et al., "Unmanned Aerial Vehicles for Power Line Inspection: A Cooperative Way in Platforms and Communications", Journal of Communicatinos vol. No. 9, No. 9, Sep. 2014, 687-692.
Denso, , Winn & Coales (Denso) Ltd. UK, www.denso.net, 2015, 1 page.
Dini, Gianluca et al., "MADAM: A Multilevel Anomaly Detector for Android Malware", MMMACNS. vol. 12, 2012, 16 pages.
Doane, J.L. et al., "Oversized rectangular waveguides with modefree bends and twists for broadband applications", Microwave Journal 32(3), Abstract Only, 1989, 153-160.
Doelitzscher, Frank et al., "ViteraaS: Virtual cluster as a Service", Cloud Computing Technology and Science (CloudCom), 2011 IEEE Third International Conference, 2011, 8 pages.
Dooley, Kevin "Out-of-Band Management", auvik, auvik.com, Apr. 12, 2014, 5 pages.
Doshi, D.A. et al., "Real Time Fault Failure Detection in Power Distribution Line using Power Line Communication", International Journal of Engineering Science, vol. 6, Issue No. 5, May 2016, 4834-4837.
Dostert, Klaus "Frequency-hopping spread-spectrum modulation for digital communications over electrical power lines", Selected Areas in Communications, IEEE Journal on 8.4, Abstract Only, 1990, 700-710.
Dragoo, R.E. et al., "Fiber Optic Data Bus for the AN/GYQ21(V)", Harris Corp, U.S. Communications Syst. Div. Chart, Microcopy Resolution Test, 1980, 115 pages.
Dutton, Harry J. "Understanding Optical Communications", International Technical Support Organization, SG24-5230-00, Sep. 1998, 55 pages.
Dyson, John D. "The Equiangular Spiral Antenna", IRE Transactions on Antennas and Propagation, 1959, 181-187.
Earth Data, "Remote Sensors", NASA, earthdata.nasa.gov, Oct. 17, 2016, 36 pages.
Ehyaie, Danial "Novel Approaches to the Design of Phased Array Antennas", Diss., The University of Michigan, 2011, 153 pages.
Eizo, "How can a screen sense touch? A basic understanding of touch panels", www.eizo.com/library/basics/basic_understanding_of_touch_panel, Sep. 27, 2010, 8 pages.
Ekstrom, "Slot-line end-fire antennas for THz frequencies", Third International Symposium on Space Terahertz Technology, 280-290.
Electric Power Research Institut, "Examination of the Exacter Outage-Avoidance System", www.epri.com/abstracts/Pages/ProductAbstract.aspx?ProductId=000000000001020393, Nov. 30, 2009, 2 pages.
Eline Corridor Systems, "How is ELine Different?", www.corridor.biz/ELine_is_different.html, Apr. 23, 2015, 1 page.
Elmore, Glenn et al., "A Surface Wave Transmission Line", QEX, May/Jun. 2012, pp. 3-9.
Elmore, Glenn "Introduction to the Propagating Wave on a Single Conductor", www.corridor.biz, Jul. 27, 2009, 30 pages.
Emerson, "About Rosemount 5300 Level Transmitter", www.emerson.com, Nov. 2016, 6 pages.
Eom, Seung-Hyun et al., "Pattern switchable antenna system using inkjet-printed directional bow-tie for bi-direction sensing applications", Sensors 15.12, 2015, 31171-31179.
EPRI—Electronic Power Research, "Product Abstract—Program on Technology Innovation: Study on the Integration of High Temperature Superconducting DC Cables Within the Eastern and West urn North American Power Grids", epri.com, Product ID:10203, Nov. 25, 2009, 2 pages.
Erickson, Katherine "Conductive cylindrical surface waveguides", www.ideals.illinois.edu/bitstream/handle/2142/30914/Erickson_Katherine.pdf?sequence=1, 2012, 74 pages.
Ericsson, "Direct Bury Duct Assemblies, MPB 302 3+—Ribbonet Microducts", www.archive.ericsson.net, Jul. 30, 2014, 2 pages.
Eskelinen, Harri et al., "DFM (A)-aspects for a horn antenna design", Lappeenranta University of Technology, 2004, 34 pages.
Eskelinen, P. "A low-cost microwave rotary joint", International Radar Conference, 13-17, Abstract Only, Oct. 2014, 1-4.
Faggiani, Adriano "Smartphone-based crowdsourcing for network monitoring: opportunities, challenges, and a case study", http://vecchio.iet.unipi.it/vecchio/files/2010/02/article.pdf, 2014, 8 pages.
Farr Research, Inc., "An Improved Solid Dielectric Lens Impulse Radiating Antenna", SBIR/STTR, DoD, sbir.gov, 2004, 3 pages.
Farzaneh, Masoud et al., "Systems for Prediction and Monitoring of Ice Shedding, Anti-Cicing and De-Icing for Power Line Conductors and Ground Wires", Dec. 1, 2010, 1-100.
Fattah, E. Abdel et al., "Numerical 3D simulation of surface wave excitation in planar-type plasma processing device with a corrugated dielectric plate", Elsevier, Vacuum 86, 2011, 330-334.
Feko, "Lens Antennas", Altair, feko.info, Jun. 30, 2014, 2 pages.
Feko, "mmWave Axial Choke Horn Antenna with Lens", Sep. 24, 2013, 2 pages.
Feng, Taiming et al., "Design of a survivable hybrid wireless-optical broadband-access network", Journal of Optical Communications and Networking 3.5, 2011, 458-464.
Feng, Wei et al., "Downlink power allocation for distributed antenna systems in a multi-cell environment", 2009 5th International Conference on Wireless Communications, Networking and Mobile Computing, 2009, 2 pages.
Fenn, Alan J. et al., "A Terrestrial Air Link for Evaluating Dual-Polarization Techniques in Satellite Communications", vol. 9, No. 1, The Lincoln Laboratory Journal, 1996, 3-18.
Fenye, Bao et al., "Dynamic trust management for internet of things applications", Proceedings of the 2012 international workshop on Selfaware internet of things. ACM, Abstract Only, 2012, 1 page.
Fiorelli, Riccardo et al., "ST7580 power line communication systemonchip design guide", Doc ID 022923 Rev 2, Jul. 2012, 63 pages.
Firelight Media Group, "About Firelight Media Group", www.insurancetechnologies.com/Products/Products_firelight_overview.html, Apr. 19, 2015, 4 pages.
Firelight Media Group LLC, "Electronic Business Fulfillment FireLight", www.firelightmedia.net/fmg/index.php/home, Apr. 19, 2015, 2 pages.
Fitzgerald, William D. "A 35-GHz Beam Waveguide System for the Millimeter-Wave Radar", The Lincoln Laboratory Journal, vol. 5, No. 2, 1992, 245-272.
Ford, Steven "AT&T's new antenna system will boost cellular coverage at Walt Disney World", Orlando Sentinel, orlandosentinel.com, Mar. 9, 2014, 4 pages.
Freyer, Dan et al., "Combating the Challenges of Ka-Band Signal Degradation", SatMagazine, satmagzine.com, Sep. 2014, 9 pages.
Friedman, M et al., "Low-loss RF transport over long distances", IEEE Transactions on Microwave Theory and Techniques, Jan. 1, 2001, 341-348.

(56) References Cited

OTHER PUBLICATIONS

Friedman, M et al., "Low-Loss RF Transport Over Long Distances", IEEE Transactions on Microwave Theory and Techniques, vol. 49, No. 2, Feb. 2001, 8 pages.
Friedman, M. et al., "Low-Loss RF Transport Over Long Distances", IEEE Transactions on Microwave Theory an Techniques, vol. 49, No. 2, Feb. 2001, 341-348.
Fromm, W. et al., "A new microwave rotary joint", 1958 IRE International Convention Record, 21-25, 6:78-82, Abstract Only, Mar. 1966, 2 pages.
Galli, "For the Grid and Through the Grid: The Role of Power Line Communications in the Smart Grid", Proceedings of the IEEE 99.6, Jun. 2011, 1-26.
Garcia-Etxarri, Aitzol et al., "A combination of concave/convex surfaces for fieldenhancement optimization: the indented nanocone", Optics express 20.23, 2012, 2520125212.
Gerini, Giampiero "Multilayer array antennas with integrated frequency selective surfaces conformal to a circular cylindrical surface", http://alexandria.tue.nl/openaccess/Metis248614.pdf, 2005, 2020-2030.
Geterud, Erik G. "Design and Optimization of Wideband Hat-Fed Reflector Antenna with Radome for Satellite Earth Station", http://publications.lib.chalmers.se/records/fulltext/163718.pdf, Discloses Frequency Selective Surfaces for antenna coverings for weather protection (table of materials on p. 29-30; pp. 37-46), 2012, 70 pages.
Ghazisaidi, Navid et al., "Survivability analysis of next-generation passive optical networks and fiber-wireless access networks", Reliability, IEEE Transactions on 60.2, 2011, 479-492.
Gigamon, "Out-of-Band Security Solution", www.gigamon.com, Aug. 3, 2014, 7 pages.
Gilbert, Barrie et al., "The Gears of Genius", IEEE SolidState Circuits Newsletter 4.12, 2007, 10-28.
Glockler, Roman "Phased Array for Millimeter Wave Frequencies", International Journal of Infrared and Millimeter Waves, Springer, vol. 11, No. 2, Feb. 1, 1990, 10 pages.
Godara, "Applications of Antenna Arrays to Mobile Communications, Part I: Performance Improvement, Feasibility, and System Considerations", Proceedings of the IEEE, vol. 85, No. 7, Jul. 1997, 1031-1060.
Goldsmith, Paul F. "Quasi-optical techniques", Proceedings of the IEEE., vol. 80, No. 11, Nov. 1, 1992, 1729-1747.
Golrezaei, Negin et al., "FemtoCaching: Wireless Video Content Delivery through Distributed Caching Helpers", INFOCOM, Proceedings IEEE, 2012, 9 pages.
Gomes, Nathan J. et al., "Radio-over-fiber transport for the support of wireless broadband services", Journal of Optical Networking, vol. 8, No. 2, 2009, 156-178.
Gonthier, François et al., "Mode coupling in nonuniform fibers: comparison between coupled-mode theory and finite-difference beam-propagation method simulations", JOSA B 8.2: 416421, Abstract Only, 1991, 3 pages.
Greco, R. "Soil water content inverse profiling from single TDR waveforms", Journal of hydrology 317.3, 2006, 325-339.
Gritzalis, Dimitris et al., "The Sphinx enigma in critical VoIP infrastructures: Human or botnet?", Information, Intelligence, Systems and Applications (IISA), 2013 Fourth International Conference, IEEE, 2013, 6 pages.
Gunduz, Deniz et al., "The multiway relay channel", IEEE Transactions on Information Theory 59.1, 2013, 5163.
Guo, Shuo et al., "Detecting Faulty Nodes with Data Errors for Wireless Sensor Networks", 2014, 25 pages.
Hadi, Ghozali S. et al., "Autonomous UAV System Development for Payload Dropping Mission", The Journal of Instrumentation, Automation and Systems, vol. 1, No. 2, 2014, pp. 72-22.
Hafeez, "Smart Home Area Networks Protocols within the Smart Grid Context", Journal of Communications vol. 9, No. 9, Sep. 2014, 665-671.
Haider, Muhammad Kumail et al., "Mobility resilience and overhead constrained adaptation in directional 60 GHz WLANs: protocol design and system implementation", Proceedings of the 17th ACM International Symposium on Mobile Ad Hoc Networking and Computing, 2016, 10 pages.
Halder, Achintya et al., "Low-cost alternate EVM test for wireless receiver systems", 23rd IEEE VLSI Test Symposium (VTS'05), 2005, 6 pages.
Hale, Paul et al., "A statistical study of deembedding applied to eye diagram analysis", IEEE Transactions on Instrumentation and Measurement 61.2, 2012, 475-488.
Halligan, Matthew S. "Maximum crosstalk estimation and modeling of electromagnetic radiation from PCB/highdensity connector interfaces", http://scholarsmine.mst.edu/cgi/viewcontent.cgiarticle=3326&context=doctoral_dissertations, 2014, 251 pages.
Han, Chong et al., "crosslayer communication module for the Internet of Things", Computer Networks 57.3: 622633, Abstract Only, 2013, 1 page.
Hanashi, Abdalla M. et al., "Effect of the Dish Angle on the Wet Antenna Attenuation", IEEE, 2014, 1-4.
Haroun, Ibrahim et al., "WLANs meet fiber optics-Evaluating 802.11 a WLANs over fiber optics links", www.rfdesign.com, 2003, 36-39.
Hassan, Karim "Fabrication and characterization of thermo-plasmonic routers for telecom applications", Diss. Univ. de Bourgogne., 2014, 59 pages.
Hassan, Maaly A. "Interference reduction in mobile ad hoc and sensor networks", Journal of Engineering and Computer Innovations vol. 2(7), Sep. 2011, 138-154.
Hassani, Alireza et al., "Porous polymer fibers for low-loss Terahertz guiding", Optics express 16.9, 2008, 6340-6351.
Hautakorpi, Jani et al., "Requirements from Session Initiation Protocol (SIP) Session Border Control (SBC) Deployments", RFC5853, IETF, 2010, 27 pages.
Hawrylyshen, A. et al., "SIPPING Working Group", J. Hautakorpi, Ed. Internet-Draft G. Camarillo Intended status: Informational Ericsson Expires: Dec. 18, 2008 R. Penfield Acme Packet, Oct. 23, 2008, 26 pages.
Hays, Phillip "SPG-49 Tracking Radar", www.okieboat.com/SPG-49%20description.html, 2015, 15 pages.
Heo, Joon et al., "Identity-Based Mutual Device Authentication Schemes for PLC Systems", IEEE International Symposium on Power Line Communications and Its Applications, 2008, pp. 47-51.
Hoss, R.J. et al., "Manufacturing Methods and Technology Program for Ruggedized Tactical Fiber Optic Cable", No. ITT-80-03-078. ITT Electrooptical Products Div Roanoke VA., 1980, 69 pages.
Howard, Courtney "UAV command, control & communications", Military & Aerospace Electronics, militaryaerospace.com, Jul. 11, 2013, 15 pages.
Hussain, Mohamed T. et al., "Closely Packed Millimeter-Wave MIMO Antenna Arrays with Dielectric Resonator Elements", Antennas and Propagation (EuCAP) 2016 10th European Conference, Apr. 2016, 1-5.
Huth, G. K. "Integrated source and channel encoded digital communication system design study", http://ntrs.nasa.gov/archive/nasa/casi.ntrs.nasa.gov/19750003064.pdf, 1974, 65 pages.
Ikrath, K. et al., "Antenna Innovation Glass-Fiber Tube Focuses Microwave Beam", Electronics, vol. 35, No. 38, Sep. 21, 1962, 44-47.
Illinois Historic Archive, "Antennas on the Web", Photo Archive of Antennas, ece.illinois.ed, 1-18, Dec. 2016.
Industrial Fiber Optics, "Asahi Multi-Core Fiber Cable", http://i-fiberoptics.com/multi-core-fiber-cable.php, Apr. 26, 2015, 2 pages.
Infoexpress, "Detecting and Preventing MAC Spoofing", Network Access Control Solutions, 2014, 1 page.
Ippolito, Louis J. "Propagation effects handbook for satellite systems design. A summary of propagation impairments on 10 to 100 GHz satellite links with techniques for system design", 1989, Abstract Only, 1989, 1 page.
Islam, M. T. "Coplanar Waveguide Fed Microstrip Patch Antenna", Information Technology Journal 9.2 (2010): 367-370., 2010, 367-370.
Izumiyama, Hidetaka et al., "Multicast over satellite", Applications and the Internet, (SAINT 2002), IEEE Proceedings, 2002, 4 pages.

(56) References Cited

OTHER PUBLICATIONS

Jackson, Mark "Timico CTO Hit by Slow FTTC Broadband Speeds After Copper Corrosion", www.ispreview.co.uk, Mar. 5, 2013, 2 pages.
Jaeger, Raymond et al., "Radiation Performance of Germanium Phosphosilicate Optical Fibers", RADC-TR-81-69: Final Technical Report, Galileo Electro-Optical Corp, May 1981, 101 pages.
James, Graeme L. et al., "Diplexing Feed Assemblies for Application to Dual-Reflector Antennas", IEEE Transactions on Antennas and Propagation, vol. 51, No. 5, May 2003, 1024-1029.
James, J. R. et al., "Investigations and Comparisons of New Types of Millimetre-Wave Planar Arrays Using Microstrip and Dielectric Structures", Royal Military College of Science, Apr. 1985, 122 pages.
Jang, Hung-Chin "Applications of Geometric Algorithms to Reduce Interference in Wireless Mesh Network", Journal on Applications of Graph Theory in Wireless Ad hoc Networks and Sensor Networks (JGRAPH-HOC) vol. 2, No. 1, Abstract Only, Mar. 2010, 1 page.
Jawhar, Imad et al., "A hierarchical and topological classification of linear sensor networks", Wireless Telecommunications Symposium, WTS, IEEE, http://faculty.uaeu.ac.ae/Nader_M/papers/WTS2009.pdf, 2009, 8 pages.
Jee, George et al., "Demonstration of the Technical Viability of PLC Systems on Medium- and Low-Voltage Lines in the United States", Broadband is Power: Internet Access Via Power Line Networks, IEEE Communication Magazine, May 2003, 5 pages.
Jensen, Michael "Data-Dependent Fingerprints for Wireless Device Authentication", www.dtic.mil/cgi-bin/GetTRDoc?Ad=ADA626320, 2014, 15 pages.
Jeong, et al., "Study of elliptical polarization requirement of KSTAR 84-GHz ECH system", Journal of the Korean Physical Society, vol. 49, Dec. 2006, 201-205.
Jiang, Peng "A New Method for Node Fault Detection in Wireless Sensor Networks", 2009, 1282-1294.
Jiang, Y.S. et al., "Electromagnetic orbital angular momentum in remote sensing", PIERS Proceedings, Moscow, Russia, Aug. 18-21, 2009, 1330-1337.
Jin, "Quasi-optical mode converter for a coaxial cavity gyrotron", Forschungszentrum Karlsruhe, Mar. 2007, 107 pages.
Jin, Yu et al., "NEVERMIND, the Problem Is Already Fixed: Proactively Detecting and Troubleshooting Customer DSL Problems", ACM CoNEXT, Philadelphia, USA, Nov.-Dec. 2010, 12 pages.
Jones, Jr., Howard S. "Conformal and Small Antenna Designs", U.S. Army Electronics Research and Development Command, Harry Diamond Laboratories, Apr. 1981, 32 pages.
Kado, Yuichi et al., "Exploring SubTHz Waves for Communications, Imaging, and Gas Sensing", Fog 2: O2, PIERS Proceedings, Beijing, China, Mar. 23-27, 2009, 42-47.
Kamilaris, Andreas et al., "Exploring the Use of DNS as a Search Engine for the Web of Things", Internet of Things (WF-IoT), 2014 IEEE World Forum, 2014, 6 pages.
Kang, Eyung W. "Chapter 6: Array Antennas", www.globalspec.com/reference/75109/203279/chapter-6-array-antennas, Apr. 22, 2015, 2 pages.
Karbowiak, A. E. et al., "Characteristics of Waveguides for Long-Distance Transmission", Journal of Research of the National Bureau of Standards, vol. 65D, No. 1, Jan.-Feb. 1961, May 23, 1960, 75-88.
Katkovnik, Vladimir et al., "High-resolution signal processing for a switch antenna array FMCW radar with a single channel receiver", 2002 IEEE Sensor Array and Multichannel Signal Processing Workshop Proceedings, 2002, 6 pages.
Katrasnik, Jaka "New Robot for Power Line Inspection", 2008 IEEE Conference on Robotics, Automation and Mechatronics, 2008, 1-6.
Kedar, "Wide Beam Tapered Slot Antenna for Wide Angle Scanning Phased Array Antenna", Progress in Electromagnetics Research B, vol. 27, 2011, 235-251.
Khan, Kaleemullah "Authentication in Multi-Hop Wireless Mesh Networks", World Academy of Science, Engineering and Technology, International Journal of Electrical, Computer, Energetic, Electronic and Communication Engineering vol. 2, No. 10, 2008, 2406-2411.
Khan, Mohammed R. "A beam steering technique using dielectric wedges", Diss. University of London, Dec. 1985, 3 pages.
Khan, Ubaid Mahmood et al., "Dual polarized dielectric resonator antennas", Chalmers University of Technology, Jun. 2010, 128 pages.
Kikuchi, H. et al., "Hybrid transmission mode of Goubau lines", J.Inst.Electr.Comm.Engrs., Japan,vol. 43, 1960, 39-45.
Kim, Jong-Hyuk et al., "Real-time Navigation, Guidance, and Control of a UAV using Low-cost Sensors", Australian Centre for Field Robotics, Mar. 5, 2011, 6 pages.
Kim, Myungsik et al., "Automated RFID-based identification system for steel coils", Progress In Electromagnetics Research 131, 2012, 1-17.
Kima, Yi-Gon et al., "Generating and detecting torsional guided waves using magnetostrictive sensors of crossed coils", Chonnam National University, Republic of Korea, Elsevier Ltd 2010, 145-151.
Kirkham, H. et al., "Power system applications of fiber optics (Jet Propulsion Lab", JPL Publication 84-28, Electric Energy Systems Division, U.S. DoE, 1984, 180.
Kleinrock, Leonard et al., "On measured behavior of the ARPA network", National Computer Conference, 1974, 767-780.
Kliros, George S. "Dielectric-EBG covered conical antenna for UWB applications", www.researchgate.net/profile/George_Kliros/publication/235322849_Dielectric-EBG_covered_conical_antenna_for_UWB_applications/links/54329e410cf225bddcc7c037.pdf, 2010, 10 pages.
Koga, Hisao et al., "High-Speed Power Line Communication System Based on Wavelet OFDM", 7th International Symposium on Power-Line Communications and Its Applications, Mar. 26-28, 2003, 226-231.
Kolpakov, Stanislav A. et al., "Toward a new generation of photonic humidity sensors", Sensors 14.3, 2014, 3986-4013.
Koshiba, Masanori et al., "Analytical expression of average power-coupling coefficients for estimating intercore crosstalk in multicore fibers", Photonics Journal, IEEE 4.5, 2012, 1987-1995.
Kroon, Barnard et al., "Steady state RF fingerprinting for identity verification: one class classifier versus customized ensemble", Artificial Intelligence and Cognitive Science. Springer Berlin Heidelberg, 198206, Abstract Only, 2010, 3 pages.
Kroyer, Thomas "A Waveguide High Order Mode Reflectometer for the Large Hadron Collider Beam-pipe", Diss. TU Wien., 2003, 76 pages.
Kuehn, E "Self-configuration and self-optimization of 4G Radio Access Networks", http://wirelessman.org/tgm/contrib/S80216m-07_169.pdf, 2007, 13 pages.
Kuhn, Marc et al., "Power Line Enhanced Cooperative Wireless Communications", IEEE Journal on Selected Areas in Communications, vol. 24, No. 7, Jul. 2006, 10 pages.
Kumar, Sailesh "Survey of Current Network Intrusion Detection Techniques", Washington Univ. in St. Louis, Dec. 2007, 18 pages.
Kumar, Sumeet et al., "Urban street lighting infrastructure monitoring using a mobile sensor platform", IEEE Sensors Journal, 16.12, 2016, 4981-4994.
Kune, Denis F. et al., "Ghost Talk: Mitigating EMI Signal Injection Attacks against Analog Sensors", IEEE Symposium on Security and Privacy, 2013, 145-159.
Laforte, J.L. et al., "State-of-the-art on power line de-icing", Atmospheric Research 46, 1998, 143-158.
Lairdtech, "Allpurpose Mount Kit", www.lairdtech.com, Mar. 29, 2015, 2 pages.
Lappgroupusa, "Selection of Number of Cable Cores With Emphasis on Sizing Parameters", Industrial Cable & Connector Technology News, lappconnect.blogspot.com, http://lappconnect.blogspot.com/2014_10_01_archive.html, Oct. 30, 2014, 4 pages.
Lazaropoulos, Athanasios "TowardsModal Integration of Overhead and Underground Low-Voltage and Medium-Voltage Power Line Communication Channels in the Smart Grid Landscape:Model Expansion, Broadband Signal Transmission Characteristics, and

(56) References Cited

OTHER PUBLICATIONS

Statistical Performance Metrics", International Scholarly Research Network, ISRN Signal Processing, vol. 2012, Article ID 121628, 17 pages, Mar. 26, 2012, 18 pages.
Lazaropoulos, Athanasios G. "Wireless sensor network design for transmission line monitoring, metering, and controlling: introducing broadband over power lines-enhanced network model (BPLeNM)", ISRN Power Engineering, 2014, 23 pages.
Lee, Joseph C. "A Compact Q-/K-Band Dual Frequency Feed Horn", No. TR-645, Massachusetts Institute of Technology, Lincoln Laboratory, May 3, 1983, 40 pages.
Lee, Sung-Woo "Mutual Coupling Considerations in the Development of Multi-feed Antenna Systems", http://ntrs.nasa.gov/archive/nasa/casi.ntrs.nasa.gov/19750003064.pdf, 2008, 127 pages.
Leech, Jamie et al., "Experimental investigation of a low-cost, high performance focal-plane horn array", Terahertz Science and Technology, IEEE Transactions on 2.1, 2012, 61-70.
Li, Mo et al., "Underground structure monitoring with wireless sensor networks", Proceedings of the 6th international conference on Information processing in sensor networks, ACM, 2007, 69-78.
Li, Xi et al., "A FCM-Based peer grouping scheme for node failure recovery in wireless P2P file sharing", 2009 IEEE International Conference on Communications, 2009, 2 pages.
Li, Xiang-Yang et al., "Interference-Aware Topology Control for Wireless Sensor Networks", SECON. vol. 5, 2005, 12 pages.
Li, Xiaowei et al., "Integrated plasmonic semi-circular launcher for dielectric-loaded surface plasmonpolariton waveguide", Optics Express, vol. 19, Issue 7, 2011, 6541-6548.
Li, Xu et al., "Smart community: an internet of things application", Communications Magazine, IEEE 49.11, Nov. 2011, 68-75.
Liang, Bin "Cylindrical Slot FSS Configuration for Beam-Switching Applications", IEEE Transactions on Antennas and Propagation, vol. 63, No. 1, Jan. 2015, 166-173.
Lier, E. et al., "Simple hybrid mode horn feed loaded with a dielectric cone", Electronics Letters 21.13: 563564, 1985, 563-564.
Lier, Erik "A Dielectric Hybrid Mode Antenna Feed: A Simple Alternative to the Corrugated Horn", IEEE Transactions on Antennas and Propagation, vol. AP-34, No. 1, Jan. 1986, 21-30.
Lim, Christina et al., "Fiber-wireless networks and subsystem technologies", Lightwave Technology, Journal of 28.4, Feb. 5, 2010, 390-405.
Liu, et al., "A 25 Gb/s (/km 2) urban wireless network beyond IMTadvanced", IEEE Communications Magazine 49.2, 2011, 122-129.
Lou, Tiancheng "Minimizing Average Interference through Topology Control", Algorithms for Sensor Systems, Springer Berlin Heidelberg, 2012, 115-129.
L-Tel: Quanzhou L-Tel Communicat, "Products: GSM Mircro Repeater", www.l-tel.com, Apr. 24, 2015, 3 pages.
Lucyszyn, S. et al., "Novel RF MEMS Switches", Proceedings of Asia-Pacific Microwave Conference 2007, 2007, 55-58.
Lucyszyn, Stepan et al., "RF MEMS for antenna applications", 7th European Conference on Antennas and Propovation (EUCAP 2103), 2013, 1988-1992.
Lumerical Solutions, Inc., "Tapered waveguide", www.docs.lumerical.com, 2010, 3 pages.
Lumerical Solutions, Inc., "Waveguide Bragg Microcavity", www.lumerical.com, Sep. 2016, 6 pages.
Luo, Hailu et al., "Reversed propagation dynamics of Laguerre-Gaussian beams in left-handed materials", Physical Review A 77.2, 023812., Feb. 20, 2008, 1-7.
Luo, Qi et al., "Circularly polarized antennas", John Wiley & Sons, Book—description only, 2013, 1 page.
Mahato, Suvranshu Sekhar "Studies on an Infrared Sensor Based Wireless Mesh Network. Diss.", Abstract Only, 2010, 2 pages.
Maier, Martin et al., "The Audacity of Fiberwireless (FiWi) Networks", AccessNets, 2009, 16-35.
Makwana, G. D. et al., "Wideband Stacked Rectangular Dielectric Resonator Antenna at 5.2 GHz", International Journal of Electromagnetics and Applications 2012, 2(3), 2012, 41-45.
Marcatili, E.A. et al., "Hollow Metallic and Dielectric Waveguides for Long Distance Optical Transmission and Lasers", Bell System Technical Journal 43(4), Abstract Only, 2 pages, 1964, 1783-1809.
Marin, Leandro "Optimized ECC Implementation for Secure Communication between Heterogeneous IoT Devices", www.mdpi.com/1424-8220/15/9/21478/pdf, 2015, 21478-21499.
Marrucci, Lorenzo "Rotating light with light: Generation of helical modes of light by spin-to-orbital angular momentum conversion in inhomogeneous liquid crystals", International Congress on Optics and Optoelectronics. International Society for Optics and Photonics, 2007, 12 pages.
Marzetta, "Noncooperative Cellular Wireless with Unlimited Numbers of Base Station Antennas", IEEE Transactions on Wireless Communications, vol. 9, No. 11, Nov. 2010, 3590-3600.
Matikainen, Leena et al., "Remote sensing methods for power line corridor surveys", ISPRS Journal of Photogrammetry and Remote Sensing, 119, 2016, 10-31.
Matsukawa, et al., "A dynamic channel assignment scheme for distributed antenna networks", Vehicular Technology Conference (VTC Spring), 2012 IEEE 75th, 2012, 5 pages.
McAllister, M.W. et al., "Resonant hemispherical dielectric antenna", Electronics Letters 20.16: 657659, Abstract Only, 1984, 1 page.
McKeown, David M. et al., "Rulebased interpretation of aerial imagery", IEEE Transactions on Pattern Analysis and Machine Intelligence 5, 1985, 570-585.
Meessen, A. "Production of EM Surface Waves by Superconducting Spheres: A New Type of Harmonic Oscillators", Progress in Electromagnetics Research Symposium Proceedings, Moscow, Russia, Aug. 19-23, 2012, pp. 529-533.
Mehta, "Advance Featuring Smart Energy Meter With Bi-directional Communication", Electronics & Communication MEFGI, Feb. 9, 2014, 169-174.
Mena, F.P. et al., "Design and Performance of a 600720GHz SidebandSeparating Receiver Using and AIN SIS Junctions", IEEE Transactions on Microwave Theory and Techniques 59.1, 2011, 166-177.
Meng, H. et al., "A transmission line model for high-frequency power line communication channel", Power System Technology, PowerCon 2002, International Conference on IEEE, vol. 2, 2002, 6 pages.
Menon, S.S. et al., "Propagation characteristics of guided modes in a solid dielectric pyramidal horn", Proceedings of the 2012 International Conference on Communication Systems and Network Technologies, IEEE Computer Society, Abstract Only, 2012, 2 pages.
Microwave Technologies, Ind, "Dielectric Antenna", www.microwavetechnologiesinc.co.in/microwavecommunicationlabproducts.html#dielectricantenna, May 21, 2015, 13 pages.
Miller, Ashley et al., "Pathway to Ubiquitous Broadband: Environments, Policies, and Technologies to Implementation", Oct. 2016, 20 pages.
Miller, David A. "Establishing Optimal Wave Communication Channels Automatically", Journal of Lightwave Technology, vol. 31, No. 24, Dec. 15, 2013, 3987-3994.
Mishra, Sumita et al., "Load Balancing Optimization in LTE/LTEA Cellular Networks: A Review", arXiv preprint arXiv:1412.7273 (2014), 2014, 1-7.
Mitchell, John E. "Integrated Wireless Backhaul Over Optical Access Networks", Journal of Lightwave Technology 32.20, 2014, 3373-3382.
Miyagi, M. "Bending losses in hollow and dielectric tube leaky waveguides", Applied Optics 20(7), Abstract Only, 2 pages, 1981, 1221-1229.
Moaveni-Nejad, Kousha et al., "Low-Interference Topology Control for Wireless Ad Hoc Networks", Department of Computer Science, Illinois Institute of Technology, Ad Hoc & Sensor Wireless Networks 1.1-2, 2005, 41-64.
Moisan, M. et al., "Plasma sources based on the propagation of electromagnetic surface waves", Journal of Physics D: Applied Physics 24, 1991, 1025-1048.
Mokhtarian, Kianoosh et al., "Caching in Video CDNs: Building Strong Lines of Defense", EuroSys, Amsterdam, Netherlands, 2014, 13 pages.

(56) References Cited

OTHER PUBLICATIONS

Mori, A. et al., "The Power Line Transmission Characteristics for an OFDM Signal", Progress in Electromagnetics Research, Pier 61, Musashi Institute of Technology, 2006, 279-290.
Morse, T.F. "Research Support for the Laboratory for Lightwave Technology", Brown Univ Providence RI Div of Engineering, 1992, 32 pages.
Mruk, Joseph Rene "Wideband monolithically integrated frontend subsystems and components", Diss. University of Colorado, 2011, 166 pages.
Mueller, G.E. et al., "Polyrod Antennas", Bell System Technical Journal, vol. 26., No. 4, Oct. 29, 1947, 837-851.
Mushref, Muhammad "Matrix solution to electromagnetic scattering by a conducting cylinder with an eccentric metamaterial coating", www.sciencedirect.com/science/article/pii/S0022247X06011450/pdf?md5=4823be0348a3771b5cec9ffb7f326c2c&pid=1-s2.0-S0022247X06011450-main.pdf, Discloses controlling antenna radiation pattern with coatings, 2007, 356-366.
Mwave, "Dual Linear C-Band Horn", www.mwavellc.com/custom-Band-LS-BandTelemetryHornAntennas.php, Jul. 6, 2012, 1 page.
Nakano, Hisamatsu "A Low-Profile Conical Beam Loop Antenna with an Electromagnetically Coupled Feed System", http://repo.lib.hosei.ac.jp/bitstream/10114/3835/1/31_TAP(Low-Profile).pdf, Dec. 2000, 1864-1866.
Nakano, Hisamatsu et al., "A Spiral Antenna Backed by a Conducting Plane Reflector", IEEE Transactions on Antennas and Propagation, vol AP-34 No. 6, Jun. 1986, 791-796.
Nandi, Somen et al., "Computing for rural empowerment: enabled by last-mile telecommunications", IEEE Communications Magazine 54.6, 2016, 102-109.
Narayanan, Arvind "Fingerprinting of RFID Tags and HighTech Stalking", 33 Bits of Entropy, 33bits.org, Oct. 4, 2011, 4 pages.
Nassa, Vinay Kumar "Wireless Communications: Past, Present and Future", Dronacharya Research Journal: 50. vol. III, Issue-II, Jul.-Dec. 2011, 2011, 96 pages.
Nassar, "Local Utility Powerline Communications in the 3-500 kHz Band: Channel Impairments, Noise, and Standards", IEEE Signal Processing Magazine, 2012, 1-22.
NBNTM, "Network technology", nbnco.com.au, Jun. 27, 2014, 2 pages.
Netgear, "Powerline—Juice Up Your Network With Powerline", www.netgear.com/home/products/networking/powerline, Apr. 21, 2015, 3 pages.
Newmark System, Inc, "GM-12 Gimbal Mount", newmarksystems.com, 2015, 1 page.
Nibarger, John P. "An 84 pixel all-silicon corrugated feedhorn for CMB measurements", Journal of Low Temperature Physics 167.3-4, 2012, 522-527.
Nicholson, Basil J. "Microwave Rotary Joints for X-, C-, and S-band", Battelle Memorial Inst Columbus OH, 1965, 51 pages.
Niedermayer, Uwe et al., "Analytic modeling, simulation and interpretation of broadband beam coupling impedance bench measurements", Nuclear Instruments and Methods in Physics Research Section a: Accelerators, Spectrometers, Detectors and Associated Equipment 776, 2015, 129-143.
Nikitin, A. Y. et al., "Efficient Coupling of Light to Graphene Plasmons by Compressing Surface Polaritons with Tapered Bulk Materials", NanoLetters; pubs.acs.org/NanoLett, Apr. 28, 2014, 2896-2901.
Nikitin, Pavel V. et al., "Propagation Model for the HVAC Duct as a Communication Channel", IEEE Transactions on Antennas and Propagation 51.5, 2003, 7 pages.
Norse Appliance, "Block attacks before they target your network, and dramatically improve the ROI on your entire security infrastructure", norsecorp.com, 2015, 4 pages.
Nuvotronics, "PolyStrata—Phased Arrays & Antennas", Nuvotronics, www.nuvotronics.com/antennas.php, Apr. 26, 2015, 1 page.
Nwclimate, "Weather Instruments and Equipment Explained", nwclimate.org, May 7, 2015, 22 pages.
Oecd, "Alternative Local Loop Technologies: A Review", Organisation for Economic Co-Operation and Development, Paris, https://www.oecd.org/sti/2090965.pdf, 1996, 25 pages.
Ohliger, Michael "An introduction to coil array design for parallel MRI", http://mriquestions.com/uploads/3/4/5/7/34572113/intro_to_coil_design_parallel_.pdf, 2006, 16 pages.
Olver, A. D. "Microwave horns and feeds", vol. 39. IET, Book description only, 1994, 1 page.
Olver, A.D. et al., "Dielectric cone loaded horn antennas", Microwaves, Antennas and Propagation, IEEE Proceedings H. vol. 135. No. 3. IET, Abstract Only, 1988, 1 page.
Opengear, "Smart Out-of-Band Management", www.opengear.com, Sep. 2015, 2 pages.
Orfanidis, Sophocles J. "Antenna Arrays", Rutgers University, 2002, 910-939.
Pahlavan, Kaveh et al., "Wireless data communications", Proceedings of the IEEE 82.9, 1994, 1398-1430.
Paruchuri, et al., "Securing Powerline Communication", IEEE, 2008, 64-69.
Patel, Pinak S. et al., "Sensor Fault Detection in Wireless Sensor Networks and Avoiding the Path Failure Nodes", International Journal of Industrial Electronics and Electrical Engineering, vol. 2, Issue-3, Mar. 2014, 2347-6982.
Patel, Shwetak N. et al., "The Design and Evaluation of an End-User-Deployable, Whole House, Contactless Power Consumption Sensor", CHI 2010: Domestic Life, Apr. 2010, 10 pages.
Pato, Silvia et al., "On building a distributed antenna system with joint signal processing for next generation wireless access networks: The Futon approach", 7th Conference on Telecommunications, Portugal, 2008, 4 pages.
Paul, Sanjoy et al., "The Cache-and-Forward Network Architecture for Efficient Mobile Content Delivery Services in the Future Internet", Innovations in NGN: Future Network and Services, First ITU-T Kaleidoscope Academic Conference, 2008, 8 pages.
PCT, "International Search Report", dated Oct. 25, 2016, 1-12.
Perkons, Alfred R. et al., "TM surface-wave power combining by a planar active-lens amplifier", IEEE Transactions on Microwave Theory and Techniques, 46.6, Jun. 1998, 775-783.
Péter, Zsolt et al., "Assessment of the current intensity for preventing ice accretion on overhead conductors", Power Delivery, IEEE Transactions on 22.1:4, 2007, 565-57.
Petrovsky, Oleg "The Internet of Things: A Security Overview", www.druva.com, Mar. 31, 2015, 3 pages.
Pham, Tien-Thang et al., "A WDM-PON-compatible system for simultaneous distribution of gigabit baseband and wireless ultrawideband services with flexible bandwidth allocation", Photonics Journal, IEEE 3.1, 2011, 13-19.
Pike, Kevin J. et al., "A spectrometer designed for 6.7 and 14.1 T DNP-enhanced solid-state MAS NMR using quasi-optical microwave transmission", Journal of Magnetic Resonance, 2012, 9 pages.
Piksa, Petr et al., "Elliptic and hyperbolic dielectric lens antennas in mmwaves", Radioengineering 20.1, 2011, 271.
Pixel Technologies, "PRO 600 SIRIUS XM Radio Amplified Outdoor Antenna", Oct. 3, 2014, 1 page.
Plagemann, Thomas et al., "Infrastructures for Community Networks", Content Delivery Networks. Springer Berlin Heidelberg, 2008, 367-388.
Pohl, Nils "A dielectric lens-based antenna concept for high-precision industrial radar measurements at 24GHz", Radar Conference (EuRAD), 2012 9th European, IEEE, 2012, 5 pages.
Ponchak, George E. et al., "A New Model for Broadband Waveguide to Microstrip Transition Design", NASA TM-88905, Dec. 1, 1986, 18 pgs.
Potlapally, Nachiketh R. et al., "Optimizing Public-Key Encryption for Wireless Clients", Proceedings of the IEEE International Conference on Communications, 2002, 1050-1056.
Pranonsatit, S. et al., "Sectorised horn antenna array using an RF MEMS rotary switch", Asia-Pacific Microwave Conference, 2010, 1909-1913.
Pranonsatit, Suneat et al., "Single-pole eight-throw RF MEMS rotary switch", Journal of Microelectromechanical Systems 15.6, 2006, 1735-1744.

(56) References Cited

OTHER PUBLICATIONS

Prashant, R.R. et al., "Detecting and Identifying the Location of Multiple Spoofing Adversaries in Wireless Network", International Journal of Computer Science and Mobile Applications, vol. 2 Issue. 5, May 2014, 1-6.
Qi, Xue et al., "Ad hoc QoS ondemand routing (AQOR) in mobile ad hoc networks", Journal of parallel and distributed computing 63.2, 2003, 154-165.
Qiu, Lili et al., "Fault Detection, Isolation, and Diagnosis in Multihop Wireless Networks", Dec. 2003, 16 pages.
Quan, Xulin "Analysis and Design of a Compact Dual-Band Directional Antenna", IEEE Antennas and Wireless Propagation Letters, vol. 11, 2012, 547-550.
Quinstar Technology, Inc., "Prime Focus Antenna (QRP series)", quinstar.com, Aug. 19, 2016, 2 pages.
Rahim, S. K. A. et al., "Measurement of wet antenna losses on 26 GHz terrestrial microwave link in Malaysia", Wireless Personal Communications 64.2, 2012, 225-231.
Rambabu, K. et al., "Compact single-channel rotary joint using ridged waveguide sections for phase adjustment", IEEE Transac-Compact single-channel rotary joint using ridged waveguide sections for phase adjustmenttions on Microwave Theory and Techniques, 51(8):1982-1986, Abstract Only, Aug. 2003, 2 pages.
Ranga, Yogesh et al., "An ultra-wideband quasi-planar antenna with enhanced gain", Progress in Electromagnetics Research C 49, 2014, 59-65.
Rangan, Sundeep et al., "Millimeter-Wave Cellular Wireless Networks: Potentials and Challenges", Proceedings of the IEEE, vol. 102, No. 3, Mar. 2014, 366-385.
Rangel, Rodrigo K. et al., "Sistema de lnspecao de Linhas de Transmissao de Energia Electrica Utilizando Veiculos Aereos Nao-Tripulados", Sep. 14-16, 2009, 1-9.
Rappaport, Theodore S. et al., "Mobile's Millimeter-Wave Makeover", Spectrum.IEEE.Org, Sep. 2014, 8 pages.
Raychaudhuri, Dipankar et al., "Emerging Wireless Technologies and the Future Mobile Internet", Cambridge University Press, Abstract Only, Mar. 2011, 1 page.
Rekimoto, Jun "SmartSkin: An Infrastructure for Freehand Manipulation on Interactive Surfaces", https://vs.inf.ethz.ch/edu/SS2005/DS/papers/surfaces/rekimoto-smartskin.pdf, 2002, 8 pages.
Ren-Bin, Zhong et al., "Surface plasmon wave propagation along single metal wire", Chin. Phys. B, vol. 21, No. 11, May 2, 2012, 9 pages.
Reynet, Olivier et al., "Effect of the magnetic properties of the inclusions on the high-frequency dielectric response of diluted composites", Physical Review B66.9: 094412, 2002, 10 pages.
RF Check, "Examples of Cell Antennas", https://web.archive.org/web/20100201214318/http//www.rfcheck.com/Examplesof-Cell-Antennas.php, Feb. 1, 2010, 1 page.
Ricardi, L. J. "Some Characteristics of a Communication Satellite Multiple-Beam Antenna", Massachusetts Institute of Technology, Lincoln Laboratory, Technical Note 1975-3, Jan. 28, 1975, 62 pages.
Rieke, M. et al., "High-Precision Positioning and Real-Time Data Processing of UAV Systems", International Archives of the Photogrammetry, Remote Sensing and Spatial Information Sciences, vol. XXXVIII-1/C22, 2011, 119-124.
Robinson, D.A. et al., "Advancing processbased watershed hydrological research using nearsurface geophysics: A vision for, and review of, electrical and magnetic geophysical methods", Hydrological Processes 22.18, Mar. 11, 2008, 3604-3635.
Robles, Rosslin John et al., "A Review on Security in Smart Home Development", International Journal of Advanced Science and Technology 15, Feb. 2010, 13-22.
Rosenberg, Uwe et al., "A novel frequency-selective power combiner/divider in single-layer substrate integrated waveguide technology", IEEE Microwave and Wireless Components Letters, vol. 23, No. 8, Aug. 2013, 406-408.
Rouse, Margaret "Transport Layer Security (TLS)", TechTarget, searchsecurity.techtarget.com, Jul. 2006, 4 pages.
Rousstia, M. W. "Switched-beam antenna array design for millimeter-wave applications", https://pure.tue.nl/ws/files/4418145/599448877400424.pdf, Jan. 1, 2011, 148 pages.
Roze, Mathieu et al., "Suspended core subwavelength fibers: towards practical designs for low-loss terahertz guidance", Optics express 19.10, 2011, 9127-9138.
Sagar, Nishant "Powerline Communications Systems: Overview and Analysis", Thesis, May 2011, 80 pages.
Sagues, Mikel et al., "Multi-tap complex-coefficient incoherent microwave photonic filters based on optical single-sideband modulation and narrow band optical filtering", Optics express 16.1, 2008, 295-303.
Sahoo, Srikanta "Faulty Node Detection in Wireless Sensor Networks Using Cluster", Apr. 2013, 212-223.
Saied, Yosra Ben et al., "Trust management system design for the internet of things: a contextaware and multiservice approach", Computers & Security 39: 351365, Abstract Only, 2013, 2 pages.
Salema, Carlos et al., "Solid Dielectric Horn Antennas", Artech House Publishers, Amazon, Book—description only, 1998, 3 pages.
Sarafi, Angeliki et al., "Hybrid wireless-broadband over power lines: A promising broadband solution in rural areas", Communications Magazine, IEEE 47.11, 2009, 140-147.
Sarnecki, Joseph et al., "Microcell design principles", Communications Magazine, IEEE 31.4, 1993, 76-82.
Saruhan, Ibrahim Halil "Detecting and Preventing Rogue Devices on the Network", SANS Institute InfoSec Reading Room, sans.org, Aug. 8, 2007, 1 page.
Scarfone, Karen et al., "Technical Guide to Information Security Testing and Assessment", National Institute of Standards and Technology, csrc.nist.gov, Special Publication, Sep. 2008, 800-115.
Scerri, Paul et al., "Geolocation of RF emitters by many UAVs", AIAA Infotech, Aerospace 2007 Conference and Exhibit, 2007, 1-13.
Schoning, Johannes et al., "Multi-Touch Surfaces: A Technical Guide", Johannes Schöning, Institute for Geoinformatics University of Münster, Technical Report TUM-I0833, 2008, 19 pages.
Sciencedaily, "New Wi-Fi antenna enhances wireless coverage", www.sciencedaily.com, Apr. 29, 2015, 2 pages.
Security Matters, "Product Overview: Introducing SilentDefense", secmatters.com, Nov. 9, 2013, 1 page.
Sembiring, Krisantus "Dynamic Resource Allocation for Cloud-based Media Processing", http://www.chinacloud.cn/upload/2013-04/13042109511919.pdf, 2013, 49-54.
Sengled, "Boost: The world's first Wi-Fi extending led bulb", www.sengled.com/sites/default/files/field/product/downloads/manual/a01-a60_na_user_manual.pdf, Dec. 2014, 32 pages.
Shafai, Lotfollah "Dielectric Loaded Antennas", John Wiley & Sons, Inc, www.researchgate.net/publication/227998803_Dielectric_Loaded_Antennas, Apr. 15, 2005, 82 pages.
Shafi, Mansoor et al., "Advances in Propagation Modeling for Wireless Systems", EURASIP Journal on Wireless Communications and Networking. Hindawi Publishing Corp, 2009, p. 5.
Shankland, Steven "Lowly DSL poised for gigabit speed boost", www.cnet.com, Oct. 21, 2014, 5 pages.
Sharma, Archana et al., "Dielectric Resonator Antenna for X band Microwave Application", Research & Reviews, International Journal of Advanced Research in Electrical, Electronics and Instrumentation Engineering, Oct. 2016, 9 pages.
Shekar, Chandra P. "Transmission Line Fault Detection & Indication through GSM", IRD India, ISSN (Online): 2347-2812, vol. 2, Issue 5, 2014, 28-30.
Shila, Devu M. "Load-Aware Traffic Engineering for Mesh Networks", Computer Communications 31.7, 2008, 1460-1469.
Shimabukuko, F.I. et al., "Attenuation measurement of very low-loss dielectric waveguides by the cavity resonator method in the millimeter/submillimeter wavelength range", No. TR-0086A (2925-06)-1, Aerospace Corp El Segundo CA Electronics Research Lab, Mar. 20, 1989, 35 pages.
Shin, Donghoon et al., "10 Gbps Millimeter-Wave OFDM Experimental System with Iterative Phase Noise Compensation", Tokyo Institute of Technology, IEEE, 2013, 184-186.
Shindo, Shuichi et al., "Attenuation measurement of cylindrical dielectric-rod waveguide", Electronics Letters 12.5, 1976, 117-118.

(56) References Cited

OTHER PUBLICATIONS

Shumate, Paul W. et al., "Evolution of fiber in the residential loop plant", IEEE Communications Magazine 29.3, 1991, 68-74.
Sievenpiper, D.F. et al., "Two-dimensional beam steering using an electrically tunable impedance surface", IEEE Transactions on Antennas and Propagation, vol. 51, No. 10, Nov. 2003, pp. 2713-2722.
Silver, Ralph U. "Local Loop Overview", National Communications System (NCS), BellSouth Network Training, newnetworks.com, Aug. 2016, 100 pages.
Silvonen, Kimmo "Calibration and DeEmbedding of Microwave Measurements Using Any Combination of Oneor TwoPort Standards", Publication of the Circuit Theory Laboratory, CT4, 1987, 1-28.
Simionovici, Ana-Maria et al., "Predictive Modeling in a VoIP System", 2013, 32-40.
Simons, Rainee N. "Coplanar Waveguide Feeds for Phased Array Antennas", Solid State Technology Branch of NASA Lewis Research Center Fourth Annual Digest, Conference on Advanced Space Exploration Initiative Technologies cosponsored by AIAA, NASA and OAI, 1992, 1-9.
Singh, Sapana et al., "Key Concepts and Network Architecture for 5G Mobile Technology", International Journal of Scientific Research Engineering & Technology (IJSRET), IIMT Engineering College, Meerut, India, vol. 1, Issue 5, Aug. 2012, 165-170.
Singh, Seema M. et al., "Broadband Over Power Lines a White Paper", State of New Jersey, Division of the Ratepayer Advocate, NJ, Oct. 2016, 67 pages.
Sommerfeld, A. "On the propagation of electrodynamic waves along a wire", Annals of Physics and Chemistry New Edition, vol. 67, No. 2, 1899, 72 pages.
Song, Kaijun et al., "Broadband radial waveguide power amplifier using a spatial power combining technique", www.mtech.edu/academics/mines/geophysical/xzhou/publications/songfanzhou_2009b_impa.pdf, 2009, 7 pages.
Sospedra, Joaquim et al., "Badalona Oil PierBased Met-Ocean Monitoring Station", Campbell Scientific, www.campbellsci.com, Nov. 2016, 2 pages.
Souryal, Michael R. et al., "Rapidly Deployable Mesh Network Testbed", https://pdfs.semanticscholar.org/f914/1ce6999c4095eab3bdea645745761ebe5141.pdf, 2009, 6 pages.
Sowmya, Arcot et al., "Modelling and representation issues in automated feature extraction from aerial and satellite images", ISPRS journal of photogrammetry and remote sensing, 55.1, 2000, 34-47.
Spencer, D G. "Novel Millimeter ACC Antenna Feed", IEEE Colloquium on Antennas for Automotives, Mar. 10, 2000, 10 pages.
Stancil, Daniel D. et al., "High-speed internet access via HVAC ducts: a new approach", Global Telecommunications Conference, IEEE vol. 6, 2001, 4 pages.
Steatite, "Custom Horn Antennas", Steatite QPar Antennas, steatiteqparantennas.co.uk, May 21, 2015, 1 page.
Strahler, Olivier "Network Based VPNs", SANS Institute InfoSec Reading Room, www.sans.org, Aug. 2002, 18 pages.
Strieby, M.E. et al., "Television transmission over wire lines", American Institute of Electrical Engineers, Transactions of the 60.12: 1090-1096, Abstract Only, 1941, 2 pages.
STUF, "How to Use STUF", STUF Page Link Info,www.crossdevices.com,http://www.crossdevices.com/cross_devices_010.htm, 2015, 1 page.
Sun, Zhi et al., "Magnetic Induction Communications for Wireless Underground Sensor Networks", IEEE Transactions on Antennas and Propagation, vol. 58, No. 7, Jul. 2010, 2426-2435.
Sundqvist, Lassi "Cellular Controlled Drone Experiment: Evaluation of Network Requirements", 2015, 71 pages.
Szabó, Csaba A. "European Broadband Initiatives with Public Participation", Broadband Services: 255, 2005, 305 pages.
Szczys, Mike "Cameras Perch on Power Lines, Steal Electricity", http://hackaday.com/2010/06/28/cameras-perch-on-power-lines-steal-electricity/, Discloses cameras that clamp on to power lines and use induction as a power source., 2010, 1 page.
Taboada, John M. et al., "Thermo-optically tuned cascaded polymer waveguide taps", Applied physics letters 75.2, 1999, 163-165.
Talbot, David "Adapting Old-Style Phone Wires for Superfast Internet", Jul. 30, 2013, 3 pages.
Tantawi, Sami G. et al., "High-power multimode X-band rf pulse compression system for future linear colliders", Physical Review Special Topics-Accelerators and Beams, 1098-4402/05/8(4)/042002, 2005, 19 pages.
Tech Briefs Media Group, "Tapered Waveguides Improve Fiber Light Coupling Efficiency", www.techbriefs.com, Jan. 1, 2006, 2 pages.
Templeton, Steven J. et al., "Detecting Spoofed Packets", DARPA Information Survivability Conference and Exposition, vol. 1, IEEE, 2003, 12 page.
Teng, Ervin et al., "Aerial Sensing and Characterization of ThreeDimensional RF Fields", Univ. at Buffalo, cse.buffalo.edu, Sep. 2016, 6 pages.
Tesoriero, Ricardo et al., "Tracking autonomous entities using RFID technology", IEEE Transactions on Consumer Electronics 55.2, 2009, 650-655.
Theoleyr, Fabrice "Internet of Things and M2M Communications", books.google.com, ISBN13: 9788792982483, Book—description only, Apr. 17, 2013, 1 page.
Thornton, John et al., "Modern lens antennas for communications engineering", vol. 39, 2013, 48 pages.
Thota, Saigopal et al., "Computing for Rural Empowerment: Enabled by Last-Mile Telecommunications (Extended Version)", Technical Report, 2013, 14 pages.
Thottapan, M. "Design and simulation of metal PBG waveguide mode launcher", www.researchgate.net/profile/Dr_M_Thottappan/publication/262415753_Design_and_Simulation_of_Metal_PBG_Waveguide_Mode_Launcher/links/0f317537ad93a5e2a4000000.pdf, 2014, 383-387.
Tillack, M. S. et al., "Configuration and engineering design of the ARIES-RS tokamak power plant", https://www.researchgate.net/publication/222496003_Configuration_and_engineering_design_of_the_ARIES-RS_tokamak_power_plant, 1997, 87-113.
Tucson Electric Power, "Energy-Harvesting Power Supply", http://sdpm.arizona.edu/projects/project-publi/upid/38a8cf3b42f35576de25de1f6dcc20f3, Discloses a project to harvest energy from a power line and that a device was built that clamps onto a power line., 2016, 1 page.
Tyco Electronics, "Raychem: Wire and Cable", Dimensions 2:1, 1996, 58 pages.
UK Essays, "Beam Adaptive Algorithms for Smart Antennas Computer Science Essay", www.ukessays.com, Mar. 23, 2015, 21 pages.
Valladares, Cindy "20 Critical Security Controls: Control 7—Wireless Device Control", Tripwire—The State of Security, www.tripwire.com, Mar. 21, 2013, 10 pages.
Van Atta, L.C. "Contributions to the antenna field during World War II", www.nonstopsystems.com/radio/pdf-hell/article-IRE-5-1962.pdf, 1962, 692-697.
Vogelgesang, Ralf et al., "Plasmonic nanostructures in aperture-less scanning near-field optical microscopy (aSNOM)", physica status solidi (b) 245.10, 2008, 2255-2260.
Volat, C. et al., "De-icing/anti-icing techniques for power lines: current methods and future direction", Proceedings of the 11th International Workshop on Atmospheric Icing of Structures, Montreal, Canada, Jun. 2005, 11 pages.
Wade, Paul "Multiple Reflector Dish Antennas", www.w1ghz.org/antbook/conf/Multiple_reflector_antennas.pdf, 2004, 45 pages.
Wagter, Herman "Fiber-to-the-X: the economics of last-mile fiber", ARS Technica, www.arstechnica.com, Mar. 31, 2010, 3 pages.
Wake, David et al., "Radio over fiber link design for next generation wireless systems", Journal of Lightwave Technology 28.16, 2010, 2456-2464.
Wang, Hao et al., "Dielectric Loaded Substrate Integrated Waveguide (SIW)—Plan Horn Antennas", IEEE Transactions on Antennas and Propagation, IEEE Service Center, Piscataway, NJ, US, vol. 56, No. 3, Mar. 1, 2010, 640-647.

(56) References Cited

OTHER PUBLICATIONS

Wang, Jing et al., "The influence of optical fiber bundle parameters on the transmission of laser speckle patterns", Optics express 22.8, 2014, 8908-8918.
Wang, Wei "Optimization Design of an Inductive Energy Harvesting Device for Wireless Power Supply System Overhead High-Voltage Power Lines", https://pdfs.semanticscholar.org/3941/601af7a21d55e8b57ab0c50d5f1d9f9f6868.pdf, Discloses an induction based energy harvesting device that takes energy from overhead powerlines (Figure 4)., 2016, 16 pages.
Wang, Xingfu et al., "Zigzag coverage scheme algorithm & analysis for wireless sensor networks", Network Protocols and Algorithms 5.4, 2013, 19-38.
Washiro, Takanori "Applications of RFID over power line for Smart Grid", Power Line Communications and Its Applications (ISPLC), 2012 16th IEEE International Symposium on. IEEE, 2012, 83-87.
Wenger, N. "The launching of surface waves on an axial-cylindrical reactive surface", IEEE Transactions on Antennas and Propagation 13.1, 1965, 126-134.
Werner, Louis B. et al., "Operation Greenhouse", Scientific Director's Report of Atomic Weapon Tests at Eniwetok, Annex 6.7 Contimation-Decontamination Studies Naval Radiological Defense Lab, 1951, 209 pages.
Wikipedia, "Angular Momentum of Light", https://en.wikipedia.org/wiki/Angular_momentum_of light, Nov. 10, 2016, 1-7.
Wilkes, Gilbert "Wave Length Lenses", Dec. 5, 1946, 49 pages.
Wilkins, George A. "Fiber Optic Telemetry in Ocean Cable Systems", Chapter in new edition of Handbook of Oceanographic Wnch, Wire and Cable Technology, Alan H. Driscoll, Ed, 1986, 50 pages.
Wolfe, Victor et al., "Feasibility Study of Utilizing 4G LTE Signals in Combination With Unmanned Aerial Vehicles for the Purpose of Search and Rescue of Avalanche Victims (Increment 1)", University of Colorado at Boulder, Research Report, 2014, 26 pages.
Wolff, Christian "Phased Array Antenna", Radar Tutorial, web.archive.org, radartutorial.eu, Oct. 21, 2014, 2 pages.
Won Jung, Chang et al., "Reconfigurable Scan-Beam Single-Arm Spiral Antenna Integrated With RF-MEMS Switches", IEEE Transactions on Antennas and Propagation, vol. 54, No. 2, Feb. 2006, 455-463.
Woodford, Chris "How do touchscreens work?", www.explainthatstuff.com/touchscreens.html, Aug. 23, 2016, 8 pages.
Wu, Xidong et al., "Design and characterization of singleand multiplebeam mmwave circularly polarized substrate lens antennas for wireless communications", Microwave Theory and Techniques, IEEE Transactions on 49.3, 2001, 431-441.
Xi, Liu Xiao "Security services in SoftLayer", Sep. 21, 2015, 18 pages.
Xia, Cen et al., "Supermodes for optical transmission", Optics express 19.17, 2011, 16653-16664.
Xiao, Shiyi et al., "Spin-dependent optics with metasurfaces", Nanophotonics 6.1, 215-234., 2016, 215-234.
Yang, et al., "Power line sensornet—a new concept for power grid monitoring", IEEE Power Engineering Society General Meeting, Abstract Only, 2006, pp. 8.
Yang, Yi "Power Line Sensor Networks for Enhancing Power Line Reliability and Utilization", Georgia Institute of Technology, https://smartech.gatech.edu/bitstream/handle/1853/41087/Yang_Yi_201108_phd.pdf, Apr. 26, 2011, 264 pages.
Yeh, C. et al., "Ceramic Waveguides", Interplanetary Network Progress Report 141.26: 1, May 15, 2000, 21 pages.
Yeh, C. et al., "Thin-Ribbon Tapered Coupler for Dielectric Waveguides", May 15, 1994, 42-48.
Yilmaz, et al., "Self-optimization of coverage and capacity in LTE using adaptive antenna systems", Aalto University, Feb. 2010, 72 pages.
Yousuf, Muhammad Salman "Power line communications: An Overview Part I", King Fand University of Petroleum and Minerals, Dhahran, KSA, 2008, 5 pages.
Yu, Shui et al., "Predicted packet padding for anonymous web browsing against traffic analysis attacks", Information Forensics and Security, IEEE Transactions on 7.4, http://nsp.org.au/syu/papers/tifs12.pdf, 2012, 1381-1393.
Zelby, Leon W. "Propagation Modes on a Dielectric Coated Wire", Journal of the Franklin Institute, vol. 274(2), Aug. 1962, pp. 85-97.
Zhang, "Modified Tapered Slot-line Antennas for Special Applications", REV Journal on Electronics and Communications, vol. 2, Jul.-Dec. 2012, 106-112.
Zhang, Ming et al., "PlanetSeer: Internet Path Failure Monitoring and Characterization in Wide Area Services", OSDI, vol. 4, 2004, 33 pages.
Zhao, et al., "Energy harvesting for a wireless-monitoring system of overhead high-voltage power lines", IET Generation, Transmission & Distribution 7, IEEE Xplore Abstract, 2013, 2 pages.
Zheng, Zhu et al., "Efficient coupling of propagating broadband terahertz radial beams to metal wires", Optics express 21.9, 2013, 10642-10650.
Zucker, Francis J. "Surface-Wave Antennas", Antenna Engineering Handbook, Chapter 10, 2007, 32 pages.
Akalin, Tahsin et al., "Single-Wire Transmission Lines at Terahertz Frequencies", IEEE Transactions on Microwave Theory and Techniques, vol. 54, No. 6, 2006, 2762-2767.
Wang, Kanglin, "Dispersion of Surface Plasmon Polaritons on Metal Wires in the Terahertz Frequency Range", Physical Review Letters, PRL 96, 157401, 2006, 4 pages.
"International Search Report and Written Opinion", PCT/US2018/015634, dated Jun. 25, 2018, 8 pages.

* cited by examiner

100

200

300

400

500

550

600

700

800

900

950

1000

1300

1400

1500

1650

1700

1750

METHOD AND APPARATUS FOR UTILITIES MANAGEMENT VIA GUIDED WAVE COMMUNICATION

FIELD OF THE DISCLOSURE

The subject disclosure relates to a method and apparatus for utilities management via guided wave communication.

BACKGROUND

As smart phones and other portable devices increasingly become ubiquitous, and data usage increases, macrocell base station devices and existing wireless infrastructure in turn require higher bandwidth capability in order to address the increased demand. To provide additional mobile bandwidth, small cell deployment is being pursued, with microcells and picocells providing coverage for much smaller areas than traditional macrocells.

In addition, most homes and businesses have grown to rely on broadband data access for services such as voice, video and Internet browsing, etc. Broadband access networks include satellite, 4G or 5G wireless, power line communication, fiber, cable, and telephone networks.

BRIEF DESCRIPTION OF THE DRAWINGS

Reference will now be made to the accompanying drawings, which are not necessarily drawn to scale, and wherein:

FIG. 190 is a block diagram of an example non-limiting embodiment of a supervised processing system implemented in conjunction with surveillance in accordance with various aspects described herein.

DETAILED DESCRIPTION

Figure 1:
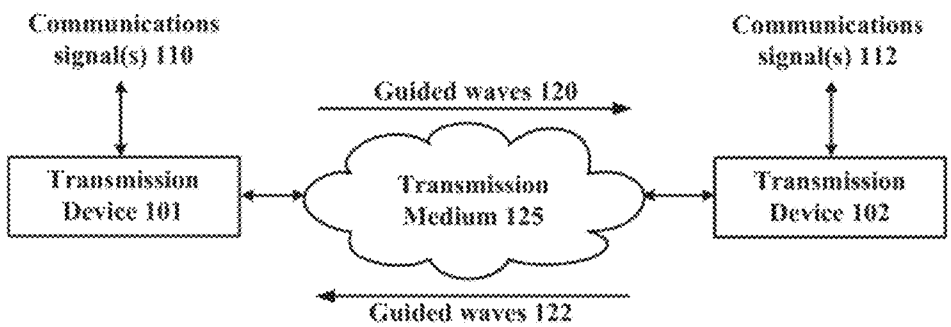
FIG. 1 is a block diagram illustrating an example, non-limiting embodiment of a guided-wave communications system in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced without these details (and without applying to any particular networked environment or standard).

In an embodiment, a guided wave communication system is presented for sending and receiving communication signals such as data or other signaling via guided electromagnetic waves. The guided electromagnetic waves include, for example, surface waves or other electromagnetic waves that are bound to or guided by a transmission medium. It will be appreciated that a variety of transmission media can be utilized with guided wave communications without departing from example embodiments. Examples of such transmission media can include one or more of the following, either alone or in one or more combinations: wires, whether insulated or not, and whether single-stranded or multi-stranded; conductors of other shapes or configurations including wire bundles, cables, rods, rails, pipes; non-conductors such as dielectric pipes, rods, rails, or other dielectric members; combinations of conductors and dielectric materials; or other guided wave transmission media.

The inducement of guided electromagnetic waves on a transmission medium can be independent of any electrical potential, charge or current that is injected or otherwise transmitted through the transmission medium as part of an electrical circuit. For example, in the case where the transmission medium is a wire, it is to be appreciated that while a small current in the wire may be formed in response to the propagation of the guided waves along the wire, this can be due to the propagation of the electromagnetic wave along the wire surface, and is not formed in response to electrical potential, charge or current that is injected into the wire as part of an electrical circuit. The electromagnetic waves traveling on the wire therefore do not require a circuit to propagate along the wire surface. The wire therefore is a single wire transmission line that is not part of a circuit. Also, in some embodiments, a wire is not necessary, and the electromagnetic waves can propagate along a single line transmission medium that is not a wire.

More generally, "guided electromagnetic waves" or "guided waves" as described by the subject disclosure are affected by the presence of a physical object that is at least a part of the transmission medium (e.g., a bare wire or other conductor, a dielectric, an insulated wire, a conduit or other hollow element, a bundle of insulated wires that is coated, covered or surrounded by a dielectric or insulator or other wire bundle, or another form of solid or otherwise non-liquid or non-gaseous transmission medium) so as to be at least partially bound to or guided by the physical object and so as to propagate along a transmission path of the physical object. Such a physical object can operate as at least a part of a transmission medium that guides, by way of an interface of the transmission medium (e.g., an outer surface, inner surface, an interior portion between the outer and the inner surfaces or other boundary between elements of the transmission medium), the propagation of guided electromagnetic waves, which in turn can carry energy, data and/or other signals along the transmission path from a sending device to a receiving device.

Unlike free space propagation of wireless signals such as unguided (or unbounded) electromagnetic waves that decrease in intensity inversely by the square of the distance traveled by the unguided electromagnetic waves, guided electromagnetic waves can propagate along a transmission medium with less loss in magnitude per unit distance than experienced by unguided electromagnetic waves.

An electrical circuit allows electrical signals to propagate from a sending device to a receiving device via a forward electrical path and a return electrical path, respectively. These electrical forward and return paths can be implemented via two conductors, such as two wires or a single wire and a common ground that serves as the second conductor. In particular, electrical current from the sending device (direct and/or alternating) flows through the electrical forward path and returns to the transmission source via the electrical return path as an opposing current. More particularly, electron flow in one conductor that flows away from the sending device, returns to the receiving device in the opposite direction via a second conductor or ground. Unlike electrical signals, guided electromagnetic waves can propagate along a transmission medium (e.g., a bare conductor, an insulated conductor, a conduit, a non-conducting material such as a dielectric strip, or any other type of object suitable for the propagation of surface waves) from a sending device to a receiving device or vice-versa without requiring the transmission medium to be part of an electrical circuit (i.e., without requiring an electrical return path) between the sending device and the receiving device. Although electromagnetic waves can propagate in an open circuit, i.e., a circuit without an electrical return path or with a break or gap that prevents the flow of electrical current through the circuit, it is noted that electromagnetic waves can also propagate along a surface of a transmission medium that is in fact part of an electrical circuit. That is electromagnetic waves can travel along a first surface of a transmission medium having a forward electrical path and/or along a second surface of a transmission medium having an electrical return path. As a consequence, guided electromagnetic waves can propagate along a surface of a transmission medium from a sending device to a receiving device or vice-versa with or without an electrical circuit.

This permits, for example, transmission of guided electromagnetic waves along a transmission medium having no conductive components (e.g., a dielectric strip). This also permits, for example, transmission of guided electromagnetic waves that propagate along a transmission medium having no more than a single conductor (e.g., an electromagnetic wave that propagates along the surface of a single bare conductor or along the surface of a single insulated conductor or an electromagnetic wave that propagates all or partly within the insulation of an insulated conductor). Even if a transmission medium includes one or more conductive components and the guided electromagnetic waves propagating along the transmission medium generate currents that, at times, flow in the one or more conductive components in a direction of the guided electromagnetic waves, such guided electromagnetic waves can propagate along the transmission medium from a sending device to a receiving device without a flow of an opposing current on an electrical return path back to the sending device from the receiving device. As a consequence, the propagation of such guided electromagnetic waves can be referred to as propagating via a single transmission line or propagating via a surface wave transmission line.

In a non-limiting illustration, consider a coaxial cable having a center conductor and a ground shield that are separated by an insulator. Typically, in an electrical system a first terminal of a sending (and receiving) device can be connected to the center conductor, and a second terminal of the sending (and receiving) device can be connected to the ground shield. If the sending device injects an electrical signal in the center conductor via the first terminal, the electrical signal will propagate along the center conductor causing, at times, forward currents and a corresponding flow of electrons in the center conductor, and return currents and an opposing flow of electrons in the ground shield. The same conditions apply for a two terminal receiving device.

In contrast, consider a guided wave communication system such as described in the subject disclosure, which can utilize different embodiments of a transmission medium (including among others a coaxial cable) for transmitting and receiving guided electromagnetic waves without an electrical circuit (i.e., without an electrical forward path or electrical return path depending on your perspective). In one embodiment, for example, the guided wave communication system of the subject disclosure can be configured to induce guided electromagnetic waves that propagate along an outer surface of a coaxial cable (e.g., the outer jacket or insulation layer of the coaxial cable). Although the guided electromagnetic waves will cause forward currents on the ground shield, the guided electromagnetic waves do not require return currents in the center conductor to enable the guided electromagnetic waves to propagate along the outer surface of the coaxial cable. Said another way, while the guided electromagnetic waves will cause forward currents on the ground shield, the guided electromagnetic waves will not generate opposing return currents in the center conductor (or other electrical return path). The same can be said of other transmission media used by a guided wave communication system for the transmission and reception of guided electromagnetic waves.

For example, guided electromagnetic waves induced by the guided wave communication system on an outer surface of a bare conductor, or an insulated conductor can propagate along the outer surface of the bare conductor or the other surface of the insulated conductor without generating opposing return currents in an electrical return path. As another point of differentiation, where the majority of the signal energy in an electrical circuit is induced by the flow of electrons in the conductors themselves, guided electromagnetic waves propagating in a guided wave communication system on an outer surface of a bare conductor, cause only minimal forward currents in the bare conductor, with the majority of the signal energy of the electromagnetic wave concentrated above the outer surface of the bare conductor and not inside the bare conductor. Furthermore, guided electromagnetic waves that are bound to the outer surface of an insulated conductor cause only minimal forward currents in the center conductor or conductors of the insulated conductor, with the majority of the signal energy of the electromagnetic wave concentrated in regions inside the insulation and/or above the outside surface of the insulated conductor—in other words, the majority of the signal energy of the electromagnetic wave is concentrated outside the center conductor(s) of the insulated conductor.

Consequently, electrical systems that require two or more conductors for carrying forward and reverse currents on separate conductors to enable the propagation of electrical signals injected by a sending device are distinct from guided wave systems that induce guided electromagnetic waves on an interface of a transmission medium without the need of an electrical circuit to enable the propagation of the guided electromagnetic waves along the interface of the transmission medium.

It is further noted that guided electromagnetic waves as described in the subject disclosure can have an electromagnetic field structure that lies primarily or substantially outside of a transmission medium so as to be bound to or guided by the transmission medium and so as to propagate non-trivial distances on or along an outer surface of the transmission medium. In other embodiments, guided electromagnetic waves can have an electromagnetic field structure that lies primarily or substantially inside a transmission medium so as to be bound to or guided by the transmission medium and so as to propagate non-trivial distances within the transmission medium. In other embodiments, guided electromagnetic waves can have an electromagnetic field structure that lies partially inside and partially outside a transmission medium so as to be bound to or guided by the transmission medium and so as to propagate non-trivial distances along the transmission medium. The desired electronic field structure in an embodiment may vary based upon a variety of factors, including the desired transmission distance, the characteristics of the transmission medium itself, and environmental conditions/characteristics outside of the transmission medium (e.g., presence of rain, fog, atmospheric conditions, etc.).

Various embodiments described herein relate to coupling devices, that can be referred to as "waveguide coupling devices", "waveguide couplers" or more simply as "couplers", "coupling devices" or "launchers" for launching and/or extracting guided electromagnetic waves to and from a transmission medium at millimeter-wave frequencies (e.g., 30 to 300 GHz), wherein the wavelength can be small compared to one or more dimensions of the coupling device and/or the transmission medium such as the circumference of a wire or other cross sectional dimension, or lower microwave frequencies such as 300 MHz to 30 GHz. Transmissions can be generated to propagate as waves guided by a coupling device, such as: a strip, arc or other length of dielectric material; a horn, monopole, rod, slot or other antenna; an array of antennas; a magnetic resonant cavity, or other resonant coupler; a coil, a strip line, a waveguide or other coupling device. In operation, the coupling device receives an electromagnetic wave from a transmitter or transmission medium. The electromagnetic field structure of the electromagnetic wave can be carried inside the coupling device, outside the coupling device or some combination thereof. When the coupling device is in close proximity to a transmission medium, at least a portion of an electromagnetic wave couples to or is bound to the transmission medium, and continues to propagate as guided electromagnetic waves. In a reciprocal fashion, a coupling device can extract guided waves from a transmission medium and transfer these electromagnetic waves to a receiver.

According to an example embodiment, a surface wave is a type of guided wave that is guided by a surface of a transmission medium, such as an exterior or outer surface of the wire, or another surface of the wire that is adjacent to or exposed to another type of medium having different properties (e.g., dielectric properties). Indeed, in an example embodiment, a surface of the wire that guides a surface wave can represent a transitional surface between two different types of media. For example, in the case of a bare or uninsulated wire, the surface of the wire can be the outer or exterior conductive surface of the bare or uninsulated wire that is exposed to air or free space. As another example, in the case of insulated wire, the surface of the wire can be the conductive portion of the wire that meets the insulator portion of the wire, or can otherwise be the insulator surface of the wire that is exposed to air or free space, or can otherwise be any material region between the insulator surface of the wire and the conductive portion of the wire that meets the insulator portion of the wire, depending upon the relative differences in the properties (e.g., dielectric properties) of the insulator, air, and/or the conductor and further dependent on the frequency and propagation mode or modes of the guided wave.

According to an example embodiment, the term "about" a wire or other transmission medium used in conjunction with a guided wave can include fundamental guided wave propagation modes such as a guided waves having a circular or substantially circular field distribution, a symmetrical electromagnetic field distribution (e.g., electric field, magnetic field, electromagnetic field, etc.) or other fundamental mode pattern at least partially around a wire or other transmission medium. In addition, when a guided wave propagates "about" a wire or other transmission medium, it can do so according to a guided wave propagation mode that includes not only the fundamental wave propagation modes (e.g., zero order modes), but additionally or alternatively non-fundamental wave propagation modes such as higher-order guided wave modes (e.g., $1^{st}$ order modes, $2^{nd}$ order modes, etc.), asymmetrical modes and/or other guided (e.g., surface) waves that have non-circular field distributions around a wire or other transmission medium. As used herein, the term "guided wave mode" refers to a guided wave propagation mode of a transmission medium, coupling device or other system component of a guided wave communication system.

For example, such non-circular field distributions can be unilateral or multi-lateral with one or more axial lobes characterized by relatively higher field strength and/or one or more nulls or null regions characterized by relatively low-field strength, zero-field strength or substantially zero-field strength. Further, the field distribution can otherwise vary as a function of azimuthal orientation around the wire such that one or more angular regions around the wire have an electric or magnetic field strength (or combination thereof) that is higher than one or more other angular regions of azimuthal orientation, according to an example embodiment. It will be appreciated that the relative orientations or positions of the guided wave higher order modes or asymmetrical modes can vary as the guided wave travels along the wire.

As used herein, the term "millimeter-wave" can refer to electromagnetic waves/signals that fall within the "millimeter-wave frequency band" of 30 GHz to 300 GHz. The term "microwave" can refer to electromagnetic waves/signals that fall within a "microwave frequency band" of 300 MHz to 300 GHz. The term "radio frequency" or "RF" can refer to electromagnetic waves/signals that fall within the "radio frequency band" of 10 kHz to 1 THz. It is appreciated that wireless signals, electrical signals, and guided electromagnetic waves as described in the subject disclosure can be configured to operate at any desirable frequency range, such as, for example, at frequencies within, above or below millimeter-wave and/or microwave frequency bands. In particular, when a coupling device or transmission medium includes a conductive element, the frequency of the guided electromagnetic waves that are carried by the coupling device and/or propagate along the transmission medium can be below the mean collision frequency of the electrons in the conductive element. Further, the frequency of the guided electromagnetic waves that are carried by the coupling device and/or propagate along the transmission medium can be a non-optical frequency, e.g. a radio frequency below the range of optical frequencies that begins at 1 THz.

As used herein, the term "antenna" can refer to a device that is part of a transmitting or receiving system to transmit/radiate or receive wireless signals.

In accordance with one or more embodiments, a guided wave repeater system includes a processing system that includes a processor; a guided wave transceiver that transmits and receives communications by electromagnetic waves at a physical interface of a transmission medium, where the electromagnetic waves are guided by the transmission medium and propagate without utilizing an electrical return; and a memory that stores executable instructions that, when executed by the processing system, facilitate performance of operations. The operations include receiving via the guided wave transceiver a first plurality of electromagnetic waves that include a first communication signal. A second plurality of electromagnetic waves that include a second communication signal are transmitted via the guided wave transceiver. The first plurality of electromagnetic waves and the second plurality of electromagnetic waves are guided by a power line of a utility pole. A third communication signal is received from a smart grid device. A fourth communication signal is transmitted to the smart grid device.

In accordance with one or more embodiments, a guided wave repeater system includes means for receiving a first plurality of electromagnetic waves that include a first communication signal. The guided wave repeater system further includes means for transmitting a second plurality of electromagnetic waves that include a second communication signal. The first plurality of electromagnetic waves and the second plurality of electromagnetic waves are guided by a power line of a utility pole and propagate without utilizing an electrical return. The guided wave repeater system further includes means for receiving a third communication signal from a smart grid device. Finally, the guided wave repeater system further includes means for transmitting a fourth communication signal to the smart grid device.

In accordance with one or more embodiments, a utilities management system includes a processing system that includes a processor; a guided wave transceiver that transmits and receives communications by electromagnetic waves at a physical interface of a transmission medium, where the electromagnetic waves are guided by the transmission medium and propagate without utilizing an electrical return path; and a memory that stores executable instructions that, when executed by the processing system, facilitate performance of operations. The operations include receiving via the guided wave transceiver a plurality of utility status signals from a plurality of utility sensors located at a plurality of supervised sites. Utility control data is generated based on the plurality of utility status signals. At least one control signal is generated for transmission via the guided wave transceiver to at least one of the plurality of supervised sites, and the at least one control signal includes at least one utility deployment instruction based on the utility control data.

In accordance with one or more embodiments, a utilities management system includes means for receiving a first plurality of electromagnetic waves at a physical interface of a transmission medium, where the first plurality of electromagnetic waves include a plurality of utility status signals from a plurality of utility of sensors located at a plurality of supervised sites. The utilities management system further includes means for generating utility control data based on the plurality of utility status signals, and finally means for generating a second plurality of electromagnetic waves that include at least one control signal for transmission to at least one of the plurality of supervised sites, where the at least one control signal includes at least one utility deployment instruction based on the utility control data. The first plurality of electromagnetic waves and the second plurality of electromagnetic waves are guided by the transmission medium and propagate without utilizing an electrical return path.

In accordance with one or more embodiments, a broadcast communication system includes a processing system that includes a processor; a guided wave transceiver that transmits and receives communications by electromagnetic waves at a physical interface of a transmission medium, where the electromagnetic waves are guided by the transmission medium and propagate without utilizing an electrical return path; and a memory that stores executable instructions that, when executed by the processing system, facilitate performance of operations. The operations include detecting a first power outage and further include generating a first plurality of electromagnetic waves for transmission to a plurality of user devices of the broadcast communication system via the guided wave transceiver, where the first plurality of electromagnetic waves include an outage status signal generated in response to detecting the first power outage.

In accordance with one or more embodiments, a broadcast communication system includes means for detecting a first power outage, and further includes means for generating a first plurality of electromagnetic waves for transmission to a plurality of user devices of the broadcast communication system. The first plurality of electromagnetic waves include an outage status signal generated in response to detecting the first power outage, and the first plurality of electromagnetic waves are guided by at least one transmission medium and propagate without utilizing an electrical return path.

In accordance with one or more embodiments, a surveillance system includes a processing system that includes a processor; a guided wave transceiver that transmits and receives communications by electromagnetic waves at a physical interface of a transmission medium, where the electromagnetic waves are guided by the transmission medium and propagate without utilizing an electrical return path; at least one sensor device; and a memory that stores executable instructions that, when executed by the processing system, facilitate performance of operations. The operations include generating surveillance data based on sensor input to the at least one sensor device. A plurality of electromagnetic waves are generated for transmission to an administrator of the surveillance system via the guided wave transceiver, where the plurality of electromagnetic waves include a surveillance data signal generated based on the surveillance data.

In accordance with one or more embodiments, a surveillance system includes means for generating surveillance data based on sensor input to at least one sensor device coupled to the surveillance system. The surveillance system further includes means for generating a plurality of electromagnetic waves for transmission to an administrator of the surveillance system. The plurality of electromagnetic waves are guided by at least one transmission medium and propagate without utilizing an electrical return path and where the plurality of electromagnetic waves include a surveillance data signal generated based on the surveillance data.

In accordance with one or more embodiments, a method for use by a guided wave repeater system that includes a processor and a guided wave transceiver includes receiving via the guided wave transceiver a first plurality of electromagnetic waves that include a first communication signal, where the first plurality of electromagnetic waves are guided by a power line of a utility pole and propagate without utilizing an electrical return. A second plurality of electromagnetic waves that include a second communication signal transmitting via the guided wave transceiver, where the second plurality of electromagnetic waves are guided by a power line of a utility pole and propagate without utilizing an electrical return. A third communication signal are received from a smart grid device. A fourth communication signal is transmitted to the smart grid device.

In accordance with one or more embodiments, a method for use by a utilities management system that includes a processor and a guided wave transceiver includes receiving a first plurality of electromagnetic waves, guided by at least one transmission medium and propagating without utilizing an electrical return path, where the first plurality of electromagnetic waves include a plurality of utility status signals sent from a plurality of utility sensors located at a plurality of supervised sites. Utility control data is generated based on the plurality of utility status signals. A second plurality of electromagnetic waves are generated for transmission via the guided wave transceiver. The second plurality of electromagnetic waves are guided by the at least one transmission medium and propagate without utilizing an electrical return path, and the second plurality of electromagnetic waves include least one control signal that includes at least one utility deployment instruction for at least one of the plurality of supervised sites based on the utility control data.

In accordance with one or more embodiments, a method for use by a broadcast communication system that includes a processor and a guided wave transceiver includes detecting a first power outage. A first plurality of electromagnetic waves are generated for transmission to a plurality of user devices of the broadcast communication system via the guided wave transceiver, where the first plurality of electromagnetic waves include an outage status signal generated in response to detecting the first power outage, and where the first plurality of electromagnetic waves are guided by at least one transmission medium and propagate without utilizing an electrical return path.

In accordance with one or more embodiments, a method for use by a surveillance system that includes a processor and a guided wave transceiver includes generating surveillance data based on sensor input to at least one sensor device coupled to the surveillance system. A plurality of electromagnetic waves are generated for transmission to an administrator of the surveillance system via the guided wave transceiver, where the plurality of electromagnetic waves are guided by at least one transmission medium and propagate without utilizing an electrical return path, and where the plurality of electromagnetic waves include a surveillance data signal generated based on the surveillance data.

Referring now to FIG. 1, a block diagram 100 illustrating an example, non-limiting embodiment of a guided wave communications system is shown. In operation, a transmission device 101 receives one or more communication signals 110 from a communication network or other communications device that includes data and generates guided waves 120 to convey the data via the transmission medium 125 to the transmission device 102. The transmission device 102 receives the guided waves 120 and converts them to communication signals 112 that include the data for transmission to a communications network or other communications device. The guided waves 120 can be modulated to convey data via a modulation technique such as phase shift keying, frequency shift keying, quadrature amplitude modulation, amplitude modulation, multi-carrier modulation such as orthogonal frequency division multiplexing and via multiple access techniques such as frequency division multiplexing, time division multiplexing, code division multiplexing, multiplexing via differing wave propagation modes and via other modulation and access strategies.

The communication network or networks can include a wireless communication network such as a mobile data network, a cellular voice and data network, a wireless local area network (e.g., WiFi or an 802.xx network), a satellite communications network, a personal area network or other wireless network. The communication network or networks can also include a wired communication network such as a telephone network, an Ethernet network, a local area network, a wide area network such as the Internet, a broadband access network, a cable network, a fiber optic network, or other wired network. The communication devices can include a network edge device, bridge device or home gateway, a set-top box, broadband modem, telephone adapter, access point, base station, or other fixed communication device, a mobile communication device such as an automotive gateway or automobile, laptop computer, tablet, smartphone, cellular telephone, or other communication device.

In an example embodiment, the guided wave communication system 100 can operate in a bi-directional fashion where transmission device 102 receives one or more communication signals 112 from a communication network or device that includes other data and generates guided waves 122 to convey the other data via the transmission medium 125 to the transmission device 101. In this mode of operation, the transmission device 101 receives the guided waves 122 and converts them to communication signals 110 that include the other data for transmission to a communications network or device. The guided waves 122 can be modulated to convey data via a modulation technique such as phase shift keying, frequency shift keying, quadrature amplitude modulation, amplitude modulation, multi-carrier modulation such as orthogonal frequency division multiplexing and via multiple access techniques such as frequency division multiplexing, time division multiplexing, code division multiplexing, multiplexing via differing wave propagation modes and via other modulation and access strategies.

The transmission medium 125 can include a cable having at least one inner portion surrounded by a dielectric material such as an insulator or other dielectric cover, coating or other dielectric material, the dielectric material having an outer surface and a corresponding circumference. In an example embodiment, the transmission medium 125 operates as a single-wire transmission line to guide the transmission of an electromagnetic wave. When the transmission medium 125 is implemented as a single wire transmission system, it can include a wire. The wire can be insulated or uninsulated, and single-stranded or multi-stranded (e.g., braided). In other embodiments, the transmission medium 125 can contain conductors of other shapes or configurations including wire bundles, cables, rods, rails, pipes. In addition, the transmission medium 125 can include non-conductors such as dielectric pipes, rods, rails, or other dielectric members; combinations of conductors and dielectric materials, conductors without dielectric materials or other guided wave transmission media. It should be noted that the transmission medium 125 can otherwise include any of the transmission media previously discussed.

Further, as previously discussed, the guided waves 120 and 122 can be contrasted with radio transmissions over free space/air or conventional propagation of electrical power or signals through the conductor of a wire via an electrical circuit. In addition to the propagation of guided waves 120 and 122, the transmission medium 125 may optionally contain one or more wires that propagate electrical power or other communication signals in a conventional manner as a part of one or more electrical circuits.

Figure 2:
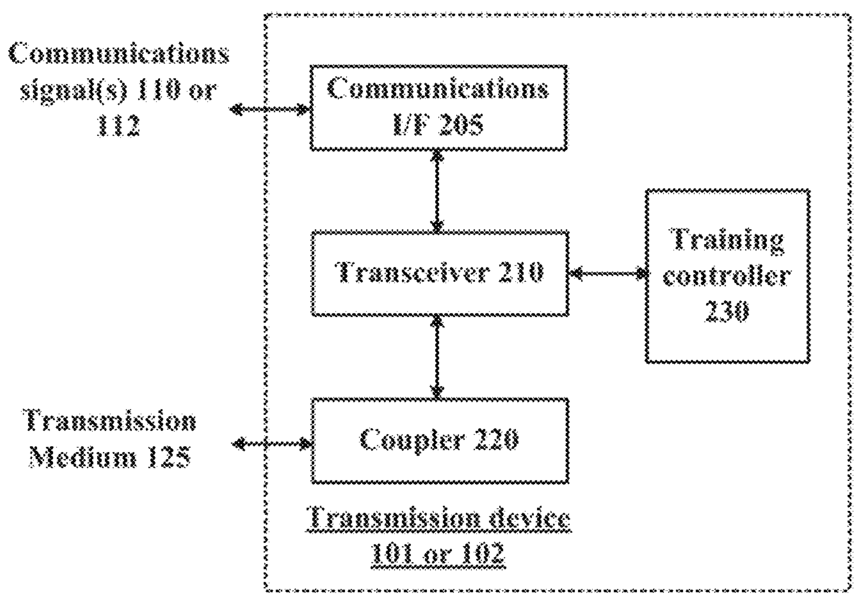
FIG. 2 is a block diagram illustrating an example, non-limiting embodiment of a transmission device in accordance with various aspects described herein.

Referring now to FIG. 2, a block diagram 200 illustrating an example, non-limiting embodiment of a transmission device is shown. The transmission device 101 or 102 includes a communications interface (I/F) 205, a transceiver 210 and a coupler 220.

In an example of operation, the communications interface 205 receives a communication signal 110 or 112 that includes data. In various embodiments, the communications interface 205 can include a wireless interface for receiving a wireless communication signal in accordance with a wireless standard protocol such as LTE or other cellular voice and data protocol, WiFi or an 802.11 protocol, WIMAX protocol, Ultra Wideband protocol, Bluetooth protocol, ZigBee protocol, a direct broadcast satellite (DBS) or other satellite communication protocol or other wireless protocol. In addition or in the alternative, the communications interface 205 includes a wired interface that operates in accordance with an Ethernet protocol, universal serial bus (USB) protocol, a data over cable service interface specification (DOCSIS) protocol, a digital subscriber line (DSL) protocol, a Firewire (IEEE 1394) protocol, or other wired protocol. In additional to standards-based protocols, the communications interface 205 can operate in conjunction with other wired or wireless protocol. In addition, the communications interface 205 can optionally operate in conjunction with a protocol stack that includes multiple protocol layers including a MAC protocol, transport protocol, application protocol, etc.

In an example of operation, the transceiver 210 generates an electromagnetic wave based on the communication signal 110 or 112 to convey the data. The electromagnetic wave has at least one carrier frequency and at least one corresponding wavelength. The carrier frequency can be within a millimeter-wave frequency band of 30 GHz-300 GHz, such as 60 GHz or a carrier frequency in the range of 30-40 GHz or a lower frequency band of 300 MHz-30 GHz in the microwave frequency range such as 26-30 GHz, 11 GHz, 6 GHz or 3 GHz, but it will be appreciated that other carrier frequencies are possible in other embodiments. In one mode of operation, the transceiver 210 merely upconverts the communications signal or signals 110 or 112 for transmission of the electromagnetic signal in the microwave or millimeter-wave band as a guided electromagnetic wave that is guided by or bound to the transmission medium 125. In another mode of operation, the communications interface 205 either converts the communication signal 110 or 112 to a baseband or near baseband signal or extracts the data from the communication signal 110 or 112 and the transceiver 210 modulates a high-frequency carrier with the data, the baseband or near baseband signal for transmission. It should be appreciated that the transceiver 210 can modulate the data received via the communication signal 110 or 112 to preserve one or more data communication protocols of the communication signal 110 or 112 either by encapsulation in the payload of a different protocol or by simple frequency shifting. In the alternative, the transceiver 210 can otherwise translate the data received via the communication signal 110 or 112 to a protocol that is different from the data communication protocol or protocols of the communication signal 110 or 112.

In an example of operation, the coupler 220 couples the electromagnetic wave to the transmission medium 125 as a guided electromagnetic wave to convey the communications signal or signals 110 or 112. While the prior description has focused on the operation of the transceiver 210 as a transmitter, the transceiver 210 can also operate to receive electromagnetic waves that convey other data from the single wire transmission medium via the coupler 220 and to generate communications signals 110 or 112, via communications interface 205 that includes the other data. Consider embodiments where an additional guided electromagnetic wave conveys other data that also propagates along the transmission medium 125. The coupler 220 can also couple this additional electromagnetic wave from the transmission medium 125 to the transceiver 210 for reception.

The transmission device 101 or 102 includes an optional training controller 230. In an example embodiment, the training controller 230 is implemented by a standalone processor or a processor that is shared with one or more other components of the transmission device 101 or 102. The training controller 230 selects the carrier frequencies, modulation schemes and/or guided wave modes for the guided electromagnetic waves based on feedback data received by the transceiver 210 from at least one remote transmission device coupled to receive the guided electromagnetic wave.

In an example embodiment, a guided electromagnetic wave transmitted by a remote transmission device 101 or 102 conveys data that also propagates along the transmission medium 125. The data from the remote transmission device 101 or 102 can be generated to include the feedback data. In operation, the coupler 220 also couples the guided electromagnetic wave from the transmission medium 125 and the transceiver receives the electromagnetic wave and processes the electromagnetic wave to extract the feedback data.

In an example embodiment, the training controller 230 operates based on the feedback data to evaluate a plurality of candidate frequencies, modulation schemes and/or transmission modes to select a carrier frequency, modulation scheme and/or transmission mode to enhance performance, such as throughput, signal strength, reduce propagation loss, etc.

Consider the following example: a transmission device 101 begins operation under control of the training controller 230 by sending a plurality of guided waves as test signals such as pilot waves or other test signals at a corresponding plurality of candidate frequencies and/or candidate modes directed to a remote transmission device 102 coupled to the transmission medium 125. The guided waves can include, in addition or in the alternative, test data. The test data can indicate the particular candidate frequency and/or guide-wave mode of the signal. In an embodiment, the training controller 230 at the remote transmission device 102 receives the test signals and/or test data from any of the guided waves that were properly received and determines the best candidate frequency and/or guided wave mode, a set of acceptable candidate frequencies and/or guided wave modes, or a rank ordering of candidate frequencies and/or guided wave modes. This selection of candidate frequenc(ies) or/and guided-mode(s) are generated by the training controller 230 based on one or more optimizing criteria such as received signal strength, bit error rate, packet error rate, signal to noise ratio, propagation loss, etc. The training controller 230 generates feedback data that indicates the selection of candidate frequenc(ies) or/and guided wave mode(s) and sends the feedback data to the transceiver 210 for transmission to the transmission device 101. The transmission device 101 and 102 can then communicate data with one another based on the selection of candidate frequenc(ies) or/and guided wave mode(s).

In other embodiments, the guided electromagnetic waves that contain the test signals and/or test data are reflected back, repeated back or otherwise looped back by the remote transmission device 102 to the transmission device 101 for reception and analysis by the training controller 230 of the transmission device 101 that initiated these waves. For example, the transmission device 101 can send a signal to the remote transmission device 102 to initiate a test mode where a physical reflector is switched on the line, a termination impedance is changed to cause reflections, a loop back mode is switched on to couple electromagnetic waves back to the source transmission device 102, and/or a repeater mode is enabled to amplify and retransmit the electromagnetic waves back to the source transmission device 102. The training controller 230 at the source transmission device 102 receives the test signals and/or test data from any of the guided waves that were properly received and determines selection of candidate frequenc(ies) or/and guided wave mode(s).

While the procedure above has been described in a start-up or initialization mode of operation, each transmission device 101 or 102 can send test signals, evaluate candidate frequencies or guided wave modes via non-test such as normal transmissions or otherwise evaluate candidate frequencies or guided wave modes at other times or continuously as well. In an example embodiment, the communication protocol between the transmission devices 101 and 102 can include an on-request or periodic test mode where either full testing or more limited testing of a subset of candidate frequencies and guided wave modes are tested and evaluated. In other modes of operation, the re-entry into such a test mode can be triggered by a degradation of performance due to a disturbance, weather conditions, etc. In an example embodiment, the receiver bandwidth of the transceiver 210 is either sufficiently wide or swept to receive all candidate frequencies or can be selectively adjusted by the training controller 230 to a training mode where the receiver bandwidth of the transceiver 210 is sufficiently wide or swept to receive all candidate frequencies.

Figure 3:
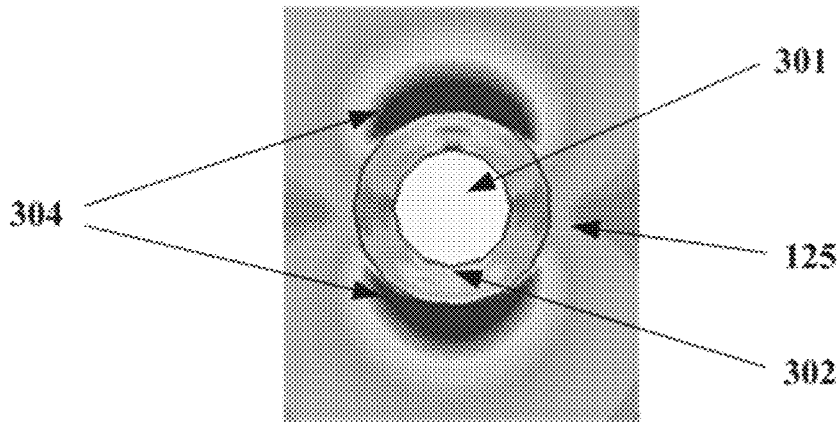
FIG. 3 is a graphical diagram illustrating an example, non-limiting embodiment of an electromagnetic field distribution in accordance with various aspects described herein.

Referring now to FIG. 3, a graphical diagram 300 illustrating an example, non-limiting embodiment of an electromagnetic field distribution is shown. In this embodiment, a transmission medium 125 in air includes an inner conductor 301 and an insulating jacket 302 of dielectric material, as shown in cross section. The diagram 300 includes different gray-scales that represent differing electromagnetic field strengths generated by the propagation of the guided wave having an asymmetrical and non-fundamental guided wave mode.

In particular, the electromagnetic field distribution corresponds to a modal "sweet spot" that enhances guided electromagnetic wave propagation along an insulated transmission medium and reduces end-to-end transmission loss. In this particular mode, electromagnetic waves are guided by the transmission medium 125 to propagate along an outer surface of the transmission medium—in this case, the outer surface of the insulating jacket 302. Electromagnetic waves are partially embedded in the insulator and partially radiating on the outer surface of the insulator. In this fashion, electromagnetic waves are "lightly" coupled to the insulator so as to enable electromagnetic wave propagation at long distances with low propagation loss.

As shown, the guided wave has a field structure that lies primarily or substantially outside of the transmission medium 125 that serves to guide the electromagnetic waves. The regions inside the conductor 301 have little or no field. Likewise, regions inside the insulating jacket 302 have low field strength. The majority of the electromagnetic field strength is distributed in the lobes 304 at the outer surface of the insulating jacket 302 and in close proximity thereof. The presence of an asymmetric guided wave mode is shown by the high electromagnetic field strengths at the top and bottom of the outer surface of the insulating jacket 302 (in the orientation of the diagram)—as opposed to very small field strengths on the other sides of the insulating jacket 302.

The example shown corresponds to a 38 GHz electromagnetic wave guided by a wire with a diameter of 1.1 cm and a dielectric insulation of thickness of 0.36 cm. Because the electromagnetic wave is guided by the transmission medium 125 and the majority of the field strength is concentrated in the air outside of the insulating jacket 302 within a limited distance of the outer surface, the guided wave can propagate longitudinally down the transmission medium 125 with very low loss. In the example shown, this "limited distance" corresponds to a distance from the outer surface that is less than half the largest cross sectional dimension of the transmission medium 125. In this case, the largest cross sectional dimension of the wire corresponds to the overall diameter of 1.82 cm, however, this value can vary with the size and shape of the transmission medium 125. For example, should the transmission medium 125 be of a rectangular shape with a height of 0.3 cm and a width of 0.4 cm, the largest cross sectional dimension would be the diagonal of 0.5 cm and the corresponding limited distance would be 0.25 cm. The dimensions of the area containing the majority of the field strength also vary with the frequency, and in general, increase as carrier frequencies decrease.

It should also be noted that the components of a guided wave communication system, such as couplers and transmission media can have their own cut-off frequencies for each guided wave mode. The cut-off frequency generally sets forth the lowest frequency that a particular guided wave mode is designed to be supported by that particular component. In an example embodiment, the particular asymmetric mode of propagation shown is induced on the transmission medium 125 by an electromagnetic wave having a frequency that falls within a limited range (such as Fc to 2Fc) of the lower cut-off frequency Fc for this particular asymmetric mode. The lower cut-off frequency Fc is particular to the characteristics of transmission medium 125. For embodiments as shown that include an inner conductor 301 surrounded by an insulating jacket 302, this cutoff frequency can vary based on the dimensions and properties of the insulating jacket 302 and potentially the dimensions and properties of the inner conductor 301 and can be determined experimentally to have a desired mode pattern. It should be noted however, that similar effects can be found for a hollow dielectric or insulator without an inner conductor. In this case, the cutoff frequency can vary based on the dimensions and properties of the hollow dielectric or insulator.

At frequencies lower than the lower cut-off frequency, the asymmetric mode is difficult to induce in the transmission medium 125 and fails to propagate for all but trivial distances. As the frequency increases above the limited range of frequencies about the cut-off frequency, the asymmetric mode shifts more and more inward of the insulating jacket 302. At frequencies much larger than the cut-off frequency, the field strength is no longer concentrated outside of the insulating jacket, but primarily inside of the insulating jacket 302. While the transmission medium 125 provides strong guidance to the electromagnetic wave and propagation is still possible, ranges are more limited by increased losses due to propagation within the insulating jacket 302—as opposed to the surrounding air.

Figure 4:
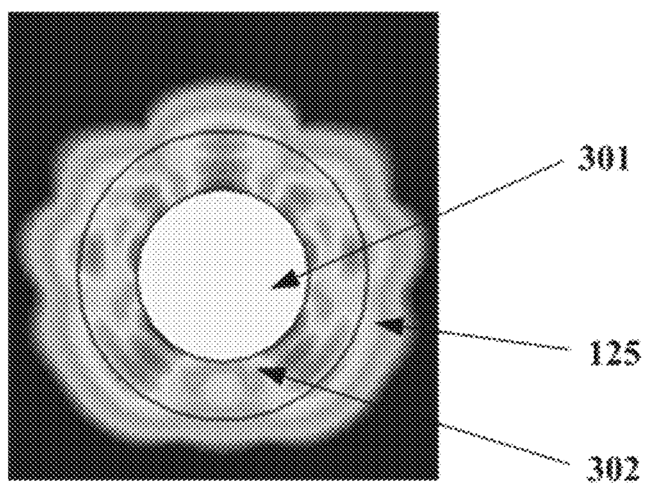
FIG. 4 is a graphical diagram illustrating an example, non-limiting embodiment of an electromagnetic field distribution in accordance with various aspects described herein.

Referring now to FIG. 4, a graphical diagram 400 illustrating an example, non-limiting embodiment of an electromagnetic field distribution is shown. In particular, a cross section diagram 400, similar to FIG. 3 is shown with common reference numerals used to refer to similar elements. The example shown corresponds to a 60 GHz wave guided by a wire with a diameter of 1.1 cm and a dielectric insulation of thickness of 0.36 cm. Because the frequency of the guided wave is above the limited range of the cut-off frequency of this particular asymmetric mode, much of the field strength has shifted inward of the insulating jacket 302. In particular, the field strength is concentrated primarily inside of the insulating jacket 302. While the transmission medium 125 provides strong guidance to the electromagnetic wave and propagation is still possible, ranges are more limited when compared with the embodiment of FIG. 3, by increased losses due to propagation within the insulating jacket 302.

Figure 5A:
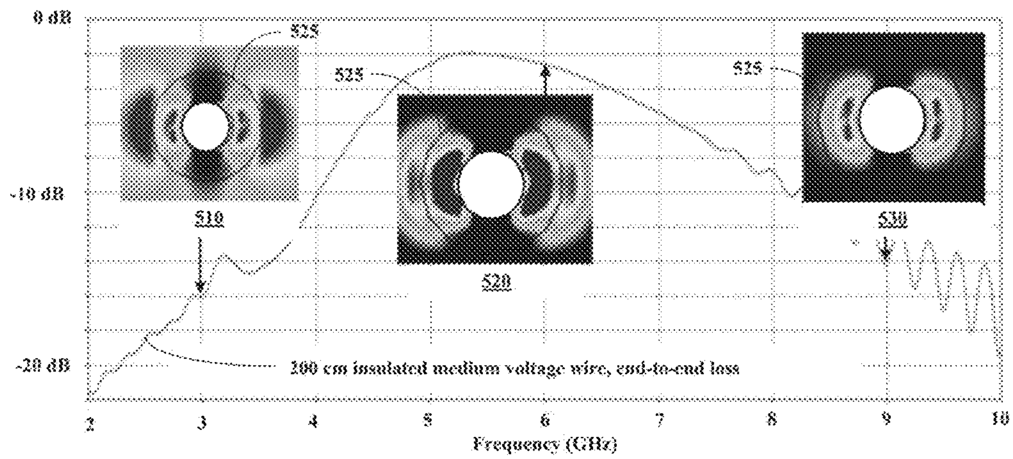
FIG. 5A is a graphical diagram illustrating an example, non-limiting embodiment of a frequency response in accordance with various aspects described herein.

Referring now to FIG. 5A, a graphical diagram illustrating an example, non-limiting embodiment of a frequency response is shown. In particular, diagram 500 presents a graph of end-to-end loss (in dB) as a function of frequency, overlaid with electromagnetic field distributions 510, 520 and 530 at three points for a 200 cm insulated medium voltage wire. The boundary between the insulator and the surrounding air is represented by reference numeral 525 in each electromagnetic field distribution.

As discussed in conjunction with FIG. 3, an example of a desired asymmetric mode of propagation shown is induced on the transmission medium 125 by an electromagnetic wave having a frequency that falls within a limited range (such as Fc to 2Fc) of the lower cut-off frequency Fc of the transmission medium for this particular asymmetric mode. In particular, the electromagnetic field distribution 520 at 6 GHz falls within this modal "sweet spot" that enhances electromagnetic wave propagation along an insulated transmission medium and reduces end-to-end transmission loss. In this particular mode, guided waves are partially embedded in the insulator and partially radiating on the outer surface of the insulator. In this fashion, the electromagnetic waves are "lightly" coupled to the insulator so as to enable guided electromagnetic wave propagation at long distances with low propagation loss.

At lower frequencies represented by the electromagnetic field distribution 510 at 3 GHz, the asymmetric mode radiates more heavily generating higher propagation losses. At higher frequencies represented by the electromagnetic field distribution 530 at 9 GHz, the asymmetric mode shifts more and more inward of the insulating jacket providing too much absorption, again generating higher propagation losses.

Figure 5B:
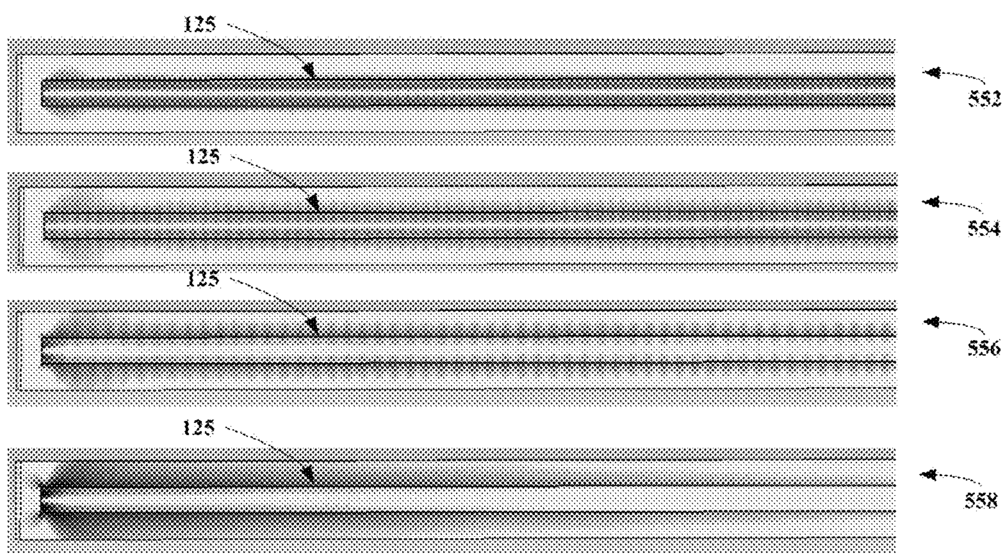
FIG. 5B is a graphical diagram illustrating example, non-limiting embodiments of a longitudinal cross-section of an insulated wire depicting fields of guided electromagnetic waves at various operating frequencies in accordance with various aspects described herein.

Referring now to FIG. 5B, a graphical diagram 550 illustrating example, non-limiting embodiments of a longitudinal cross-section of a transmission medium 125, such as an insulated wire, depicting fields of guided electromagnetic waves at various operating frequencies is shown. As shown in diagram 556, when the guided electromagnetic waves are at approximately the cutoff frequency ($f_c$) corresponding to the modal "sweet spot", the guided electromagnetic waves are loosely coupled to the insulated wire so that absorption is reduced, and the fields of the guided electromagnetic waves are bound sufficiently to reduce the amount radiated into the environment (e.g., air). Because absorption and radiation of the fields of the guided electromagnetic waves is low, propagation losses are consequently low, enabling the guided electromagnetic waves to propagate for longer distances.

As shown in diagram 554, propagation losses increase when an operating frequency of the guide electromagnetic waves increases above about two-times the cutoff frequency ($f_c$)—or as referred to, above the range of the "sweet spot". More of the field strength of the electromagnetic wave is driven inside the insulating layer, increasing propagation losses. At frequencies much higher than the cutoff frequency ($f_c$) the guided electromagnetic waves are strongly bound to the insulated wire as a result of the fields emitted by the guided electromagnetic waves being concentrated in the insulation layer of the wire, as shown in diagram 552. This in turn raises propagation losses further due to absorption of the guided electromagnetic waves by the insulation layer. Similarly, propagation losses increase when the operating frequency of the guided electromagnetic waves is substantially below the cutoff frequency ($f_c$), as shown in diagram 558. At frequencies much lower than the cutoff frequency ($f_c$) the guided electromagnetic waves are weakly (or nominally) bound to the insulated wire and thereby tend to radiate into the environment (e.g., air), which in turn, raises propagation losses due to radiation of the guided electromagnetic waves.

Figure 6:
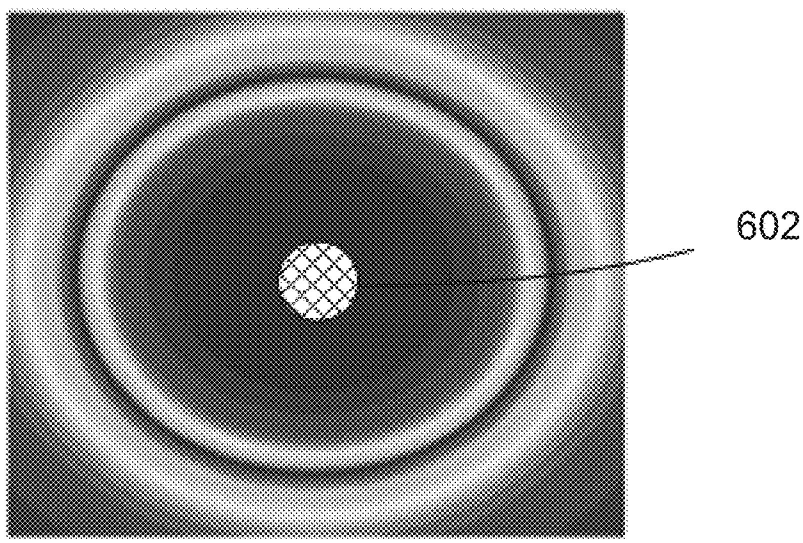
FIG. 6 is a graphical diagram illustrating an example, non-limiting embodiment of an electromagnetic field distribution in accordance with various aspects described herein.

Referring now to FIG. 6, a graphical diagram 600 illustrating an example, non-limiting embodiment of an electromagnetic field distribution is shown. In this embodiment, a transmission medium 602 is a bare wire, as shown in cross section. The diagram 300 includes different gray-scales that represent differing electromagnetic field strengths generated by the propagation of a guided wave having a symmetrical and fundamental guided wave mode at a single carrier frequency.

In this particular mode, electromagnetic waves are guided by the transmission medium 602 to propagate along an outer surface of the transmission medium—in this case, the outer surface of the bare wire. Electromagnetic waves are "lightly" coupled to the wire so as to enable electromagnetic wave propagation at long distances with low propagation loss. As shown, the guided wave has a field structure that lies substantially outside of the transmission medium 602 that serves to guide the electromagnetic waves. The regions inside the conductor have little or no field.

Figure 7:
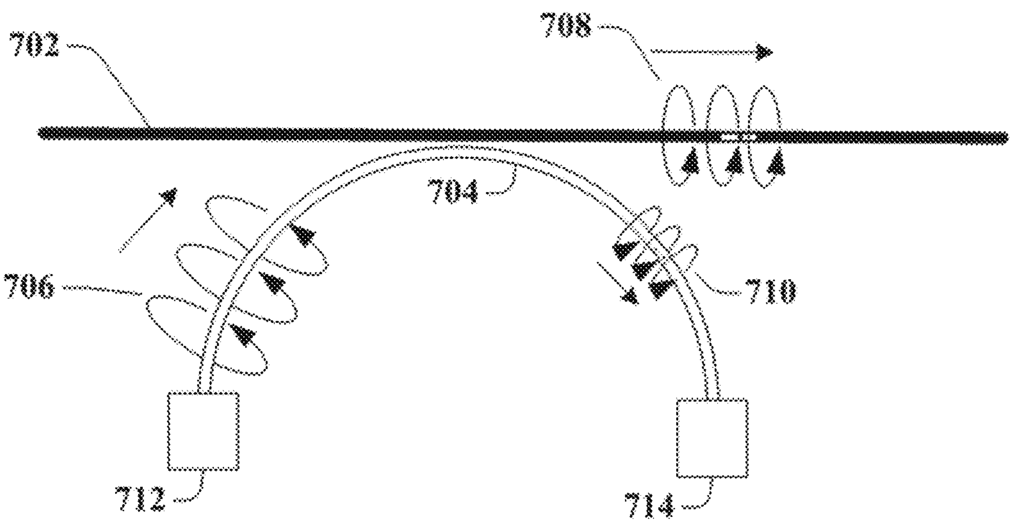
FIG. 7 is a block diagram illustrating an example, non-limiting embodiment of an arc coupler in accordance with various aspects described herein.

Referring now to FIG. 7, a block diagram 700 illustrating an example, non-limiting embodiment of an arc coupler is shown. In particular, a coupling device is presented for use in a transmission device, such as transmission device 101 or 102 presented in conjunction with FIG. 1. The coupling device includes an arc coupler 704 coupled to a transmitter circuit 712 and termination or damper 714. The arc coupler 704 can be made of a dielectric material, or other low-loss insulator (e.g., Teflon, polyethylene, etc.), or made of a conducting (e.g., metallic, non-metallic, etc.) material, or any combination of the foregoing materials. As shown, the arc coupler 704 operates as a waveguide and has a wave 706 propagating as a guided wave about a waveguide surface of the arc coupler 704. In the embodiment shown, at least a portion of the arc coupler 704 can be placed near a wire 702 or other transmission medium, (such as transmission medium 125), in order to facilitate coupling between the arc coupler 704 and the wire 702 or other transmission medium, as described herein to launch the guided wave 708 on the wire. The arc coupler 704 can be placed such that a portion of the curved arc coupler 704 is tangential to, and parallel or substantially parallel to the wire 702. The portion of the arc coupler 704 that is parallel to the wire can be an apex of the curve, or any point where a tangent of the curve is parallel to the wire 702. When the arc coupler 704 is positioned or placed thusly, the wave 706 travelling along the arc coupler 704 couples, at least in part, to the wire 702, and propagates as guided wave 708 around or about the wire surface of the wire 702 and longitudinally along the wire 702. The guided wave 708 can be characterized as a surface wave or other electromagnetic wave that is guided by or bound to the wire 702 or other transmission medium.

A portion of the wave 706 that does not couple to the wire 702 propagates as a wave 710 along the arc coupler 704. It will be appreciated that the arc coupler 704 can be configured and arranged in a variety of positions in relation to the wire 702 to achieve a desired level of coupling or non-coupling of the wave 706 to the wire 702. For example, the curvature and/or length of the arc coupler 704 that is parallel or substantially parallel, as well as its separation distance (which can include zero separation distance in an embodiment), to the wire 702 can be varied without departing from example embodiments. Likewise, the arrangement of arc coupler 704 in relation to the wire 702 may be varied based upon considerations of the respective intrinsic characteristics (e.g., thickness, composition, electromagnetic properties, etc.) of the wire 702 and the arc coupler 704, as well as the characteristics (e.g., frequency, energy level, etc.) of the waves 706 and 708.

The guided wave 708 stays parallel or substantially parallel to the wire 702, even as the wire 702 bends and flexes. Bends in the wire 702 can increase transmission losses, which are also dependent on wire diameters, frequency, and materials. If the dimensions of the arc coupler 704 are chosen for efficient power transfer, most of the power in the wave 706 is transferred to the wire 702, with little power remaining in wave 710. It will be appreciated that the guided wave 708 can still be multi-modal in nature (discussed herein), including having modes that are non-fundamental or asymmetric, while traveling along a path that is parallel or substantially parallel to the wire 702, with or without a fundamental transmission mode. In an embodiment, non-fundamental or asymmetric modes can be utilized to minimize transmission losses and/or obtain increased propagation distances.

It is noted that the term parallel is generally a geometric construct which often is not exactly achievable in real systems. Accordingly, the term parallel as utilized in the subject disclosure represents an approximation rather than an exact configuration when used to describe embodiments disclosed in the subject disclosure. In an embodiment, substantially parallel can include approximations that are within 30 degrees of true parallel in all dimensions.

In an embodiment, the wave 706 can exhibit one or more wave propagation modes. The arc coupler modes can be dependent on the shape and/or design of the coupler 704. The one or more arc coupler modes of wave 706 can generate, influence, or impact one or more wave propagation modes of the guided wave 708 propagating along wire 702. It should be particularly noted however that the guided wave modes present in the guided wave 706 may be the same or different from the guided wave modes of the guided wave 708. In this fashion, one or more guided wave modes of the guided wave 706 may not be transferred to the guided wave 708, and further one or more guided wave modes of guided wave 708 may not have been present in guided wave 706. It should also be noted that the cut-off frequency of the arc coupler 704 for a particular guided wave mode may be different than the cutoff frequency of the wire 702 or other transmission medium for that same mode. For example, while the wire 702 or other transmission medium may be operated slightly above its cutoff frequency for a particular guided wave mode, the arc coupler 704 may be operated well above its cut-off frequency for that same mode for low loss, slightly below its cut-off frequency for that same mode to, for example, induce greater coupling and power transfer, or some other point in relation to the arc coupler's cutoff frequency for that mode.

In an embodiment, the wave propagation modes on the wire 702 can be similar to the arc coupler modes since both waves 706 and 708 propagate about the outside of the arc coupler 704 and wire 702 respectively. In some embodiments, as the wave 706 couples to the wire 702, the modes can change form, or new modes can be created or generated, due to the coupling between the arc coupler 704 and the wire 702. For example, differences in size, material, and/or impedances of the arc coupler 704 and wire 702 may create additional modes not present in the arc coupler modes and/or suppress some of the arc coupler modes. The wave propagation modes can comprise the fundamental transverse electromagnetic mode (Quasi-$TEM_{00}$), where only small electric and/or magnetic fields extend in the direction of propagation, and the electric and magnetic fields extend radially outwards while the guided wave propagates along the wire. This guided wave mode can be donut shaped, where few of the electromagnetic fields exist within the arc coupler 704 or wire 702.

Waves 706 and 708 can comprise a fundamental TEM mode where the fields extend radially outwards, and also comprise other, non-fundamental (e.g., asymmetric, higher-level, etc.) modes. While particular wave propagation modes are discussed above, other wave propagation modes are likewise possible such as transverse electric (TE) and transverse magnetic (TM) modes, based on the frequencies employed, the design of the arc coupler 704, the dimensions and composition of the wire 702, as well as its surface characteristics, its insulation if present, the electromagnetic properties of the surrounding environment, etc. It should be noted that, depending on the frequency, the electrical and physical characteristics of the wire 702 and the particular wave propagation modes that are generated, guided wave 708 can travel along the conductive surface of an oxidized uninsulated wire, an unoxidized uninsulated wire, an insulated wire and/or along the insulating surface of an insulated wire.

In an embodiment, a diameter of the arc coupler 704 is smaller than the diameter of the wire 702. For the millimeter-band wavelength being used, the arc coupler 704 supports a single waveguide mode that makes up wave 706. This single waveguide mode can change as it couples to the wire 702 as guided wave 708. If the arc coupler 704 were larger, more than one waveguide mode can be supported, but these additional waveguide modes may not couple to the wire 702 as efficiently, and higher coupling losses can result. However, in some alternative embodiments, the diameter of the arc coupler 704 can be equal to or larger than the diameter of the wire 702, for example, where higher coupling losses are desirable or when used in conjunction with other techniques to otherwise reduce coupling losses (e.g., impedance matching with tapering, etc.).

In an embodiment, the wavelength of the waves 706 and 708 are comparable in size, or smaller than a circumference of the arc coupler 704 and the wire 702. In an example, if the wire 702 has a diameter of 0.5 cm, and a corresponding circumference of around 1.5 cm, the wavelength of the transmission is around 1.5 cm or less, corresponding to a frequency of 70 GHz or greater. In another embodiment, a suitable frequency of the transmission and the carrier-wave signal is in the range of 30-100 GHz, perhaps around 30-60 GHz, and around 38 GHz in one example. In an embodiment, when the circumference of the arc coupler 704 and wire 702 is comparable in size to, or greater, than a wavelength of the transmission, the waves 706 and 708 can exhibit multiple wave propagation modes including fundamental and/or non-fundamental (symmetric and/or asymmetric) modes that propagate over sufficient distances to support various communication systems described herein. The waves 706 and 708 can therefore comprise more than one type of electric and magnetic field configuration. In an embodiment, as the guided wave 708 propagates down the wire 702, the electrical and magnetic field configurations will remain the same from end to end of the wire 702. In other embodiments, as the guided wave 708 encounters interference (distortion or obstructions) or loses energy due to transmission losses or scattering, the electric and magnetic field configurations can change as the guided wave 708 propagates down wire 702.

In an embodiment, the arc coupler 704 can be composed of nylon, Teflon, polyethylene, a polyamide, or other plastics. In other embodiments, other dielectric materials are possible. The wire surface of wire 702 can be metallic with either a bare metallic surface, or can be insulated using plastic, dielectric, insulator or other coating, jacket or sheathing. In an embodiment, a dielectric or otherwise non-conducting/insulated waveguide can be paired with either a bare/metallic wire or insulated wire. In other embodiments, a metallic and/or conductive waveguide can be paired with a bare/metallic wire or insulated wire. In an embodiment, an oxidation layer on the bare metallic surface of the wire 702 (e.g., resulting from exposure of the bare metallic surface to oxygen/air) can also provide insulating or dielectric properties similar to those provided by some insulators or sheathings.

It is noted that the graphical representations of waves 706, 708 and 710 are presented merely to illustrate the principles that wave 706 induces or otherwise launches a guided wave 708 on a wire 702 that operates, for example, as a single wire transmission line. Wave 710 represents the portion of wave 706 that remains on the arc coupler 704 after the generation of guided wave 708. The actual electric and magnetic fields generated as a result of such wave propagation may vary depending on the frequencies employed, the particular wave propagation mode or modes, the design of the arc coupler 704, the dimensions and composition of the wire 702, as well as its surface characteristics, its optional insulation, the electromagnetic properties of the surrounding environment, etc.

It is noted that arc coupler 704 can include a termination circuit or damper 714 at the end of the arc coupler 704 that can absorb leftover radiation or energy from wave 710. The termination circuit or damper 714 can prevent and/or minimize the leftover radiation or energy from wave 710 reflecting back toward transmitter circuit 712. In an embodiment, the termination circuit or damper 714 can include termination resistors, and/or other components that perform impedance matching to attenuate reflection. In some embodiments, if the coupling efficiencies are high enough, and/or wave 710 is sufficiently small, it may not be necessary to use a termination circuit or damper 714. For the sake of simplicity, these transmitter 712 and termination circuits or dampers 714 may not be depicted in the other figures, but in those embodiments, transmitter and termination circuits or dampers may possibly be used.

Further, while a single arc coupler 704 is presented that generates a single guided wave 708, multiple arc couplers 704 placed at different points along the wire 702 and/or at different azimuthal orientations about the wire can be employed to generate and receive multiple guided waves 708 at the same or different frequencies, at the same or different phases, at the same or different wave propagation modes.

Figure 8:
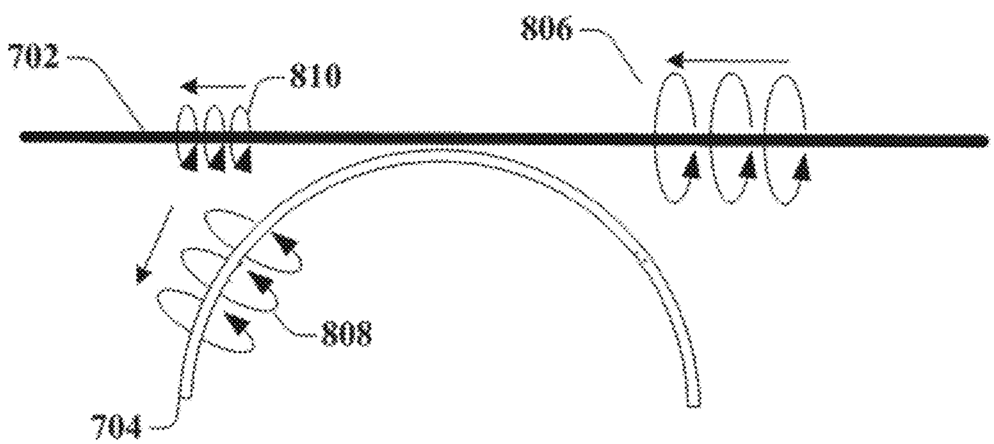
FIG. 8 is a block diagram illustrating an example, non-limiting embodiment of an arc coupler in accordance with various aspects described herein.

FIG. 8, a block diagram 800 illustrating an example, non-limiting embodiment of an arc coupler is shown. In the embodiment shown, at least a portion of the coupler 704 can be placed near a wire 702 or other transmission medium, (such as transmission medium 125), in order to facilitate coupling between the arc coupler 704 and the wire 702 or other transmission medium, to extract a portion of the guided wave 806 as a guided wave 808 as described herein. The arc coupler 704 can be placed such that a portion of the curved arc coupler 704 is tangential to, and parallel or substantially parallel to the wire 702. The portion of the arc coupler 704 that is parallel to the wire can be an apex of the curve, or any point where a tangent of the curve is parallel to the wire 702. When the arc coupler 704 is positioned or placed thusly, the wave 806 travelling along the wire 702 couples, at least in part, to the arc coupler 704, and propagates as guided wave 808 along the arc coupler 704 to a receiving device (not expressly shown). A portion of the wave 806 that does not couple to the arc coupler propagates as wave 810 along the wire 702 or other transmission medium.

In an embodiment, the wave 806 can exhibit one or more wave propagation modes. The arc coupler modes can be dependent on the shape and/or design of the coupler 704. The one or more modes of guided wave 806 can generate, influence, or impact one or more guide-wave modes of the guided wave 808 propagating along the arc coupler 704. It should be particularly noted however that the guided wave modes present in the guided wave 806 may be the same or different from the guided wave modes of the guided wave 808. In this fashion, one or more guided wave modes of the guided wave 806 may not be transferred to the guided wave 808, and further one or more guided wave modes of guided wave 808 may not have been present in guided wave 806.

Figure 9A:
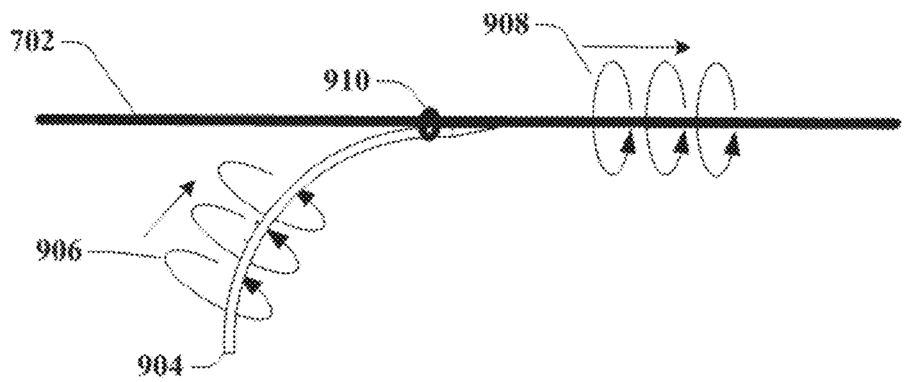
FIG. 9A is a block diagram illustrating an example, non-limiting embodiment of a stub coupler in accordance with various aspects described herein.

Referring now to FIG. 9A, a block diagram 900 illustrating an example, non-limiting embodiment of a stub coupler is shown. In particular, a coupling device that includes stub coupler 904 is presented for use in a transmission device, such as transmission device 101 or 102 presented in conjunction with FIG. 1. The stub coupler 904 can be made of a dielectric material, or other low-loss insulator (e.g., Teflon, polyethylene and etc.), or made of a conducting (e.g., metallic, non-metallic, etc.) material, or any combination of the foregoing materials. As shown, the stub coupler 904 operates as a waveguide and has a wave 906 propagating as a guided wave about a waveguide surface of the stub coupler 904. In the embodiment shown, at least a portion of the stub coupler 904 can be placed near a wire 702 or other transmission medium, (such as transmission medium 125), in order to facilitate coupling between the stub coupler 904 and the wire 702 or other transmission medium, as described herein to launch the guided wave 908 on the wire.

In an embodiment, the stub coupler 904 is curved, and an end of the stub coupler 904 can be tied, fastened, or otherwise mechanically coupled to a wire 702. When the end of the stub coupler 904 is fastened to the wire 702, the end of the stub coupler 904 is parallel or substantially parallel to the wire 702. Alternatively, another portion of the dielectric waveguide beyond an end can be fastened or coupled to wire 702 such that the fastened or coupled portion is parallel or substantially parallel to the wire 702. The fastener 910 can be a nylon cable tie or other type of non-conducting/dielectric material that is either separate from the stub coupler 904 or constructed as an integrated component of the stub coupler 904. The stub coupler 904 can be adjacent to the wire 702 without surrounding the wire 702.

Like the arc coupler 704 described in conjunction with FIG. 7, when the stub coupler 904 is placed with the end parallel to the wire 702, the guided wave 906 travelling along the stub coupler 904 couples to the wire 702, and propagates as guided wave 908 about the wire surface of the wire 702. In an example embodiment, the guided wave 908 can be characterized as a surface wave or other electromagnetic wave.

It is noted that the graphical representations of waves 906 and 908 are presented merely to illustrate the principles that wave 906 induces or otherwise launches a guided wave 908 on a wire 702 that operates, for example, as a single wire transmission line. The actual electric and magnetic fields generated as a result of such wave propagation may vary depending on one or more of the shape and/or design of the coupler, the relative position of the dielectric waveguide to the wire, the frequencies employed, the design of the stub coupler 904, the dimensions and composition of the wire 702, as well as its surface characteristics, its optional insulation, the electromagnetic properties of the surrounding environment, etc.

In an embodiment, an end of stub coupler 904 can taper towards the wire 702 in order to increase coupling efficiencies. Indeed, the tapering of the end of the stub coupler 904 can provide impedance matching to the wire 702 and reduce reflections, according to an example embodiment of the subject disclosure. For example, an end of the stub coupler 904 can be gradually tapered in order to obtain a desired level of coupling between waves 906 and 908 as illustrated in FIG. 9A.

In an embodiment, the fastener 910 can be placed such that there is a short length of the stub coupler 904 between the fastener 910 and an end of the stub coupler 904. Maximum coupling efficiencies are realized in this embodiment when the length of the end of the stub coupler 904 that is beyond the fastener 910 is at least several wavelengths long for whatever frequency is being transmitted.

Figure 9B:
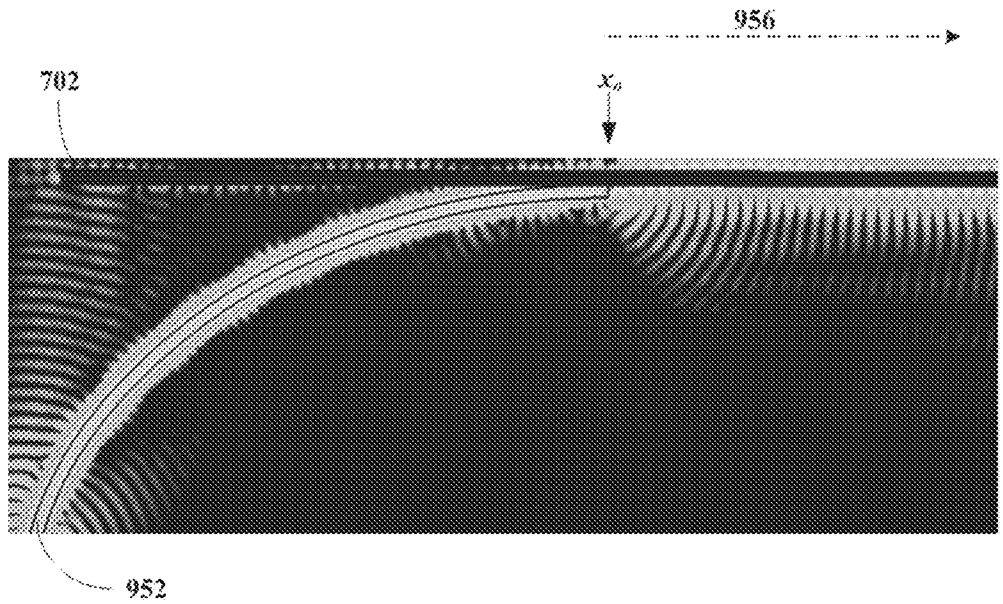
FIG. 9B is a diagram illustrating an example, non-limiting embodiment of an electromagnetic distribution in accordance with various aspects described herein.

Turning now to FIG. 9B, a diagram 950 illustrating an example, non-limiting embodiment of an electromagnetic distribution in accordance with various aspects described herein is shown. In particular, an electromagnetic distribution is presented in two dimensions for a transmission device that includes coupler 952, shown in an example stub coupler constructed of a dielectric material. The coupler 952 couples an electromagnetic wave for propagation as a guided wave along an outer surface of a wire 702 or other transmission medium.

The coupler 952 guides the electromagnetic wave to a junction at $x_0$ via a symmetrical guided wave mode. While some of the energy of the electromagnetic wave that propagates along the coupler 952 is outside of the coupler 952, the majority of the energy of this electromagnetic wave is contained within the coupler 952. The junction at $x_0$ couples the electromagnetic wave to the wire 702 or other transmission medium at an azimuthal angle corresponding to the bottom of the transmission medium. This coupling induces an electromagnetic wave that is guided to propagate along the outer surface of the wire 702 or other transmission medium via at least one guided wave mode in direction 956. The majority of the energy of the guided electromagnetic wave is outside or, but in close proximity to the outer surface of the wire 702 or other transmission medium. In the example shown, the junction at $x_0$ forms an electromagnetic wave that propagates via both a symmetrical mode and at least one asymmetrical surface mode, such as the first order mode presented in conjunction with FIG. 3, that skims the surface of the wire 702 or other transmission medium.

It is noted that the graphical representations of guided waves are presented merely to illustrate an example of guided wave coupling and propagation. The actual electric and magnetic fields generated as a result of such wave propagation may vary depending on the frequencies employed, the design and/or configuration of the coupler 952, the dimensions and composition of the wire 702 or other transmission medium, as well as its surface characteristics, its insulation if present, the electromagnetic properties of the surrounding environment, etc.

Figure 10A:
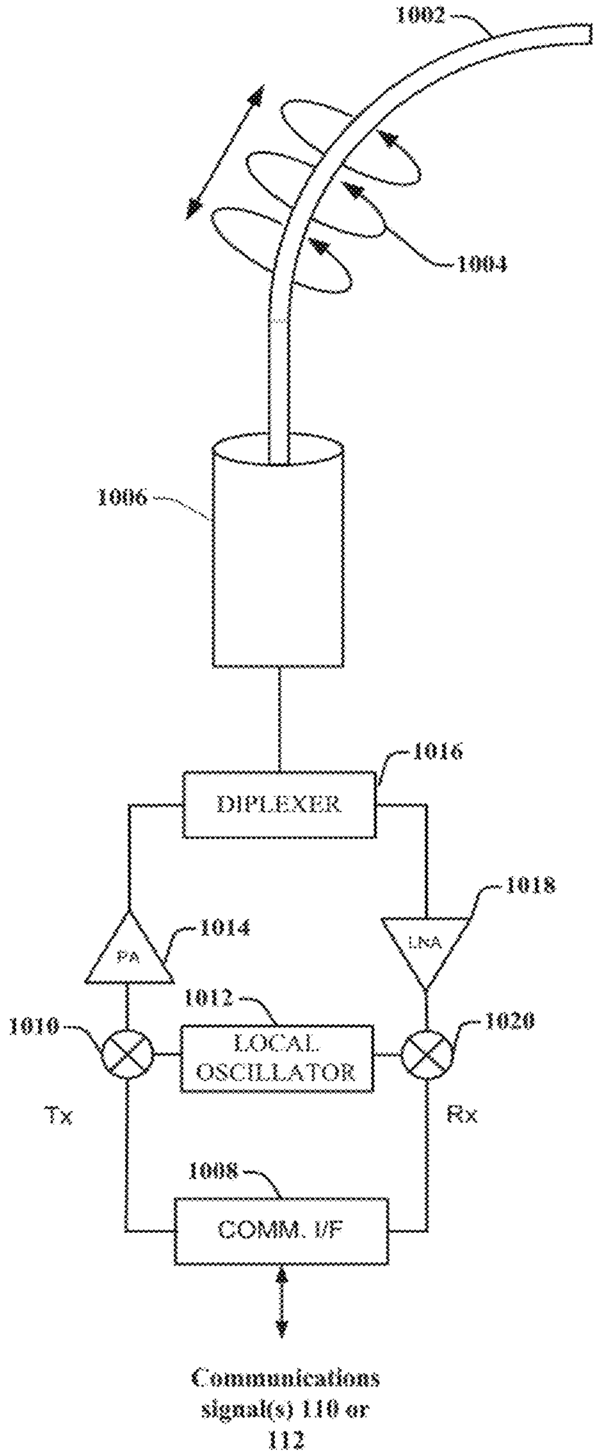
FIGS. 10A and 10B are block diagrams illustrating example, non-limiting embodiments of couplers and transceivers in accordance with various aspects described herein.

Turning now to FIG. 10A, illustrated is a block diagram 1000 of an example, non-limiting embodiment of a coupler and transceiver system in accordance with various aspects described herein. The system is an example of transmission device 101 or 102. In particular, the communication interface 1008 is an example of communications interface 205, the stub coupler 1002 is an example of coupler 220, and the transmitter/receiver device 1006, diplexer 1016, power amplifier 1014, low noise amplifier 1018, frequency mixers 1010 and 1020 and local oscillator 1012 collectively form an example of transceiver 210.

In operation, the transmitter/receiver device 1006 launches and receives waves (e.g., guided wave 1004 onto stub coupler 1002). The guided waves 1004 can be used to transport signals received from and sent to a host device, base station, mobile devices, a building or other device by way of a communications interface 1008. The communications interface 1008 can be an integral part of system 1000. Alternatively, the communications interface 1008 can be tethered to system 1000. The communications interface 1008 can comprise a wireless interface for interfacing to the host device, base station, mobile devices, a building or other device utilizing any of various wireless signaling protocols (e.g., LTE, WiFi, WiMAX, IEEE 802.xx, etc.) including an infrared protocol such as an infrared data association (IrDA) protocol or other line of sight optical protocol. The communications interface 1008 can also comprise a wired interface such as a fiber optic line, coaxial cable, twisted pair, category 5 (CAT-5) cable or other suitable wired or optical mediums for communicating with the host device, base station, mobile devices, a building or other device via a protocol such as an Ethernet protocol, universal serial bus (USB) protocol, a data over cable service interface specification (DOCSIS) protocol, a digital subscriber line (DSL) protocol, a Firewire (IEEE 1394) protocol, or other wired or optical protocol. For embodiments where system 1000 functions as a repeater, the communications interface 1008 may not be necessary.

The output signals (e.g., Tx) of the communications interface 1008 can be combined with a carrier wave (e.g., millimeter-wave carrier wave) generated by a local oscillator 1012 at frequency mixer 1010. Frequency mixer 1010 can use heterodyning techniques or other frequency shifting techniques to frequency shift the output signals from communications interface 1008. For example, signals sent to and from the communications interface 1008 can be modulated signals such as orthogonal frequency division multiplexed (OFDM) signals formatted in accordance with a Long-Term Evolution (LTE) wireless protocol or other wireless 3G, 4G, 5G or higher voice and data protocol, a ZigBee, WIMAX, UltraWideband or IEEE 802.11 wireless protocol; a wired protocol such as an Ethernet protocol, universal serial bus (USB) protocol, a data over cable service interface specification (DOCSIS) protocol, a digital subscriber line (DSL) protocol, a Firewire (IEEE 1394) protocol or other wired or wireless protocol. In an example embodiment, this frequency conversion can be done in the analog domain, and as a result, the frequency shifting can be done without regard to the type of communications protocol used by a base station, mobile devices, or in-building devices. As new communications technologies are developed, the communications interface 1008 can be upgraded (e.g., updated with software, firmware, and/or hardware) or replaced and the frequency shifting and transmission apparatus can remain, simplifying upgrades. The carrier wave can then be sent to a power amplifier ("PA") 1014 and can be transmitted via the transmitter receiver device 1006 via the diplexer 1016.

Signals received from the transmitter/receiver device 1006 that are directed towards the communications interface 1008 can be separated from other signals via diplexer 1016. The received signal can then be sent to low noise amplifier ("LNA") 1018 for amplification. A frequency mixer 1020, with help from local oscillator 1012 can downshift the received signal (which is in the millimeter-wave band or around 38 GHz in some embodiments) to the native frequency. The communications interface 1008 can then receive the transmission at an input port (Rx).

In an embodiment, transmitter/receiver device 1006 can include a cylindrical or non-cylindrical metal (which, for example, can be hollow in an embodiment, but not necessarily drawn to scale) or other conducting or non-conducting waveguide and an end of the stub coupler 1002 can be placed in or in proximity to the waveguide or the transmitter/receiver device 1006 such that when the transmitter/receiver device 1006 generates a transmission, the guided wave couples to stub coupler 1002 and propagates as a guided wave 1004 about the waveguide surface of the stub coupler 1002. In some embodiments, the guided wave 1004 can propagate in part on the outer surface of the stub coupler 1002 and in part inside the stub coupler 1002. In other embodiments, the guided wave 1004 can propagate substantially or completely on the outer surface of the stub coupler 1002. In yet other embodiments, the guided wave 1004 can propagate substantially or completely inside the stub coupler 1002. In this latter embodiment, the guided wave 1004 can radiate at an end of the stub coupler 1002 (such as the tapered end shown in FIG. 4) for coupling to a transmission medium such as a wire 702 of FIG. 7. Similarly, if guided wave 1004 is incoming (coupled to the stub coupler 1002 from a wire 702), guided wave 1004 then enters the transmitter/receiver device 1006 and couples to the cylindrical waveguide or conducting waveguide. While transmitter/receiver device 1006 is shown to include a separate waveguide—an antenna, cavity resonator, klystron, magnetron, travelling wave tube, or other radiating element can be employed to induce a guided wave on the coupler 1002, with or without the separate waveguide.

In an embodiment, stub coupler 1002 can be wholly constructed of a dielectric material (or another suitable insulating material), without any metallic or otherwise conducting materials therein. Stub coupler 1002 can be composed of nylon, Teflon, polyethylene, a polyamide, other plastics, or other materials that are non-conducting and suitable for facilitating transmission of electromagnetic waves at least in part on an outer surface of such materials. In another embodiment, stub coupler 1002 can include a core that is conducting/metallic, and have an exterior dielectric surface. Similarly, a transmission medium that couples to the stub coupler 1002 for propagating electromagnetic waves induced by the stub coupler 1002 or for supplying electromagnetic waves to the stub coupler 1002 can, in addition to being a bare or insulated wire, be wholly constructed of a dielectric material (or another suitable insulating material), without any metallic or otherwise conducting materials therein.

It is noted that although FIG. 10A shows that the opening of transmitter receiver device 1006 is much wider than the stub coupler 1002, this is not to scale, and that in other embodiments the width of the stub coupler 1002 is comparable or slightly smaller than the opening of the hollow waveguide. It is also not shown, but in an embodiment, an end of the coupler 1002 that is inserted into the transmitter/receiver device 1006 tapers down in order to reduce reflection and increase coupling efficiencies.

Before coupling to the stub coupler 1002, the one or more waveguide modes of the guided wave generated by the transmitter/receiver device 1006 can couple to the stub coupler 1002 to induce one or more wave propagation modes of the guided wave 1004. The wave propagation modes of the guided wave 1004 can be different than the hollow metal waveguide modes due to the different characteristics of the hollow metal waveguide and the dielectric waveguide. For instance, wave propagation modes of the guided wave 1004 can comprise the fundamental transverse electromagnetic mode (Quasi-$TEM_{00}$), where only small electrical and/or magnetic fields extend in the direction of propagation, and the electric and magnetic fields extend radially outwards from the stub coupler 1002 while the guided waves propagate along the stub coupler 1002. The fundamental transverse electromagnetic mode wave propagation mode may or may not exist inside a waveguide that is hollow. Therefore, the hollow metal waveguide modes that are used by transmitter/receiver device 1006 are waveguide modes that can couple effectively and efficiently to wave propagation modes of stub coupler 1002.

Figure 10B:
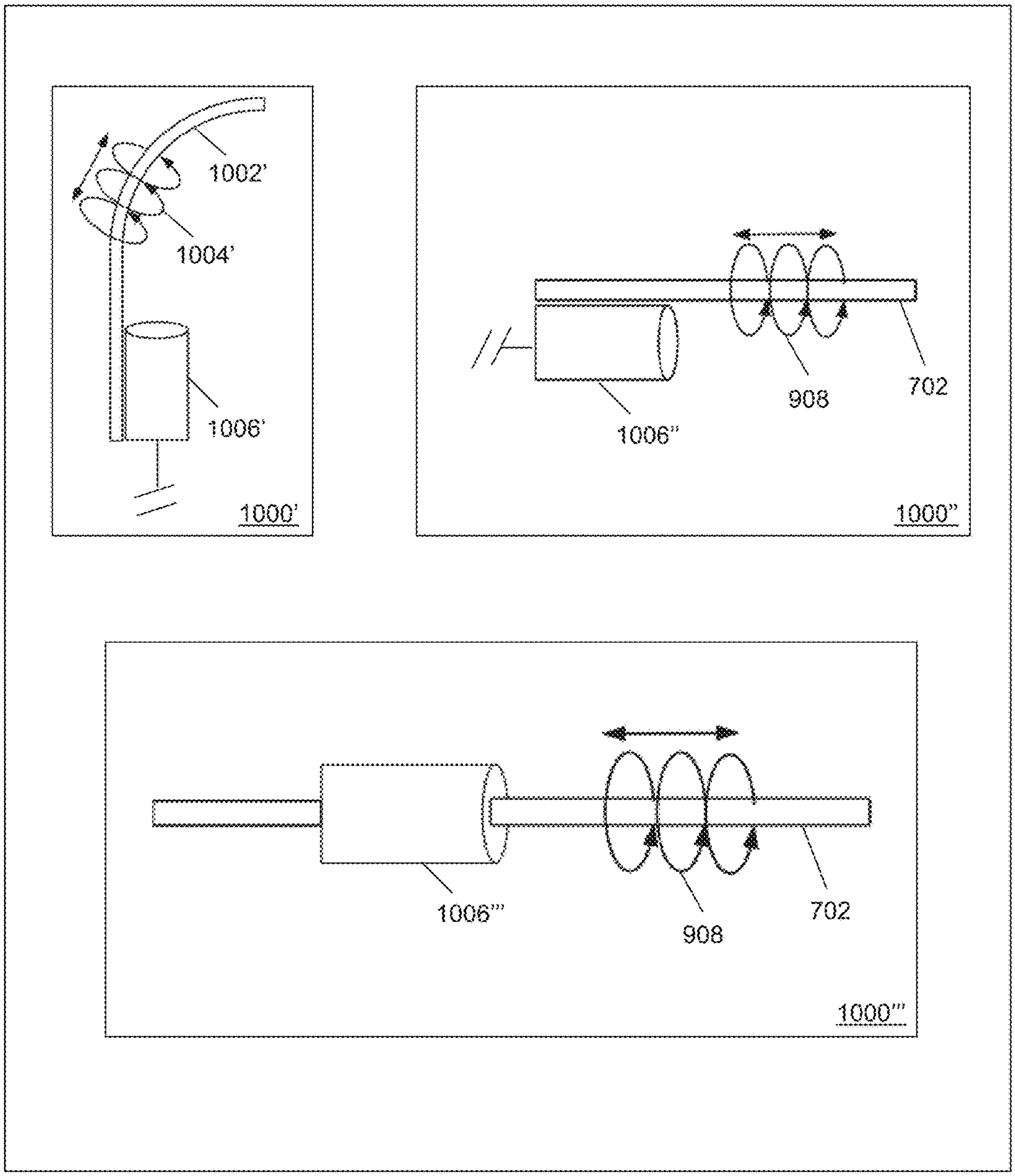

It will be appreciated that other constructs or combinations of the transmitter/receiver device 1006 and stub coupler 1002 are possible. For example, a stub coupler 1002' can be placed tangentially or in parallel (with or without a gap) with respect to an outer surface of the hollow metal waveguide of the transmitter/receiver device 1006' (corresponding circuitry not shown) as depicted by reference 1000' of FIG. 10B. In another embodiment, not shown by reference 1000', the stub coupler 1002' can be placed inside the hollow metal waveguide of the transmitter/receiver device 1006' without an axis of the stub coupler 1002' being coaxially aligned with an axis of the hollow metal waveguide of the transmitter/receiver device 1006'. In either of these embodiments, the guided wave generated by the transmitter/receiver device 1006' can couple to a surface of the stub coupler 1002' to induce one or more wave propagation modes of the guided wave 1004' on the stub coupler 1002' including a fundamental mode (e.g., a symmetric mode) and/or a non-fundamental mode (e.g., asymmetric mode).

In one embodiment, the guided wave 1004' can propagate in part on the outer surface of the stub coupler 1002' and in part inside the stub coupler 1002'. In another embodiment, the guided wave 1004' can propagate substantially or completely on the outer surface of the stub coupler 1002'. In yet other embodiments, the guided wave 1004' can propagate substantially or completely inside the stub coupler 1002'. In this latter embodiment, the guided wave 1004' can radiate at an end of the stub coupler 1002' (such as the tapered end shown in FIG. 9) for coupling to a transmission medium such as a wire 702 of FIG. 9.

It will be further appreciated that other constructs the transmitter/receiver device 1006 are possible. For example, a hollow metal waveguide of a transmitter/receiver device 1006" (corresponding circuitry not shown), depicted in FIG. 10B as reference 1000", can be placed tangentially or in parallel (with or without a gap) with respect to an outer surface of a transmission medium such as the wire 702 of FIG. 4 without the use of the stub coupler 1002. In this embodiment, the guided wave generated by the transmitter/receiver device 1006" can couple to a surface of the wire 702 to induce one or more wave propagation modes of a guided wave 908 on the wire 702 including a fundamental mode (e.g., a symmetric mode) and/or a non-fundamental mode (e.g., asymmetric mode). In another embodiment, the wire 702 can be positioned inside a hollow metal waveguide of a transmitter/receiver device 1006'" (corresponding circuitry not shown) so that an axis of the wire 702 is coaxially (or not coaxially) aligned with an axis of the hollow metal waveguide without the use of the stub coupler 1002—see FIG. 10B reference 1000'". In this embodiment, the guided wave generated by the transmitter/receiver device 1006'" can couple to a surface of the wire 702 to induce one or more wave propagation modes of a guided wave 908 on the wire including a fundamental mode (e.g., a symmetric mode) and/or a non-fundamental mode (e.g., asymmetric mode).

In the embodiments of 1000" and 1000'", for a wire 702 having an insulated outer surface, the guided wave 908 can propagate in part on the outer surface of the insulator and in part inside the insulator. In embodiments, the guided wave 908 can propagate substantially or completely on the outer surface of the insulator, or substantially or completely inside the insulator. In the embodiments of 1000" and 1000'", for a wire 702 that is a bare conductor, the guided wave 908 can propagate in part on the outer surface of the conductor and in part inside the conductor. In another embodiment, the guided wave 908 can propagate substantially or completely on the outer surface of the conductor.

Figure 11:
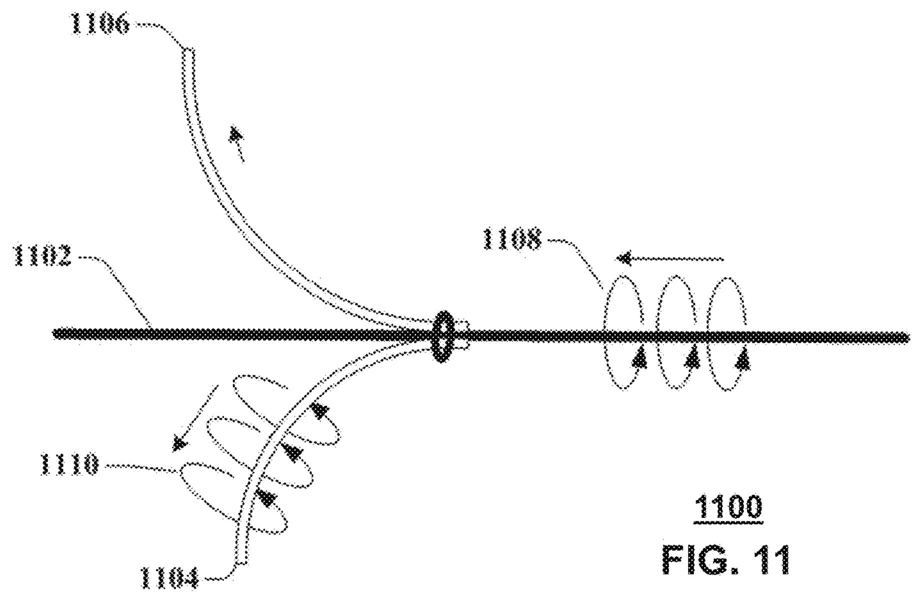
FIG. 11 is a block diagram illustrating an example, non-limiting embodiment of a dual stub coupler in accordance with various aspects described herein.

Referring now to FIG. 11, a block diagram 1100 illustrating an example, non-limiting embodiment of a dual stub coupler is shown. In particular, a dual coupler design is presented for use in a transmission device, such as transmission device 101 or 102 presented in conjunction with FIG. 1. In an embodiment, two or more couplers (such as the stub couplers 1104 and 1106) can be positioned around a wire 1102 in order to receive guided wave 1108. In an embodiment, one coupler is enough to receive the guided wave 1108. In that case, guided wave 1108 couples to coupler 1104 and propagates as guided wave 1110. If the field structure of the guided wave 1108 oscillates or undulates around the wire 1102 due to the particular guided wave mode(s) or various outside factors, then coupler 1106 can be placed such that guided wave 1108 couples to coupler 1106. In some embodiments, four or more couplers can be placed around a portion of the wire 1102, e.g., at 90 degrees or another spacing with respect to each other, in order to receive guided waves that may oscillate or rotate around the wire 1102, that have been induced at different azimuthal orientations or that have non-fundamental or higher order modes that, for example, have lobes and/or nulls or other asymmetries that are orientation dependent. However, it will be appreciated that there may be less than or more than four couplers placed around a portion of the wire 1102 without departing from example embodiments.

It should be noted that while couplers 1106 and 1104 are illustrated as stub couplers, any other of the coupler designs described herein including arc couplers, antenna or horn couplers, magnetic couplers, etc., could likewise be used. It will also be appreciated that while some example embodiments have presented a plurality of couplers around at least a portion of a wire 1102, this plurality of couplers can also be considered as part of a single coupler system having multiple coupler subcomponents. For example, two or more couplers can be manufactured as single system that can be installed around a wire in a single installation such that the couplers are either pre-positioned or adjustable relative to each other (either manually or automatically with a controllable mechanism such as a motor or other actuator) in accordance with the single system.

Receivers coupled to couplers 1106 and 1104 can use diversity combining to combine signals received from both couplers 1106 and 1104 in order to maximize the signal quality. In other embodiments, if one or the other of the couplers 1104 and 1106 receive a transmission that is above a predetermined threshold, receivers can use selection diversity when deciding which signal to use. Further, while reception by a plurality of couplers 1106 and 1104 is illustrated, transmission by couplers 1106 and 1104 in the same configuration can likewise take place. In particular, a wide range of multi-input multi-output (MIMO) transmission and reception techniques can be employed for transmissions where a transmission device, such as transmission device 101 or 102 presented in conjunction with FIG. 1 includes multiple transceivers and multiple couplers.

It is noted that the graphical representations of waves 1108 and 1110 are presented merely to illustrate the principles that guided wave 1108 induces or otherwise launches a wave 1110 on a coupler 1104. The actual electric and magnetic fields generated as a result of such wave propagation may vary depending on the frequencies employed, the design of the coupler 1104, the dimensions and composition of the wire 1102, as well as its surface characteristics, its insulation if any, the electromagnetic properties of the surrounding environment, etc.

Figure 12:
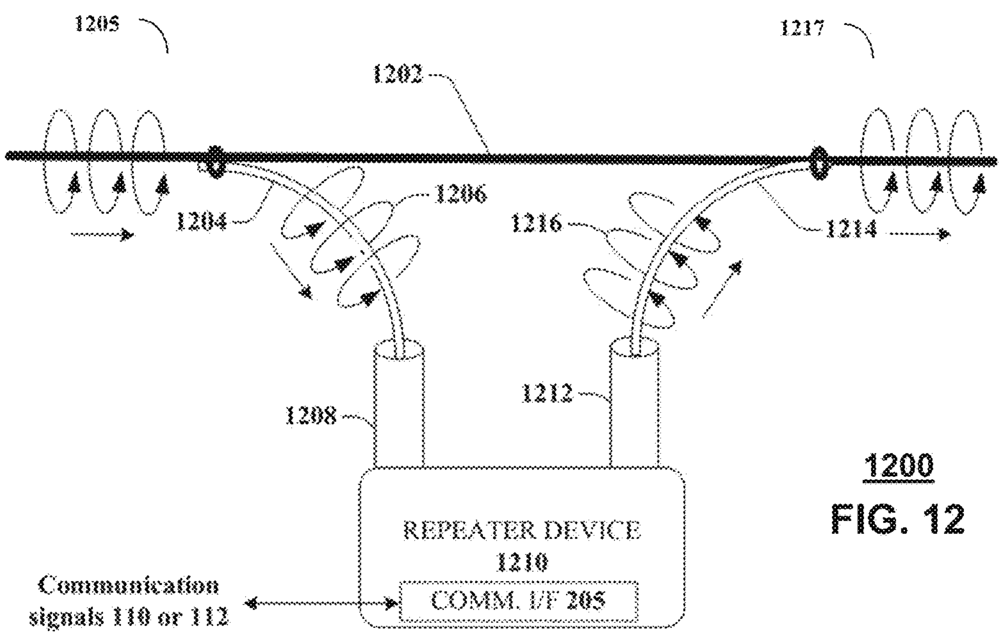
FIG. 12 is a block diagram illustrating an example, non-limiting embodiment of a repeater system in accordance with various aspects described herein.

Referring now to FIG. 12, a block diagram 1200 illustrating an example, non-limiting embodiment of a repeater system is shown. In particular, a repeater device 1210 is presented for use in a transmission device, such as transmission device 101 or 102 presented in conjunction with FIG. 1. In this system, two couplers 1204 and 1214 can be placed near a wire 1202 or other transmission medium such that guided waves 1205 propagating along the wire 1202 are extracted by coupler 1204 as wave 1206 (e.g. as a guided wave), and then are boosted or repeated by repeater device 1210 and launched as a wave 1216 (e.g. as a guided wave) onto coupler 1214. The wave 1216 can then be launched on the wire 1202 and continue to propagate along the wire 1202 as a guided wave 1217. In an embodiment, the repeater device 1210 can receive at least a portion of the power utilized for boosting or repeating through magnetic coupling with the wire 1202, for example, when the wire 1202 is a power line or otherwise contains a power-carrying conductor. It should be noted that while couplers 1204 and 1214 are illustrated as stub couplers, any other of the coupler designs described herein including arc couplers, antenna or horn couplers, magnetic couplers, or the like, could likewise be used.

In some embodiments, repeater device 1210 can repeat the transmission associated with wave 1206, and in other embodiments, repeater device 1210 can include a communications interface 205 that extracts data or other signals from the wave 1206 for supplying such data or signals to another network and/or one or more other devices as communication signals 110 or 112 and/or receiving communication signals 110 or 112 from another network and/or one or more other devices and launch guided wave 1216 having embedded therein the received communication signals 110 or 112. In a repeater configuration, receiver waveguide 1208 can receive the wave 1206 from the coupler 1204 and transmitter waveguide 1212 can launch guided wave 1216 onto coupler 1214 as guided wave 1217. Between receiver waveguide 1208 and transmitter waveguide 1212, the signal embedded in guided wave 1206 and/or the guided wave 1216 itself can be amplified to correct for signal loss and other inefficiencies associated with guided wave communications or the signal can be received and processed to extract the data contained therein and regenerated for transmission. In an embodiment, the receiver waveguide 1208 can be configured to extract data from the signal, process the data to correct for data errors utilizing for example error correcting codes, and regenerate an updated signal with the corrected data. The transmitter waveguide 1212 can then transmit guided wave 1216 with the updated signal embedded therein. In an embodiment, a signal embedded in guided wave 1206 can be extracted from the transmission and processed for communication with another network and/or one or more other devices via communications interface 205 as communication signals 110 or 112. Similarly, communication signals 110 or 112 received by the communications interface 205 can be inserted into a transmission of guided wave 1216 that is generated and launched onto coupler 1214 by transmitter waveguide 1212.

It is noted that although FIG. 12 shows guided wave transmissions 1206 and 1216 entering from the left and exiting to the right respectively, this is merely a simplification and is not intended to be limiting. In other embodiments, receiver waveguide 1208 and transmitter waveguide 1212 can also function as transmitters and receivers respectively, allowing the repeater device 1210 to be bi-directional.

In an embodiment, repeater device 1210 can be placed at locations where there are discontinuities or obstacles on the wire 1202 or other transmission medium. In the case where the wire 1202 is a power line, these obstacles can include transformers, connections, utility poles, and other such power line devices. The repeater device 1210 can help the guided (e.g., surface) waves jump over these obstacles on the line and boost the transmission power at the same time. In other embodiments, a coupler can be used to jump over the obstacle without the use of a repeater device. In that embodiment, both ends of the coupler can be tied or fastened to the wire, thus providing a path for the guided wave to travel without being blocked by the obstacle.

Figure 13:
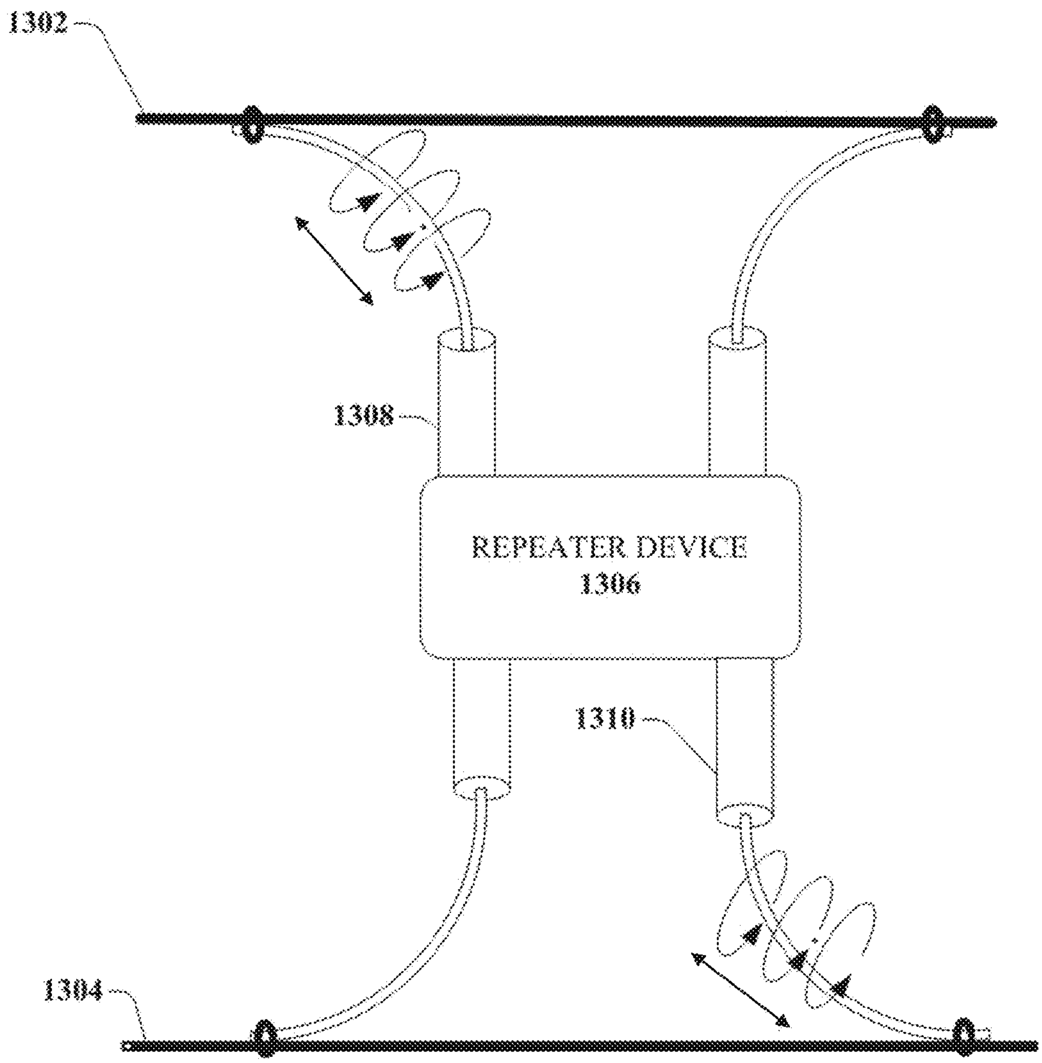
FIG. 13 illustrates a block diagram illustrating an example, non-limiting embodiment of a bidirectional repeater in accordance with various aspects described herein.

Turning now to FIG. 13, illustrated is a block diagram 1300 of an example, non-limiting embodiment of a bidirectional repeater in accordance with various aspects described herein. In particular, a bidirectional repeater device 1306 is presented for use in a transmission device, such as transmission device 101 or 102 presented in conjunction with FIG. 1. It should be noted that while the couplers are illustrated as stub couplers, any other of the coupler designs described herein including arc couplers, antenna or horn couplers, magnetic couplers, or the like, could likewise be used. The bidirectional repeater 1306 can employ diversity paths in the case of when two or more wires or other transmission media are present. Since guided wave transmissions have different transmission efficiencies and coupling efficiencies for transmission medium of different types such as insulated wires, un-insulated wires or other types of transmission media and further, if exposed to the elements, can be affected by weather, and other atmospheric conditions, it can be advantageous to selectively transmit on different transmission media at certain times. In various embodiments, the various transmission media can be designated as a primary, secondary, tertiary, etc. whether or not such designation indicates a preference of one transmission medium over another.

In the embodiment shown, the transmission media include an insulated or uninsulated wire 1302 and an insulated or uninsulated wire 1304 (referred to herein as wires 1302 and 1304, respectively). The repeater device 1306 uses a receiver coupler 1308 to receive a guided wave traveling along wire 1302 and repeats the transmission using transmitter waveguide 1310 as a guided wave along wire 1304. In other embodiments, repeater device 1306 can switch from the wire 1304 to the wire 1302, or can repeat the transmissions along the same paths. Repeater device 1306 can include sensors, or be in communication with sensors (or a network management system 1601 depicted in FIG. 16A) that indicate conditions that can affect the transmission. Based on the feedback received from the sensors, the repeater device 1306 can make the determination about whether to keep the transmission along the same wire, or transfer the transmission to the other wire.

Figure 14:
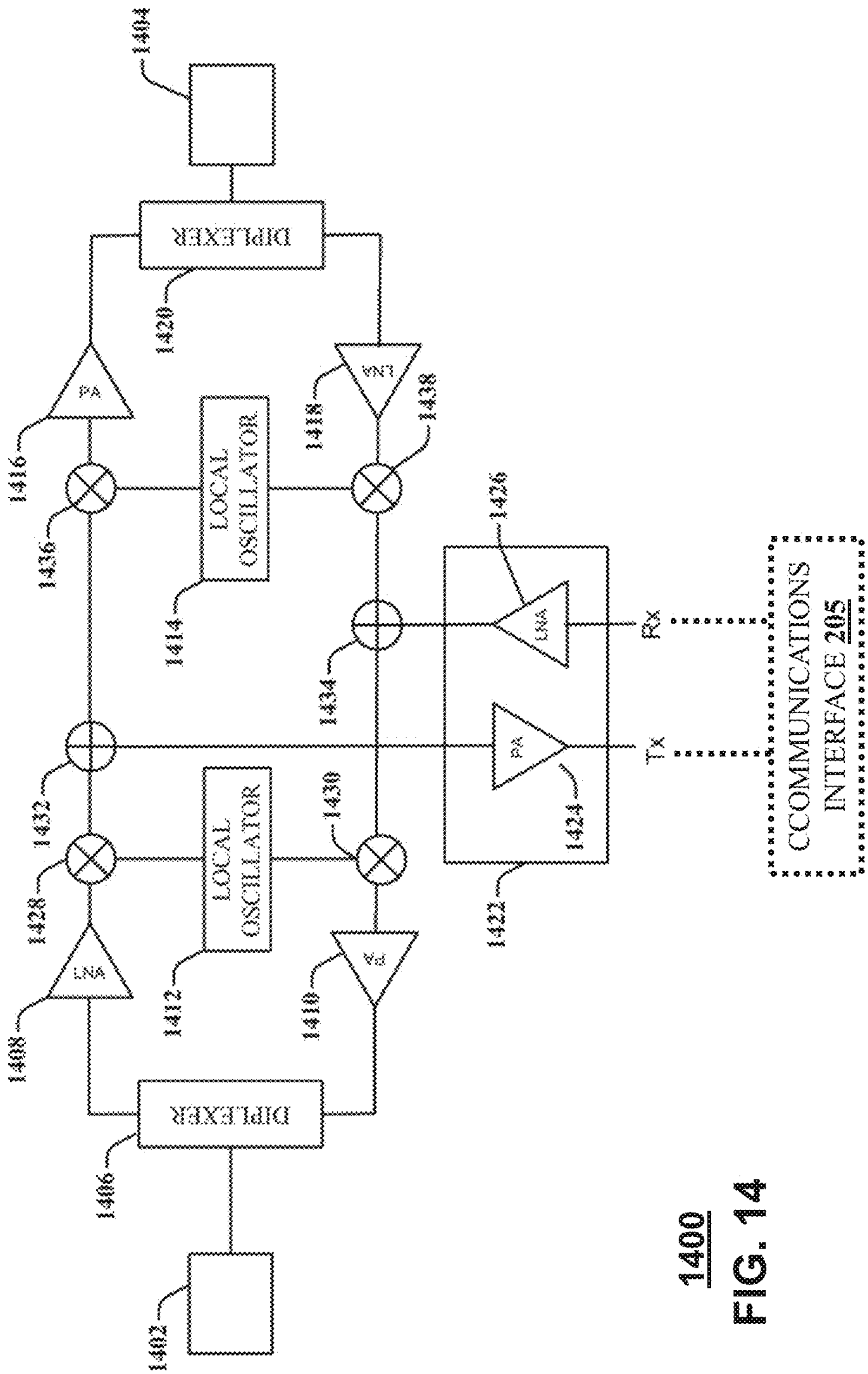
FIG. 14 is a block diagram illustrating an example, non-limiting embodiment of a waveguide system in accordance with various aspects described herein.

Turning now to FIG. 14, illustrated is a block diagram 1400 illustrating an example, non-limiting embodiment of a bidirectional repeater system. In particular, a bidirectional repeater system is presented for use in a transmission device, such as transmission device 101 or 102 presented in conjunction with FIG. 1. The bidirectional repeater system includes waveguide coupling devices 1402 and 1404 that receive and transmit transmissions from other coupling devices located in a distributed antenna system or backhaul system.

In various embodiments, waveguide coupling device 1402 can receive a transmission from another waveguide coupling device, wherein the transmission has a plurality of subcarriers. Diplexer 1406 can separate the transmission from other transmissions, and direct the transmission to low-noise amplifier ("LNA") 1408. A frequency mixer 1428, with help from a local oscillator 1412, can downshift the transmission (which is in the millimeter-wave band or around 38 GHz in some embodiments) to a lower frequency, such as a cellular band (~1.9 GHz) for a distributed antenna system, a native frequency, or other frequency for a backhaul system. An extractor (or demultiplexer) 1432 can extract the signal on a subcarrier and direct the signal to an output component 1422 for optional amplification, buffering or isolation by power amplifier 1424 for coupling to communications interface 205. The communications interface 205 can further process the signals received from the power amplifier 1424 or otherwise transmit such signals over a wireless or wired interface to other devices such as a base station, mobile devices, a building, etc. For the signals that are not being extracted at this location, extractor 1432 can redirect them to another frequency mixer 1436, where the signals are used to modulate a carrier wave generated by local oscillator 1414. The carrier wave, with its subcarriers, is directed to a power amplifier ("PA") 1416 and is retransmitted by waveguide coupling device 1404 to another system, via diplexer 1420.

An LNA 1426 can be used to amplify, buffer or isolate signals that are received by the communication interface 205 and then send the signal to a multiplexer 1434 which merges the signal with signals that have been received from waveguide coupling device 1404. The signals received from coupling device 1404 have been split by diplexer 1420, and then passed through LNA 1418, and downshifted in frequency by frequency mixer 1438. When the signals are combined by multiplexer 1434, they are upshifted in frequency by frequency mixer 1430, and then boosted by PA 1410, and transmitted to another system by waveguide coupling device 1402. In an embodiment bidirectional repeater system can be merely a repeater without the output device 1422. In this embodiment, the multiplexer 1434 would not be utilized and signals from LNA 1418 would be directed to mixer 1430 as previously described. It will be appreciated that in some embodiments, the bidirectional repeater system could also be implemented using two distinct and separate unidirectional repeaters. In an alternative embodiment, a bidirectional repeater system could also be a booster or otherwise perform retransmissions without downshifting and upshifting. Indeed, in example embodiment, the retransmissions can be based upon receiving a signal or guided wave and performing some signal or guided wave processing or reshaping, filtering, and/or amplification, prior to retransmission of the signal or guided wave.

Figure 15:
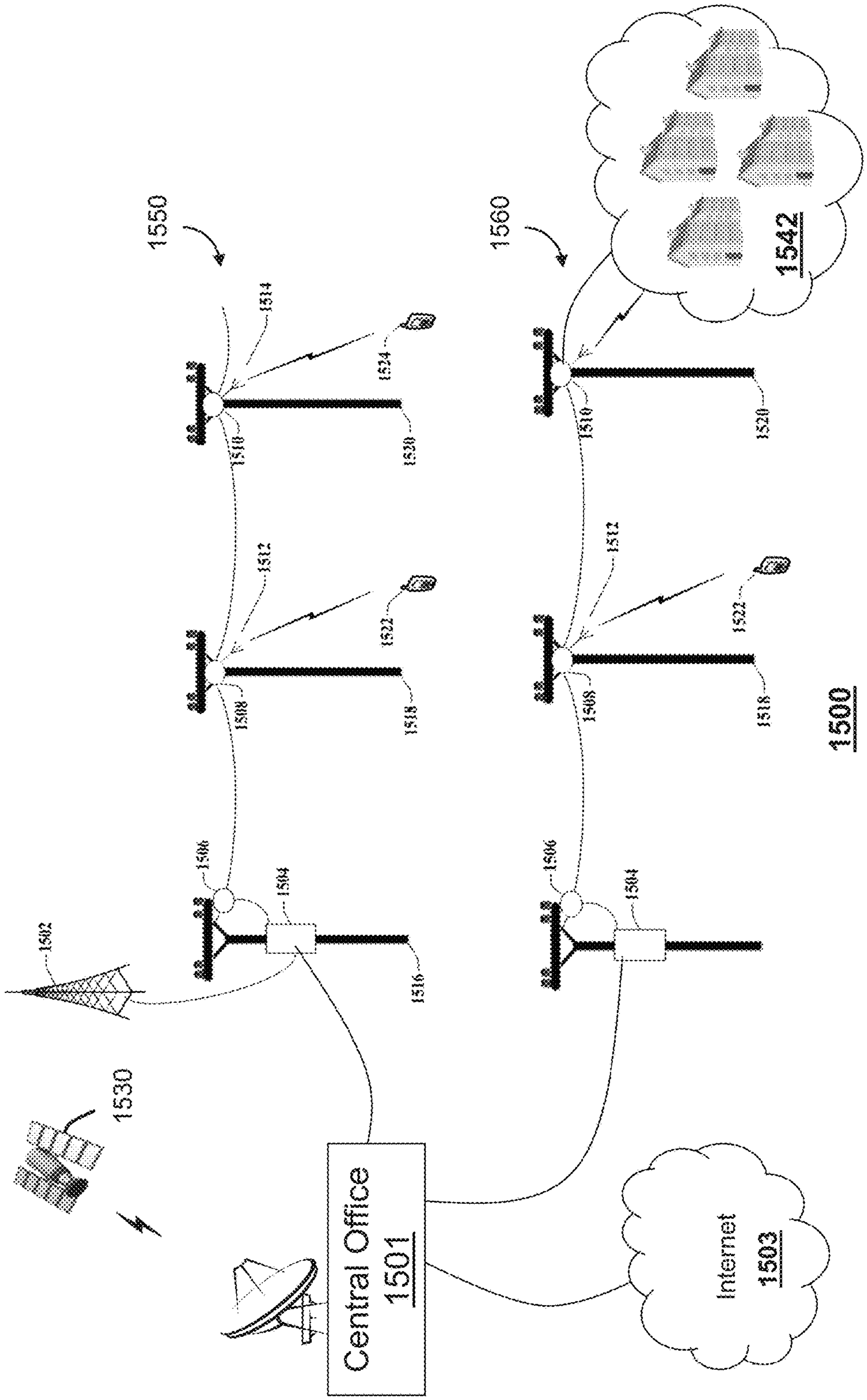
FIG. 15 is a block diagram illustrating an example, non-limiting embodiment of a guided-wave communications system in accordance with various aspects described herein.

Referring now to FIG. 15, a block diagram 1500 illustrating an example, non-limiting embodiment of a guided wave communications system is shown. This diagram depicts an exemplary environment in which a guided wave communication system, such as the guided wave communication system presented in conjunction with FIG. 1, can be used.

To provide network connectivity to additional base station devices, a backhaul network that links the communication cells (e.g., macrocells and macrocells) to network devices of a core network correspondingly expands. Similarly, to provide network connectivity to a distributed antenna system, an extended communication system that links base station devices and their distributed antennas is desirable. A guided wave communication system 1500 such as shown in FIG. 15 can be provided to enable alternative, increased or additional network connectivity and a waveguide coupling system can be provided to transmit and/or receive guided wave (e.g., surface wave) communications on a transmission medium such as a wire that operates as a single-wire transmission line (e.g., a utility line), and that can be used as a waveguide and/or that otherwise operates to guide the transmission of an electromagnetic wave.

The guided wave communication system 1500 can comprise a first instance of a distribution system 1550 that includes one or more base station devices (e.g., base station device 1504) that are communicably coupled to a central office 1501 and/or a macrocell site 1502. Base station device 1504 can be connected by a wired (e.g., fiber and/or cable), or by a wireless (e.g., microwave wireless) connection to the macrocell site 1502 and the central office 1501. A second instance of the distribution system 1560 can be used to provide wireless voice and data services to mobile device 1522 and to residential and/or commercial establishments 1542 (herein referred to as establishments 1542). System 1500 can have additional instances of the distribution systems 1550 and 1560 for providing voice and/or data services to mobile devices 1522-1524 and establishments 1542 as shown in FIG. 15.

Macrocells such as macrocell site 1502 can have dedicated connections to a mobile network and base station device 1504 or can share and/or otherwise use another connection. Central office 1501 can be used to distribute media content and/or provide internet service provider (ISP) services to mobile devices 1522-1524 and establishments 1542. The central office 1501 can receive media content from a constellation of satellites 1530 (one of which is shown in FIG. 15) or other sources of content, and distribute such content to mobile devices 1522-1524 and establishments 1542 via the first and second instances of the distribution system 1550 and 1560. The central office 1501 can also be communicatively coupled to the Internet 1503 for providing internet data services to mobile devices 1522-1524 and establishments 1542.

Base station device 1504 can be mounted on, or attached to, utility pole 1516. In other embodiments, base station device 1504 can be near transformers and/or other locations situated nearby a power line. Base station device 1504 can facilitate connectivity to a mobile network for mobile devices 1522 and 1524. Antennas 1512 and 1514, mounted on or near utility poles 1518 and 1520, respectively, can receive signals from base station device 1504 and transmit those signals to mobile devices 1522 and 1524 over a much wider area than if the antennas 1512 and 1514 were located at or near base station device 1504.

It is noted that FIG. 15 displays three utility poles, in each instance of the distribution systems 1550 and 1560, with one base station device, for purposes of simplicity. In other embodiments, utility pole 1516 can have more base station devices, and more utility poles with distributed antennas and/or tethered connections to establishments 1542.

A transmission device 1506, such as transmission device 101 or 102 presented in conjunction with FIG. 1, can transmit a signal from base station device 1504 to antennas 1512 and 1514 via utility or power line(s) that connect the utility poles 1516, 1518, and 1520. To transmit the signal, radio source and/or transmission device 1506 upconverts the signal (e.g., via frequency mixing) from base station device 1504 or otherwise converts the signal from the base station device 1504 to a microwave band signal and the transmission device 1506 launches a microwave band wave that propagates as a guided wave traveling along the utility line or other wire as described in previous embodiments. At utility pole 1518, another transmission device 1508 receives the guided wave (and optionally can amplify it as needed or desired or operate as a repeater to receive it and regenerate it) and sends it forward as a guided wave on the utility line or other wire. The transmission device 1508 can also extract a signal from the microwave band guided wave and shift it down in frequency or otherwise convert it to its original cellular band frequency (e.g., 1.9 GHz or other defined cellular frequency) or another cellular (or non-cellular) band frequency. An antenna 1512 can wireless transmit the downshifted signal to mobile device 1522. The process can be repeated by transmission device 1510, antenna 1514 and mobile device 1524, as necessary or desirable.

Transmissions from mobile devices 1522 and 1524 can also be received by antennas 1512 and 1514 respectively. The transmission devices 1508 and 1510 can upshift or otherwise convert the cellular band signals to microwave band and transmit the signals as guided wave (e.g., surface wave or other electromagnetic wave) transmissions over the power line(s) to base station device 1504.

Media content received by the central office 1501 can be supplied to the second instance of the distribution system 1560 via the base station device 1504 for distribution to mobile devices 1522 and establishments 1542. The transmission device 1510 can be tethered to the establishments 1542 by one or more wired connections or a wireless interface. The one or more wired connections may include without limitation, a power line, a coaxial cable, a fiber cable, a twisted pair cable, a guided wave transmission medium or other suitable wired mediums for distribution of media content and/or for providing internet services. In an example embodiment, the wired connections from the transmission device 1510 can be communicatively coupled to one or more very high bit rate digital subscriber line (VDSL) modems located at one or more corresponding service area interfaces (SAIs—not shown) or pedestals, each SAI or pedestal providing services to a portion of the establishments 1542. The VDSL modems can be used to selectively distribute media content and/or provide internet services to gateways (not shown) located in the establishments 1542. The SAIs or pedestals can also be communicatively coupled to the establishments 1542 over a wired medium such as a power line, a coaxial cable, a fiber cable, a twisted pair cable, a guided wave transmission medium or other suitable wired mediums. In other example embodiments, the transmission device 1510 can be communicatively coupled directly to establishments 1542 without intermediate interfaces such as the SAIs or pedestals.

In another example embodiment, system 1500 can employ diversity paths, where two or more utility lines or other wires are strung between the utility poles 1516, 1518, and 1520 (e.g., for example, two or more wires between poles 1516 and 1520) and redundant transmissions from base station/macrocell site 1502 are transmitted as guided waves down the surface of the utility lines or other wires. The utility lines or other wires can be either insulated or uninsulated, and depending on the environmental conditions that cause transmission losses, the coupling devices can selectively receive signals from the insulated or uninsulated utility lines or other wires. The selection can be based on measurements of the signal-to-noise ratio of the wires, or based on determined weather/environmental conditions (e.g., moisture detectors, weather forecasts, etc.). The use of diversity paths with system 1500 can enable alternate routing capabilities, load balancing, increased load handling, concurrent bi-directional or synchronous communications, spread spectrum communications, etc.

It is noted that the use of the transmission devices 1506, 1508, and 1510 in FIG. 15 are by way of example only, and that in other embodiments, other uses are possible. For instance, transmission devices can be used in a backhaul communication system, providing network connectivity to base station devices. Transmission devices 1506, 1508, and 1510 can be used in many circumstances where it is desirable to transmit guided wave communications over a wire, whether insulated or not insulated. Transmission devices 1506, 1508, and 1510 are improvements over other coupling devices due to no contact or limited physical and/or electrical contact with the wires that may carry high voltages. The transmission device can be located away from the wire (e.g., spaced apart from the wire) and/or located on the wire so long as it is not electrically in contact with the wire, as the dielectric acts as an insulator, allowing for cheap, easy, and/or less complex installation. However, as previously noted conducting or non-dielectric couplers can be employed, for example in configurations where the wires correspond to a telephone network, cable television network, broadband data service, fiber optic communications system or other network employing low voltages or having insulated transmission lines.

It is further noted, that while base station device 1504 and macrocell site 1502 are illustrated in an embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as an 802.11 protocol, WIMAX protocol, UltraWideband protocol, Bluetooth protocol, ZigBee protocol or other wireless protocol.

Figure 16A:
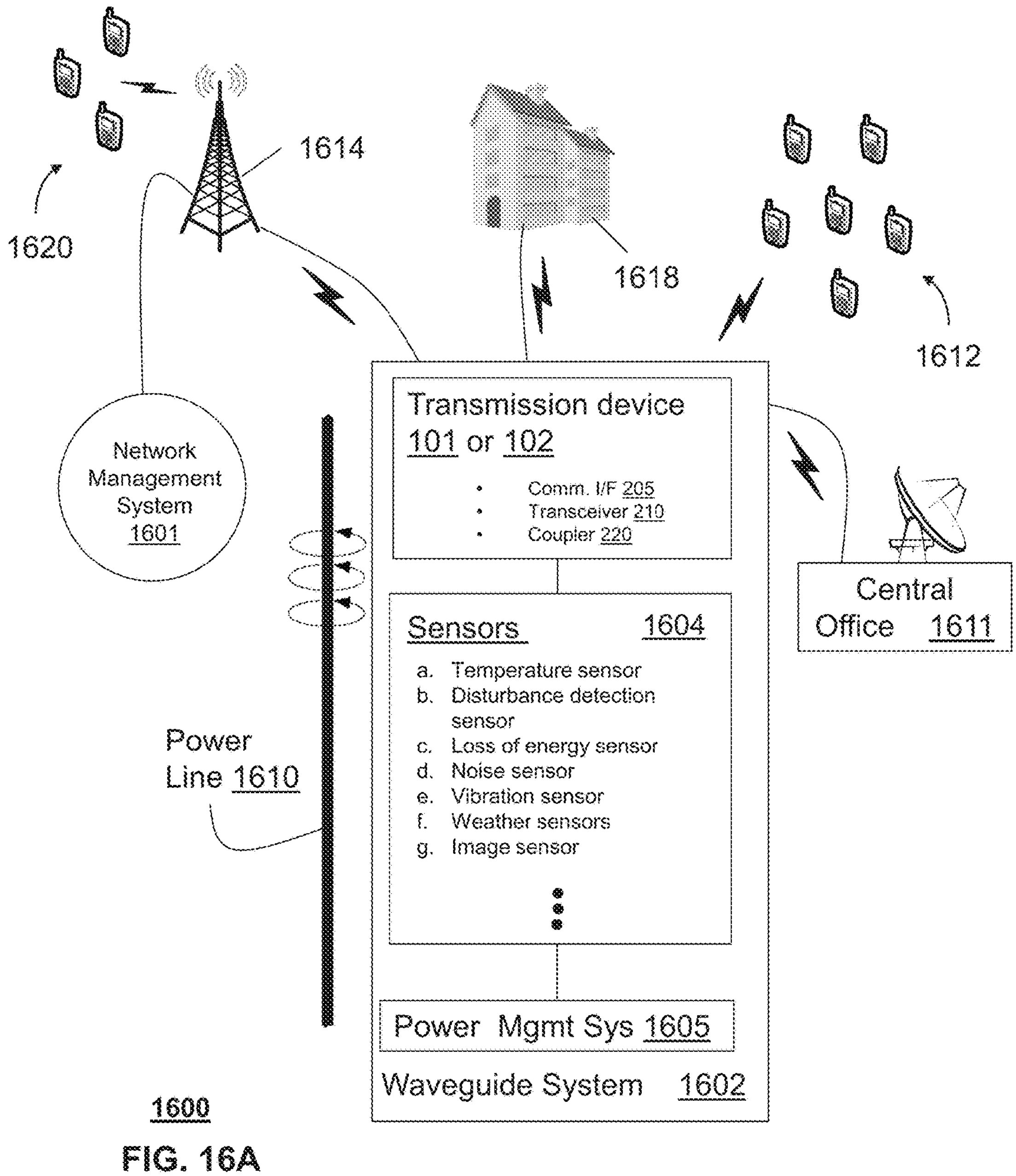
FIGS. 16A & 16B are block diagrams illustrating an example, non-limiting embodiment of a system for managing a power grid communication system in accordance with various aspects described herein.
Figure 16B:
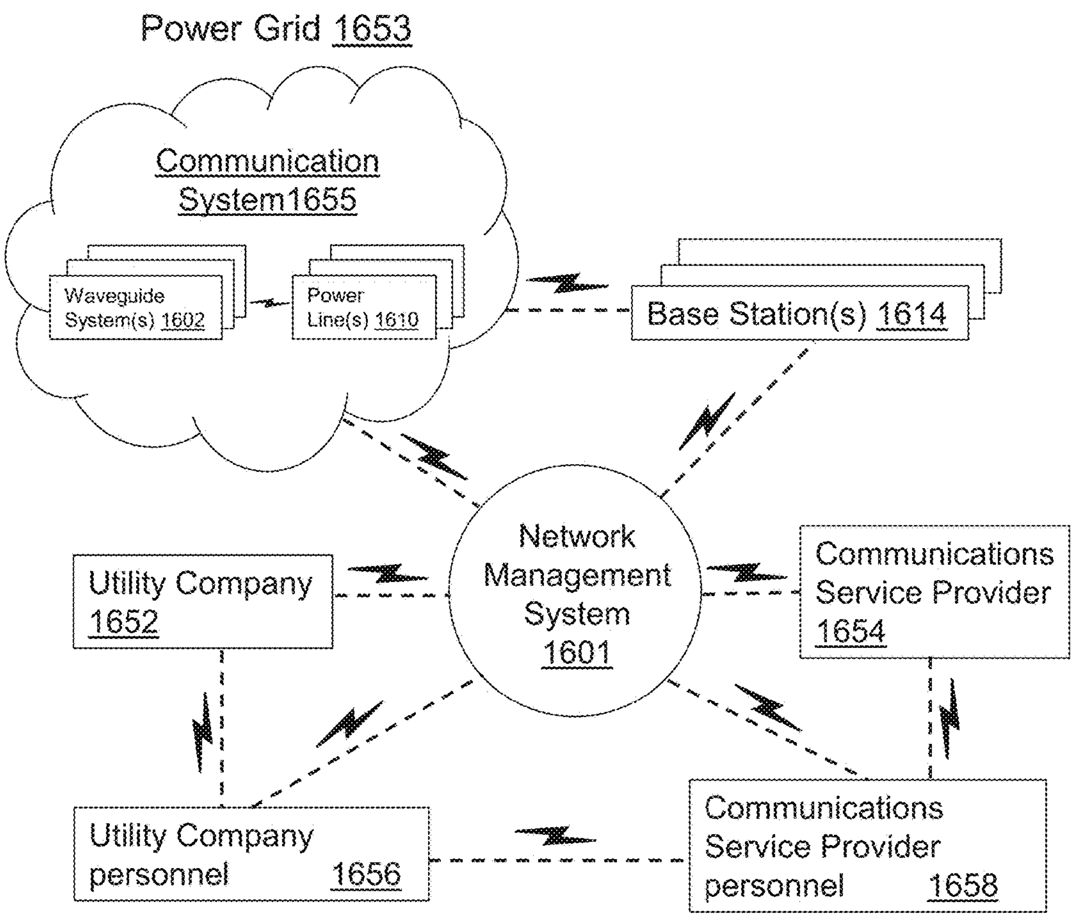

Referring now to FIGS. 16A & 16B, block diagrams illustrating an example, non-limiting embodiment of a system for managing a power grid communication system are shown. Considering FIG. 16A, a waveguide system 1602 is presented for use in a guided wave communications system, such as the system presented in conjunction with FIG. 15. The waveguide system 1602 can comprise sensors 1604, a power management system 1605, a transmission device 101 or 102 that includes at least one communication interface 205, transceiver 210 and coupler 220.

The waveguide system 1602 can be coupled to a power line 1610 for facilitating guided wave communications in accordance with embodiments described in the subject disclosure. In an example embodiment, the transmission device 101 or 102 includes coupler 220 for inducing electromagnetic waves on a surface of the power line 1610 that longitudinally propagate along the surface of the power line 1610 as described in the subject disclosure. The transmission device 101 or 102 can also serve as a repeater for retransmitting electromagnetic waves on the same power line 1610 or for routing electromagnetic waves between power lines 1610 as shown in FIGS. 12-13.

The transmission device 101 or 102 includes transceiver 210 configured to, for example, up-convert a signal operating at an original frequency range to electromagnetic waves operating at, exhibiting, or associated with a carrier frequency that propagate along a coupler to induce corresponding guided electromagnetic waves that propagate along a surface of the power line 1610. A carrier frequency can be represented by a center frequency having upper and lower cutoff frequencies that define the bandwidth of the electromagnetic waves. The power line 1610 can be a wire (e.g., single stranded or multi-stranded) having a conducting surface or insulated surface. The transceiver 210 can also receive signals from the coupler 220 and down-convert the electromagnetic waves operating at a carrier frequency to signals at their original frequency.

Signals received by the communications interface 205 of transmission device 101 or 102 for up-conversion can include without limitation signals supplied by a central office 1611 over a wired or wireless interface of the communications interface 205, a base station 1614 over a wired or wireless interface of the communications interface 205, wireless signals transmitted by mobile devices 1620 to the base station 1614 for delivery over the wired or wireless interface of the communications interface 205, signals supplied by in-building communication devices 1618 over the wired or wireless interface of the communications interface 205, and/or wireless signals supplied to the communications interface 205 by mobile devices 1612 roaming in a wireless communication range of the communications interface 205. In embodiments where the waveguide system 1602 functions as a repeater, such as shown in FIGS. 12-13, the communications interface 205 may or may not be included in the waveguide system 1602.

The electromagnetic waves propagating along the surface of the power line 1610 can be modulated and formatted to include packets or frames of data that include a data payload and further include networking information (such as header information for identifying one or more destination waveguide systems 1602). The networking information may be provided by the waveguide system 1602 or an originating device such as the central office 1611, the base station 1614, mobile devices 1620, or in-building devices 1618, or a combination thereof. Additionally, the modulated electromagnetic waves can include error correction data for mitigating signal disturbances. The networking information and error correction data can be used by a destination waveguide system 1602 for detecting transmissions directed to it, and for down-converting and processing with error correction data transmissions that include voice and/or data signals directed to recipient communication devices communicatively coupled to the destination waveguide system 1602.

Referring now to the sensors 1604 of the waveguide system 1602, the sensors 1604 can comprise one or more of a temperature sensor 1604*a*, a disturbance detection sensor 1604*b*, a loss of energy sensor 1604*c*, a noise sensor 1604*d*, a vibration sensor 1604*e*, an environmental (e.g., weather) sensor 1604*f*, and/or an image sensor 1604*g*. The temperature sensor 1604*a* can be used to measure ambient temperature, a temperature of the transmission device 101 or 102, a temperature of the power line 1610, temperature differentials (e.g., compared to a setpoint or baseline, between transmission device 101 or 102 and 1610, etc.), or any combination thereof. In one embodiment, temperature metrics can be collected and reported periodically to a network management system 1601 by way of the base station 1614.

The disturbance detection sensor 1604*b* can perform measurements on the power line 1610 to detect disturbances such as signal reflections, which may indicate a presence of a downstream disturbance that may impede the propagation of electromagnetic waves on the power line 1610. A signal reflection can represent a distortion resulting from, for example, an electromagnetic wave transmitted on the power line 1610 by the transmission device 101 or 102 that reflects in whole or in part back to the transmission device 101 or 102 from a disturbance in the power line 1610 located downstream from the transmission device 101 or 102.

Signal reflections can be caused by obstructions on the power line 1610. For example, a tree limb may cause electromagnetic wave reflections when the tree limb is lying on the power line 1610, or is in close proximity to the power line 1610 which may cause a corona discharge. Other obstructions that can cause electromagnetic wave reflections can include without limitation an object that has been entangled on the power line 1610 (e.g., clothing, a shoe wrapped around a power line 1610 with a shoe string, etc.), a corroded build-up on the power line 1610 or an ice build-up. Power grid components may also impede or obstruct with the propagation of electromagnetic waves on the surface of power lines 1610. Illustrations of power grid components that may cause signal reflections include without limitation a transformer and a joint for connecting spliced power lines. A sharp angle on the power line 1610 may also cause electromagnetic wave reflections.

The disturbance detection sensor 1604*b* can comprise a circuit to compare magnitudes of electromagnetic wave reflections to magnitudes of original electromagnetic waves transmitted by the transmission device 101 or 102 to determine how much a downstream disturbance in the power line 1610 attenuates transmissions. The disturbance detection sensor 1604*b* can further comprise a spectral analyzer circuit for performing spectral analysis on the reflected waves. The spectral data generated by the spectral analyzer circuit can be compared with spectral profiles via pattern recognition, an expert system, curve fitting, matched filtering or other artificial intelligence, classification or comparison technique to identify a type of disturbance based on, for example, the spectral profile that most closely matches the spectral data. The spectral profiles can be stored in a memory of the disturbance detection sensor 1604*b* or may be remotely accessible by the disturbance detection sensor 1604*b*. The profiles can comprise spectral data that models different disturbances that may be encountered on power lines 1610 to enable the disturbance detection sensor 1604*b* to identify disturbances locally. An identification of the disturbance if known can be reported to the network management system 1601 by way of the base station 1614. The disturbance detection sensor 1604*b* can also utilize the transmission device 101 or 102 to transmit electromagnetic waves as test signals to determine a roundtrip time for an electromagnetic wave reflection. The round trip time measured by the disturbance detection sensor 1604*b* can be used to calculate a distance traveled by the electromagnetic wave up to a point where the reflection takes place, which enables the disturbance detection sensor 1604*b* to calculate a distance from the transmission device 101 or 102 to the downstream disturbance on the power line 1610.

The distance calculated can be reported to the network management system 1601 by way of the base station 1614. In one embodiment, the location of the waveguide system 1602 on the power line 1610 may be known to the network management system 1601, which the network management system 1601 can use to determine a location of the disturbance on the power line 1610 based on a known topology of the power grid. In another embodiment, the waveguide system 1602 can provide its location to the network management system 1601 to assist in the determination of the location of the disturbance on the power line 1610. The location of the waveguide system 1602 can be obtained by the waveguide system 1602 from a pre-programmed location of the waveguide system 1602 stored in a memory of the waveguide system 1602, or the waveguide system 1602 can determine its location using a GPS receiver (not shown) included in the waveguide system 1602.

The power management system 1605 provides energy to the aforementioned components of the waveguide system 1602. The power management system 1605 can receive energy from solar cells, or from a transformer (not shown) coupled to the power line 1610, or by inductive coupling to the power line 1610 or another nearby power line. The power management system 1605 can also include a backup battery and/or a super capacitor or other capacitor circuit for providing the waveguide system 1602 with temporary power. The loss of energy sensor 1604*c* can be used to detect when the waveguide system 1602 has a loss of power condition and/or the occurrence of some other malfunction. For example, the loss of energy sensor 1604*c* can detect when there is a loss of power due to defective solar cells, an obstruction on the solar cells that causes them to malfunction, loss of power on the power line 1610, and/or when the backup power system malfunctions due to expiration of a backup battery, or a detectable defect in a super capacitor. When a malfunction and/or loss of power occurs, the loss of energy sensor 1604*c* can notify the network management system 1601 by way of the base station 1614.

The noise sensor 1604*d* can be used to measure noise on the power line 1610 that may adversely affect transmission of electromagnetic waves on the power line 1610. The noise sensor 1604*d* can sense unexpected electromagnetic interference, noise bursts, or other sources of disturbances that may interrupt reception of modulated electromagnetic waves on a surface of a power line 1610. A noise burst can be caused by, for example, a corona discharge, or other source of noise. The noise sensor 1604*d* can compare the measured noise to a noise profile obtained by the waveguide system 1602 from an internal database of noise profiles or from a remotely located database that stores noise profiles via pattern recognition, an expert system, curve fitting, matched filtering or other artificial intelligence, classification or comparison technique. From the comparison, the noise sensor 1604*d* may identify a noise source (e.g., corona discharge or otherwise) based on, for example, the noise profile that provides the closest match to the measured noise. The noise sensor 1604*d* can also detect how noise affects transmissions by measuring transmission metrics such as bit error rate, packet loss rate, jitter, packet retransmission requests, etc. The noise sensor 1604*d* can report to the network management system 1601 by way of the base station 1614 the identity of noise sources, their time of occurrence, and transmission metrics, among other things.

The vibration sensor 1604*e* can include accelerometers and/or gyroscopes to detect 2D or 3D vibrations on the power line 1610. The vibrations can be compared to vibration profiles that can be stored locally in the waveguide system 1602, or obtained by the waveguide system 1602 from a remote database via pattern recognition, an expert system, curve fitting, matched filtering or other artificial intelligence, classification or comparison technique. Vibration profiles can be used, for example, to distinguish fallen trees from wind gusts based on, for example, the vibration profile that provides the closest match to the measured vibrations. The results of this analysis can be reported by the vibration sensor 1604*e* to the network management system 1601 by way of the base station 1614.

The environmental sensor 1604*f* can include a barometer for measuring atmospheric pressure, ambient temperature (which can be provided by the temperature sensor 1604*a*), wind speed, humidity, wind direction, and rainfall, among other things. The environmental sensor 1604*f* can collect raw information and process this information by comparing it to environmental profiles that can be obtained from a memory of the waveguide system 1602 or a remote database to predict weather conditions before they arise via pattern recognition, an expert system, knowledge-based system or other artificial intelligence, classification or other weather modeling and prediction technique. The environmental sensor 1604*f* can report raw data as well as its analysis to the network management system 1601.

The image sensor 1604*g* can be a digital camera (e.g., a charged coupled device or CCD imager, infrared camera, etc.) for capturing images in a vicinity of the waveguide system 1602. The image sensor 1604*g* can include an electromechanical mechanism to control movement (e.g., actual position or focal points/zooms) of the camera for inspecting the power line 1610 from multiple perspectives (e.g., top surface, bottom surface, left surface, right surface and so on). Alternatively, the image sensor 1604*g* can be designed such that no electromechanical mechanism is needed in order to obtain the multiple perspectives. The collection and retrieval of imaging data generated by the image sensor 1604*g* can be controlled by the network management system 1601, or can be autonomously collected and reported by the image sensor 1604*g* to the network management system 1601.

Other sensors that may be suitable for collecting telemetry information associated with the waveguide system 1602 and/or the power lines 1610 for purposes of detecting, predicting and/or mitigating disturbances that can impede the propagation of electromagnetic wave transmissions on power lines 1610 (or any other form of a transmission medium of electromagnetic waves) may be utilized by the waveguide system 1602.

Referring now to FIG. 16B, block diagram 1650 illustrates an example, non-limiting embodiment of a system for managing a power grid 1653 and a communication system 1655 embedded therein or associated therewith in accordance with various aspects described herein. The communication system 1655 comprises a plurality of waveguide systems 1602 coupled to power lines 1610 of the power grid 1653. At least a portion of the waveguide systems 1602 used in the communication system 1655 can be in direct communication with a base station 1614 and/or the network management system 1601. Waveguide systems 1602 not directly connected to a base station 1614 or the network management system 1601 can engage in communication sessions with either a base station 1614 or the network management system 1601 by way of other downstream waveguide systems 1602 connected to a base station 1614 or the network management system 1601.

The network management system 1601 can be communicatively coupled to equipment of a utility company 1652 and equipment of a communications service provider 1654 for providing each entity, status information associated with the power grid 1653 and the communication system 1655, respectively. The network management system 1601, the equipment of the utility company 1652, and the communications service provider 1654 can access communication devices utilized by utility company personnel 1656 and/or communication devices utilized by communications service provider personnel 1658 for purposes of providing status information and/or for directing such personnel in the management of the power grid 1653 and/or communication system 1655.

Figure 17A:
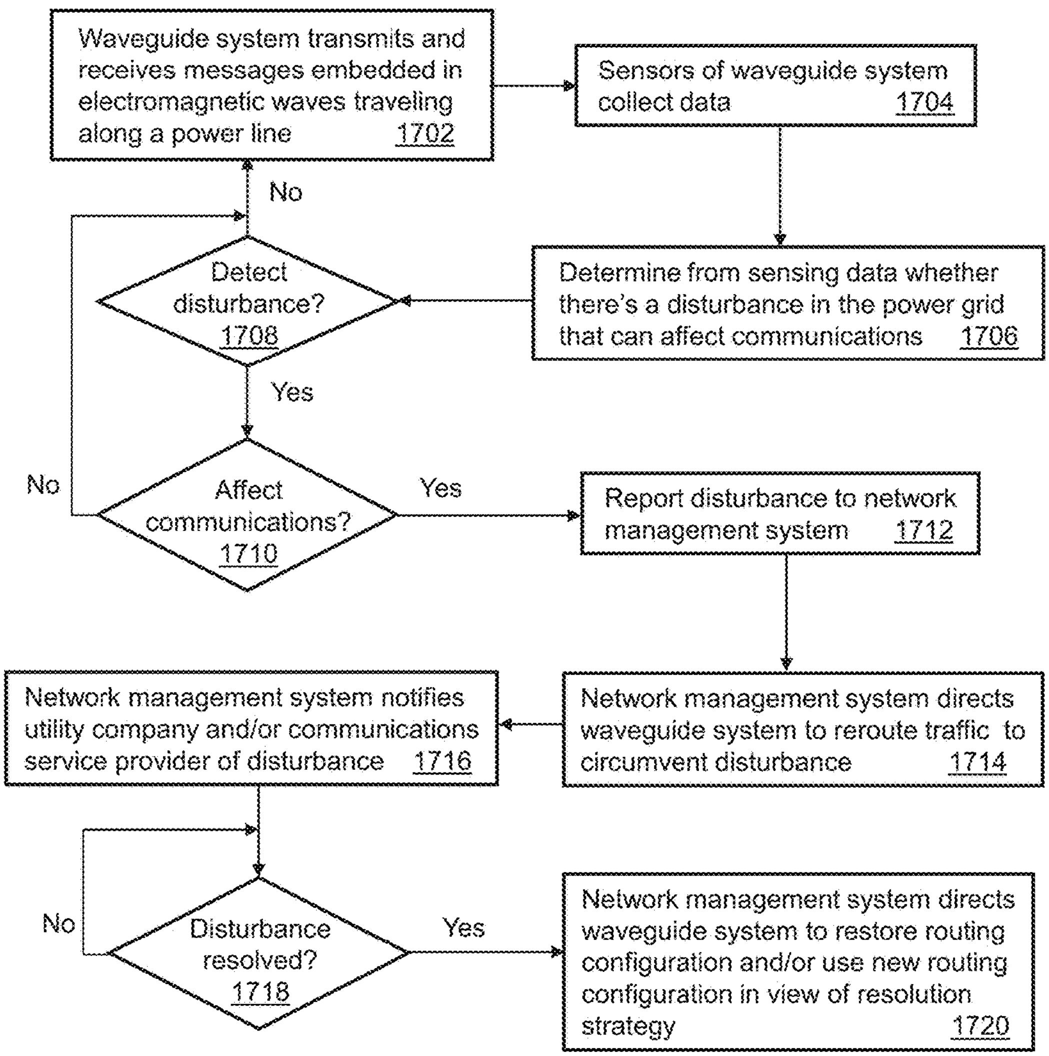
FIG. 17A illustrates a flow diagram of an example, non-limiting embodiment of a method for detecting and mitigating disturbances occurring in a communication network of the system of FIGS. 16A and 16B.

FIG. 17A illustrates a flow diagram of an example, non-limiting embodiment of a method 1700 for detecting and mitigating disturbances occurring in a communication network of the systems of FIGS. 16A & 16B. Method 1700 can begin with step 1702 where a waveguide system 1602 transmits and receives messages embedded in, or forming part of, modulated electromagnetic waves or another type of electromagnetic waves traveling along a surface of a power line 1610. The messages can be voice messages, streaming video, and/or other data/information exchanged between communication devices communicatively coupled to the communication system 1655. At step 1704 the sensors 1604 of the waveguide system 1602 can collect sensing data. In an embodiment, the sensing data can be collected in step 1704 prior to, during, or after the transmission and/or receipt of messages in step 1702. At step 1706 the waveguide system 1602 (or the sensors 1604 themselves) can determine from the sensing data an actual or predicted occurrence of a disturbance in the communication system 1655 that can affect communications originating from (e.g., transmitted by) or received by the waveguide system 1602. The waveguide system 1602 (or the sensors 1604) can process temperature data, signal reflection data, loss of energy data, noise data, vibration data, environmental data, or any combination thereof to make this determination. The waveguide system 1602 (or the sensors 1604) may also detect, identify, estimate, or predict the source of the disturbance and/or its location in the communication system 1655. If a disturbance is neither detected/identified nor predicted/estimated at step 1708, the waveguide system 1602 can proceed to step 1702 where it continues to transmit and receive messages embedded in, or forming part of, modulated electromagnetic waves traveling along a surface of the power line 1610.

If at step 1708 a disturbance is detected/identified or predicted/estimated to occur, the waveguide system 1602 proceeds to step 1710 to determine if the disturbance adversely affects (or alternatively, is likely to adversely affect or the extent to which it may adversely affect) transmission or reception of messages in the communication system 1655. In one embodiment, a duration threshold and a frequency of occurrence threshold can be used at step 1710 to determine when a disturbance adversely affects communications in the communication system 1655. For illustration purposes only, assume a duration threshold is set to 500 ms, while a frequency of occurrence threshold is set to 5 disturbances occurring in an observation period of 10 sec. Thus, a disturbance having a duration greater than 500 ms will trigger the duration threshold. Additionally, any disturbance occurring more than 5 times in a 10 sec time interval will trigger the frequency of occurrence threshold.

In one embodiment, a disturbance may be considered to adversely affect signal integrity in the communication systems 1655 when the duration threshold alone is exceeded. In another embodiment, a disturbance may be considered as adversely affecting signal integrity in the communication systems 1655 when both the duration threshold and the frequency of occurrence threshold are exceeded. The latter embodiment is thus more conservative than the former embodiment for classifying disturbances that adversely affect signal integrity in the communication system 1655. It will be appreciated that many other algorithms and associated parameters and thresholds can be utilized for step 1710 in accordance with example embodiments.

Referring back to method 1700, if at step 1710 the disturbance detected at step 1708 does not meet the condition for adversely affected communications (e.g., neither exceeds the duration threshold nor the frequency of occurrence threshold), the waveguide system 1602 may proceed to step 1702 and continue processing messages. For instance, if the disturbance detected in step 1708 has a duration of 1 msec with a single occurrence in a 10 sec time period, then neither threshold will be exceeded. Consequently, such a disturbance may be considered as having a nominal effect on signal integrity in the communication system 1655 and thus would not be flagged as a disturbance requiring mitigation. Although not flagged, the occurrence of the disturbance, its time of occurrence, its frequency of occurrence, spectral data, and/or other useful information, may be reported to the network management system 1601 as telemetry data for monitoring purposes.

Referring back to step 1710, if on the other hand the disturbance satisfies the condition for adversely affected communications (e.g., exceeds either or both thresholds), the waveguide system 1602 can proceed to step 1712 and report the incident to the network management system 1601. The report can include raw sensing data collected by the sensors 1604, a description of the disturbance if known by the waveguide system 1602, a time of occurrence of the disturbance, a frequency of occurrence of the disturbance, a location associated with the disturbance, parameters readings such as bit error rate, packet loss rate, retransmission requests, jitter, latency and so on. If the disturbance is based on a prediction by one or more sensors of the waveguide system 1602, the report can include a type of disturbance expected, and if predictable, an expected time occurrence of the disturbance, and an expected frequency of occurrence of the predicted disturbance when the prediction is based on historical sensing data collected by the sensors 1604 of the waveguide system 1602.

At step 1714, the network management system 1601 can determine a mitigation, circumvention, or correction technique, which may include directing the waveguide system 1602 to reroute traffic to circumvent the disturbance if the location of the disturbance can be determined. In one embodiment, the waveguide coupling device 1402 detecting the disturbance may direct a repeater such as the one shown in FIGS. 13-14 to connect the waveguide system 1602 from a primary power line affected by the disturbance to a secondary power line to enable the waveguide system 1602 to reroute traffic to a different transmission medium and avoid the disturbance. In an embodiment where the waveguide system 1602 is configured as a repeater the waveguide system 1602 can itself perform the rerouting of traffic from the primary power line to the secondary power line. It is further noted that for bidirectional communications (e.g., full or half-duplex communications), the repeater can be configured to reroute traffic from the secondary power line back to the primary power line for processing by the waveguide system 1602.

In another embodiment, the waveguide system 1602 can redirect traffic by instructing a first repeater situated upstream of the disturbance and a second repeater situated downstream of the disturbance to redirect traffic from a primary power line temporarily to a secondary power line and back to the primary power line in a manner that avoids the disturbance. It is further noted that for bidirectional communications (e.g., full or half-duplex communications), repeaters can be configured to reroute traffic from the secondary power line back to the primary power line.

To avoid interrupting existing communication sessions occurring on a secondary power line, the network management system 1601 may direct the waveguide system 1602 to instruct repeater(s) to utilize unused time slot(s) and/or frequency band(s) of the secondary power line for redirecting data and/or voice traffic away from the primary power line to circumvent the disturbance.

At step 1716, while traffic is being rerouted to avoid the disturbance, the network management system 1601 can notify equipment of the utility company 1652 and/or equipment of the communications service provider 1654, which in turn may notify personnel of the utility company 1656 and/or personnel of the communications service provider 1658 of the detected disturbance and its location if known. Field personnel from either party can attend to resolving the disturbance at a determined location of the disturbance. Once the disturbance is removed or otherwise mitigated by personnel of the utility company and/or personnel of the communications service provider, such personnel can notify their respective companies and/or the network management system 1601 utilizing field equipment (e.g., a laptop computer, smartphone, etc.) communicatively coupled to network management system 1601, and/or equipment of the utility company and/or the communications service provider. The notification can include a description of how the disturbance was mitigated and any changes to the power lines 1610 that may change a topology of the communication system 1655.

Once the disturbance has been resolved (as determined in decision 1718), the network management system 1601 can direct the waveguide system 1602 at step 1720 to restore the previous routing configuration used by the waveguide system 1602 or route traffic according to a new routing configuration if the restoration strategy used to mitigate the disturbance resulted in a new network topology of the communication system 1655. In another embodiment, the waveguide system 1602 can be configured to monitor mitigation of the disturbance by transmitting test signals on the power line 1610 to determine when the disturbance has been removed. Once the waveguide system 1602 detects an absence of the disturbance it can autonomously restore its routing configuration without assistance by the network management system 1601 if it determines the network topology of the communication system 1655 has not changed, or it can utilize a new routing configuration that adapts to a detected new network topology.

Figure 17B:
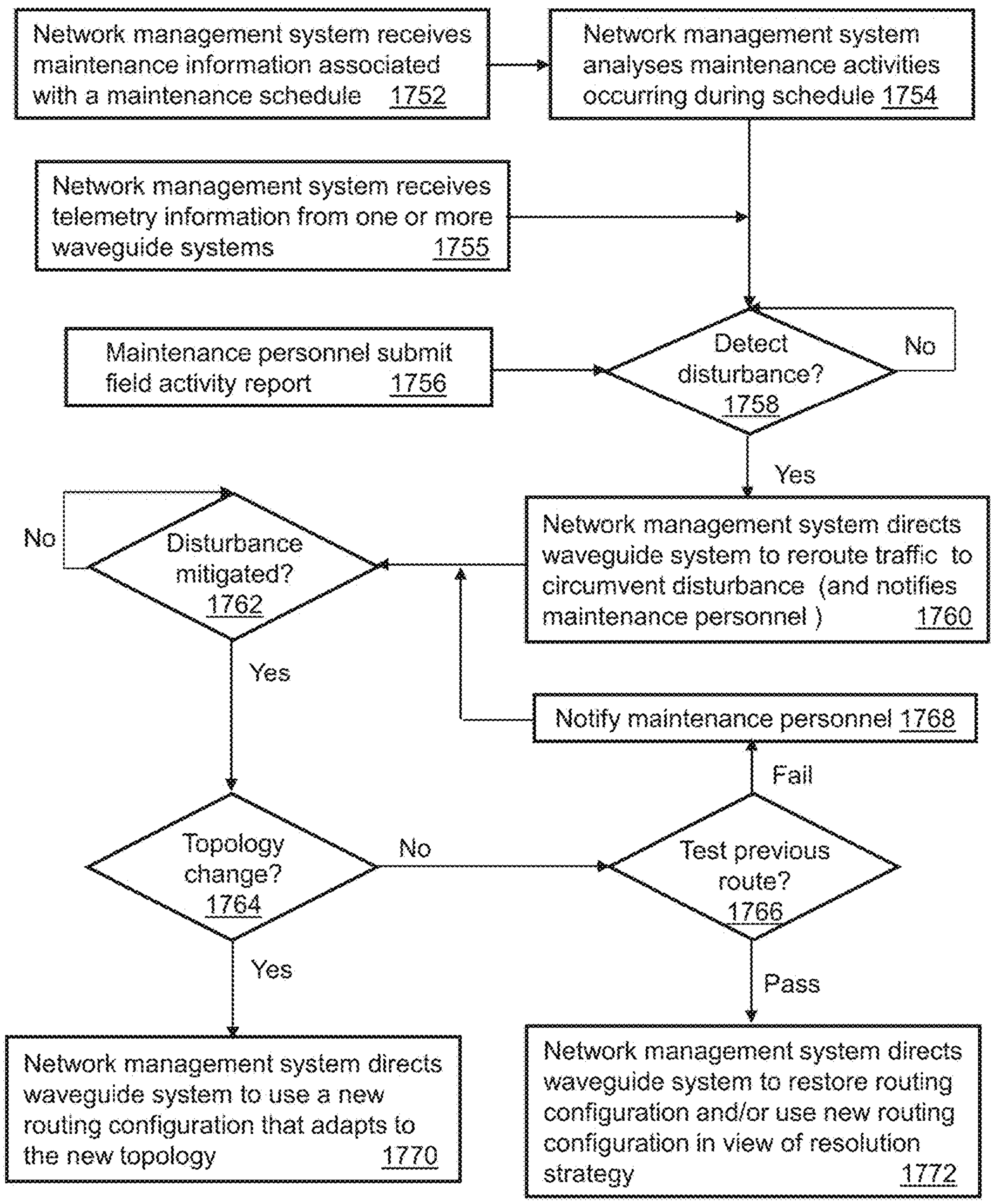
FIG. 17B illustrates a flow diagram of an example, non-limiting embodiment of a method for detecting and mitigating disturbances occurring in a communication network of the system of FIGS. 16A and 16B.

FIG. 17B illustrates a flow diagram of an example, non-limiting embodiment of a method 1750 for detecting and mitigating disturbances occurring in a communication network of the system of FIGS. 16A and 16B. In one embodiment, method 1750 can begin with step 1752 where a network management system 1601 receives from equipment of the utility company 1652 or equipment of the communications service provider 1654 maintenance information associated with a maintenance schedule. The network management system 1601 can at step 1754 identify from the maintenance information, maintenance activities to be performed during the maintenance schedule. From these activities, the network management system 1601 can detect a disturbance resulting from the maintenance (e.g., scheduled replacement of a power line 1610, scheduled replacement of a waveguide system 1602 on the power line 1610, scheduled reconfiguration of power lines 1610 in the power grid 1653, etc.).

In another embodiment, the network management system 1601 can receive at step 1755 telemetry information from one or more waveguide systems 1602. The telemetry information can include among other things an identity of each waveguide system 1602 submitting the telemetry information, measurements taken by sensors 1604 of each waveguide system 1602, information relating to predicted, estimated, or actual disturbances detected by the sensors 1604 of each waveguide system 1602, location information associated with each waveguide system 1602, an estimated location of a detected disturbance, an identification of the disturbance, and so on. The network management system 1601 can determine from the telemetry information a type of disturbance that may be adverse to operations of the waveguide, transmission of the electromagnetic waves along the wire surface, or both. The network management system 1601 can also use telemetry information from multiple waveguide systems 1602 to isolate and identify the disturbance. Additionally, the network management system 1601 can request telemetry information from waveguide systems 1602 in a vicinity of an affected waveguide system 1602 to triangulate a location of the disturbance and/or validate an identification of the disturbance by receiving similar telemetry information from other waveguide systems 1602.

In yet another embodiment, the network management system 1601 can receive at step 1756 an unscheduled activity report from maintenance field personnel. Unscheduled maintenance may occur as result of field calls that are unplanned or as a result of unexpected field issues discovered during field calls or scheduled maintenance activities. The activity report can identify changes to a topology configuration of the power grid 1653 resulting from field personnel addressing discovered issues in the communication system 1655 and/or power grid 1653, changes to one or more waveguide systems 1602 (such as replacement or repair thereof), mitigation of disturbances performed if any, and so on.

At step 1758, the network management system 1601 can determine from reports received according to steps 1752 through 1756 if a disturbance will occur based on a maintenance schedule, or if a disturbance has occurred or is predicted to occur based on telemetry data, or if a disturbance has occurred due to an unplanned maintenance identified in a field activity report. From any of these reports, the network management system 1601 can determine whether a detected or predicted disturbance requires rerouting of traffic by the affected waveguide systems 1602 or other waveguide systems 1602 of the communication system 1655.

When a disturbance is detected or predicted at step 1758, the network management system 1601 can proceed to step 1760 where it can direct one or more waveguide systems 1602 to reroute traffic to circumvent the disturbance. When the disturbance is permanent due to a permanent topology change of the power grid 1653, the network management system 1601 can proceed to step 1770 and skip steps 1762, 1764, 1766, and 1772. At step 1770, the network management system 1601 can direct one or more waveguide systems 1602 to use a new routing configuration that adapts to the new topology. However, when the disturbance has been detected from telemetry information supplied by one or more waveguide systems 1602, the network management system 1601 can notify maintenance personnel of the utility company 1656 or the communications service provider 1658 of a location of the disturbance, a type of disturbance if known, and related information that may be helpful to such personnel to mitigate the disturbance. When a disturbance is expected due to maintenance activities, the network management system 1601 can direct one or more waveguide systems 1602 to reconfigure traffic routes at a given schedule (consistent with the maintenance schedule) to avoid disturbances caused by the maintenance activities during the maintenance schedule.

Returning back to step 1760 and upon its completion, the process can continue with step 1762. At step 1762, the network management system 1601 can monitor when the disturbance(s) have been mitigated by field personnel. Mitigation of a disturbance can be detected at step 1762 by analyzing field reports submitted to the network management system 1601 by field personnel over a communications network (e.g., cellular communication system) utilizing field equipment (e.g., a laptop computer or handheld computer/device). If field personnel have reported that a disturbance has been mitigated, the network management system 1601 can proceed to step 1764 to determine from the field report whether a topology change was required to mitigate the disturbance. A topology change can include rerouting a power line 1610, reconfiguring a waveguide system 1602 to utilize a different power line 1610, otherwise utilizing an alternative link to bypass the disturbance and so on. If a topology change has taken place, the network management system 1601 can direct at step 1770 one or more waveguide systems 1602 to use a new routing configuration that adapts to the new topology.

If, however, a topology change has not been reported by field personnel, the network management system 1601 can proceed to step 1766 where it can direct one or more waveguide systems 1602 to send test signals to test a routing configuration that had been used prior to the detected disturbance(s). Test signals can be sent to affected waveguide systems 1602 in a vicinity of the disturbance. The test signals can be used to determine if signal disturbances (e.g., electromagnetic wave reflections) are detected by any of the waveguide systems 1602. If the test signals confirm that a prior routing configuration is no longer subject to previously detected disturbance(s), then the network management system 1601 can at step 1772 direct the affected waveguide systems 1602 to restore a previous routing configuration. If, however, test signals analyzed by one or more waveguide coupling device 1402 and reported to the network management system 1601 indicate that the disturbance(s) or new disturbance(s) are present, then the network management system 1601 will proceed to step 1768 and report this information to field personnel to further address field issues. The network management system 1601 can in this situation continue to monitor mitigation of the disturbance(s) at step 1762.

In the aforementioned embodiments, the waveguide systems 1602 can be configured to be self-adapting to changes in the power grid 1653 and/or to mitigation of disturbances. That is, one or more affected waveguide systems 1602 can be configured to self-monitor mitigation of disturbances and reconfigure traffic routes without requiring instructions to be sent to them by the network management system 1601. In this embodiment, the one or more waveguide systems 1602 that are self-configurable can inform the network management system 1601 of its routing choices so that the network management system 1601 can maintain a macro-level view of the communication topology of the communication system 1655.

While for purposes of simplicity of explanation, the respective processes are shown and described as a series of blocks in FIGS. 17A and 17B, respectively, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIGS. 18A, 18B, 18C, 18D, 18E, 18F and 18G are block diagrams illustrating example, non-limiting embodiments of a waveguide device for transmitting and/or receiving electromagnetic waves in accordance with various aspects described herein. In one or more embodiments, the waveguide device can be separable or otherwise configured to facilitate a physical connection with a transmission medium, such as a power line. As an example, the waveguide device can be selectively separable into portions (of the same or different sizes) so that the portions (any number of) can be joined or moved back together and clamped onto or otherwise physically connected with the transmission medium. Various components and/or techniques can be utilized for separating and rejoining portions of the waveguide device such as hinges, latching mechanisms, and so forth. The method of opening, closing or actuating the latching mechanism can vary including via a magnetic field, a servo-motor, a pushrod, and so forth. In one or more embodiments, the waveguide device can be self-closing, such as automatically actuating a latching mechanism of the waveguide device to physically connect with the transmission medium when in proximity to the transmission medium. In one or more embodiments, the latching mechanism can open or close responsive to a latching signal generated by the waveguide system or generated by another device, such as an unmanned aircraft utilized to deliver the waveguide device as described herein.

Figure 18A:
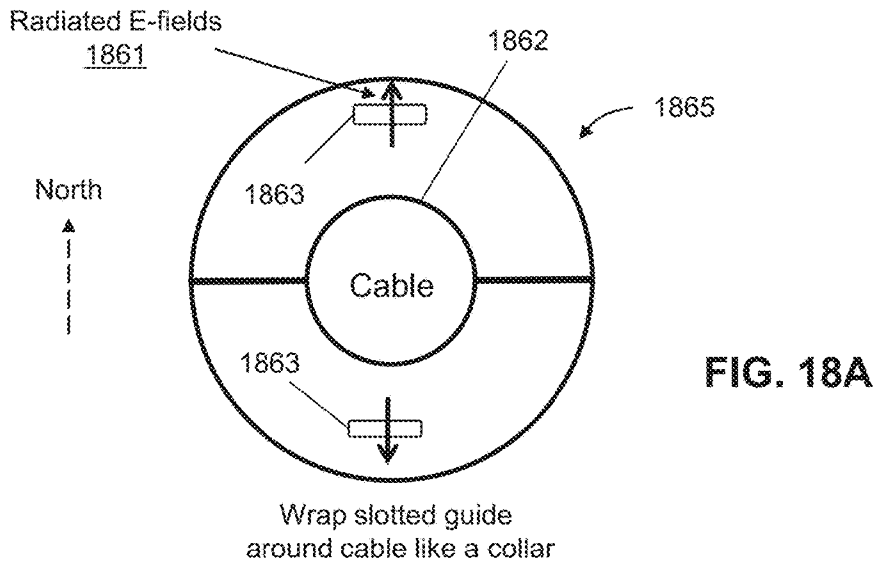
FIGS. 18A, 18B, 18C, 18D, 18E, 18F, 18G, 18H, 18I and 18J are block diagrams illustrating example, non-limiting embodiments of a waveguide device for transmitting or receiving electromagnetic waves in accordance with various aspects described herein.

In an embodiment, FIG. 18A illustrates a front view of a waveguide device 1865 having a plurality of slots 1863 (e.g., openings or apertures) for emitting electromagnetic waves having radiated electric fields (e-fields) 1861. In an embodiment, the radiated e-fields 1861 of pairs of symmetrically positioned slots 1863 (e.g., north and south slots of the waveguide 1865) can be directed away from each other (i.e., polar opposite radial orientations about the cable 1862). While the slots 1863 are shown as having a rectangular shape, other shapes such as other polygons, sector and arc shapes, ellipsoid shapes and other shapes are likewise possible. For illustration purposes only, the term north will refer to a relative direction as shown in the figures. All references in the subject disclosure to other directions (e.g., south, east, west, northwest, and so forth) will be relative to northern illustration. In an embodiment, to achieve e-fields with opposing orientations at the north and south slots 1863, for example, the north and south slots 1863 can be arranged to have a circumferential distance between each other that is approximately one wavelength of electromagnetic waves signals supplied to these slots. The waveguide 1865 can have a cylindrical cavity in a center of the waveguide 1865 to enable placement of a cable 1862. In one embodiment, the cable 1862 can comprise an insulated conductor. In another embodiment, the cable 1862 can comprise an uninsulated conductor. In yet other embodiments, the cable 1862 can comprise any of the embodiments of a transmission core 1852 of cable 1850 previously described.

In one embodiment, the cable 1862 can slide into the cylindrical cavity of the waveguide 1865. In another embodiment, the waveguide 1865 can utilize an assembly mechanism (not shown). The assembly mechanism (e.g., a hinge or other suitable mechanism that provides a way to open the waveguide 1865 at one or more locations) can be used to enable placement of the waveguide 1865 on an outer surface of the cable 1862 or otherwise to assemble separate pieces together to form the waveguide 1865 as shown. According to these and other suitable embodiments, the waveguide 1865 can be configured to wrap around the cable 1862 like a collar.

Figure 18B:
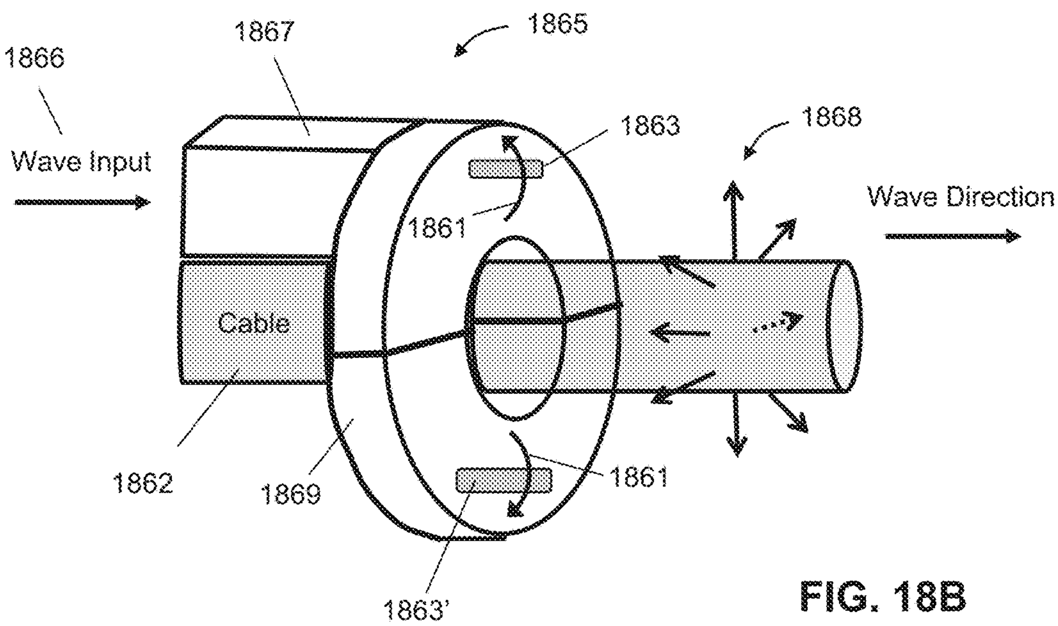

FIG. 18B illustrates a side view of an embodiment of the waveguide 1865. The waveguide 1865 can be adapted to have a hollow rectangular waveguide portion 1867 that receives electromagnetic waves 1866 generated by a transmitter circuit as previously described in the subject disclosure (e.g., see reference 101, 1000 of FIGS. 1 and 10A). The electromagnetic waves 1866 can be distributed by the hollow rectangular waveguide portion 1867 into in a hollow collar 1869 of the waveguide 1865. The rectangular waveguide portion 1867 and the hollow collar 1869 can be constructed of materials suitable for maintaining the electromagnetic waves within the hollow chambers of these assemblies (e.g., carbon fiber materials). It should be noted that while the waveguide portion 1867 is shown and described in a hollow rectangular configuration, other shapes and/or other non-hollow configurations can be employed. In particular, the waveguide portion 1867 can have a square or other polygonal cross section, an arc or sector cross section that is truncated to conform to the outer surface of the cable 1862, a circular or ellipsoid cross section or cross sectional shape. In addition, the waveguide portion 1867 can be configured as, or otherwise include, a solid dielectric material.

As previously described, the hollow collar 1869 can be configured to emit electromagnetic waves from each slot 1863 with opposite e-fields 1861 at pairs of symmetrically positioned slots 1863 and 1863'. In an embodiment, the electromagnetic waves emitted by the combination of slots 1863 and 1863' can in turn induce electromagnetic waves 1868 on that are bound to the cable 1862 for propagation according to a fundamental wave mode without other wave modes present—such as non-fundamental wave modes. In this configuration, the electromagnetic waves 1868 can propagate longitudinally along the cable 1862 to other downstream waveguide systems coupled to the cable 1862.

It should be noted that since the hollow rectangular waveguide portion 1867 of FIG. 18B is closer to slot 1863 (at the northern position of the waveguide 1865), slot 1863 can emit electromagnetic waves having a stronger magnitude than electromagnetic waves emitted by slot 1863' (at the southern position). To reduce magnitude differences between these slots, slot 1863' can be made larger than slot 1863. The technique of utilizing different slot sizes to balance signal magnitudes between slots can be applied to any of the embodiments of the subject disclosure relating to FIGS. 18A, 18B, 18D, 18F, 18H and 18I—some of which are described below.

Figure 18C:
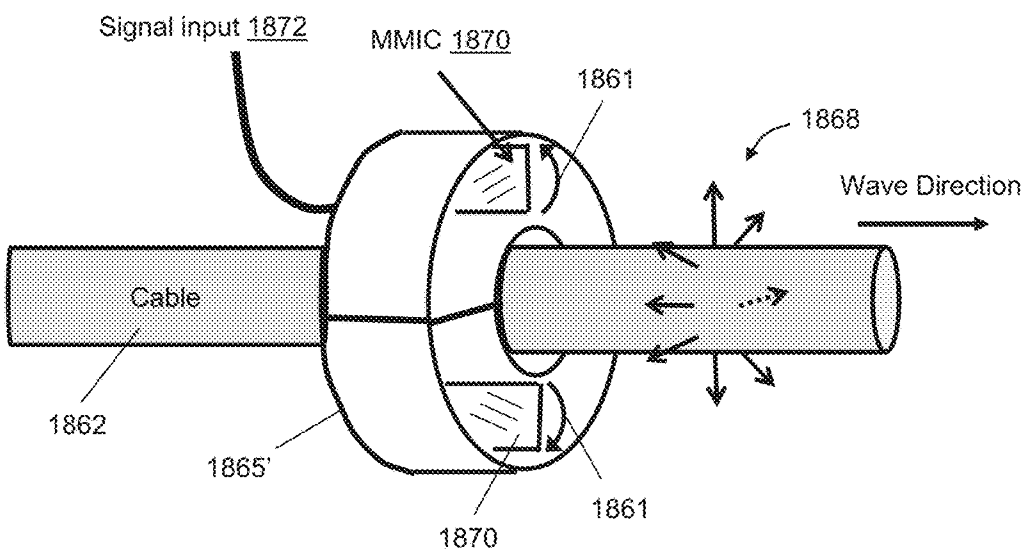

In another embodiment, FIG. 18C depicts a waveguide 1865' that can be configured to utilize circuitry such as monolithic microwave integrated circuits (MMICs) 1870 each coupled to a signal input 1872 (e.g., coaxial cable that provides a communication signal). The signal input 1872 can be generated by a transmitter circuit as previously described in the subject disclosure (e.g., see reference 101, 1000 of FIGS. 1 and 10A) adapted to provide electrical signals to the MMICs 1870. Each MMIC 1870 can be configured to receive signal 1872 which the MMIC 1870 can modulate and transmit with a radiating element (e.g., an antenna) to emit electromagnetic waves having radiated e-fields 1861. In one embodiment, the MMIC's 1870 can be configured to receive the same signal 1872, but transmit electromagnetic waves having e-fields 1861 of opposing orientation. This can be accomplished by configuring one of the MMICs 1870 to transmit electromagnetic waves that are 180 degrees out of phase with the electromagnetic waves transmitted by the other MMIC 1870. In an embodiment, the combination of the electromagnetic waves emitted by the MMICs 1870 can together induce electromagnetic waves 1868 that are bound to the cable 1862 for propagation according to a fundamental wave mode without other wave modes present—such as non-fundamental wave modes. In this configuration, the electromagnetic waves 1868 can propagate longitudinally along the cable 1862 to other downstream waveguide systems coupled to the cable 1862.

Figure 18D:
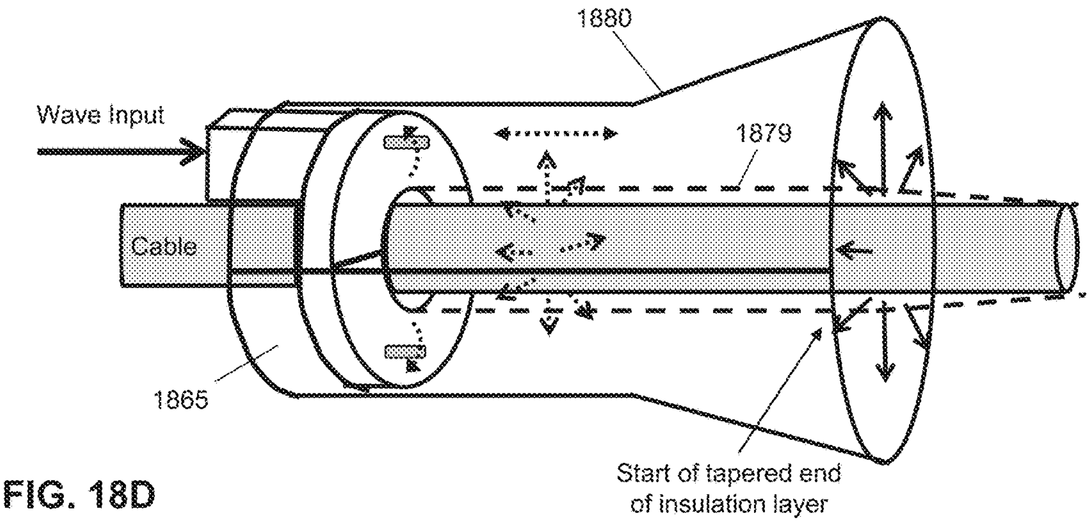
Figure 18E:
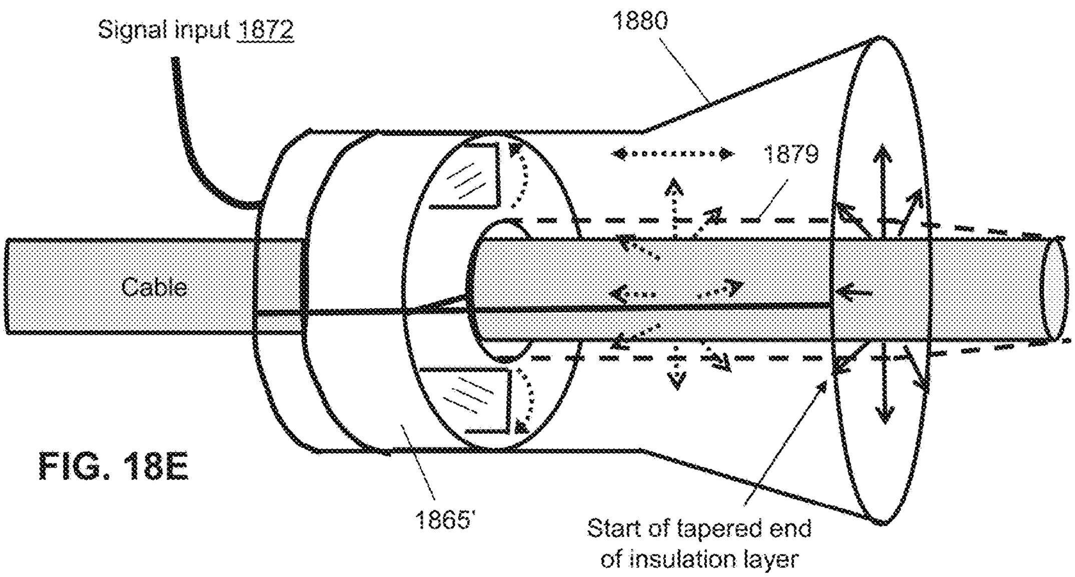

A tapered horn 1880 can be added to the embodiments of FIGS. 18B and 18C to assist in the inducement of the electromagnetic waves 1868 on cable 1862 as depicted in FIGS. 18D and 18E. In an embodiment where the cable 1862 is an uninsulated conductor, the electromagnetic waves induced on the cable 1862 can have a large radial dimension (e.g., 1 meter). To enable use of a smaller tapered horn 1880, an insulation layer 1879 can be applied on a portion of the cable 1862 at or near the cavity as depicted with hash lines in FIGS. 18D and 18E. The insulation layer 1879 can have a tapered end facing away from the waveguide 1865. The added insulation enables the electromagnetic waves 1868 initially launched by the waveguide 1865 (or 1865') to be tightly bound to the insulation, which in turn reduces the radial dimension of the electromagnetic fields 1868 (e.g., centimeters). As the electromagnetic waves 1868 propagate away from the waveguide 1865 (1865') and reach the tapered end of the insulation layer 1879, the radial dimension of the electromagnetic waves 1868 begin to increase eventually achieving the radial dimension they would have had had the electromagnetic waves 1868 been induced on the uninsulated conductor without an insulation layer. In the illustration of FIGS. 18D and 18E the tapered end begins at an end of the tapered horn 1880. In other embodiments, the tapered end of the insulation layer 1879 can begin before or after the end of the tapered horn 1880. The tapered horn can be metallic or constructed of other conductive material or constructed of a plastic or other non-conductive material that is coated or clad with a dielectric layer or doped with a conductive material to provide reflective properties similar to a metallic horn.

Figure 18F:
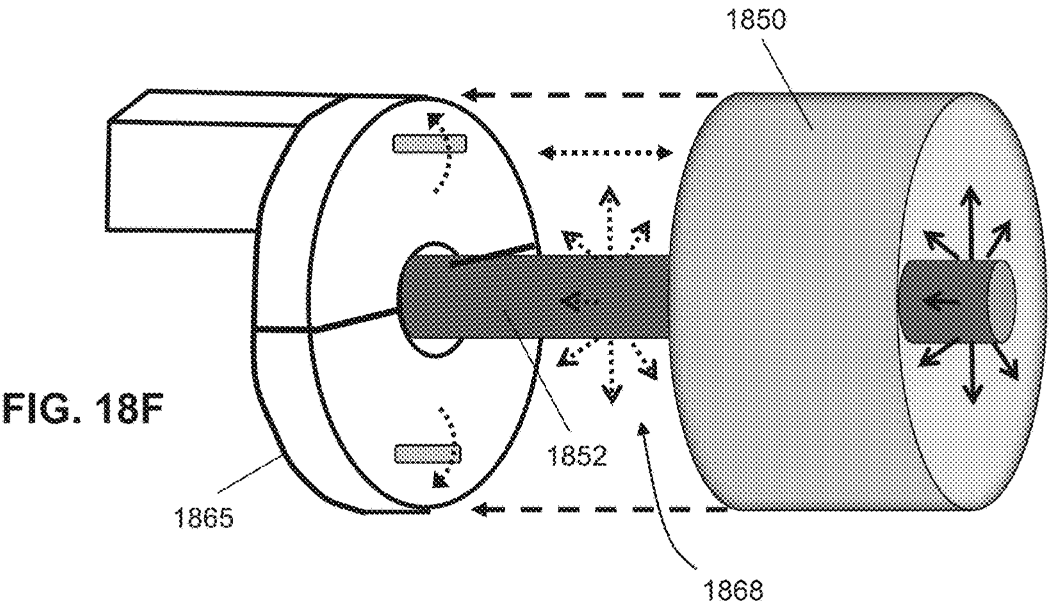
Figure 18G:
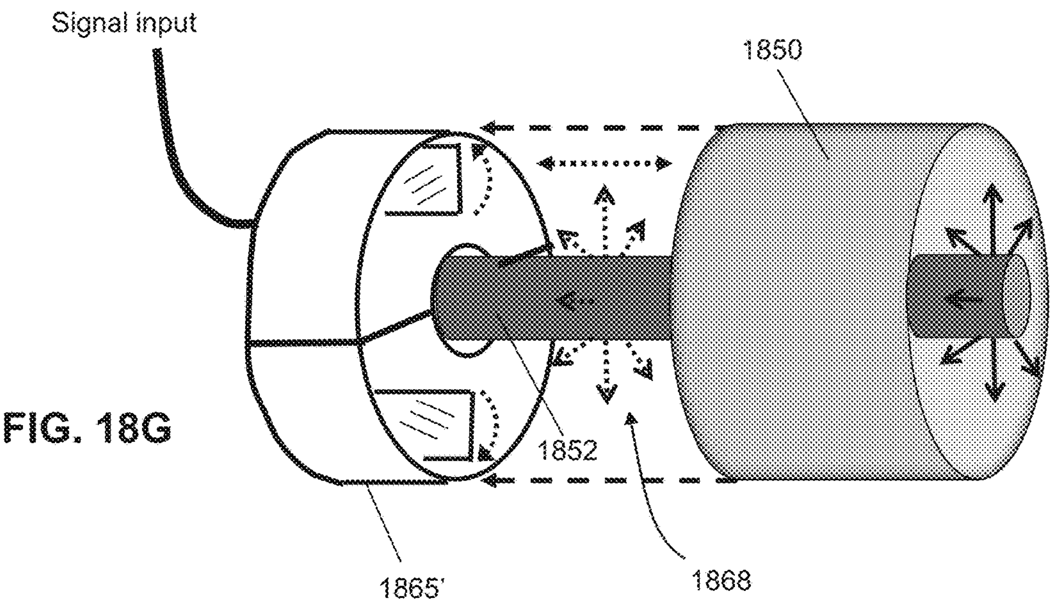

In an embodiment, cable 1862 can comprise any of the embodiments of cable 1850 described earlier. In this embodiment, waveguides 1865 and 1865' can be coupled to a transmission core 1852 of cable 1850 as depicted in FIGS. 18F and 18G. The waveguides 1865 and 1865' can induce, as previously described, electromagnetic waves 1868 on the transmission core 1852 for propagation entirely or partially within inner layers of cable 1850.

It is noted that for the foregoing embodiments of FIGS. 18D, 18E, 18F and 18G, electromagnetic waves 1868 can be bidirectional. For example, electromagnetic waves 1868 of a different operating frequency can be received by slots 1863 or MMIC's 1870 of the waveguides 1865 and 1865', respectively. Once received, the electromagnetic waves can be converted by a receiver circuit (e.g., see reference 101, 1000 of FIGS. 1 and 10A) for generating a communication signal for processing.

Although not shown, it is further noted that the waveguides 1865 and 1865' can be adapted so that the waveguides 1865 and 1865' can direct electromagnetic waves 1868 upstream or downstream longitudinally. For example, a first tapered horn 1880 coupled to a first instance of a waveguide 1865 or 1865' can be directed westerly on cable 1862, while a second tapered horn 1880 coupled to a second instance of a waveguide 1865 or 1865' can be directed easterly on cable 1862. The first and second instances of the waveguides 1865 or 1865' can be coupled so that in a repeater configuration, signals received by the first waveguide 1865 or 1865' can be provided to the second waveguide 1865 or 1865' for retransmission in an easterly direction on cable 1862. The repeater configuration just described can also be applied from an easterly to westerly direction on cable 1862.

Figure 18H:
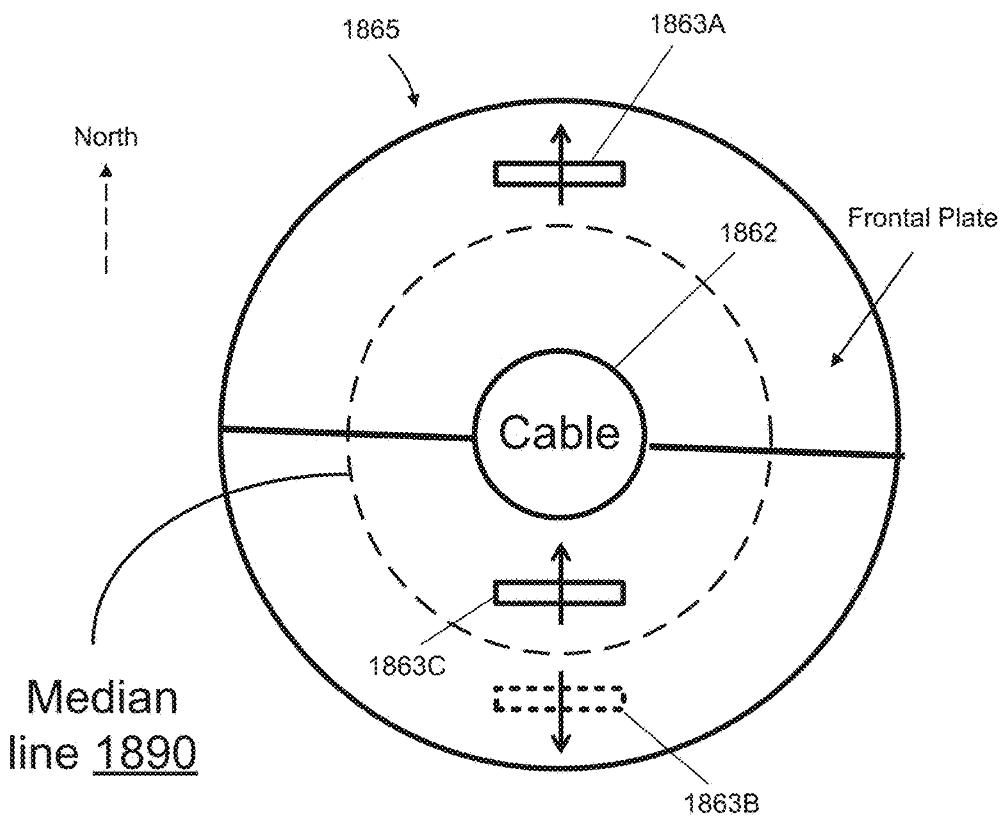

The waveguide 1865 of FIGS. 18A, 18B, 18D and 18F can also be configured to generate electromagnetic fields having only non-fundamental or asymmetric wave modes. FIG. 18H depicts an embodiment of a waveguide 1865 that can be adapted to generate electromagnetic fields having only non-fundamental wave modes. A median line 1890 represents a separation between slots where electrical currents on a backside (not shown) of a frontal plate of the waveguide 1865 change polarity. For example, electrical currents on the backside of the frontal plate corresponding to e-fields that are radially outward (i.e., point away from a center point of cable 1862) can in some embodiments be associated with slots located outside of the median line 1890 (e.g., slots 1863A and 1863B). Electrical currents on the backside of the frontal plate corresponding to e-fields that are radially inward (i.e., point towards a center point of cable 1862) can in some embodiments be associated with slots located inside of the median line 1890. The direction of the currents can depend on the operating frequency of the electromagnetic waves 1866 supplied to the hollow rectangular waveguide portion 1867 (see FIG. 18B) among other parameters.

For illustration purposes, assume the electromagnetic waves 1866 supplied to the hollow rectangular waveguide portion 1867 have an operating frequency whereby a circumferential distance between slots 1863A and 1863B is one full wavelength of the electromagnetic waves 1866. In this instance, the e-fields of the electromagnetic waves emitted by slots 1863A and 1863B point radially outward (i.e., have opposing orientations). When the electromagnetic waves emitted by slots 1863A and 1863B are combined, the resulting electromagnetic waves on cable 1862 will propagate according to the fundamental wave mode. In contrast, by repositioning one of the slots (e.g., slot 1863B) inside the media line 1890 (i.e., slot 1863C), slot 1863C will generate electromagnetic waves that have e-fields that are approximately 180 degrees out of phase with the e-fields of the electromagnetic waves generated by slot 1863A. Consequently, the e-field orientations of the electromagnetic waves generated by slot pairs 1863A and 1863C will be substantially aligned. The combination of the electromagnetic waves emitted by slot pairs 1863A and 1863C will thus generate electromagnetic waves that are bound to the cable 1862 for propagation according to a non-fundamental wave mode.

Figure 18I:
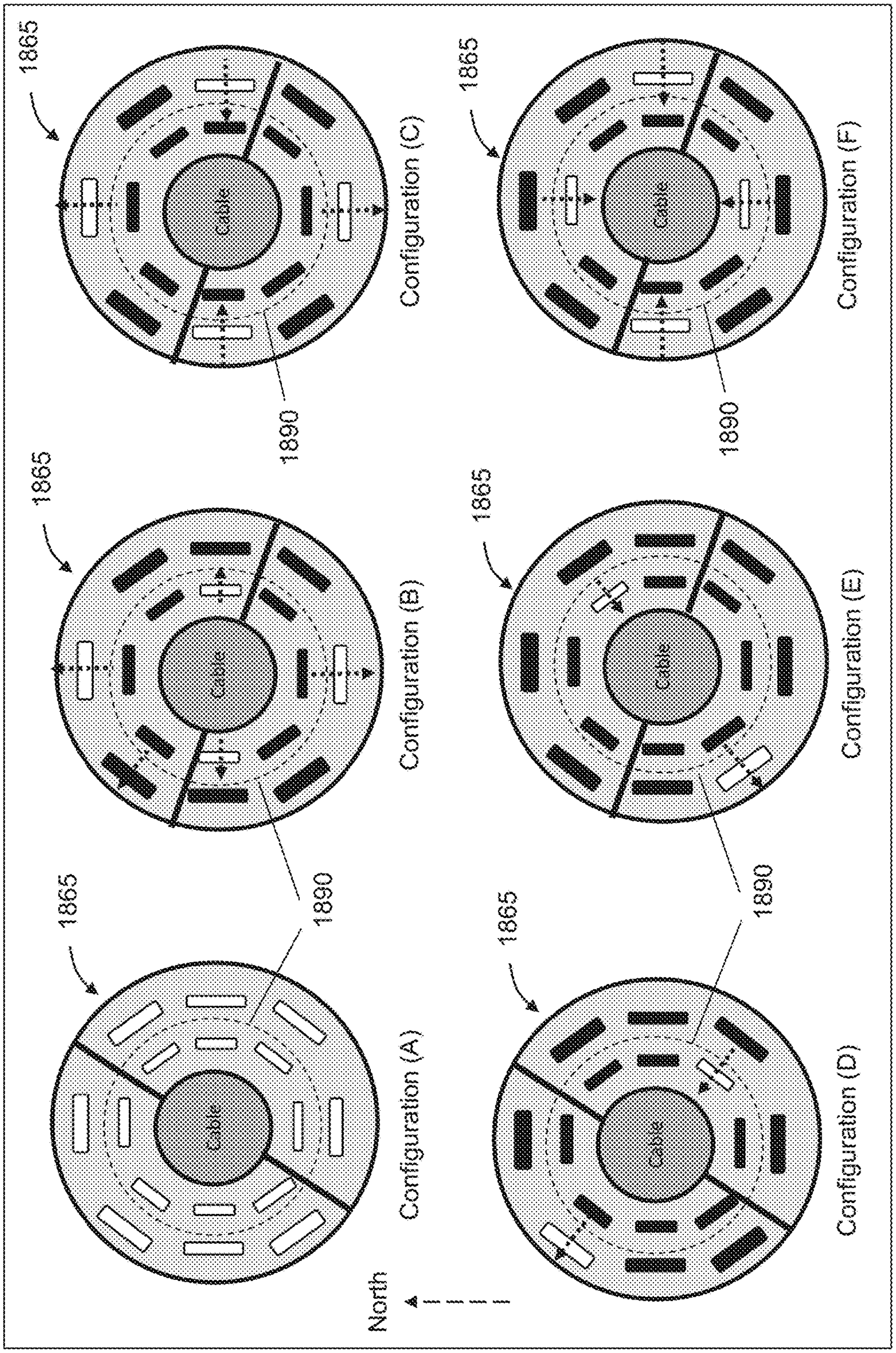

To achieve a reconfigurable slot arrangement, waveguide 1865 can be adapted according to the embodiments depicted in FIG. 18I. Configuration (A) depicts a waveguide 1865 having a plurality of symmetrically positioned slots. Each of the slots 1863 of configuration (A) can be selectively disabled by blocking the slot with a material (e.g., carbon fiber or metal) to prevent the emission of electromagnetic waves. A blocked (or disabled) slot 1863 is shown in black, while an enabled (or unblocked) slot 1863 is shown in white. Although not shown, a blocking material can be placed behind (or in front) of the frontal plate of the waveguide 1865. A mechanism (not shown) can be coupled to the blocking material so that the blocking material can slide in or out of a particular slot 1863 much like closing or opening a window with a cover. The mechanism can be coupled to a linear motor controllable by circuitry of the waveguide 1865 to selectively enable or disable individual slots 1863. With such a mechanism at each slot 1863, the waveguide 1865 can be configured to select different configurations of enabled and disabled slots 1863 as depicted in the embodiments of FIG. 18I. Other methods or techniques for covering or opening slots (e.g., utilizing rotatable disks behind or in front of the waveguide 1865) can be applied to the embodiments of the subject disclosure.

In one embodiment, the waveguide system 1865 can be configured to enable certain slots 1863 outside the median line 1890 and disable certain slots 1863 inside the median line 1890 as shown in configuration (B) to generate fundamental waves. Assume, for example, that the circumferential distance between slots 1863 outside the median line 1890 (i.e., in the northern and southern locations of the waveguide system 1865) is one full wavelength. These slots will therefore have electric fields (e-fields) pointing at certain instances in time radially outward as previously described. In contrast, the slots inside the median line 1890 (i.e., in the western and eastern locations of the waveguide system 1865) will have a circumferential distance of one-half a wavelength relative to either of the slots 1863 outside the median line. Since the slots inside the median line 1890 are half a wavelength apart, such slots will produce electromagnetic waves having e-fields pointing radially outward. If the western and eastern slots 1863 outside the median line 1890 had been enabled instead of the western and eastern slots inside the median line 1890, then the e-fields emitted by those slots would have pointed radially inward, which when combined with the electric fields of the northern and southern would produce non-fundamental wave mode propagation. Accordingly, configuration (B) as depicted in FIG. 18I can be used to generate electromagnetic waves at the northern and southern slots 1863 having e-fields that point radially outward and electromagnetic waves at the western and eastern slots 1863 with e-fields that also point radially outward, which when combined induce electromagnetic waves on cable 1862 having a fundamental wave mode.

In another embodiment, the waveguide system 1865 can be configured to enable a northerly, southerly, westerly and easterly slots 1863 all outside the median line 1890, and disable all other slots 1863 as shown in configuration (C). Assuming the circumferential distance between a pair of opposing slots (e.g., northerly and southerly, or westerly and easterly) is a full wavelength apart, then configuration (C) can be used to generate electromagnetic waves having a non-fundamental wave mode with some e-fields pointing radially outward and other fields pointing radially inward. In yet another embodiment, the waveguide system 1865 can be configured to enable a northwesterly slot 1863 outside the median line 1890, enable a southeasterly slot 1863 inside the median line 1890, and disable all other slots 1863 as shown in configuration (D). Assuming the circumferential distance between such a pair of slots is a full wavelength apart, then such a configuration can be used to generate electromagnetic waves having a non-fundamental wave mode with e-fields aligned in a northwesterly direction.

In another embodiment, the waveguide system 1865 can be configured to produce electromagnetic waves having a non-fundamental wave mode with e-fields aligned in a southwesterly direction. This can be accomplished by utilizing a different arrangement than used in configuration (D). Configuration (E) can be accomplished by enabling a southwesterly slot 1863 outside the median line 1890, enabling a northeasterly slot 1863 inside the median line 1890, and disabling all other slots 1863 as shown in configuration (E). Assuming the circumferential distance between such a pair of slots is a full wavelength apart, then such a configuration can be used to generate electromagnetic waves having a non-fundamental wave mode with e-fields aligned in a southwesterly direction. Configuration (E) thus generates a non-fundamental wave mode that is orthogonal to the non-fundamental wave mode of configuration (D).

In yet another embodiment, the waveguide system 1865 can be configured to generate electromagnetic waves having a fundamental wave mode with e-fields that point radially inward. This can be accomplished by enabling a northerly slot 1863 inside the median line 1890, enabling a southerly slot 1863 inside the median line 1890, enabling an easterly slot outside the median 1890, enabling a westerly slot 1863 outside the median 1890, and disabling all other slots 1863 as shown in configuration (F). Assuming the circumferential distance between the northerly and southerly slots is a full wavelength apart, then such a configuration can be used to generate electromagnetic waves having a fundamental wave mode with radially inward e-fields. Although the slots selected in configurations (B) and (F) are different, the fundamental wave modes generated by configurations (B) and (F) are the same.

It yet another embodiment, e-fields can be manipulated between slots to generate fundamental or non-fundamental wave modes by varying the operating frequency of the electromagnetic waves 1866 supplied to the hollow rectangular waveguide portion 1867. For example, assume in the illustration of FIG. 18H that for a particular operating frequency of the electromagnetic waves 1866 the circumferential distance between slot 1863A and 1863B is one full wavelength of the electromagnetic waves 1866. In this instance, the e-fields of electromagnetic waves emitted by slots 1863A and 1863B will point radially outward as shown, and can be used in combination to induce electromagnetic waves on cable 1862 having a fundamental wave mode. In contrast, the e-fields of electromagnetic waves emitted by slots 1863A and 1863C will be radially aligned (i.e., pointing northerly) as shown, and can be used in combination to induce electromagnetic waves on cable 1862 having a non-fundamental wave mode.

Now suppose that the operating frequency of the electromagnetic waves 1866 supplied to the hollow rectangular waveguide portion 1867 is changed so that the circumferential distance between slot 1863A and 1863B is one-half a wavelength of the electromagnetic waves 1866. In this instance, the e-fields of electromagnetic waves emitted by slots 1863A and 1863B will be radially aligned (i.e., point in the same direction). That is, the e-fields of electromagnetic waves emitted by slot 1863B will point in the same direction as the e-fields of electromagnetic waves emitted by slot 1863A. Such electromagnetic waves can be used in combination to induce electromagnetic waves on cable 1862 having a non-fundamental wave mode. In contrast, the e-fields of electromagnetic waves emitted by slots 1863A and 1863C will be radially outward (i.e., away from cable 1862), and can be used in combination to induce electromagnetic waves on cable 1862 having a fundamental wave mode.

Figure 18J:
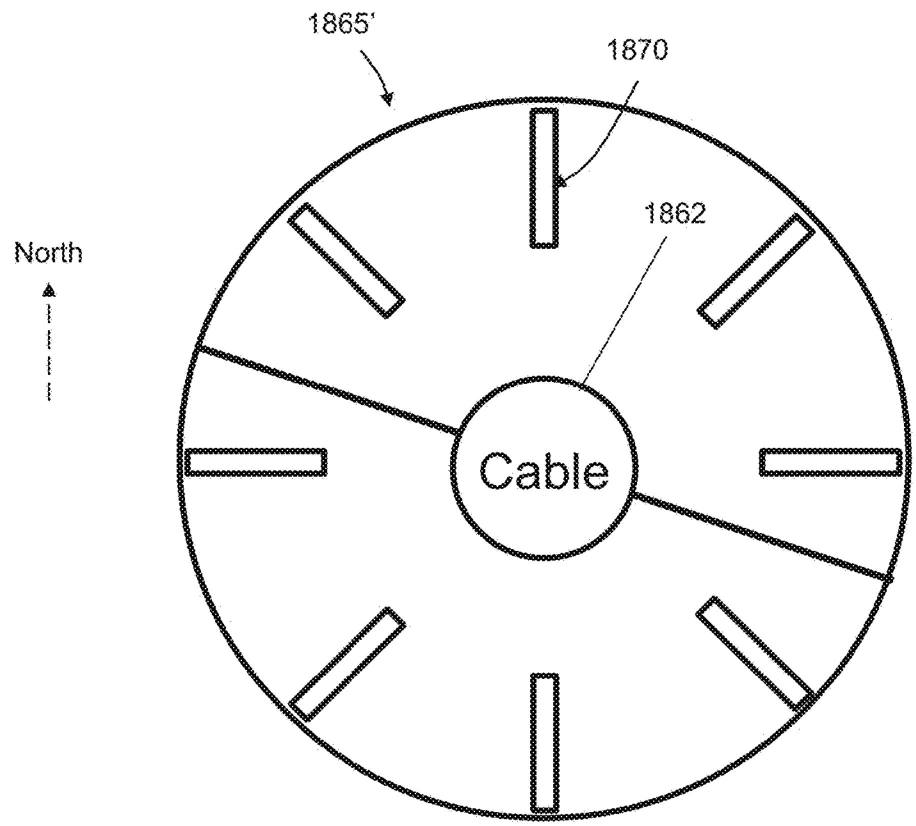

In another embodiment, the waveguide 1865' of FIGS. 18C, 18E and 18G can also be configured to generate electromagnetic waves having only non-fundamental wave modes. This can be accomplished by adding more MMICs 1870 as depicted in FIG. 18J. Each MMIC 1870 can be configured to receive the same signal input 1872. However, MMICs 1870 can selectively be configured to emit electromagnetic waves having differing phases using controllable phase-shifting circuitry in each MMIC 1870. For example, the northerly and southerly MMICs 1870 can be configured to emit electromagnetic waves having a 180-degree phase difference, thereby aligning the e-fields either in a northerly or southerly direction. Any combination of pairs of MMICs 1870 (e.g., westerly and easterly MMICs 1870, northwesterly and southeasterly MMICs 1870, northeasterly and southwesterly MMICs 1870) can be configured with opposing or aligned e-fields. Consequently, waveguide 1865' can be configured to generate electromagnetic waves with one or more non-fundamental wave modes, electromagnetic waves with one or more fundamental wave modes, or any combinations thereof.

It is submitted that it is not necessary to select slots 1863 in pairs to generate electromagnetic waves having a non-fundamental wave mode. For example, electromagnetic waves having a non-fundamental wave mode can be generated by enabling a single slot from the plurality of slots shown in configuration (A) of FIG. 18I and disabling all other slots. Similarly, a single MMIC 1870 of the MMICs 1870 shown in FIG. 18J can be configured to generate electromagnetic waves having a non-fundamental wave mode while all other MMICs 1870 are not in use or disabled. Likewise other wave modes and wave mode combinations can be induced by enabling other non-null proper subsets of waveguide slots 1863 or the MMICs 1870.

It is further submitted that the e-field arrows shown in FIGS. 18H-18I are illustrative only and represent a static depiction of e-fields. In practice, the electromagnetic waves may have oscillating e-fields, which at one instance in time point outwardly, and at another instance in time point inwardly. For example, in the case of non-fundamental wave modes having e-fields that are aligned in one direction (e.g., northerly), such waves may at another instance in time have e-fields that point in an opposite direction (e.g., southerly). Similarly, fundamental wave modes having e-fields that are radial may at one instance have e-fields that point radially away from the cable 1862 and at another instance in time point radially towards the cable 1862. It is further noted that the embodiments of FIGS. 18H-18J can be adapted to generate electromagnetic waves with one or more non-fundamental wave modes, electromagnetic waves with one or more fundamental wave modes (e.g., TM00 and HE11 modes), or any combinations thereof. It is further noted that such adaptions can be used in combination with any embodiments described in the subject disclosure. It is also noted that the embodiments of FIGS. 18H-18J can be combined (e.g., slots used in combination with MMIC s).

It is further noted that in some embodiments, the waveguide systems 1865 and 1865' of FIGS. 18A-18J may generate combinations of fundamental and non-fundamental wave modes where one wave mode is dominant over the other. For example, in one embodiment electromagnetic waves generated by the waveguide systems 1865 and 1865' of FIGS. 18A-18J may have a weak signal component that has a non-fundamental wave mode, and a substantially strong signal component that has a fundamental wave mode. Accordingly, in this embodiment, the electromagnetic waves have a substantially fundamental wave mode. In another embodiment electromagnetic waves generated by the waveguide systems 1865 and 1865' of FIGS. 18A-18J may have a weak signal component that has a fundamental wave mode, and a substantially strong signal component that has a non-fundamental wave mode. Accordingly, in this embodiment, the electromagnetic waves have a substantially non-fundamental wave mode. Further, a non-dominant wave mode may be generated that propagates only trivial distances along the length of the transmission medium.

It is also noted that the waveguide systems 1865 and 1865' of FIGS. 18A-18J can be configured to generate instances of electromagnetic waves that have wave modes that can differ from a resulting wave mode or modes of the combined electromagnetic wave. It is further noted that each MMIC 1870 of the waveguide system 1865' of FIG. 18J can be configured to generate an instance of electromagnetic waves having wave characteristics that differ from the wave characteristics of another instance of electromagnetic waves generated by another MMIC 1870. One MMIC 1870, for example, can generate an instance of an electromagnetic wave having a spatial orientation and a phase, frequency, magnitude, electric field orientation, and/or magnetic field orientation that differs from the spatial orientation and phase, frequency, magnitude, electric field orientation, and/or magnetic field orientation of a different instance of another electromagnetic wave generated by another MMIC 1870. The waveguide system 1865' can thus be configured to generate instances of electromagnetic waves having different wave and spatial characteristics, which when combined achieve resulting electromagnetic waves having one or more desirable wave modes.

From these illustrations, it is submitted that the waveguide systems 1865 and 1865' of FIGS. 18A-18J can be adapted to generate electromagnetic waves with one or more selectable wave modes. In one embodiment, for example, the waveguide systems 1865 and 1865' can be adapted to select one or more wave modes and generate electromagnetic waves having a single wave mode or multiple wave modes selected and produced from a process of combining instances of electromagnetic waves having one or more configurable wave and spatial characteristics. In an embodiment, for example, parametric information can be stored in a look-up table. Each entry in the look-up table can represent a selectable wave mode. A selectable wave mode can represent a single wave mode, or a combination of wave modes. The combination of wave modes can have one or dominant wave modes. The parametric information can provide configuration information for generating instances of electromagnetic waves for producing resultant electromagnetic waves that have the desired wave mode.

For example, once a wave mode or modes is selected, the parametric information obtained from the look-up table from the entry associated with the selected wave mode(s) can be used to identify which of one or more MMICs 1870 to utilize, and/or their corresponding configurations to achieve electromagnetic waves having the desired wave mode(s). The parametric information may identify the selection of the one or more MMICs 1870 based on the spatial orientations of the MMICs 1870, which may be required for producing electromagnetic waves with the desired wave mode. The parametric information can also provide information to configure each of the one or more MMICs 1870 with a particular phase, frequency, magnitude, electric field orientation, and/or magnetic field orientation which may or may not be the same for each of the selected MMICs 1870. A look-up table with selectable wave modes and corresponding parametric information can be adapted for configuring the slotted waveguide system 1865.

In some embodiments, a guided electromagnetic wave can be considered to have a desired wave mode if the corresponding wave mode propagates non-trivial distances on a transmission medium and has a field strength that is substantially greater in magnitude (e.g., 20 dB higher in magnitude) than other wave modes that may or may not be desirable. Such a desired wave mode or modes can be referred to as dominant wave mode(s) with the other wave modes being referred to as non-dominant wave modes. In a similar fashion, a guided electromagnetic wave that is said to be substantially without the fundamental wave mode has either no fundamental wave mode or a non-dominant fundamental wave mode. A guided electromagnetic wave that is said to be substantially without a non-fundamental wave mode has either no non-fundamental wave mode(s) or only non-dominant non-fundamental wave mode(s). In some embodiments, a guided electromagnetic wave that is said to have only a single wave mode or a selected wave mode may have only one corresponding dominant wave mode.

It is further noted that the embodiments of FIGS. 18H-18J can be applied to other embodiments of the subject disclosure. For example, the embodiments of FIGS. 18H-18J can be used as alternate embodiments to the embodiments depicted in FIGS. 18A-18G or can be combined with the embodiments depicted in FIGS. 18A-18G.

Figure 19A:
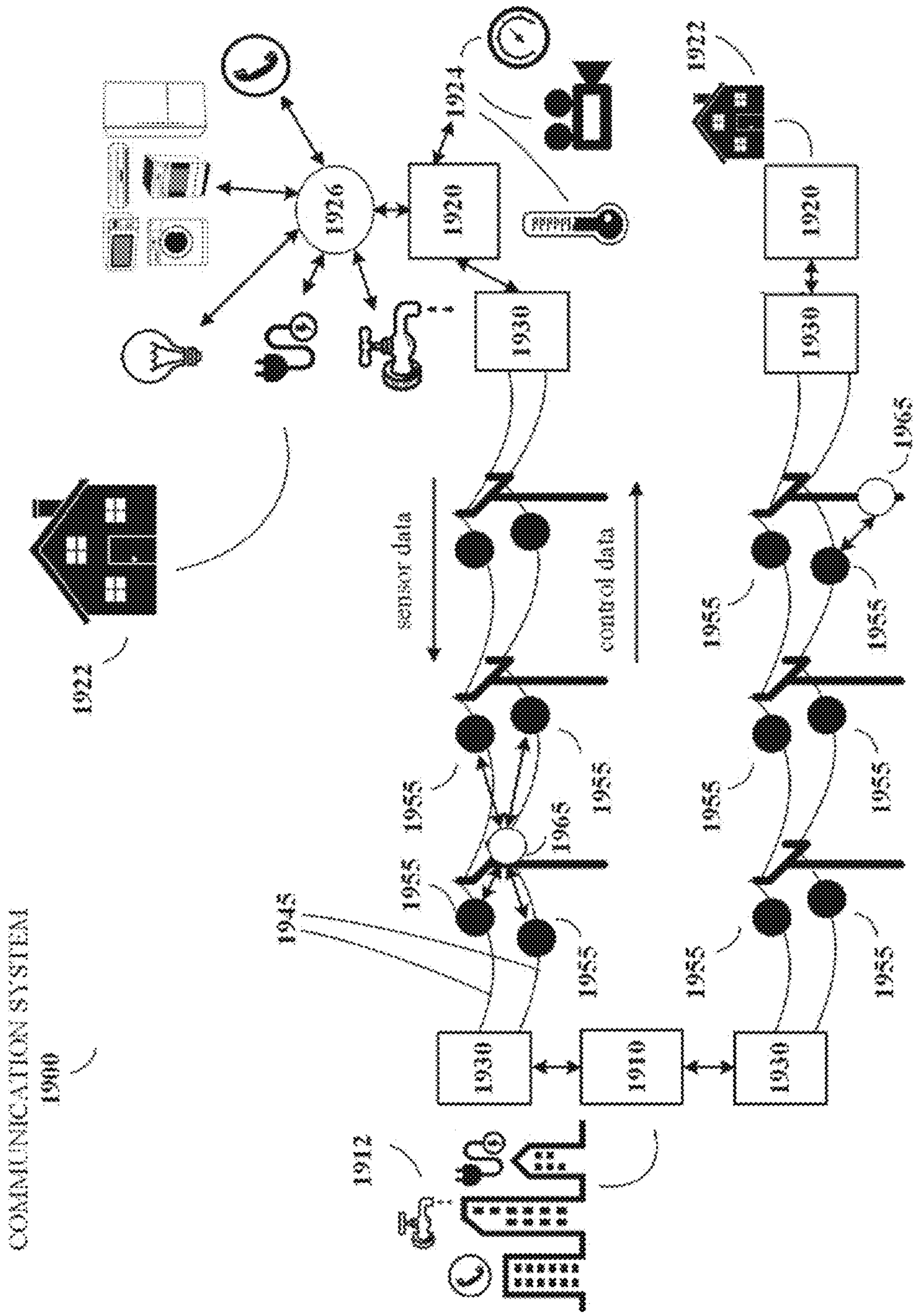
FIG. 19A is an illustration of a communication system in accordance with various aspects described herein.

Referring to FIG. 19A, a communication system 1900 is illustrated in which one or more supervisory entities 1912 communicate bidirectionally with one or more supervised entities 1922 via guided wave communications between corresponding one or more supervisory processing systems 1910 and one or more supervised processing systems 1920. This communication system can enable a supervisory processing system 1910 to collect data from the supervised entities and/or control the supervised entities via the supervised processing system 1920. The supervised processing system 1920 can be coupled to or otherwise communicate bidirectionally via a wired and/or wireless connection with one or more sensor devices 1924 and/or one or more control devices 1926 to facilitate collection of sensor data and/or control of the supervised entity. Each supervisory processing system 1910 and supervised processing system 1920 can be coupled to at least one guided wave transceiver device 1930 to facilitate communication between the supervisor processing systems and supervised processing systems via electromagnetic waves at a physical interface of a transmission medium 1945, where the electromagnetic waves are guided by the transmission medium and propagate without utilizing an electrical return path as discussed previously. The transmission medium 1945 can include, for example, one or more power lines as discussed previously or other transmission media. The guided waves can be routed directly between supervisory processing systems and supervised processing systems, or can be repeated along the transmission path by a plurality of repeater devices 1955, which can be implemented by utilizing repeater 1210 of FIG. 12. In various embodiments, some or all of the repeater devices 1955 can be coupled to additional supervisory processing systems 1910 and/or additional supervised processing systems 1920. The communication system 1900 can further include a plurality of intelligent devices 1965, which can include for example, smart grid devices or other intelligent devices. Intelligent devices 1965 can communicate with one or more neighboring repeaters 1955 and/or supervised processing systems 1920 along the transmission path, and can be physically attached to utility poles that support the transmission medium. In various embodiments, some or all the intelligent devices 1965 are implemented by utilizing additional supervisory processing systems 1910 and/or additional supervised processing systems 1920.

In accordance with one or more embodiments, communication system 1900 is utilized for utilities management, and can include a utilities management system. The utilities management system can include a processing system that includes a processor, such as supervisory processing system 1910; a guided wave transceiver, such as guided wave transceiver 1930, that transmits and receives communications by electromagnetic waves at a physical interface of a transmission medium, such as transmission medium 1945, where the electromagnetic waves are guided by the transmission medium and propagate without utilizing an electrical return path; and a memory, such as memory device 1913 of FIG. 19B, that stores executable instructions that, when executed by the processing system, facilitate performance of operations. The operations include receiving via the guided wave transceiver a plurality of utility status signals from a plurality of utility sensors, such as sensor devices 1924, located at a plurality of supervised sites, such as supervised entities 1922. Utility control data is generated based on the plurality of utility status signals. At least one control signal is generated for transmission via the guided wave transceiver to at least one of the plurality of supervised sites, and the at least one control signal includes at least one utility deployment instruction based on the utility control data.

In various embodiments, the utilities management system is implemented in conjunction with a supervisory control and data acquisition (SCADA) system. In various embodiments, at least one of the plurality of supervised sites is a home, at least one of the plurality of utility sensors located in the home is coupled with a home automation controller, and the at least one utility deployment instruction is executed by the home automation controller, such as control device 1926. In various embodiments, the at least one control signal is sent to the home and includes an instruction to turn off appliances of the home.

In various embodiments, the utility control data is generated by utilizing a supervisory control algorithm based on the plurality of utility status signals to optimize utility consumption across the plurality of supervised sites. In various embodiments of the utilities management system, an emergency notification signal is received via the guided wave transceiver, and generating the utility control data is further based on the emergency notification signal. In various embodiments, the at least one control signal includes an instruction for the supervised site to switch from a primary power source to a secondary power source. In various embodiments, the secondary power source includes a battery and/or a solar panel. In various embodiments, a primary power consumption level is determined based on the plurality of utility status signals. The primary power consumption level is compared to a primary power load threshold, and the instruction to switch from the primary power source to the secondary power source is based on the primary power consumption level comparing unfavorably to the primary power load threshold.

In various embodiments of the utilities management system, a subset of the plurality of utility sensors monitor a power line, and the transmission medium that guides the electromagnetic waves includes the power line. In various embodiments, one of the subset of the plurality of utility sensors is coupled to an intermediate guided wave transceiver. The intermediate guided wave transceiver transmits at least one of the plurality of utility status signals corresponding to the one of the subset of the plurality of utility sensors to the utility management system as a first plurality of electromagnetic waves that are guided by the power line and that propagate without utilizing an electrical return path. The at least one control signal is received by the intermediate guided wave transceiver as a second plurality of electromagnetic waves that are guided by the power line and that propagate without utilizing an electrical return path, and the intermediate guided wave transceiver is a waypoint of a transmission path of the at least one control signal to the at least one of the plurality of supervised sites. The intermediate guided wave transceiver repeats second plurality of electromagnetic waves for transmission along the power line to a next guided wave transceiver of a remainder of the transmission path.

In accordance with one or more embodiments, communication system 1900 is utilized for broadcast communication and includes a broadcast communication system. The broadcast communication system includes a processing system that includes a processor, such as supervisory processing system 1910 or supervised processing system 1920; a guided wave transceiver, such as guided wave transceiver 1930, that transmits and receives communications by electromagnetic waves at a physical interface of a transmission medium 1945, where the electromagnetic waves are guided by the transmission medium and propagate without utilizing an electrical return path; and a memory, such as memory 1913 of FIG. 19B, that stores executable instructions that, when executed by the processing system, facilitate performance of operations. The operations include detecting a first power outage and further include generating a first plurality of electromagnetic waves for transmission to a plurality of user devices of the broadcast communication system via the guided wave transceiver, such as user devices 1970 and/or 1980, supervised entity 1922, and/or control device 1926, where the first plurality of electromagnetic waves include an outage status signal generated in response to detecting the first power outage.

In various embodiments, the broadcast communication system is physically attached to a first one of a plurality of power line phases of a power pole, and the first power outage corresponds to a failure of a second one of the plurality of power line phases of the power pole. In various embodiments, the broadcast communication system further includes a wireless transmitter, as well as a disturbance detection sensor, a loss of energy sensor, and/or a vibration sensor. A second power outage corresponding to a failure of the first one of the plurality of power line phases is detected based on sensor input to the disturbance detection sensor, the loss of energy sensor, and/or the vibration sensor, and a notification of the second power outage is generated for transmission via the wireless transmitter. In various embodiments, the broadcast communication system further includes a wireless transceiver and a power outage notification is received via the wireless transceiver. The first power outage is detected in response to receiving the power outage notification.

In various embodiments, the broadcast communication system further includes a wireless receiver, at least one wireless transmission that includes utility status data from at least one utility provider is received via the wireless receiver, and the outage status signal is generated based on the utility status data. In various embodiments, the broadcast communication system further comprises a wireless transmitter. At least one status request is generated for transmission via the wireless transmitter to the at least one utility provider in response to detecting the first power outage, and the at least one wireless transmission is received in response to the at least one status request.

In various embodiments of the broadcast communication system, a second plurality of electromagnetic waves are received via the guided wave transceiver that includes a power outage notification signal. The first power outage is detected in response to receiving the power outage notification signal. In various embodiments, at least one second plurality of electromagnetic waves are received from at least one utility provider via the guided wave transceiver. The second plurality of electromagnetic waves include utility status data, and the outage status signal is generated based on the utility status data. In various embodiments, at least one third plurality of electromagnetic waves that include a status request signal are generated for transmission via the guided wave transceiver to the at least one utility provider in response to detecting the first power outage, and the at least one second plurality of electromagnetic waves is received in response to the status request signal.

In various embodiments, the outage status signal includes message data for display by a subset of the plurality of user devices. In various embodiments, the message data corresponds to a message from a utility provider. A second plurality of electromagnetic waves are received via the guided wave transceiver that include a message response signal from one of the subset of the plurality of user devices corresponding to user input to the one of the subset of the plurality of user devices. The second plurality of electromagnetic waves are transmitted via the guided wave transceiver to the utility provider. In various embodiments, at least one of the plurality of user devices includes a home automation controller, and the outage status signal includes at least one instruction for execution by the home automation controller. In various embodiments, the broadcast the outage status signal includes at least one electric vehicle charging station location.

In various embodiments, a second plurality of electromagnetic waves are received from a utility provider via the guided wave transceiver that includes planned maintenance data. A third plurality of electromagnetic waves are generated for transmission to the plurality of user devices of the broadcast communication system via the guided wave transceiver, where the third plurality of electromagnetic waves includes the planned maintenance data.

In various embodiments, a first power outage likelihood value is determined. The first power outage likelihood value is compared to a power outage likelihood threshold. A second plurality of electromagnetic waves for transmission to the plurality of user devices of the broadcast communication system via the guided wave transceiver, the second plurality of electromagnetic waves includes power outage warning data, and the second plurality of electromagnetic waves is generated in response to the first power outage likelihood value comparing unfavorably to the power outage likelihood threshold. In various embodiments, the broadcast communication system includes an environmental sensor, and the first power outage likelihood value is based on sensor input to the environmental sensor. In various embodiments, the first power outage likelihood value is determined at a first time, and a second power outage likelihood value is determined at a second time that is later than the first time. The second power outage likelihood value is compared to the power outage likelihood threshold, and a third plurality of electromagnetic waves are generated for transmission to the plurality of user devices of the broadcast communication system via the guided wave transceiver. The third plurality of electromagnetic waves indicate that the power outage warning has passed, and the third plurality of electromagnetic waves is generated in response to the second power outage likelihood value comparing favorably to the power outage likelihood threshold.

In accordance with one or more embodiments, communication system 1900 is utilized for surveillance and can include a surveillance system. The surveillance system includes a processing system that includes a processor, such as supervised processing system 1920; a guided wave transceiver, such as guided wave transceiver 1930, that transmits and receives communications by electromagnetic waves at a physical interface of a transmission medium 1945, where the electromagnetic waves are guided by the transmission medium and propagate without utilizing an electrical return path; at least one sensor device such as sensor device 1924; and a memory, such as memory device 1923 of FIG. 19B, that stores executable instructions that, when executed by the processing system, facilitate performance of operations. The operations include generating surveillance data based on sensor input to the at least one sensor device. A plurality of electromagnetic waves are generated for transmission to an administrator of the surveillance system, such as supervisory entity 1912, via the guided wave transceiver, where the plurality of electromagnetic waves include a surveillance data signal generated based on the surveillance data.

In various embodiments, the surveillance system is physically attached to a power line, and the at least one sensor device monitors a region in proximity to the power line. In various embodiments, the at least one sensor device includes a camera, and where the surveillance data includes image data. In various embodiments, the transmitted surveillance data signal includes video data collected by the camera for viewing by the administrator. In various embodiments, a second plurality of electromagnetic waves are received that include camera control data. The camera is controlled based on the camera control data, and controlling the camera includes orienting the camera, positioning the camera, panning the camera, zooming a lens of the camera, starting a recording by the camera, and/or stopping a recording by the camera.

In various embodiments of the surveillance system where the surveillance data signal is transmitted to an administrator system, a processor of the administrator system performs analysis of surveillance data of the surveillance data signal to detect suspicious activity. In various embodiments, generating the surveillance data includes detecting suspicious activity, and where the surveillance data signal includes a notification of the suspicious activity.

In various embodiments, the surveillance system further includes a speaker. The speaker is controlled to sound an alarm in response to detecting the suspicious activity. In various embodiments where the at least one sensor device includes a camera, the camera is activated to begin capturing image data in response to detecting the suspicious activity. In various embodiments where the surveillance data includes image data, the suspicious activity is detected based on image analysis of the image data. In various embodiments, the image analysis includes at least one of: motion detection or facial detection. In various embodiments, the surveillance system further includes a lighting device. The lighting device is activated in response to detecting the suspicious activity. An orientation of the lighting device is controlled to track the detected motion and/or the detected face. In various embodiments, the camera is controlled based on the motion detection and/or the facial detection to track motion and/or a face. Controlling the camera includes orienting the camera towards the motion, orienting the camera towards the face, zooming in on the motion, and/or zooming in on the face.

In various embodiments of the surveillance system, a notification of the suspicious activity is transmitted to a law enforcement entity in response to detecting the suspicious activity. The notification of the suspicious activity is transmitted as electromagnetic waves that are guided by the transmission medium that and propagate without utilizing an electrical return path. In various embodiments, the at least one sensor device includes a disturbance detection sensor, a loss of energy sensor, and/or a vibration sensor, and the suspicious activity is detected based on surveillance data generated based on sensor input to the disturbance detection sensor, the loss of energy sensor, and/or the vibration sensor.

In accordance with one or more embodiments, communication system 1900 includes a guided wave repeater system, which can be implemented by utilizing repeater 1955 and/or supervised processing system 1920. The guided wave repeater system includes a processing system that includes a processor, such as supervised processing system 1920; a guided wave transceiver, such as guided wave transceiver 1930, that transmits and receives communications by electromagnetic waves at a physical interface of a transmission medium, where the electromagnetic waves are guided by the transmission medium 1945 and propagate without utilizing an electrical return; and a memory, such as memory device 1923 of FIG. 19B, that stores executable instructions that, when executed by the processing system, facilitate performance of operations. The operations include receiving via the guided wave transceiver a first plurality of electromagnetic waves that include a first communication signal. A second plurality of electromagnetic waves that include a second communication signal are transmitted via the guided wave transceiver. The first plurality of electromagnetic waves and the second plurality of electromagnetic waves are guided by a power line of a utility pole. A third communication signal is received from a smart grid device, such as intelligent device 1965. A fourth communication signal is transmitted to the smart grid device.

In various embodiments of the guided wave repeater system, the smart grid device is physically attached to the utility pole. In various embodiments, the smart grid device is powered by the power line. In various embodiments, the guided wave repeater system further includes a wireless transceiver. The third communication signal is a wireless communication signal received by the wireless transceiver, and the fourth communication signal is a wireless communication signal transmitted by the wireless transceiver. In various embodiments, the third communication signal and the fourth communication signal are received and transmitted, respectively, via an access line of sight radio link protocol. In various embodiments, the guided wave repeater system further includes a wired interface. The third communication signal is received from the smart grid device via the wired interface, and the fourth communication signal is transmitted to the smart grid device via the wired interface.

In various embodiments of the guided wave repeater system, the third communication signal is received as a third plurality of electromagnetic waves via the guided wave transceiver, and the fourth communication signal is received as a fourth plurality of electromagnetic waves via the guided wave transceiver. In various embodiments, the third communication signal is received as a third plurality of electromagnetic waves via a second guided wave transceiver, and where the fourth communication signal is received as a fourth plurality of electromagnetic waves via the second guided wave transceiver.

In various embodiments of the guided wave repeater system, the third communication signal includes supervisory control and data acquisition (SCADA) data. The third communication signal is transformed to generate the second plurality of electromagnetic waves for transmission, where the second communication signal includes the SCADA data. In various embodiments, the first communication signal includes supervisory control and data acquisition (SCADA) data. The first plurality of electromagnetic waves are transformed to generate the fourth communication signal for transmission to the smart grid device, where the fourth communication signal includes the SCADA data.

In various embodiments, the guided wave repeater system includes a wired interface and the first plurality of electromagnetic waves are transformed to generate a fifth communication signal that includes data of the first communication signal. The fifth communication signal is transmitted to a second guided wave repeater system via the wired interface. A sixth communication signal is received from the second guided wave repeater system via the wired interface. The sixth communication signal is transformed to generate the second plurality of electromagnetic waves, where the second plurality of electromagnetic waves include data of the sixth communication signal. In various embodiments where the guided wave repeater system is physically attached to the power line, the power line corresponds to a first phase on a first side of the utility pole. The second guided wave repeater system is physically attached to the first phase on an opposite side of the utility pole.

In various embodiments, the communication system 1900 can be implemented by utilizing the guided wave communication system 1500 of FIG. 15. The supervisory entities 1912 can include central office 1501, and/or can communicate with central office 1501 via wireless, wired, and/or surface wave communication links. The supervised entities 1922 can include residential and commercial establishments 1542. The supervisory processing system and/or supervised processing system can be implemented by utilizing one or more base station devices 1504 and/or the guided wave transceiver can be implemented by utilizing the transmission device 1506, 1508, and/or 1510. In various embodiments, the intelligent device 1965 can be implemented by utilizing one or more base station devices 1504. The repeaters 1955 can also be implemented by utilizing the transmission device 1506, 1508, and/or 1510.

In various embodiments, the communication system 1900 can be implemented by utilizing the power grid communication system of FIG. 16, utilizing the waveguide system 1602. The transmission medium can include power line 1610, and the supervised entities can include elements of the waveguide system, monitoring regions in proximity to the power line and/or the power line itself. Sensor devices 1924 can include sensors 1604 of FIG. 16, such as temperature sensor 1604*a*, disturbance detection sensor 1604*b*, loss of energy sensor 1604*c*, noise sensor 1604*d*, vibration sensor 1604*e*, environmental (e.g., weather) sensor 1604*f*, image sensor 1604*g*. and/or other sensors.

In various embodiments, bidirectional communication can be achieved via a single transmission medium 1945, for example, where a supervised entity and supervisory entity communicate via time division or frequency division duplexing, and where the repeaters 1955 repeat guided waves received from both directions along the transmission medium. In various embodiments, the bidirectional communication can be achieved via multiple transmission mediums 1945, for example, via multiple phases of a power line system as shown in FIG. 19A, where communication in one direction is achieved via a first power line phase, and where communication in the opposite direction is achieved via a second power line phase. In various embodiments, the guided wave transceiver 1930 can include a guided wave transmitter that transmits guided waves along a first phase and a guided wave receiver that receives guided waves along a second phase, for example, by utilizing transmission devices 101 and 102 of FIG. 1.

In various embodiments, communication system 1900 can be utilized to implement a supervisory control and data acquisition (SCADA) system, for example, to monitor and control utility distribution and/or elements of a smart grid infrastructure. For example, the communication system 1900 can bridge the communications gap in smart grid technologies between SCADA focal points within the substations and smart meters in the home. The supervisory entities 1912 can include utility providers such as electricity providers, gas providers, water providers, telephone providers, cellular providers, cable providers, and/or internet providers, and the supervisory processing system 1910 can operate as a utilities management system. The supervised entities 1922 can include users of the utilities, residential and/or commercial entities, infrastructure entities, transportation vehicles and/or entities, and/or utility production and/or distribution centers, channels, devices and/or equipment.

Figure 19B:
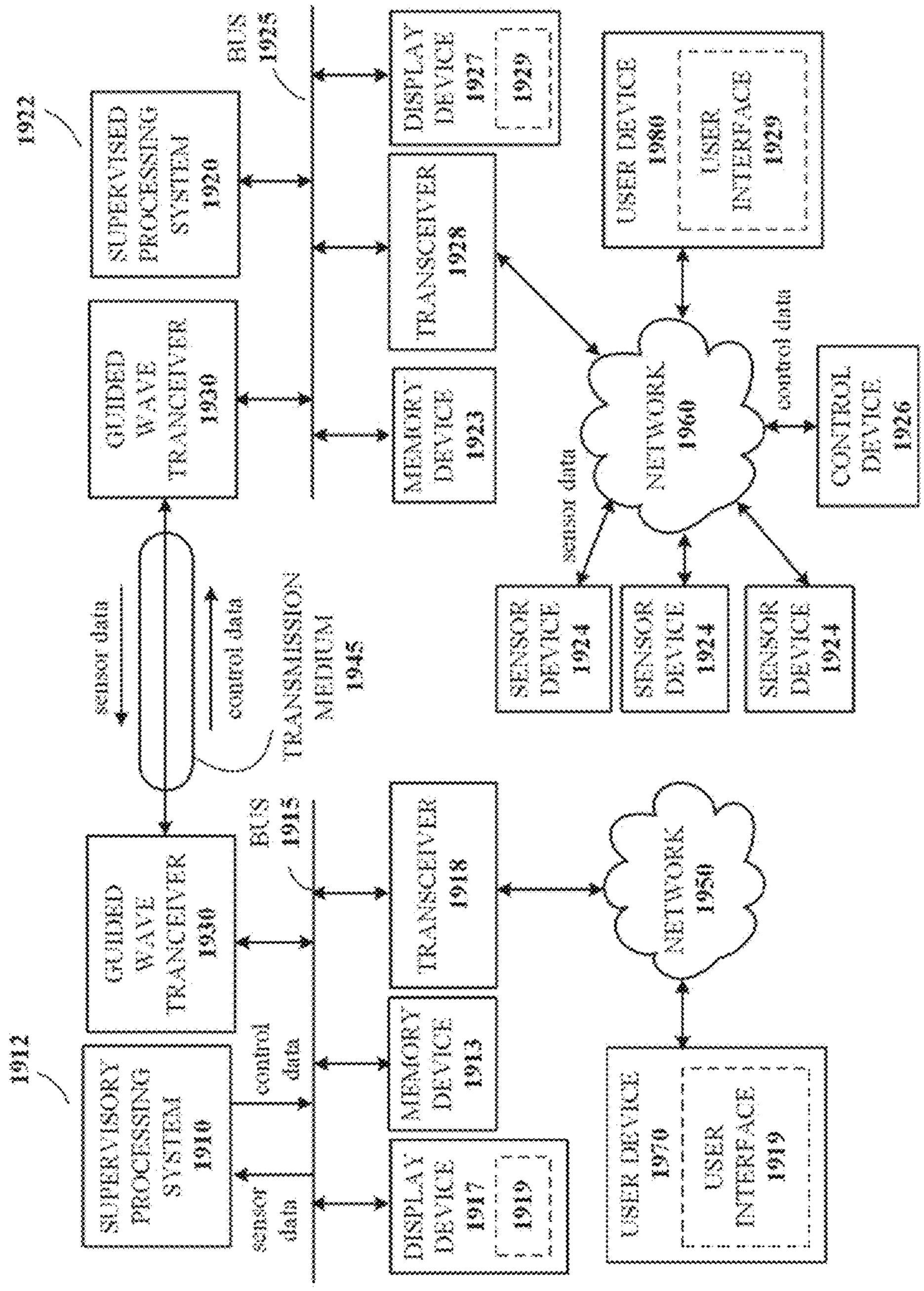
FIG. 19B is a block diagram illustrating a communication system in accordance with various aspects described herein.

FIG. 19B illustrates a block diagram of communication system 1900. In various embodiments, supervised processing system 1920 is operable to collect raw or processed status and/or sensor data from the at least one sensor device 1924 for transmission to supervisory processing system as guided wave communications via transmission medium 1945. Supervisory processing system 1910 is operable to process the status and/or sensor data received from supervised processing systems 1920 via guided wave communications to generate control data for transmission back to the supervised processing systems via guided wave communication. Supervised processing system 1920 is operable to facilitate execution of control data received from the supervisory processing system via guided wave communication by utilizing control device 1926.

In various embodiments, the supervisory processing system 1910 of supervisory entity 1912 can be coupled to least one guided wave transceiver device 1930 and at least one memory device 1913 that includes a memory, connected via bus 1915. In various embodiments, supervisory processing system 1910 is further coupled to at least one additional transceiver 1918, which can connect to additional devices such as user device 1970 and/or connect to a wired and/or wireless network 1950, which can include, a network associated with the supervisory entity and/or the Internet. In various embodiments, supervisory processing system 1910 can display a user interface 1919 on at least one display device 1917, allowing users such as administrators of a utility provider and/or administrators of communication system 1900 to monitor, direct, and/or override the supervisory processing system. Display device 1917 can be connected via bus 1915, or the at least one transceiver 1918 can be utilized to bidirectionally communicate with an external device such as user device 1970 that includes the display device 1917, for example, via network 1950. In various embodiments, the processing of status and/or sensor data, and/or the generation of the control data, is achieved on an external device such an external server and/or user device 1970, and the supervisory processing system 1910 merely receives and relays sensor collection data to the external processor via the at least one additional transceiver 1918 and/or receives control data from the external processor via the at least one additional transceiver for transmission back to the monitored entities via guided wave communication.

In various embodiments, supervised processing system 1920 is coupled to at least one guided wave transceiver device 1930 and at least one memory device 1923 that includes a memory, connected via bus 1925. In various embodiments, supervised processing system 1920 is coupled to at least one additional transceiver 1928, which can connect to additional devices such as user device 1980 and/or connect to a wired and/or wireless network 1960, which can include, a network associated with the supervised entity, for example, a residential network, and/or the Internet. In various embodiments, network 1960 includes network 1950 or vice versa. In various embodiments, supervised processing system 1920 is coupled to at least one sensor device 1924 and/or at least one control device 1926. Sensor device 1924 and/or control device 1926 can be connected via bus 1925, or the at least one transceiver 1928 can be utilized to bidirectionally communicate with sensor device 1924 and/or control device 1926, for example, via network 1960. In various embodiments, supervised processing system 1920 can communicate with a display device 1927 that displays a user interface 1929 allowing users associated with the supervised entity 1922 to monitor, direct, and/or override the supervised processing system. Display device 1927 can be connected via bus 1925, or the at least one transceiver 1928 can be utilized to bidirectionally communicate with an external device such as user device 1980 that includes the display device 1927, for example, via network 1960.

In various embodiments, the guided wave transceiver device 1930 of the supervisory processing system 1910 and/or the supervised processing system 1920 can be implemented, for example, by utilizing the transmission device 101 and/or 102 of FIG. 1, to facilitate bidirectional communication with the one or more supervisory processing systems 1910 via electromagnetic waves at a physical interface of a transmission medium, where the electromagnetic waves are guided by the transmission medium and propagate without utilizing an electrical return path as discussed previously. In particular, received electromagnetic waves can be converted to communications signals upon receipt by utilizing interface 205 and transceiver 210 of transmission device 102. Transmission device 101 can be utilized to convert communications signals into electromagnetic waves via interface 205 and transceiver 210 for transmission.

In various embodiments, the sensor devices 1924 can include sensors 1604 of FIG. 16 as discussed previously or any other sensors used to monitor the supervised entity. This can include, for example, temperature sensors, pressure sensors, Global Positioning System (GPS) sensors, gyroscopes, accelerometers, sensors measuring flow or fluid velocity, voltmeters, ammeters, chemical sensors, cameras, biometric sensors, infrared sensors, vibration sensors, and/or tactile sensors. Sensor devices 1924 can be directed towards monitoring equipment, for example, monitoring equipment health, efficiency, whether the equipment is operating under normal or extreme settings, etc. Sensors devices 1924 can be located at utility production and/or distribution centers and/or channels to gather data relating to status, utility consumption rate and/or production rate; and/or sensors at residential and/or commercial entities relating to utility status and/or consumption, which can include smart device sensor data, smart appliance sensor data, home automation sensor data, and/or sensor data received by personal devices such as mobile phones, personal computers, smart phones, and/or wearable technology. Sensor devices can also monitor human activity at the supervised entities, for example, by utilizing data collected by mobile devices, computers, laptops, surveillance systems, and/or wearable devices. For example, such data could include biometric data, location data, keyboard or touchscreen input, text data, voice data, and/or mobile application data. The supervised entity can also include transportation infrastructure and/or vehicles, and accordingly the sensor devices can also monitor personal vehicles, commercial vehicles, or public transportation vehicles and can be included in the vehicles themselves, for example, transmitting vehicle speed data, navigation data, location data, fuel data, etc. and/or located along transportation infrastructure such as roads, highways, railroads, subway lines, airports, etc. transmitting traffic data, collision data, status data, etc. The sensor data can also include information gathered via a network such as the Internet and/or via radio broadcasts, and can include weather data, emergency data, demographic data, social media data, text analysis of websites, messaging services data, news articles, etc. For example, this data could be used to detect extreme and/or emergency conditions, reported emergencies or utility outages, etc. In various embodiments, some or all of the sensor data is collected by the supervisory processing system directly without utilizing guided wave communications from a supervised processing system, for example, via the at least one additional transceiver 1918, which can include data collected from additional sensors and/or data collected via network 1950. Each sensor device 1924 can include its own processor, memory, and/or transceiver, operable to send raw and/or preprocessed data to the supervised processing system.

In various embodiments, the control devices 1926 can include automated controllers at utility production and/or distribution centers and/or controllers at residential or commercial entities such as home automation controllers. The control device 1926 can also include any intelligent controller that can control one or more devices, mechanical processes, and/or electrical processes associated with one or more homes, offices, buildings, commercial establishments, outdoor establishments, cars or other transportation vehicles, factories or plants, etc. For example, the control device could be utilized by an intelligent system and/or automated controller associated with the supervised entity, such as a home automation controller. In various embodiments, the control device includes its own processor, memory, and/or transceiver to process and execute control data received from the supervised processing system. In various embodiments, the control devices utilize one or more processors of supervised processing system 1920 itself to process and execute the control data.

In various embodiments, the at least one additional transceiver 1918 and/or 1928 can include a communications interface such as a wireless interface for receiving a wireless communication signal in accordance with a wireless standard protocol such as LTE or other cellular voice and data protocol, WiFi or an 802.11 protocol, WIMAX protocol, Ultra Wideband protocol, Bluetooth protocol, ZigBee protocol, a direct broadcast satellite (DBS) or other satellite communication protocols or other wireless protocols. In addition or in the alternative, the transceiver can include a wired interface that operates in accordance with an Ethernet protocol, universal serial bus (USB) protocol, a data over cable service interface specification (DOCSIS) protocol, a digital subscriber line (DSL) protocol, a Firewire (IEEE 1394) protocol, or other wired protocols. In additional to standards-based protocols, the transceiver can operate in conjunction with other wired or wireless protocols. In addition, additional transceiver 1918 and/or 1928 can optionally operate in conjunction with a protocol stack that includes multiple protocol layers including a MAC protocol, transport protocol, application protocol, etc. In various embodiments, additional transceiver 1918 and/or 1928 can be implemented by utilizing communications interface 205 of FIG. 1. In various embodiments, the at least one additional transceiver 1918 and/or 1928 can facilitate a connection to one or more devices, such as home devices, appliances, sensors such as sensor devices 1924, control devices such as control devices 1926, display devices, and/or user devices. In various embodiments, the at least one additional transceiver can facilitate a connection to a wired or wireless network, such as a home network, a network associated with the supervised entity, a network associated with the supervisory entity, and/or the Internet.

In various embodiments, display device 1917 and/or 1927 can include a screen or monitor, and a user can interact with user interface 1919 and/or 1929 respectively via a keyboard, touchscreen, text, voice, buttons, knobs, switches, a mouse, and/or other input mechanisms. In various embodiments, user device 1970 and/or 1980 can include a personal computer, laptop, monitor, mobile device, television, set top box, wearable device, and/or other device associated with a user. The user can interact with the user interface via user input to the user device. In various embodiments, a user can interact with the user interface 1919 and/or 1929 to monitor, direct, and/or override the supervisory processing system or supervised processing system, respectively. In various embodiments, a user can interact with the user interface 1919 and/or 1929 to set user preferences, for example, stored by user account of the system, for example, in memory 1913 or memory 1923. Users of user interface 1919 and/or 1929 can include, for example, residents a supervised residential entity, employees of a supervised commercial entity, employees of a utility provider, administrators of a utility provider, service or maintenance personnel of the communication system 1900, and/or administrators of the communication system 1900.

FIG. 19C-FIG. 19H illustrate embodiments of the communication system 1900 that include guided wave repeater systems. In various embodiments, the guided wave repeater systems can be implemented by utilizing repeater 1955. In various embodiments, some or all of the supervised processing systems 1920 operate as guided wave repeater systems. In various embodiments, such supervised processing systems 1920 are coupled to repeater devices 1955 or are otherwise operable to repeat guided wave transmissions. In various embodiments, these guided wave repeater systems correspond to supervised entities 1922 that include monitoring and/or control of the transmission medium itself, or the area in proximity to the transmission medium. For example, a supervisory entity 1912 that includes a power provider or smart grid infrastructure administrating entity may wish to monitor utility poles and/or one or more power line phases. In various embodiments, some or all supervised processing systems 1920 are physically attached to the power line or utility pole, for example allowing a direct connection to the power line by its guided wave transceiver 1930. In various embodiments, the supervised processing system 1920 can be implemented as a guided wave repeater system by utilizing the transmission device 1506, 1508, or 1510 of FIG. 15 in this fashion. Communications received from a supervisory processing system can be processed and/or executed, as well as forwarded along to a neighboring supervised processing system for processing, execution, and/or continued repeating down the transmission path via a plurality of subsequent repeaters 1955 and/or supervised processing systems 1920 operating in conjunction with guided wave repeater systems. In various embodiments, the repeaters and/or supervised processing system can be also be powered by the power line.

Figure 19C:
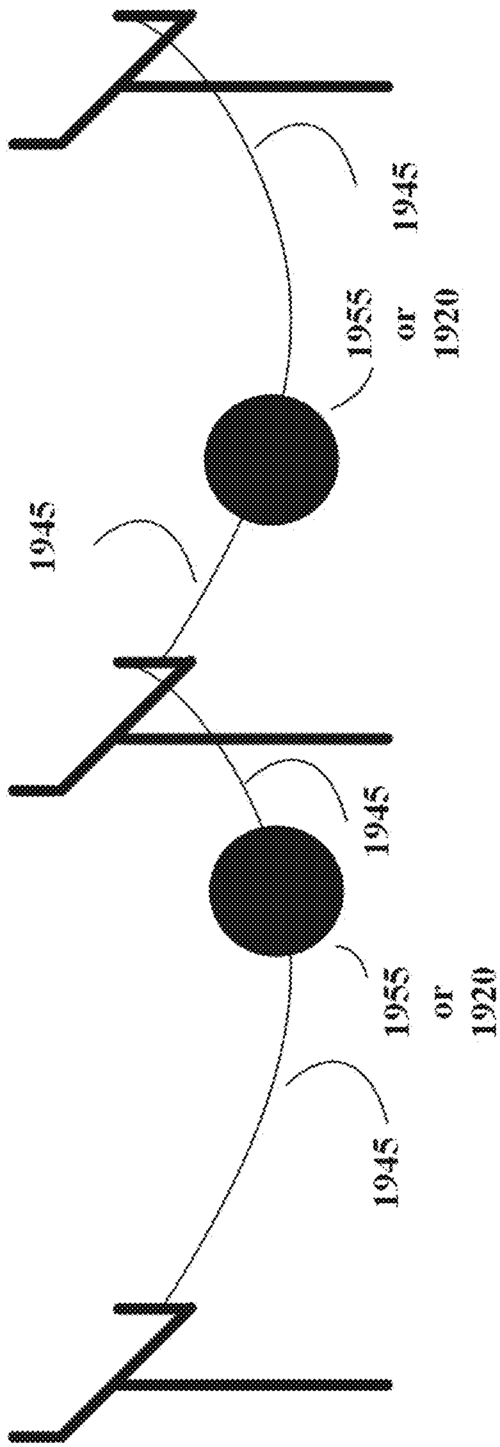
FIGS. 19C, 19D, 19E, 19F, 19G, 19H, and 19I are illustrations of example non-limiting embodiments of guided wave repeater systems in accordance with various aspects described herein.

In various embodiments, such as the embodiment illustrated in FIG. 19C, the guided wave transmission medium 1945 is uninterrupted between neighboring supervised processing systems. In various embodiments, a repeater 1955 and/or a supervised processing system 1920 operating in conjunction with a guided wave repeater system can be coupled to two guided wave transceivers 1930, where the first guided wave transceiver can receive communication along a power line phase from one side to be repeated as a transmission via the second guided wave transceiver along the power line phase. In various embodiments, such as the embodiment illustrated in FIG. 19D, the transmission medium 1945 is interrupted by interruption 1967. For example, two repeaters 1955 and/or two supervised processing systems 1920 are on opposite sides of a utility pole, and the guided wave communication between the two units is interrupted when crossing the utility pole. Communication between the two units can instead be achieved via a wired and/or wireless connection, for example, by utilizing transceiver 1928. While network 1960 can be utilized in this fashion, the close proximity of the two repeaters 1955 and/or two supervised processing systems 1920 can be utilized by implementing a direct wired and/or wireless communication link 1966, for example, a wired communication cable and/or a short range wireless connection such as an access line of sight radio link connection, Bluetooth, ZigBee, and/or other short range communication link. In various embodiments, communication link 1966 can include another guided wave cable such as transmission media 2400, 2420 and/or 2430 described in conjunction with in FIG. 24A-FIG. 24C.

Figure 19D:
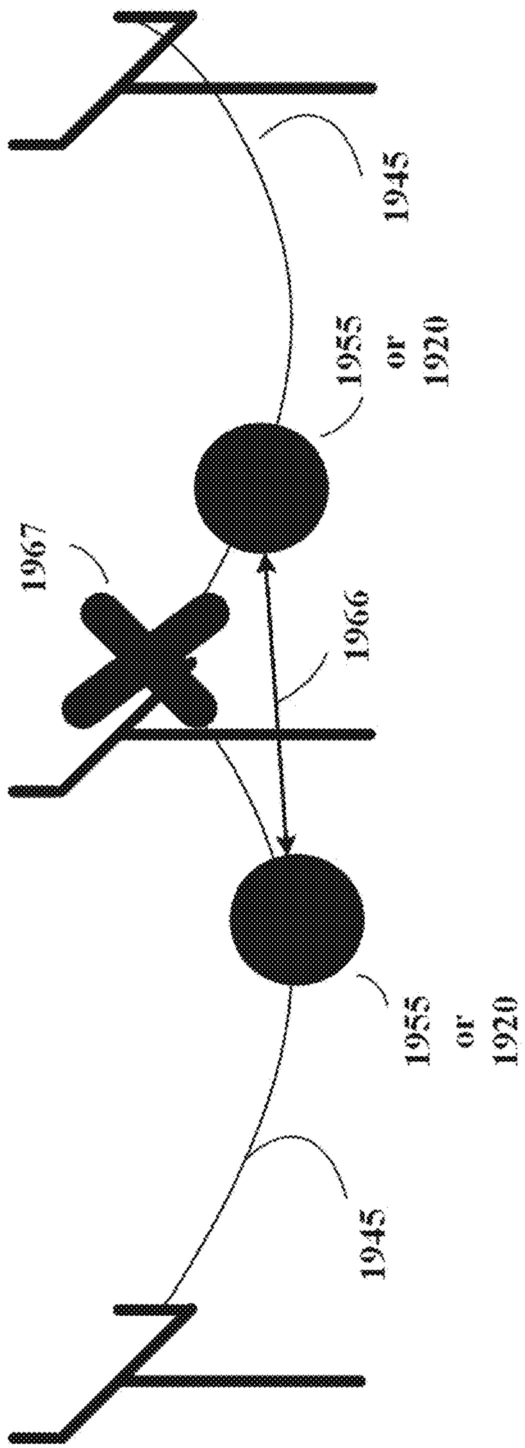
Figure 19E:
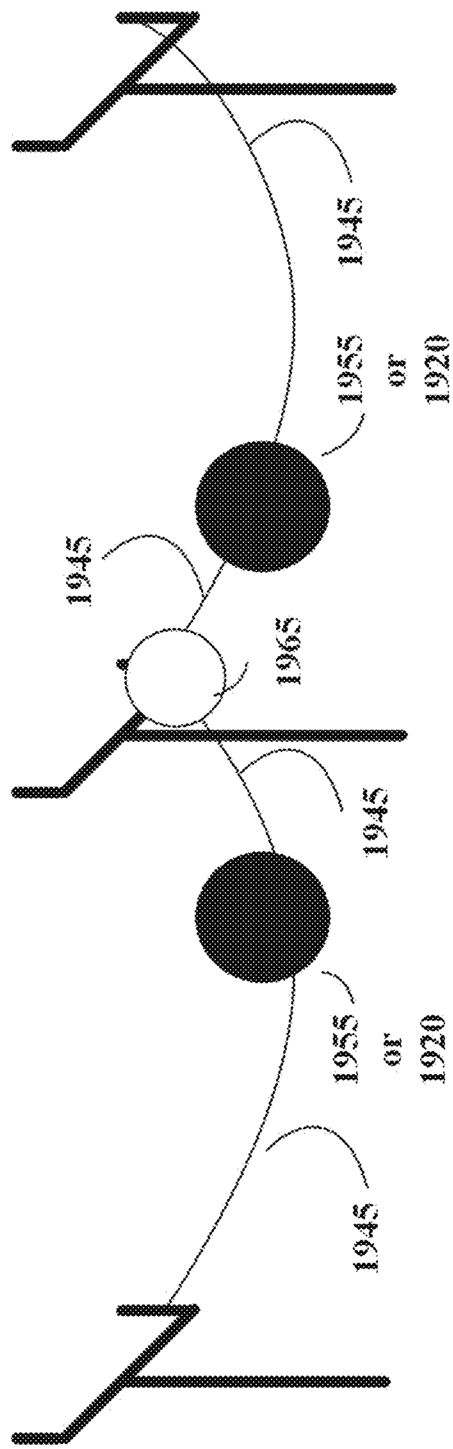
Figure 19F:
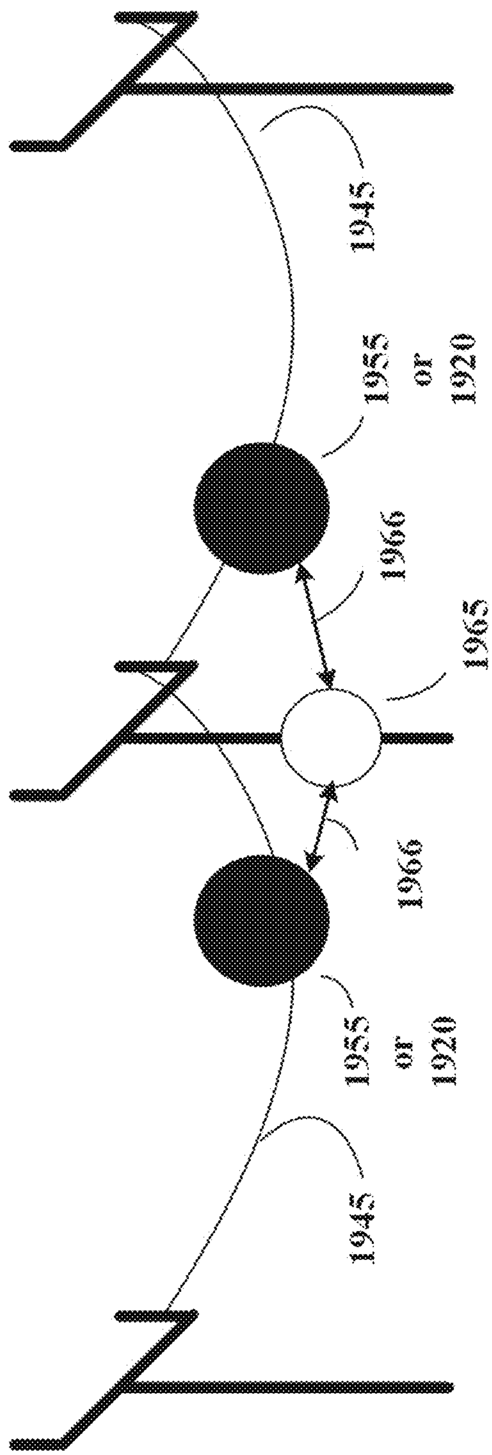

In various embodiments, a utility pole can include an intelligent device 1965 such as a smart grid device or other device that can, for example, process data, receive and transmit communications over a wired and/or wireless network, and/or execute commands. In various embodiments, the intelligent device can be powered via power lines of the utility pole. In various embodiments, the intelligent device can be implemented utilizing the base station device 1504 of FIG. 15. In various embodiments, the intelligent device 1965 includes one or more guided wave transceivers 1930 and in various embodiments, can be implemented by utilizing a supervisory processing system 1910 and/or supervised processing system 1920. In various embodiments, such as the embodiment illustrated in FIG. 19E, intelligent device 1965 can receive and transmit communications via the power line on opposite sides of the utility pole. In various embodiments where the two repeaters 1955 and/or two supervised processing systems operating in conjunction with guided wave repeater systems are attached on either side of the utility pole, the intelligent device can facilitate the connection between them via the power line or another transmission medium for the guided wave communications. In various embodiments, such as the embodiment illustrated in FIG. 19F, the intelligent device can facilitate the connection between them instead via the short range wired or wireless communication link 1966. In this fashion the intelligent device can be implemented by utilizing the supervisory processing system 1910 and/or supervised processing system 1920, communicating with guided wave transceivers 1930 via the short range link to the two repeaters 1955 and/or two supervised processing systems 1920. In various embodiments, the intelligent device can collect the data received via one or both repeaters 1955 or one or both supervised processing systems 1920 for processing, as well as forward it along the transmission path. In various embodiments, the intelligent device can also transmit its own data to the one or both repeaters 1955 and/or supervised processing systems 1920 for processing and/or repeated transmission along the transmission path. In various embodiments, the intelligent device may be part of an unrelated system, and is merely utilized as a repeater. In various embodiments, the intelligent device causes the interruption 1967, and the short range link between the two repeaters 1955 or two supervised processing systems 1920 can be implemented utilizing a wired connection such as communication link 1966 that circumvents the intelligent device, such as depicted in FIG. 19D.

Figure 19G:
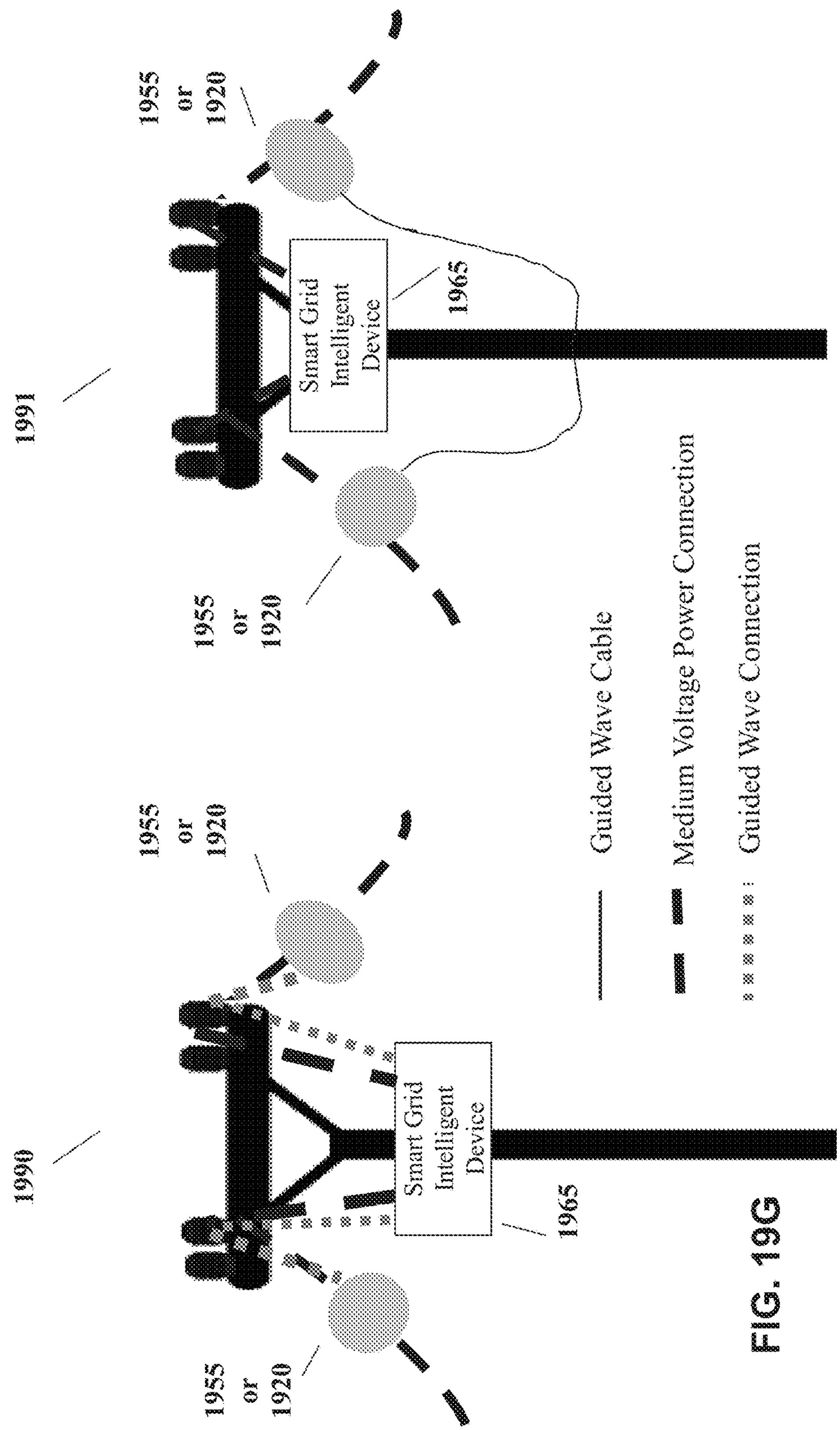
Figure 19H:
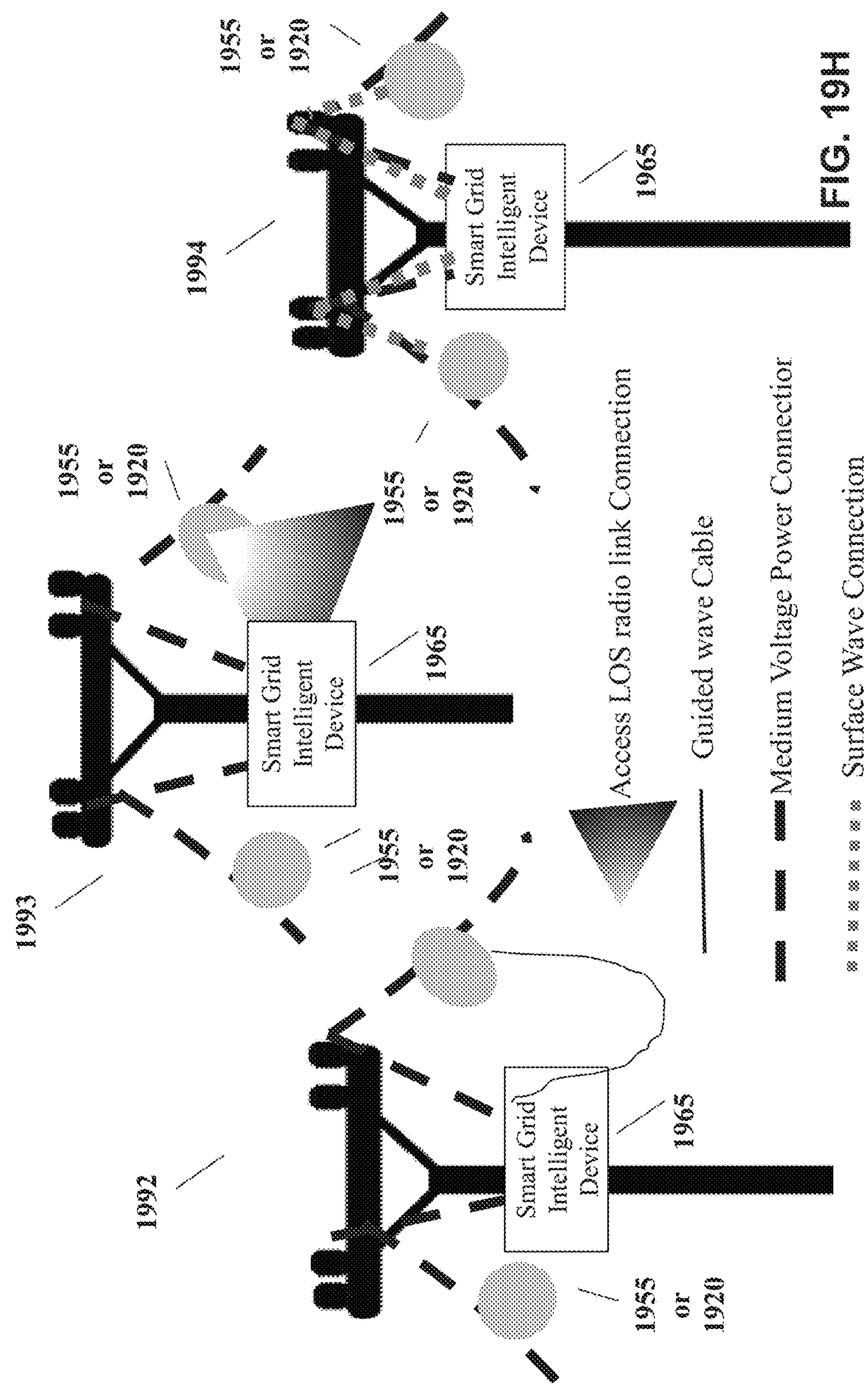

FIG. 19G and FIG. 19H further illustrate example utility pole configurations in conjunction with the discussion of FIG. 19C-FIG. 19F. FIG. 19G illustrates two methods of communication between neighboring repeaters 1955 and/or supervised processing systems 1920, and a first utility pole configuration 1990 and a second utility pole configuration 1991 are presented. In configuration 1990, communication is achieved by communicating through the intelligent device 1965. Repeaters 1955 and/or supervised processing systems 1920 are connected via a medium voltage power connection, and communicate via guided surface waves through intelligent device 1965 via a physical interface for integrating a low loss mode surface wave launcher such as guided wave transceiver 1930, emphasizing aperture methodologies with circuit parameter considerations. Configuration 1990 can be implemented, for example, by utilizing the configuration of FIG. 19E. In configuration 1991, communication is achieved by communicating around the intelligent device. Repeaters 1955 and/or supervised processing systems 1920 still receive the a medium voltage power connection, but repeaters 1955 and/or supervised processing system 1920 communicate via a direct link by utilizing a guided wave cable, such as transmission medium 2400, 2420 and/or 2430 of FIG. 24A-24C. Configuration 1991 can be implemented, for example, by utilizing the configuration of FIG. 19D.

FIG. 19H illustrates three methods of communication between an intelligent device 1965 and a repeater 1955 and/or supervised processing system 1920, and a third utility pole configuration 1992, and a fourth utility pole configuration 1993, and a fifth utility pole configuration 1994 are presented. In configuration 1992, the repeaters 1955 and/or supervised processing system 1920 communicate with the intelligent device 1965 via a direct link by utilizing a guided wave cable, such as transmission medium 2400, 2420, and/or 2430 of FIG. 24A-24C. In configuration 1993, the repeaters 1955 and/or supervised processing system 1920 communicate with the intelligent device 1965 via a direct link by utilizing a standard access radio link. Configurations 1992 and 1993 can be implemented, for example, by utilizing the configuration of FIG. 19F. In configuration 1994, the repeaters 1955 and/or supervised processing system 1920 communicate with the intelligent device 1965 via an integrated physical interface for integrating a low loss mode surface wave launcher such as guided wave transceiver 1930, emphasizing aperture methodologies with circuit parameter considerations. Configuration 1994 can be implemented, for example, by utilizing the configuration of FIG. 19E.

Figure 19I:
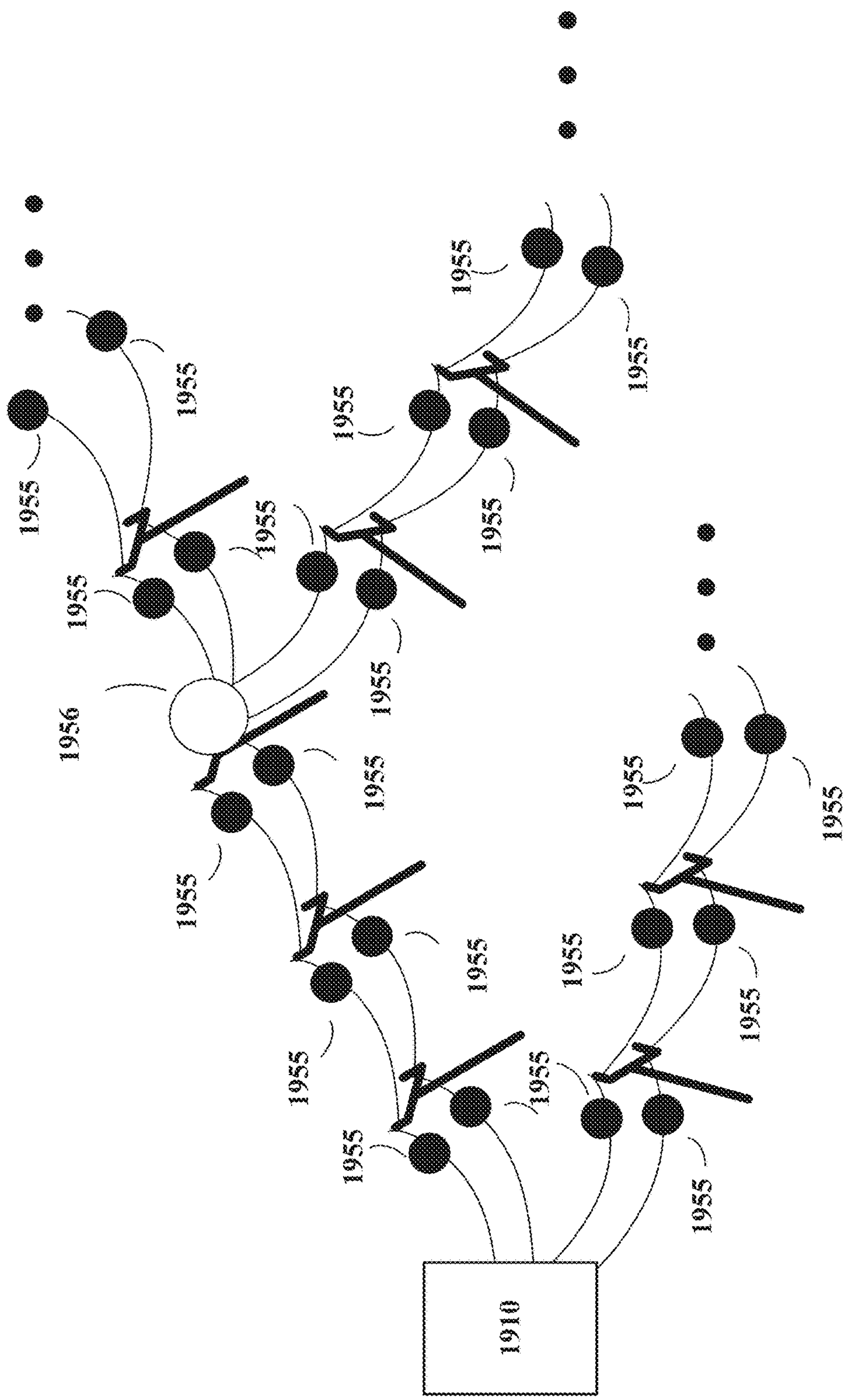

FIG. 19I is an illustration of an embodiment of communication system 1900. In various embodiments, a network of power lines is a complex network with various branches and forks. In various embodiments, a repeater 1956 can repeat an incoming guided wave communication to two or more guided wave transmission branches. For example, repeater 1956 can include three or more guided wave transceivers 1930 to handle three or more transmission medium branches. In various embodiments, the communication system 1900 includes a plurality of multi-way repeaters 1956 to facilitate communication across a vast network of guided wave transmission mediums, such as a power line network or smart grid network. In various embodiments, the multi-way repeater 1956 can be implemented by utilizing one or more repeaters 1955 and/or one or more transmission devices 1506, 1508, and 1510 of FIG. 15. In various embodiments, the multi-way repeater 1956 can be implemented by utilizing a supervised processing system 1920 or supervisory processing system operating 1910 in conjunction with a guided wave repeater system, coupled to a plurality of guided wave transceivers corresponding to the number of guided wave transmission medium branches. In various embodiments a processor of the multi-way repeater 1956 such as the supervised processing system or supervisory processing system can choose to route incoming communications to a subset of branches, for example, based on an indicated destination of the transmission. In various embodiments, the multi-way repeater 1956 can include a memory such as memory 1913 or 1923 that can, for example store a map of the guided wave network or other instructions for routing communications given destination and/or routing information included in the communication signal. A processor of the multi-way repeater can use this information to select a subset of branches, or in some instances select no branches, to route the transmission. In various embodiments, conventional network communication strategies can be utilized to route guided wave communications in communication system 1900.

Figure 19J:
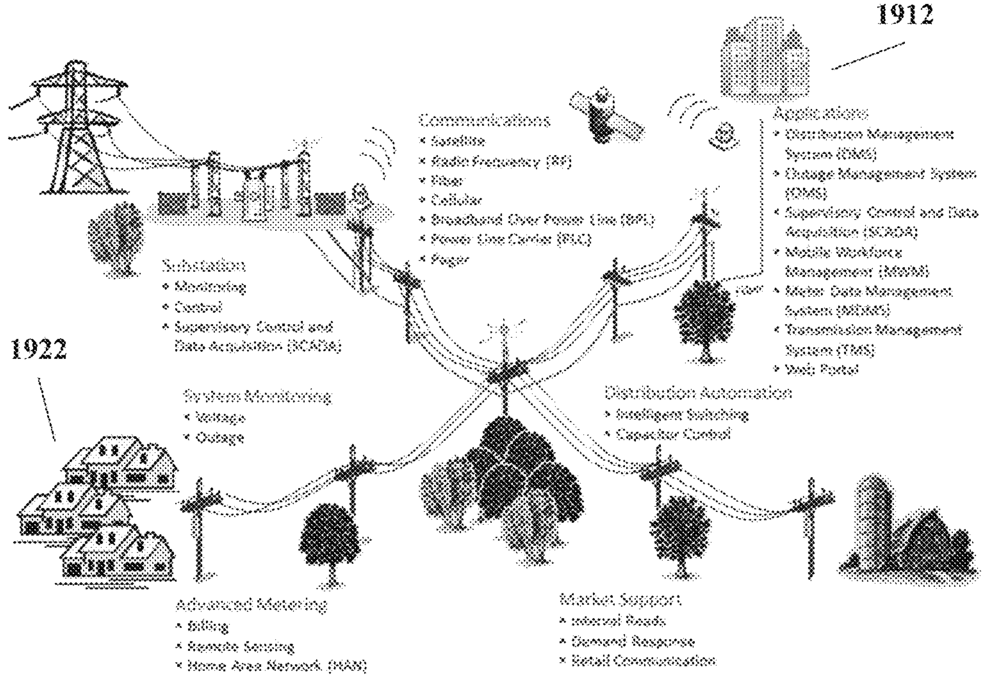
FIGS. 19J and 19K are illustrations of example non-limiting embodiments of implemented in conjunction with utilities management in accordance with various aspects described herein.
Figure 19K:
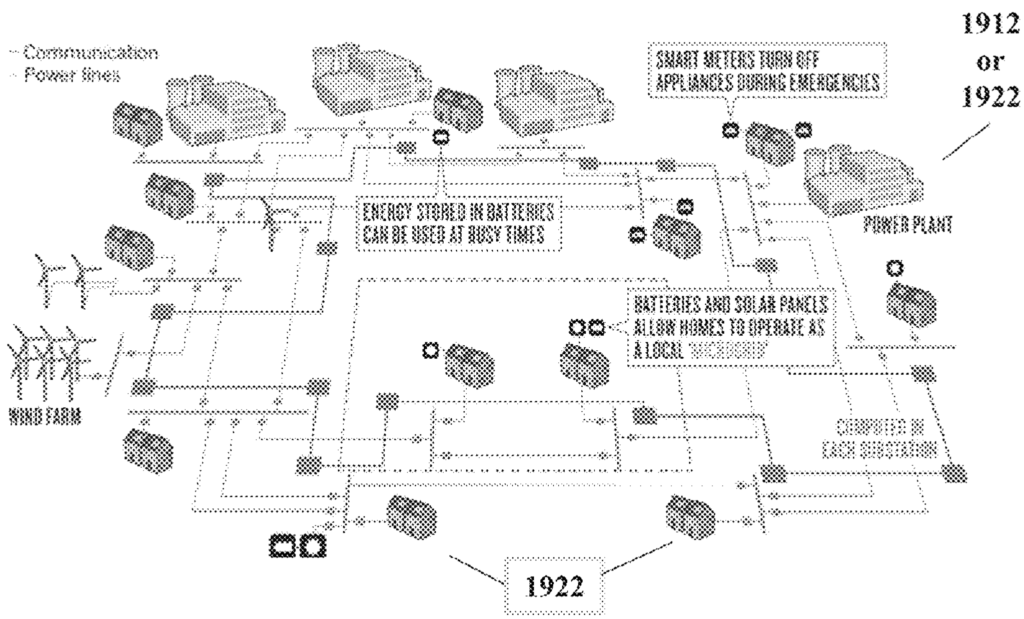

FIG. 19J and FIG. 19K illustrate example embodiments of the communication system 1900 utilized in conjunction with utilities management. A SCADA system can be implemented to facilitate bidirectional communication between supervised entities 1922 and supervisory entities 1912 via guided wave communications across power lines. A SCADA system can be implemented in a smart grid network, facilitating communication between homes and power providers, enabling communication with smart devices to control home energy usage, and also enabling control and communication with of a plurality of power sources, including traditional power lines, batteries, and power from renewable resources such as wind farms and solar cells.

In various embodiments, the supervisory processing system can be utilized as a utilities management system associated with a particular utility provider, or can manage a plurality of utilities provided by a plurality of utility providers. In an example embodiment, the supervisory processing system can receive sensor and/or status data relating to energy consumption by residential and/or commercial entities 1922 such as data from smart devices or smart appliances, load stability, equipment status, power outages, status of secondary power sources and/or equipment such as batteries, solar cells, and/or wind turbines. The supervisory processing system can process and respond to the sensor and/or status data to generate control data for transmission to some or all of the monitored entities. For example, the supervisory processing system can send instructions to an automated home controller to turn off some or all smart appliances in response to a power surge, control a portion of a power grid to switch to a backup battery source in response to high or busy consumption of the primary power source, in response to a power outage, and/or in response to an emergency. As another example, the supervisory processing system can utilize an optimization algorithm to determine optimal power distribution for load stability, and generate control data directed to the power distribution to various entities accordingly.

As another example, a supervisory processing system operating in conjunction with a utilities management system could respond to water availability data, water toxicity data, weather data, and/or water consumption data to control water distribution to residential and commercial entities. For example, the water management system could use this data to determine that drought conditions exist, that water availability is low, that there is a major water contamination problem, and/or that there is a major malfunction at a water treatment plant. The water management system can generate control data in response, for example, limiting water distribution and/or instructing home automation controllers to limit and/or cut off water usage by an entire residential or commercial entity, or individually controlling taps, showers, sprinklers, dishwashing appliances, washing machine appliances, etc.

As another example, a supervisory processing system implemented as a utilities management system could monitor additional data collected over a network such as the Internet to determine a high number of news articles and/or social media posts relating to a gas leak, and the supervisory processing system can use this data to turn off a gas source or a gas line. As another example the supervisory processing system can determine that an extreme thunderstorm is likely based on weather data collected via weather sensors or via weather data collected via the Internet, and in response instruct portions of a smart grid to turn off switch to an emergency backup power source.

In various embodiments, the supervised processing system can execute specific control instructions received from the supervisory entity, for example, executing an instruction to turn off the water or turn off the gas. In various embodiments, the supervised processing system can transmit specific control settings to the supervisory processing system which can include a list of utilities controlled, devices or appliances monitored and/or controlled, power specifications of the devices, usage history, a predefined or custom priority of devices, etc. In response, the supervisory entity can evaluate these settings when generating the control data, and can send more specific instructions such as "turn off the kitchen light" and "set the air conditioning to 70 degrees." In various embodiments, the priority data can be used in response to the need to limit consumption of a utility. For example, a supervised processing system of a first home may prioritize the microwave and refrigerator, as the resident really enjoys eating frozen meals. A supervised processing system of a second home whose resident typically orders takeout may instead prioritize the television. If the supervisory processing system determines that a set of residential entities need to reduce electricity consumption by 10 percent, the supervisory processing system can generate the control data based on this information, and may instruct the first system to turn off the television while instructing the second system to turn off the microwave. In other embodiments, the distribution of power between appliances is determined by the supervised processing system itself, for example where the supervised entity is an individual home, and the control settings are not transmitted to the supervisory processing system. In the previous example, the supervisory processing system could instead send the same instruction to reduce electricity by 10 percent to both homes. The first supervised processing system would process this data and determine which appliances to turn off based on the control settings, and may still determine to turn off the television based on the priority settings stored by the supervised processing system. In various embodiments, priority settings are determined based on analysis of appliance usage, and the first home may turn off the television because it is not normally used. As another example, the television and lights may be turned off in response to a 4 am requirement to reduce power because television and lights are seldom used at this time, and the refrigerator will remain on because the resident never cuts power to their refrigerating unit to prevent food from spoiling. In various embodiments, mass analytics are employed by the supervisory processing system and/or the supervised processing system to prioritize appliances based on all residential entities across the entire system.

In various embodiments, the supervisory processing system can be directed towards other applications other than SCADA utility management, for example, communicating with monitored entities in conjunction with a Distribution Management System (DMS), Outage Management System (OMS), Mobile Workforce Management (MWM), Meter Data Management System (MDMS), or a Transmission Management System (TMS).

In various embodiments, communication system 1900 can be utilized for broadcast communication, and a supervisory processing system 1910 can operate in conjunction with a broadcast communication system, transmitting notification data and/or control data to some or all supervised processing systems 1920. For example, emergency notifications and/or emergency instructions can be sent in this fashion. In various embodiments where the supervisory processing system is operating in conjunction with a utilities management system, the supervisory processing system can transmit broadcast communications relating to widespread utility outages, such as a power outage. In particular, utilizing the guided wave communication system enables important messages and instructions to be broadcast to supervised entities such as residential and commercial entities via the transmission medium in situations where communication may otherwise be impossible, such as in the case of a power outage. In various embodiments, the messages and/or instructions are displayed on one or more user devices and/or one or more display devices of the supervised processing system, such as a message indicating status of the outage, indicating that users should avoid transit near a gas leak, indicating loss of power, indicating nearby charging stations for electric vehicles, indicating current maintenance to a utility or future maintenance to a utility, etc. In various embodiments, messages and/or instructions are interpreted as control data and are executed automatically by the supervised processing system and/or an external processing system communicating with the supervised processing system via the network, for example, directing some or all residential and/or commercial entities to switch a backup power supply and/or turn off home appliances. In various embodiments, a user can respond to a received message displayed via user interface 1929, for example, via voice and/or text input to a user device. The user device can communicate the response back to the supervised processing system, and the supervised processing system can relay the response back to the supervisory processing system via guided wave communication. The response can also be transmitted to the supervisory processing system instead via a wired and/or wireless connection, for example, by utilizing network 1950 and/or network 1960. In various embodiments, the supervisory processing system, upon receiving the message, can relay the message, for example, via a wired and/or wireless connection to a user device of an administrator of the system for display by the administrator, for example, via user device 1980. In various embodiments, a messaging service that enables bidirectional communication between users and administrators can be implemented in this fashion.

In various embodiments where the communication system utilizes the supervised processing systems coupled to repeaters as discussed in conjunction with FIG. 19C-FIG. 19H, the broadcast of the notification and/or instruction is facilitated as the supervisory processing system 1910 can transmit a communication to as few as one supervised processing system via the guided wave transceiver, and this supervised processing system can repeat the electromagnetic wave to further supervised processing systems as discussed previously, while processing the data and/or executing an instruction.

In various embodiments, the guided wave broadcast communications can be sent to a subset of supervised processing systems based on broadcast parameters. For example, broadcast parameters could include sending the message and/or instruction data only to residential entities. In various embodiments, users of the supervised processing system can update notification preferences in a user account, for example via user input to the user interface, and the broadcast will be sent based on the preference data. In various embodiments where a supervised processing system is communicating with various entities and/or users, for example, transmitting data wirelessly to multiple user devices and/or vehicles via network 1960, the supervised processing system can also broadcast this information via the network to some or all of the entities and/or users based on parameter data stored in memory 1923, parameter data received from the supervised broadcast system via guided wave communication, parameter data received from an external server via the network, and/or parameter data received directly from one or more user devices via the network. In various embodiments, the parameter data can include location data, for example, location data associated with user devices, such as mobile device geospatial data, addresses of supervised entities, and/or a physical location associated with the supervised processing system itself. For example, only supervised entities within proximity of the location of a gas leak or within proximity of an approaching storm will receive communications from the supervisory processing system.

In various embodiments, a user device and/or vehicle is associated with a particular supervised processing system, such as the supervised processing system of a residential entity associated with the vehicle or of a transportation service associated with the vehicle. A supervised processing system will transmit the notification and/or instructions to their associated user devices and/or vehicles. In various embodiments, vehicles and user devices such as mobile phones may not be in proximity to its respective supervised processing system and/or the network connection to its respective supervised processing system may not be available. To address this issue, all supervised processing systems can broadcast the notification and/or instruction, for example, as a radio signal or short wave communication signal, and any nearby vehicles and user devices can receive the broadcast. In various embodiments, the supervised processing system will transmit the communication directly to nearby vehicles and/or user devices based on location data received from the vehicles and/or user devices.

In various embodiments where the supervised entities include vehicles, such as a privately owned car or a vehicle that is part of a public transportation system, the supervised processing system can communicate wirelessly with the vehicles via network 1960 as described previously. In particular, the supervised processing system can transmit messages to vehicles to be delivered to one or more users via a display and/or speaker associated with the vehicle. This can also include location data and/or navigational instructions for display, for example, giving the location of a hazardous area or electric vehicle charging station, and/or giving navigational instructions to avoid a hazardous area or route to an electric vehicle charging station. The broadcast communication system can also send control data to the vehicle, for example, an instruction for a subway car to stop due to an emergency situation such as a gas leak, or control data directing an autonomous vehicle to avoid a hazardous area or to route to the nearest electric vehicle charging station.

In various embodiments, a supervised processing system can also generate their own broadcast in response to detecting an emergency situation such as a power outage. The supervised entity can detect an emergency situation, for example, based on sensor data and/or based on notifications received from the additional transceiver, for example, from a user device or from the network. For example, a supervised processing system that transmits guided waves via a power line can determine that a power outage has occurred, for example, by detecting a voltage drop and/or that the power line was severed by utilizing sensors 1604, and/or by receiving a radio emergency broadcast, receiving a notification of a planned or unplanned outage via a user device of a maintenance worker, etc. In various embodiments, the supervised processing system can broadcast a notification and/or instruction relating to the emergency via guided wave communication to other supervised processing systems, for example, where one or more supervised processing systems utilize repeaters as discussed in conjunction with FIG. 19C-FIG. 19I. In various embodiments, the supervised processing system can transmit this information directly to the supervisory processing system, and the supervisory processing system will generate the broadcast accordingly. In various embodiments, the supervisory processing system will detect the emergency itself, based on user input by an administrative authority, information from its own sensors, and/or information received via the network 1950 as discussed previously.

Figure 19L:
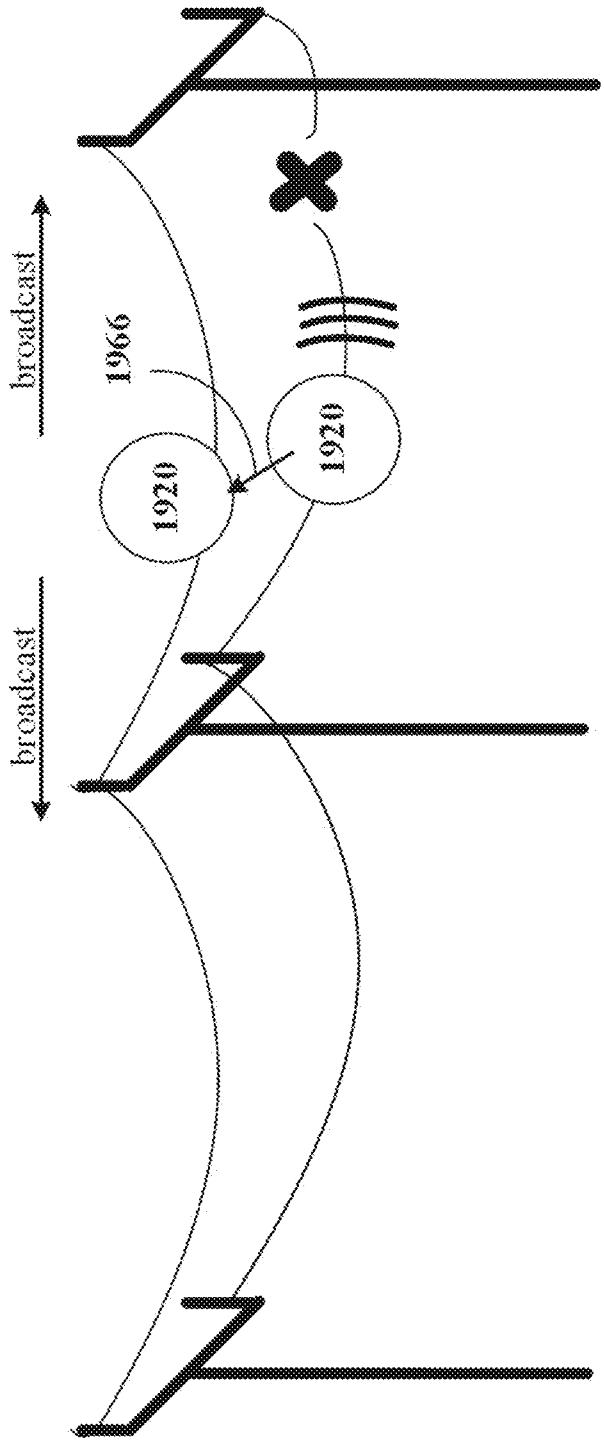
FIG. 19L illustrates an example non-limiting embodiment of a communication system in accordance with various aspects described herein.

FIG. 19L illustrates an embodiment of communication system 1900. In various embodiments, such as embodiments where the power outage affects the transmission medium, such as a severed power line, the supervised processing system can instead send the power outage notification via the network to a supervisory processing system. In various embodiments, the supervised processing system can instead send the power outage notification to another supervised processing system for transmission back to the supervisory processing system and/or for immediate broadcast via guided wave communications. This strategy may be preferred in embodiments where supervisory processing systems are in close proximity, for example, sharing the same utility pole on opposite sides of the same phase as in FIG. 19C-FIG. 19H, or on different phases on the same side of the utility pole as shown in FIG. 19L, where a short range wireless connection or short wired connection can be utilized. In various embodiments, where multiple phases of a power line are utilizing guided wave communications, a first supervised system on a first phase can communicate with a second supervised system on a second phase via a wired and/or wireless connection such as communication link 1966 described previously or another short range wireless connection such as an access line of sight radio link connection, Bluetooth connection, and/or ZigBee connection, for example by utilizing their respective additional transceivers 1928. Consider an example where the first phase of the power line is severed, and thus both power and the ability to transmit a guided wave on this power line is lost. This first supervised processing system can send a communication to the second supervised processing system for guided wave transmission via the second power line phase. In various embodiments where multiple phases of a power line are utilizing guided wave communications, the broadcast will be transmitted along some or all the phases preemptively for resiliency, allowing the broadcast to reach its final destination even if one or more of the phases fail due to the power outage.

In various embodiments, a supervisory processing system and/or supervised processing system can generate a broadcast communication in response to an upcoming emergency and/or outage, such as an upcoming power outage. In various embodiments, the upcoming power outage can be planned, such as planned maintenance, or predicted. For example, an upcoming emergency and/or power outage can be predicted based on data gathered from sensors and/or via the network to include equipment status data, user input, weather data, news data, social media data, etc. The broadcast can include times that a planned or predicted outage is projected to take place, preemptive instructions, such as instructing supervised entities to switch to a backup battery or instructing users to find a safe place to wait, whether or not an emergency warning has passed, etc. In various embodiments, the supervisory processing system can generate a likelihood value for an outage based on the collected data based on a likelihood algorithm, and generate a broadcast in response to the likelihood value comparing unfavorably to a likelihood threshold to indicate that the likelihood of an outage is higher than a threshold value. In various embodiments, a second broadcast will be transmitted when the likelihood value once again compares favorably to the likelihood threshold to indicate that the warning period has passed.

Figure 19M:
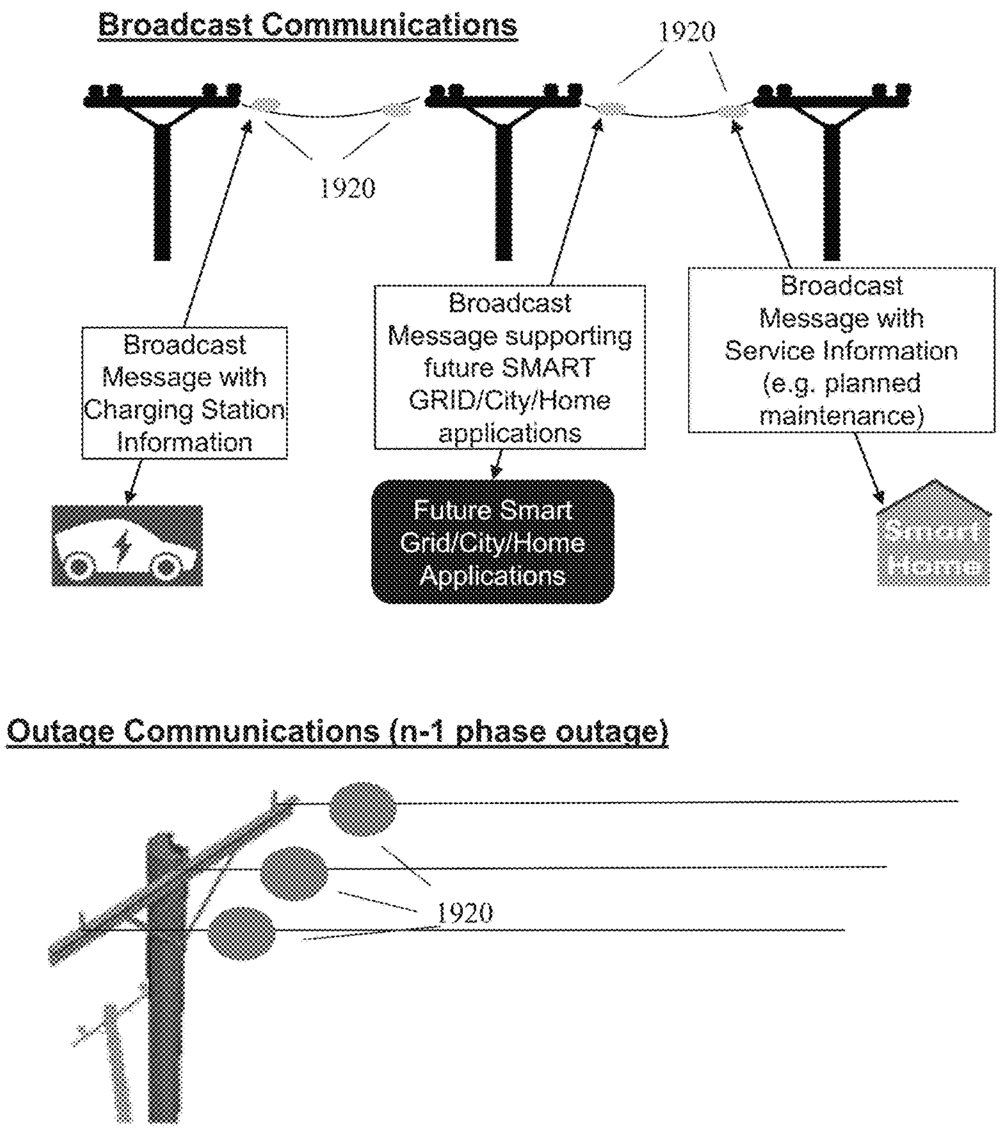
FIG. 19M is an illustration of an example non-limiting embodiment of a communication system implemented in conjunction with broadcast communication in accordance with various aspects described herein.

FIG. 19M illustrates an example embodiment of communication system 1900 operating in conjunction with broadcast communications along power lines via guided wave communications. Broadcast messaging can include charging station information, can support future smart grid/city/home application, and/or can include service information such as planned maintenance. As discussed, broadcasting along multiple power line phases can increase resiliency, and supervised processing systems 1920 can be placed along multiple phases accordingly, ensuring that broadcast communication is enabled unless all power line phases fail.

Figure 19N:
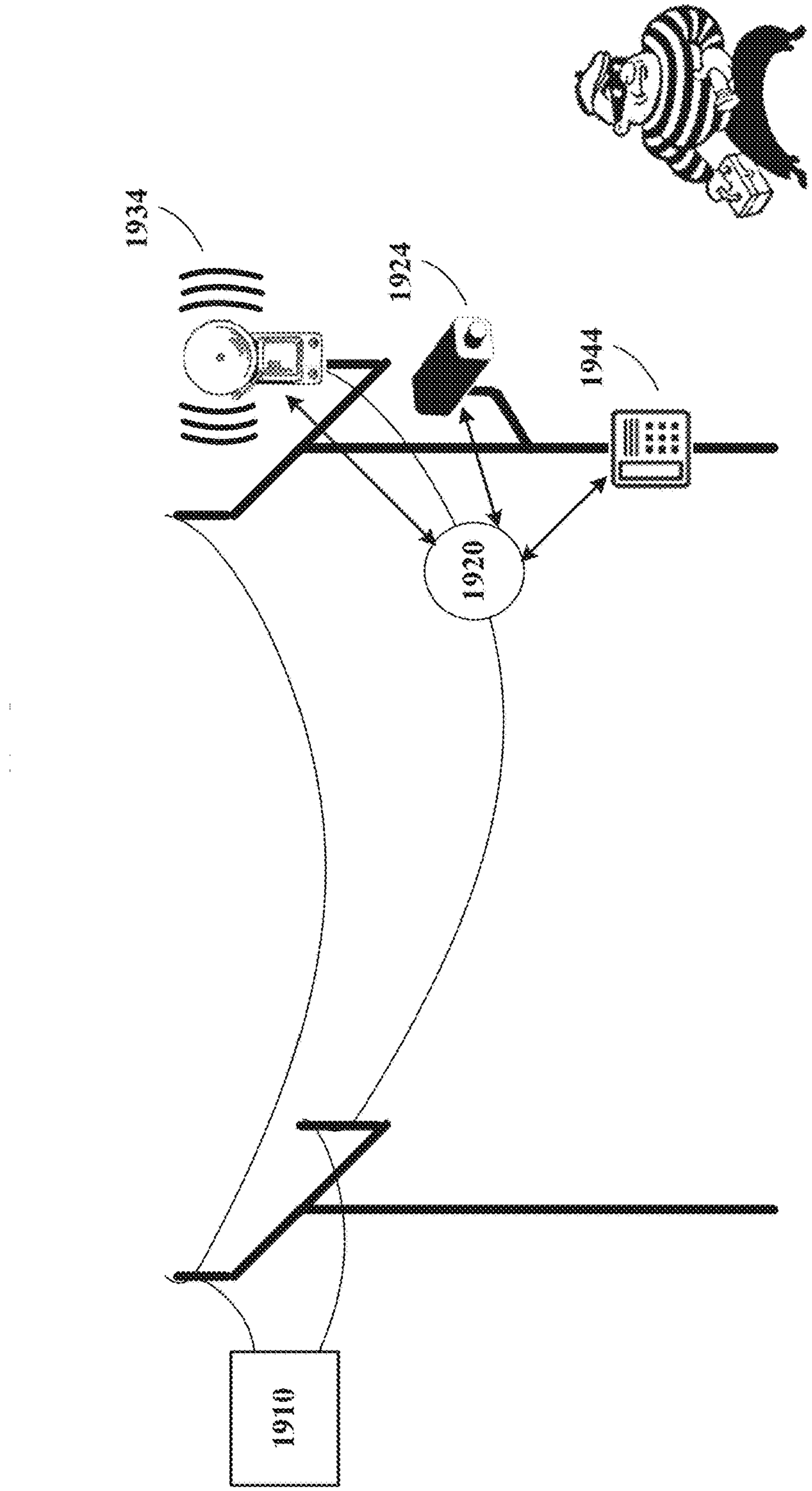
FIG. 19N is an illustration of an example non-limiting embodiment of a communication system implemented in conjunction with surveillance in accordance with various aspects described herein.

FIG. 19N illustrates another embodiment of the communication system 1900 where the supervised processing system 1920 is utilized in conjunction with a surveillance system monitoring the supervised entity 1922, sending surveillance data collected by the sensor devices 1924 to the supervisory processing system, where the supervisory entity 1912 associated with the supervisory processing system is, for example, an administrator of a surveillance system provider and/or an administrator of the supervised entity. In various embodiments, the surveillance system can be directed towards monitoring the transmission medium itself, utilizing one or more of the embodiments described in conjunction with FIG. 19C-FIG. 19H. This system can utilize many of the features described in FIG. 16, but in particular can be directed towards detecting intentional and malicious action such as vandalism to the transmission medium and/or detecting one or more people in proximity to the area that could perform a malicious action. The sensors can include, for example, image sensors such as image sensor 1604*g* or any one or more cameras that capture still photos and/or video, and/or motion sensors such as passive infrared sensors, microwave sensors, area reflective sensors, ultrasonic sensors, vibration sensors, or another type of sensor that detects motion. Motion data can also be captured using the image sensor, utilizing image processing techniques to recognize and/or track the motion of an object.

Figure 19O:
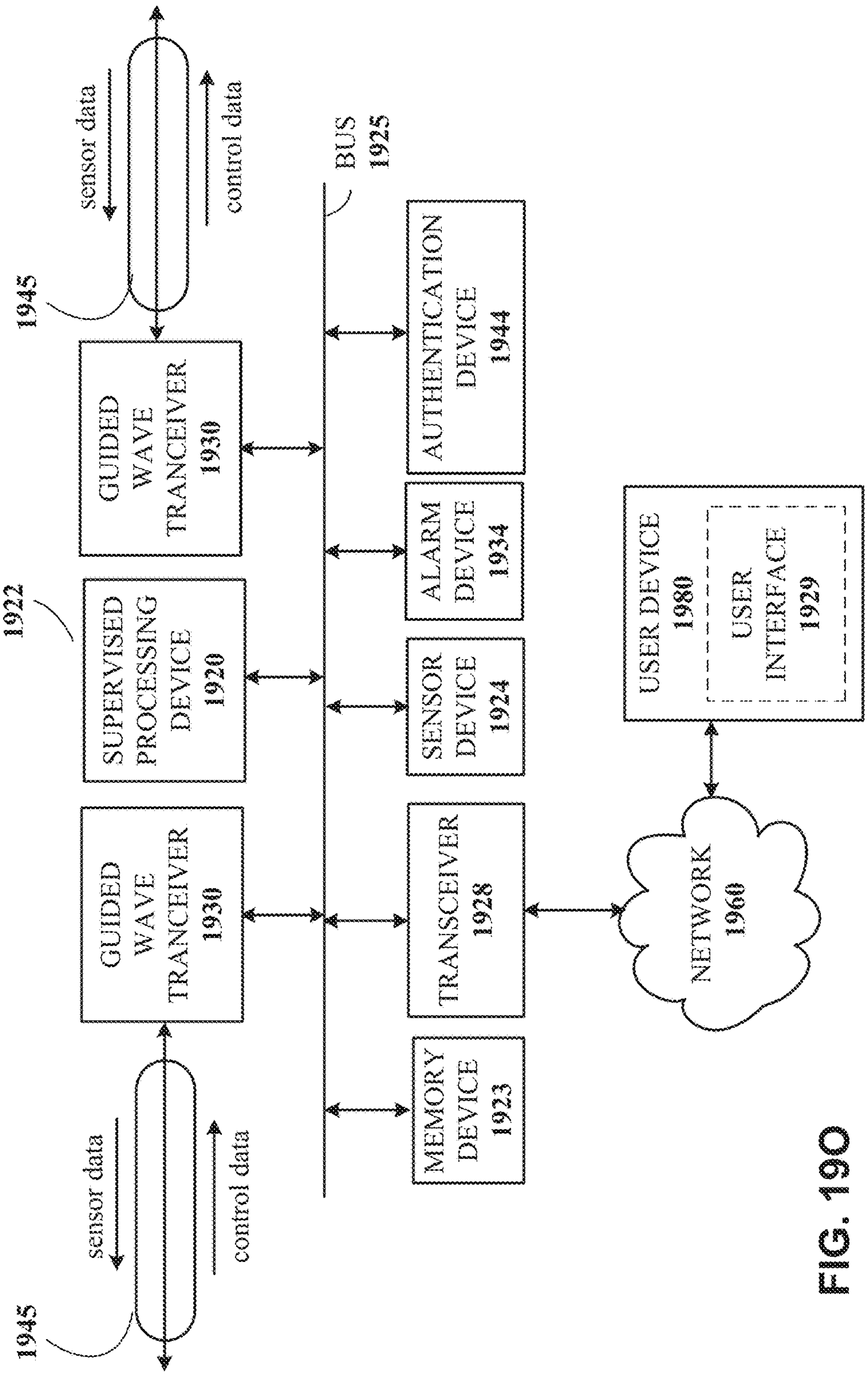

FIG. 19O is a block diagram illustration of a supervised processing system 1920 operating in conjunction with a surveillance system. In various embodiments, supervised processing system 1920 is coupled to at least one guided wave transceiver device 1930 and at least one memory device 1923 that includes a memory, connected via bus 1925, at least one additional transceiver 1928, at least one sensor device 1924, and/or at least one control device 1926, which can connect to additional devices such as user device 1980 and/or connect to a wired and/or wireless network 1960, as previously described. In addition to these previously described features, supervised processing system 1920 can be coupled to, or communicate bidirectionally with via the at least one additional transceiver 1928, an alarm device 1934 and/or an authentication device 1944. In various embodiments, the control device 1926 can be used to control alarm device 1934 and/or an authentication device 1944.

In various embodiments where the supervised processing system 1920 operates in conjunction with a surveillance system, the supervised processing system 1920 can send raw surveillance data collected by sensor devices 1924 to the supervising entity 1912. This can include transmitting raw data from sensors 1604, transmitting one or more video signals, transmitting a notification that a motion sensor has been triggered, etc. This data can be transmitted in real-time, can be transmitted in fixed intervals, and/or can be transmitted in response to a request from the supervising entity 1912. For example, the supervised processing system 1920 can transmit a real-time video feed to the supervisory processing system for analysis by a user such as an administrator, for example, via user interface 1919. In various embodiments, analysis of the raw data received by the can also be achieved automatically by a the supervisory processing system 1910 by utilizing an algorithm to detect suspicious activity, for example, by utilizing facial detection and/or motion detection methods on a video stream to detect an intruder, and/or by utilizing one or more sensors 1604 to determine that there is a problem with the transmission medium such as a severed power line that was perhaps caused by suspicious activity. In various embodiments, this analysis of the raw data can be achieved instead via the supervised processing system 1920, and a transmission can be sent to the supervisory processing system in response to detecting suspicious activity, for example, to alert the administrator and/or law enforcement authorities. In various embodiments, the automated analysis by the supervisory system and/or supervised system will notify and/or allow an administrative user to evaluate detected suspicious activity, for example via user interface 1919, allowing the administrative user to confirm whether or not the activity is indeed malicious action. For example, instead of requiring an administrator to constantly view a video feed, an administrator will only be notified when a suspicious person and/or action is detected by the system, and the administrator can view past or current video footage to determine if the activity was indeed malicious and if further steps need to be taken.

In various embodiments, this automatic suspicious activity detection by the supervised processing system and/or supervisory processing system can include utilizing scheduled maintenance data, for example, logged by an administrator of the system, to determine that activity by a detected person is scheduled maintenance and not vandalism by, for example, comparing a current time to a time that corresponds to scheduled maintenance. In various embodiments, the automatic intrusion detection can include utilizing a database of images of authorized personnel that includes, for example, maintenance workers, etc., and detected faces can be compared to faces in the database to determine whether or not a detected person is a recognized and/or authorized person. In various embodiments, a database of images of unauthorized personnel, such as known vandals and/or criminals, can be utilized in a similar fashion to determine that a detected person is a known criminal and thus that malicious activity is likely occurring.

In various embodiments, authorized personnel such as maintenance workers can be identified via an authentication device 1944. For example, a maintenance worker can identify themselves via user input to the authentication device, which can include text, keypad, voice input, tactile input, biometric input such as a fingerprint or eye scan, image input, for example, to utilize facial recognition, etc. In various embodiments, the authentication device can include a user device 1970 or 1980, for example, a mobile phone of a maintenance worker, and the user input can be sent directly to the supervised processing system and/or supervisor processing system wirelessly. For example, a maintenance worker can login to a maintenance worker account and/or enter a passcode on a keypad located on a utility pole, or on their own mobile device. In various embodiments, the authentication device can include an optical scanner or magnetic stripe reader to scan an ID card of the maintenance worker. In various embodiments, the authentication device can include a receiver that receives a wireless signal emitted by a device associated with the authorized personnel such as a beacon and/or mobile device, where the authorized personnel is identified by a unique identifier included in wireless signal. In various embodiments, such a receiver is implemented by utilizing the at least one additional transceiver 1928.

In various embodiments, the supervised processing system of a surveillance system can be coupled to one or more alarm devices 1934, such as a speaker that sounds an alarm tone and/or lighting devices such as a strobe light or directed spotlight. In various embodiments, the alarm devices can be activated automatically by the surveillance system and/or in response to control data received from the supervisory processing system. In various embodiments, the control data will enable the spotlight to automatically track the detected intruder based the image data, motion data, and/or other sensor data. In various embodiments, the surveillance system and/or supervisory processing system will send a transmission via the guided wave transceiver, a wired connection and/or a wireless connection to law enforcement authority such as the police automatically in response to detecting the intrusion.

In various embodiments, the sensors and/or alarm devices of the surveillance can be controlled based on control data generated automatically by the supervised processing system 1920 in response to detecting the suspicious activity. In various embodiments, the control data can instead by received from supervisory processing system 1910 via the guided wave transceiver 1930. In various embodiments, the control data can be utilized by the control device 1926 to control the sensors and/or alarm devices, or can be controlled directly by the supervised processing system. Executing the control data to control sensors can include, for example, turning sensors on or off, changing the position and/or orientation of a sensor such as a camera, zooming a camera in or out, starting or stopping a camera from recording, etc. Executing the control data to control alarm devices can include, setting off the alarm tone via the audio device of the surveillance system, turning on and/or controlling the position/orientation of a strobe light and/or spotlight of the surveillance system, directing the surveillance system to alert law enforcement authorities, etc. For example, an administrator viewing a video feed can directly control a camera to zoom in on and follow a suspicious person and/or allow the administrator to set off an alarm of the surveillance system to scare the intruder away. In various embodiments, some of the sensors of the surveillance system will be activated and/or turned on/off in response to an instruction in the control data. For example, a camera may turn on automatically only in response to possibly suspicious behavior determined by analysis of motion detector data and/or data collected by sensors 1604, and may turn off in response to a lack of suspicious behavior for a fixed time interval, or turn off in response to a determination that the suspicious behavior is not indeed malicious. In various embodiments, this control data can be generated automatically by the supervisory processing system, or in response to automatically detecting the suspicious activity.

Figure 20:
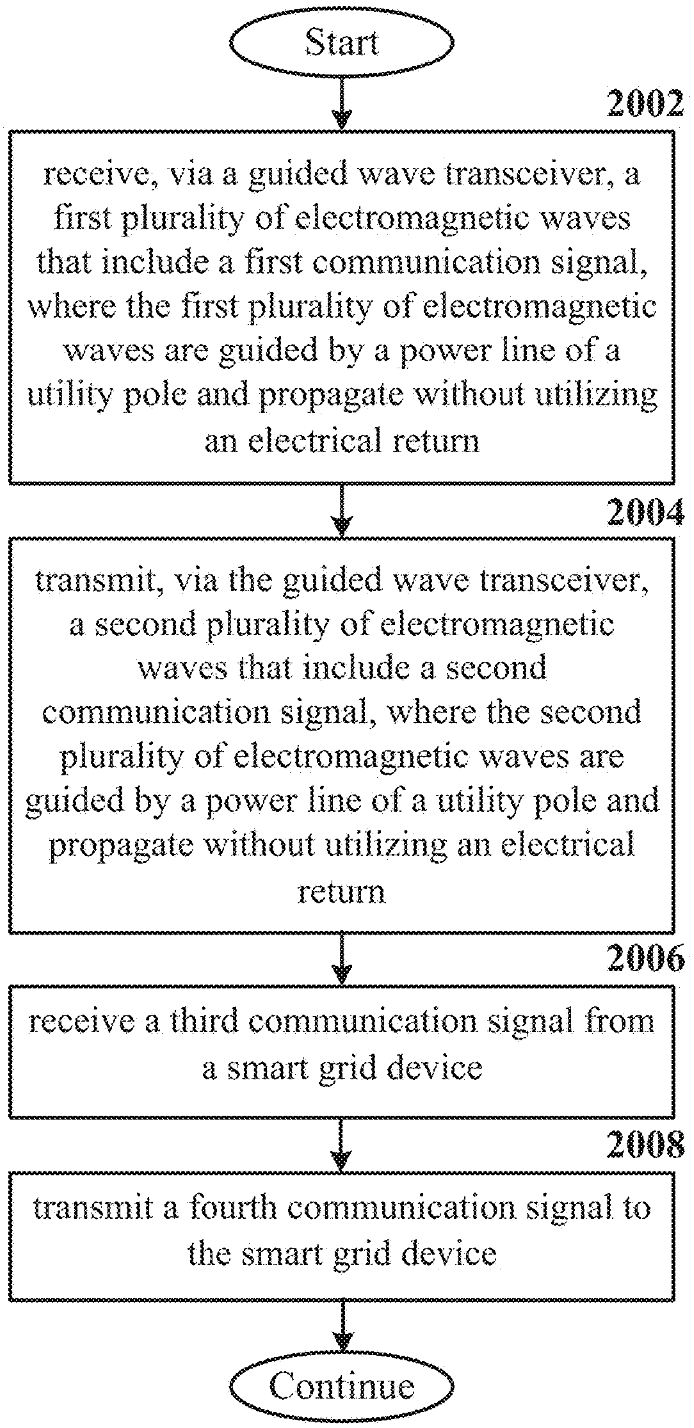
FIG. 20 illustrates a flow diagram of an example, non-limiting embodiment of a method in accordance with various aspects described herein.

FIG. 20 is a flowchart illustrating a method for use by a guided wave repeater system that includes a processor and a guided wave transceiver. Step 2002 includes receiving via the guided wave transceiver a first plurality of electromagnetic waves that include a first communication signal, where the first plurality of electromagnetic waves are guided by a power line of a utility pole and propagate without utilizing an electrical return. Step 2004 includes transmitting via the guided wave transceiver a second plurality of electromagnetic waves that include a second communication signal, where the second plurality of electromagnetic waves are guided by a power line of a utility pole and propagate without utilizing an electrical return. Step 2006 includes receiving a third communication signal from a smart grid device. Step 2008 includes transmitting a fourth communication signal to the smart grid device.

In various embodiments, the smart grid device is physically attached to the utility pole. In various embodiments, the smart grid device is powered by the power line. In various embodiments, the guided wave repeater system further includes a wireless transceiver. The third communication signal is a wireless communication signal received by the wireless transceiver, and the fourth communication signal is a wireless communication signal transmitted by the wireless transceiver. In various embodiments, the third communication signal and the fourth communication signal are received and transmitted, respectively, via an access line of sight radio link protocol. In various embodiments, the guided wave repeater system further includes a wired interface. The third communication signal is received from the smart grid device via the wired interface, and the fourth communication signal is transmitted to the smart grid device via the wired interface.

In various embodiments of the guided wave repeater system, the third communication signal is received as a third plurality of electromagnetic waves via the guided wave transceiver, and the fourth communication signal is received as a fourth plurality of electromagnetic waves via the guided wave transceiver. In various embodiments, the third communication signal is received as a third plurality of electromagnetic waves via a second guided wave transceiver, and where the fourth communication signal is received as a fourth plurality of electromagnetic waves via the second guided wave transceiver.

In various embodiments of the guided wave repeater system, the third communication signal includes supervisory control and data acquisition (SCADA) data. The third communication signal is transformed to generate the second plurality of electromagnetic waves for transmission, where the second communication signal includes the SCADA data. In various embodiments, the first communication signal includes supervisory control and data acquisition (SCADA) data. The first plurality of electromagnetic waves are transformed to generate the fourth communication signal for transmission to the smart grid device, where the fourth communication signal includes the SCADA data.

In various embodiments, the guided wave repeater system includes a wired interface and the first plurality of electromagnetic waves are transformed to generate a fifth communication signal that includes data of the first communication signal. The fifth communication signal is transmitted to a second guided wave repeater system via the wired interface. A sixth communication signal is received from the second guided wave repeater system via the wired interface. The sixth communication signal is transformed to generate the second plurality of electromagnetic waves, where the second plurality of electromagnetic waves include data of the sixth communication signal. In various embodiments where the guided wave repeater system is physically attached to the power line, the power line corresponds to a first phase on a first side of the utility pole. The second guided wave repeater system is physically attached to the first phase on an opposite side of the utility pole.

Figure 21:
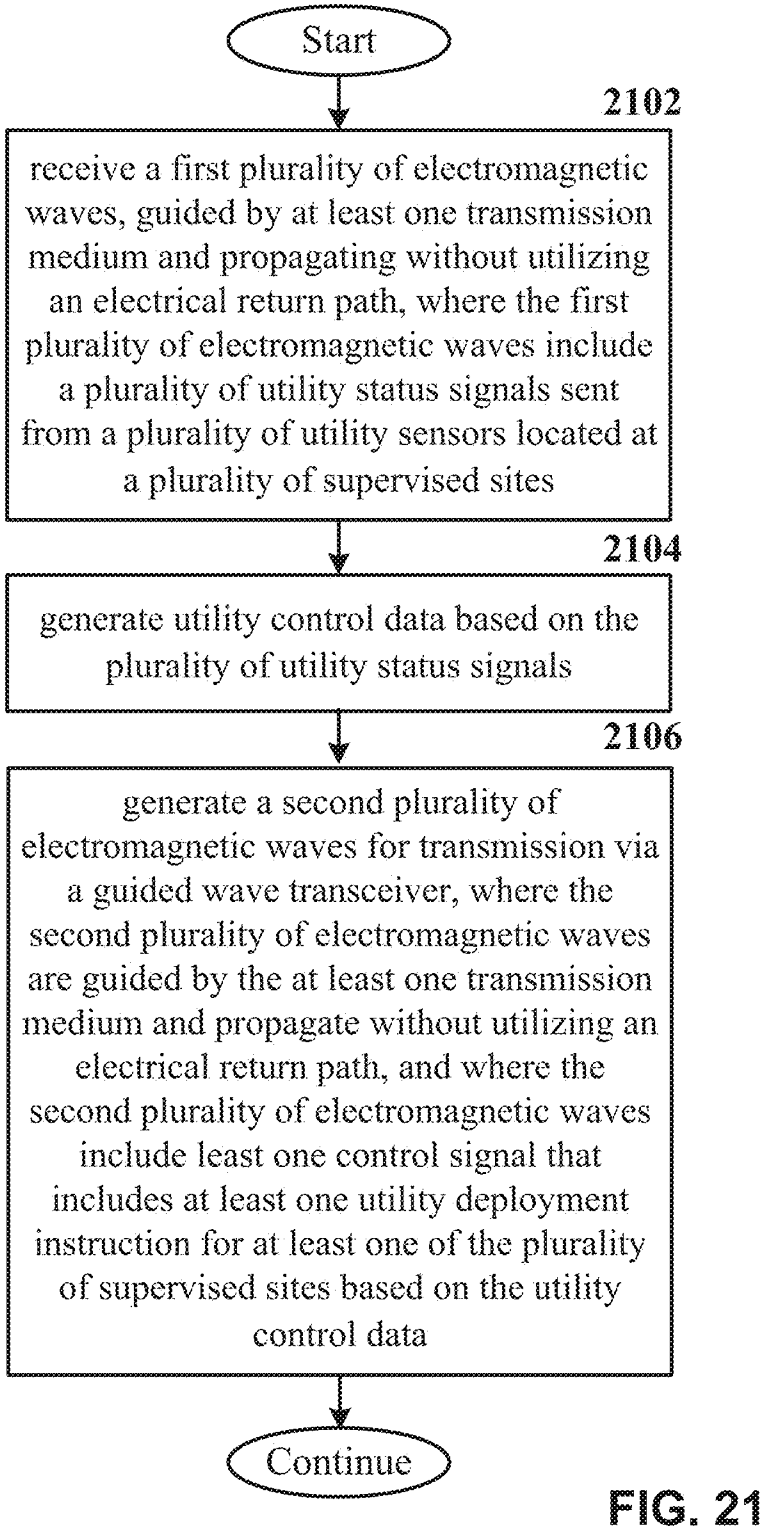
FIG. 21 illustrates a flow diagram of an example, non-limiting embodiment of a method in accordance with various aspects described herein.

FIG. 21 is a flowchart illustrating a method for use by a utilities management system that includes a processor and a guided wave transceiver. Step 2102 includes receiving a first plurality of electromagnetic waves, guided by at least one transmission medium and propagating without utilizing an electrical return path, where the first plurality of electromagnetic waves include a plurality of utility status signals sent from a plurality of utility sensors located at a plurality of supervised sites. Step 2104 includes generating utility control data based on the plurality of utility status signals. Step 2106 includes generating a second plurality of electromagnetic waves for transmission via the guided wave transceiver, where the second plurality of electromagnetic waves are guided by the at least one transmission medium and propagate without utilizing an electrical return path, and where the second plurality of electromagnetic waves include least one control signal that includes at least one utility deployment instruction for at least one of the plurality of supervised sites based on the utility control data.

In various embodiments, the utilities management system is implemented in conjunction with a supervisory control and data acquisition (SCADA) system. In various embodiments, at least one of the plurality of supervised sites is a home, at least one of the plurality of utility sensors located in the home is coupled with a home automation controller, and the at least one utility deployment instruction is executed by the home automation controller. In various embodiments, the at least one control signal is sent to the home and includes an instruction to turn off appliances of the home.

In various embodiments, the utility control data is generated by utilizing a supervisory control algorithm based on the plurality of utility status signals to optimize utility consumption across the plurality of supervised sites. In various embodiments of the utilities management system, an emergency notification signal is received via the guided wave transceiver, and generating the utility control data is further based on the emergency notification signal. In various embodiments, the at least one control signal includes an instruction for the supervised site to switch from a primary power source to a secondary power source. In various embodiments, the secondary power source includes a battery and/or a solar panel. In various embodiments, a primary power consumption level is determined based on the plurality of utility status signals. The primary power consumption level is compared to a primary power load threshold, and the instruction to switch from the primary power source to the secondary power source is based on the primary power consumption level comparing unfavorably to the primary power load threshold.

In various embodiments, a subset of the plurality of utility sensors monitor a power line, and the transmission medium that guides the electromagnetic waves includes the power line. In various embodiments, one of the subset of the plurality of utility sensors is coupled to an intermediate guided wave transceiver. The intermediate guided wave transceiver transmits at least one of the plurality of utility status signals corresponding to the one of the subset of the plurality of utility sensors to the utility management system as a first plurality of electromagnetic waves that are guided by the power line and that propagate without utilizing an electrical return path. The at least one control signal is received by the intermediate guided wave transceiver as a second plurality of electromagnetic waves that are guided by the power line and that propagate without utilizing an electrical return path, and the intermediate guided wave transceiver is a waypoint of a transmission path of the at least one control signal to the at least one of the plurality of supervised sites. The intermediate guided wave transceiver repeats second plurality of electromagnetic waves for transmission along the power line to a next guided wave transceiver of a remainder of the transmission path.

Figure 22:
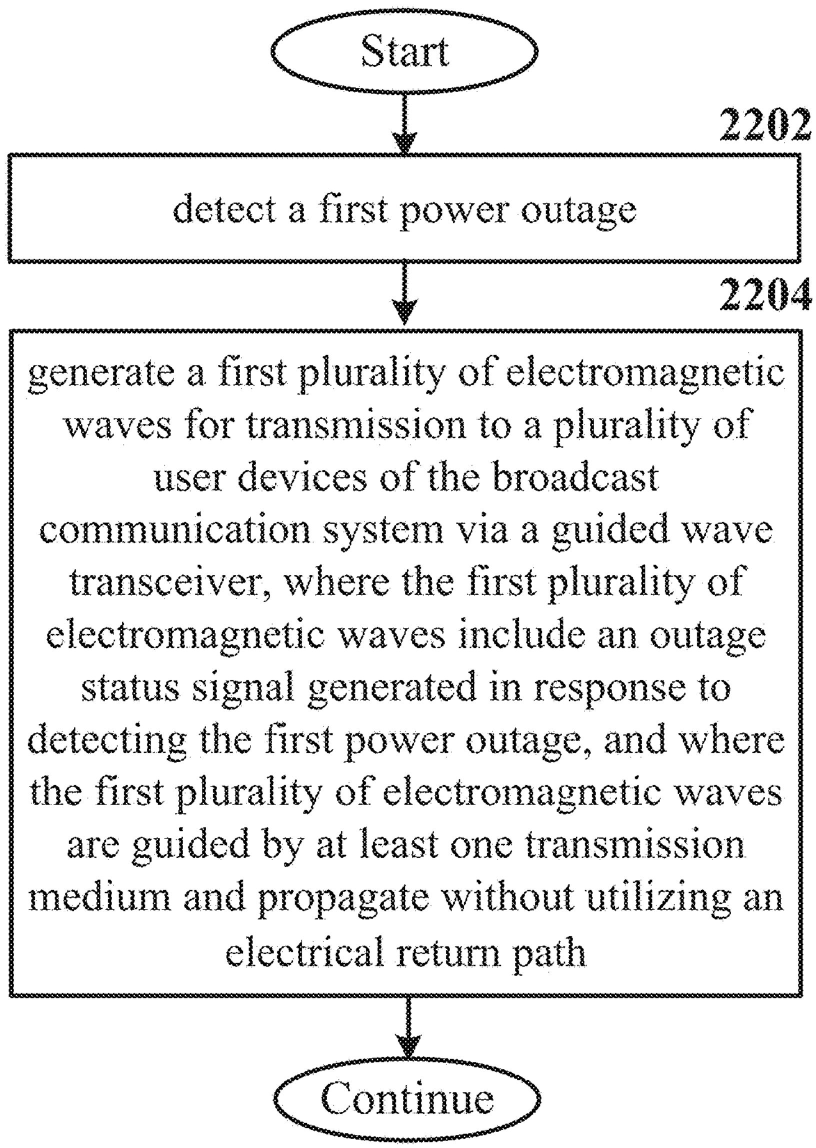
FIG. 22 illustrates a flow diagram of an example, non-limiting embodiment of a method in accordance with various aspects described herein.

FIG. 22 is a flowchart illustrating a method for use by a broadcast communication system that includes a processor and a guided wave transceiver. Step 2202 includes detecting a first power outage. Step 2204 includes generating a first plurality of electromagnetic waves for transmission to a plurality of user devices of the broadcast communication system via the guided wave transceiver, where the first plurality of electromagnetic waves include an outage status signal generated in response to detecting the first power outage, and where the first plurality of electromagnetic waves are guided by at least one transmission medium and propagate without utilizing an electrical return path.

In various embodiments, the broadcast communication system is physically attached to a first one of a plurality of power line phases of a power pole, and the first power outage corresponds to a failure of a second one of the plurality of power line phases of the power pole. In various embodiments, the broadcast communication system further includes a wireless transmitter, as well as a disturbance detection sensor, a loss of energy sensor, and/or a vibration sensor. A second power outage corresponding to a failure of the first one of the plurality of power line phases is detected based on sensor input to the disturbance detection sensor, the loss of energy sensor, and/or the vibration sensor, and a notification of the second power outage is generated for transmission via the wireless transmitter. In various embodiments, the broadcast communication system further includes a wireless transceiver and a power outage notification is received via the wireless transceiver. The first power outage is detected in response to receiving the power outage notification.

In various embodiments, the broadcast communication system further includes a wireless receiver, at least one wireless transmission that includes utility status data from at least one utility provider is received via the wireless receiver, and the outage status signal is generated based on the utility status data. In various embodiments the broadcast communication system further comprises a wireless transmitter. At least one status request is generated for transmission via the wireless transmitter to the at least one utility provider in response to detecting the first power outage, and the at least one wireless transmission is received in response to the at least one status request.

In various embodiments, a second plurality of electromagnetic waves are received via the guided wave transceiver that includes a power outage notification signal. The first power outage is detected in response to receiving the power outage notification signal. In various embodiments, at least one second plurality of electromagnetic waves are received from at least one utility provider via the guided wave transceiver. The second plurality of electromagnetic waves include utility status data, and the outage status signal is generated based on the utility status data. In various embodiments, at least one third plurality of electromagnetic waves that include a status request signal are generated for transmission via the guided wave transceiver to the at least one utility provider in response to detecting the first power outage, and the at least one second plurality of electromagnetic waves is received in response to the status request signal.

In various embodiments, the outage status signal includes message data for display by a subset of the plurality of user devices. In various embodiments, the message data corresponds to a message from a utility provider. A second plurality of electromagnetic waves are received via the guided wave transceiver that include a message response signal from one of the subset of the plurality of user devices corresponding to user input to the one of the subset of the plurality of user devices. The second plurality of electromagnetic waves are transmitted via the guided wave transceiver to the utility provider. In various embodiments, at least one of the plurality of user devices includes a home automation controller, and the outage status signal includes at least one instruction for execution by the home automation controller. In various embodiments, the broadcast the outage status signal includes at least one electric vehicle charging station location.

In various embodiments, a second plurality of electromagnetic waves are received from a utility provider via the guided wave transceiver that includes planned maintenance data. A third plurality of electromagnetic waves are generated for transmission to the plurality of user devices of the broadcast communication system via the guided wave transceiver, where the third plurality of electromagnetic waves includes the planned maintenance data.

In various embodiments, a first power outage likelihood value is determined. The first power outage likelihood value is compared to a power outage likelihood threshold. A second plurality of electromagnetic waves for transmission to the plurality of user devices of the broadcast communication system via the guided wave transceiver, the second plurality of electromagnetic waves includes power outage warning data, and the second plurality of electromagnetic waves is generated in response to the first power outage likelihood value comparing unfavorably to the power outage likelihood threshold. In various embodiments, the broadcast communication system includes an environmental sensor, and the first power outage likelihood value is based on sensor input to the environmental sensor. In various embodiments, the first power outage likelihood value is determined at a first time, and a second power outage likelihood value is determined at a second time that is later than the first time. The second power outage likelihood value is compared to the power outage likelihood threshold, and a third plurality of electromagnetic waves are generated for transmission to the plurality of user devices of the broadcast communication system via the guided wave transceiver. The third plurality of electromagnetic waves indicate that the power outage warning has passed, and the third plurality of electromagnetic waves is generated in response to the second power outage likelihood value comparing favorably to the power outage likelihood threshold.

Figure 23:
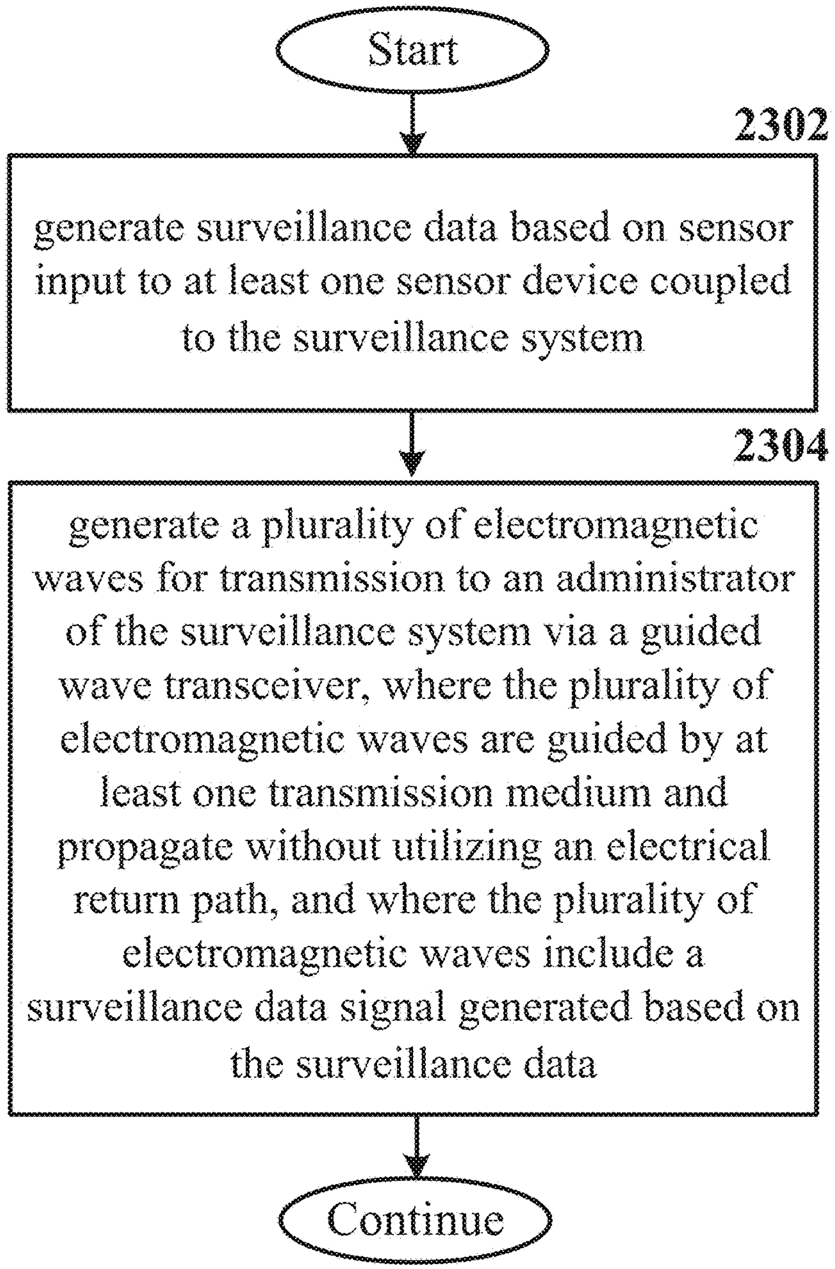
FIG. 23 illustrates a flow diagram of an example, non-limiting embodiment of a method in accordance with various aspects described herein.

FIG. 23 is a flowchart illustrating a method for use by a surveillance system that includes a processor and a guided wave transceiver. Step 2302 includes generating surveillance data based on sensor input to at least one sensor device coupled to the surveillance system. Step 2304 includes generating a plurality of electromagnetic waves for transmission to an administrator of the surveillance system via the guided wave transceiver, where the plurality of electromagnetic waves are guided by at least one transmission medium and propagate without utilizing an electrical return path, and where the plurality of electromagnetic waves include a surveillance data signal generated based on the surveillance data.

In various embodiments, the surveillance system is physically attached to a power line, and the at least one sensor device monitors a region in proximity to the power line. In various embodiments, the at least one sensor device includes a camera, and where the surveillance data includes image data. In various embodiments, the transmitted surveillance data signal includes video data collected by the camera for viewing by the administrator. In various embodiments, a second plurality of electromagnetic waves are received that include camera control data. The camera is controlled based on the camera control data, and controlling the camera includes orienting the camera, positioning the camera, panning the camera, zooming a lens of the camera, starting a recording by the camera, and/or stopping a recording by the camera.

In various embodiments where the surveillance data signal is transmitted to an administrator system, a processor of the administrator system performs analysis of surveillance data of the surveillance data signal to detect suspicious activity. In various embodiments, generating the surveillance data includes detecting suspicious activity, and where the surveillance data signal includes a notification of the suspicious activity.

In various embodiments the surveillance system further includes a speaker. The speaker is controlled to sound an alarm in response to detecting the suspicious activity. In various embodiments where the at least one sensor device includes a camera, the camera is activated to begin capturing image data in response to detecting the suspicious activity. In various embodiments where the surveillance data includes image data, the suspicious activity is detected based on image analysis of the image data. In various embodiments, the image analysis includes at least one of: motion detection or facial detection. In various embodiments, the surveillance system further includes a lighting device. The lighting device is activated in response to detecting the suspicious activity. An orientation of the lighting device is controlled to track the detected motion and/or the detected face. In various embodiments, the camera is controlled based on the motion detection and/or the facial detection to track motion and/or a face. Controlling the camera includes orienting the camera towards the motion, orienting the camera towards the face, zooming in on the motion, and/or zooming in on the face.

In various embodiments, a notification of the suspicious activity is transmitted to a law enforcement entity in response to detecting the suspicious activity. The notification of the suspicious activity is transmitted as electromagnetic waves that are guided by the transmission medium that and propagate without utilizing an electrical return path. In various embodiments, the at least one sensor device includes a disturbance detection sensor, a loss of energy sensor, and/or a vibration sensor, and the suspicious activity is detected based on surveillance data generated based on sensor input to the disturbance detection sensor, the loss of energy sensor, and/or the vibration sensor.

Figure 24A:
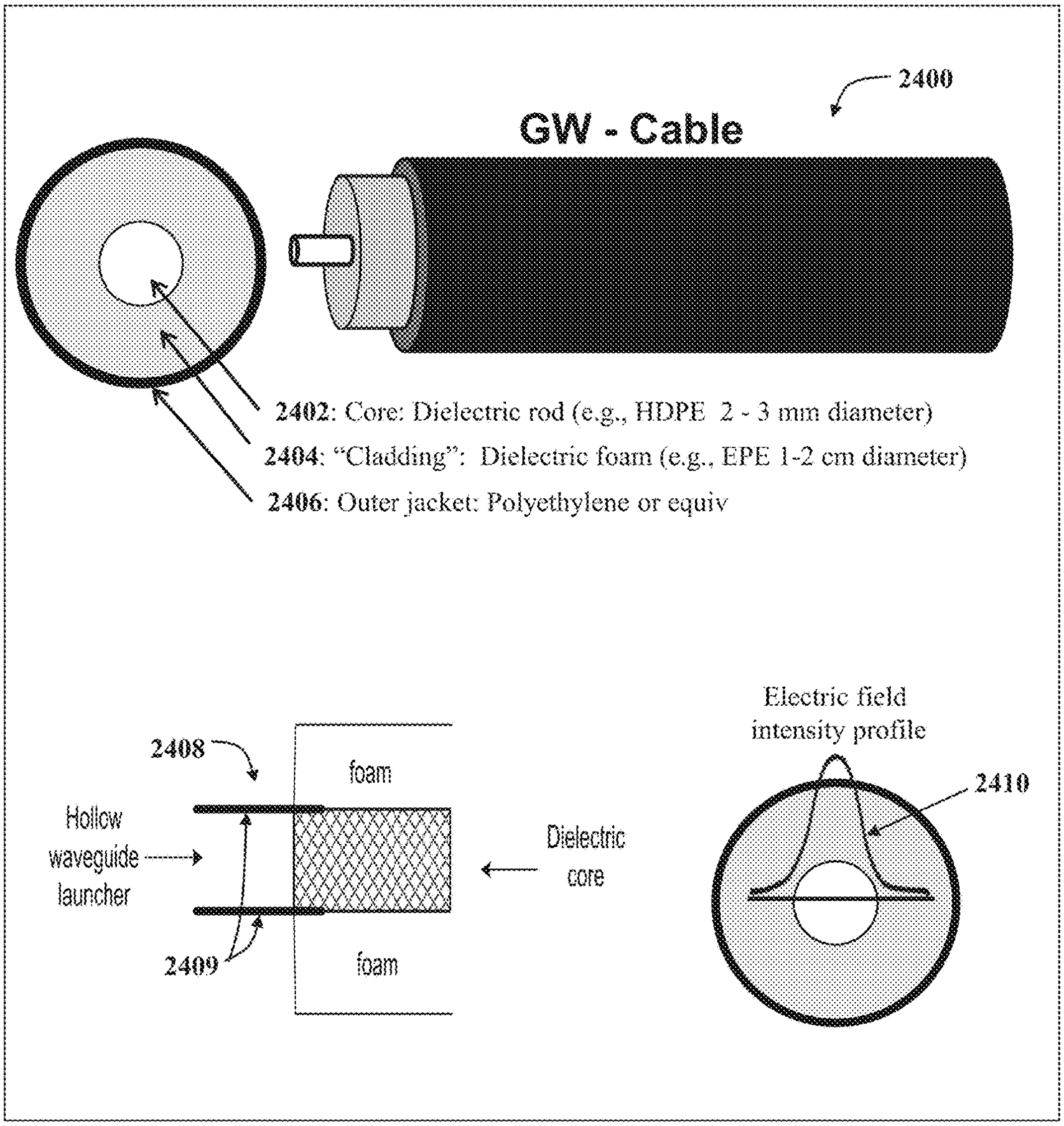
FIGS. 24A, 24B, and 24C are block diagrams illustrating example, non-limiting embodiment of a transmission medium for propagating guided electromagnetic waves.

Turning now to FIG. 24A, a block diagram illustrating an example, non-limiting embodiment of a transmission medium 2400 for propagating guided electromagnetic waves is shown. In particular, a further example of transmission medium 125 presented in conjunction with FIG. 1 is presented. In an embodiment, the transmission medium 2400 can comprise a first dielectric material 2402 and a second dielectric material 2404 disposed thereon. In an embodiment, the first dielectric material 2402 can comprise a dielectric core (referred to herein as dielectric core 2402) and the second dielectric material 2404 can comprise a cladding or shell such as a dielectric foam that surrounds in whole or in part the dielectric core (referred to herein as dielectric foam 2404). In an embodiment, the dielectric core 2402 and dielectric foam 2404 can be coaxially aligned to each other (although not necessary). In an embodiment, the combination of the dielectric core 2402 and the dielectric foam 2404 can be flexed or bent at least by 45 degrees without damaging the materials of the dielectric core 2402 and the dielectric foam 2404. In an embodiment, an outer surface of the dielectric foam 2404 can be further surrounded in whole or in part by a third dielectric material 2406, which can serve as an outer jacket (referred to herein as jacket 2406). The jacket 2406 can prevent exposure of the dielectric core 2402 and the dielectric foam 2404 to an environment that can adversely affect the propagation of electromagnetic waves (e.g., water, soil, etc.).

The dielectric core 2402 can comprise, for example, a high density polyethylene material, a high density polyurethane material, or other suitable dielectric material(s). The dielectric foam 2404 can comprise, for example, a cellular plastic material such an expanded polyethylene material, or other suitable dielectric material(s). The jacket 2406 can comprise, for example, a polyethylene material or equivalent. In an embodiment, the dielectric constant of the dielectric foam 2404 can be (or substantially) lower than the dielectric constant of the dielectric core 2402. For example, the dielectric constant of the dielectric core 2402 can be approximately 2.3 while the dielectric constant of the dielectric foam 2404 can be approximately 1.15 (slightly higher than the dielectric constant of air).

The dielectric core 2402 can be used for receiving signals in the form of electromagnetic waves from a launcher or other coupling device described herein which can be configured to launch guided electromagnetic waves on the transmission medium 2400. In one embodiment, the transmission 2400 can be coupled to a hollow waveguide 2408 structured as, for example, a circular waveguide 2409, which can receive electromagnetic waves from a radiating device such as a stub antenna (not shown). The hollow waveguide 2408 can in turn induce guided electromagnetic waves in the dielectric core 2402. In this configuration, the guided electromagnetic waves are guided by or bound to the dielectric core 2402 and propagate longitudinally along the dielectric core 2402. By adjusting electronics of the launcher, an operating frequency of the electromagnetic waves can be chosen such that a field intensity profile 2410 of the guided electromagnetic waves extends nominally (or not at all) outside of the jacket 2406.

By maintaining most (if not all) of the field strength of the guided electromagnetic waves within portions of the dielectric core 2402, the dielectric foam 2404 and/or the jacket 2406, the transmission medium 2400 can be used in hostile environments without adversely affecting the propagation of the electromagnetic waves propagating therein. For example, the transmission medium 2400 can be buried in soil with no (or nearly no) adverse effect to the guided electromagnetic waves propagating in the transmission medium 2400. Similarly, the transmission medium 2400 can be exposed to water (e.g., rain or placed underwater) with no (or nearly no) adverse effect to the guided electromagnetic waves propagating in the transmission medium 2400. In an embodiment, the propagation loss of guided electromagnetic waves in the foregoing embodiments can be 1 to 2 dB per meter or better at an operating frequency of 60 GHz. Depending on the operating frequency of the guided electromagnetic waves and/or the materials used for the transmission medium 2400 other propagation losses may be possible. Additionally, depending on the materials used to construct the transmission medium 2400, the transmission medium 2400 can in some embodiments be flexed laterally with no (or nearly no) adverse effect to the guided electromagnetic waves propagating through the dielectric core 2402 and the dielectric foam 2404.

Figure 24B:
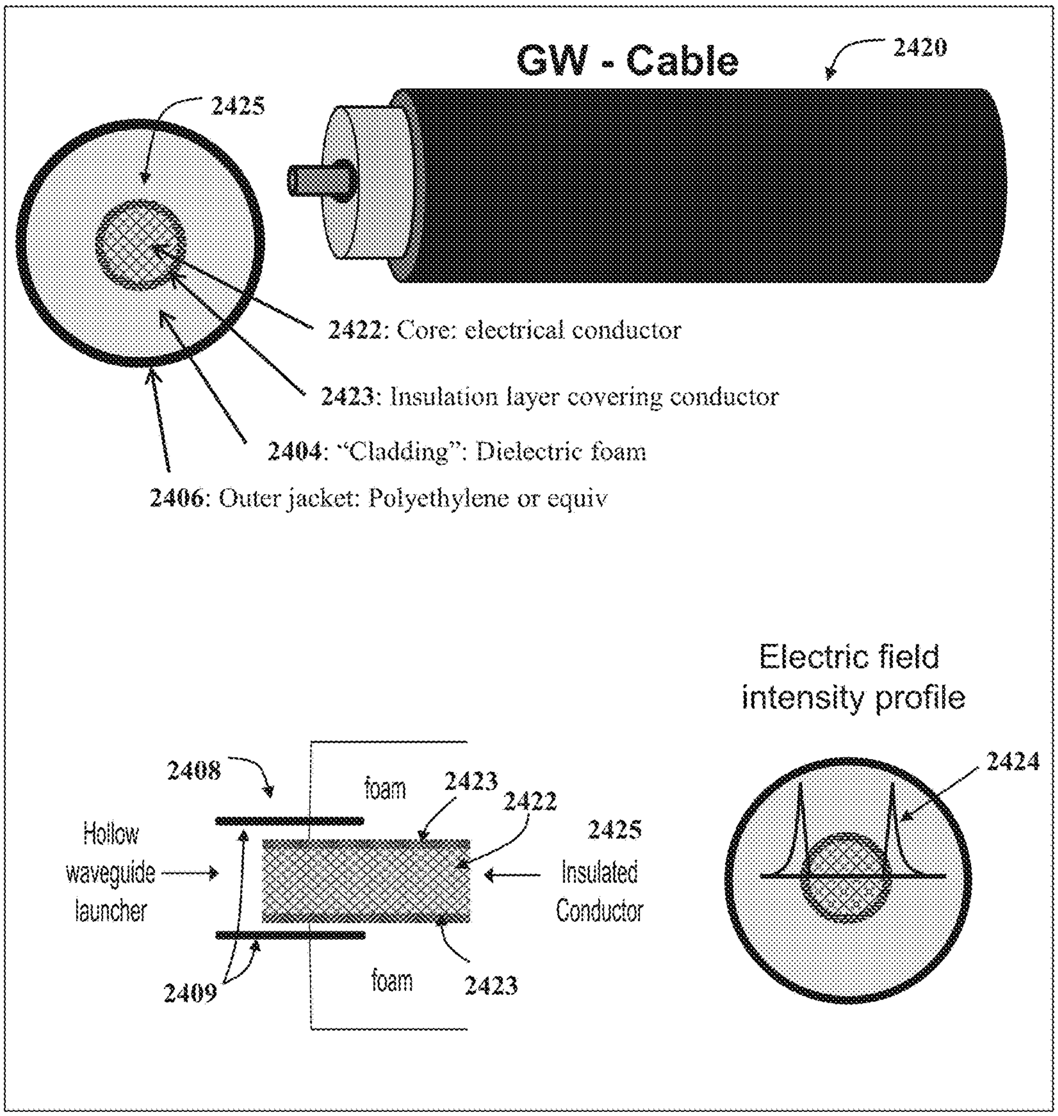

FIG. 24B depicts a transmission medium 2420 that differs from the transmission medium 2400 of FIG. 24A, yet provides a further example of the transmission medium 125 presented in conjunction with FIG. 1. The transmission medium 2420 shows similar reference numerals for similar elements of the transmission medium 2400 of FIG. 24A. In contrast to the transmission medium 2400, the transmission medium 2420 comprises a conductive core 2422 having an insulation layer 2423 surrounding the conductive core 2422 in whole or in part. The combination of the insulation layer 2423 and the conductive core 2422 will be referred to herein as an insulated conductor 2425. In the illustration of FIG. 24B, the insulation layer 2423 is covered in whole or in part by a dielectric foam 2404 and jacket 2406, which can be constructed from the materials previously described. In an embodiment, the insulation layer 2423 can comprise a dielectric material, such as polyethylene, having a higher dielectric constant than the dielectric foam 2404 (e.g., 2.3 and 1.15, respectively). In an embodiment, the components of the transmission medium 2420 can be coaxially aligned (although not necessary). In an embodiment, a hollow waveguide 2408 having metal plates 2409, which can be separated from the insulation layer 2423 (although not necessary) can be used to launch guided electromagnetic waves that substantially propagate on an outer surface of the insulation layer 2423, however other coupling devices as described herein can likewise be employed. In an embodiment, the guided electromagnetic waves can be sufficiently guided by or bound by the insulation layer 2423 to guide the electromagnetic waves longitudinally along the insulation layer 2423. By adjusting operational parameters of the launcher, an operating frequency of the guided electromagnetic waves launched by the hollow waveguide 2408 can generate an electric field intensity profile 2424 that results in the guided electromagnetic waves being substantially confined within the dielectric foam 2404 thereby preventing the guided electromagnetic waves from being exposed to an environment (e.g., water, soil, etc.) that adversely affects propagation of the guided electromagnetic waves via the transmission medium 2420.

Figure 24C:
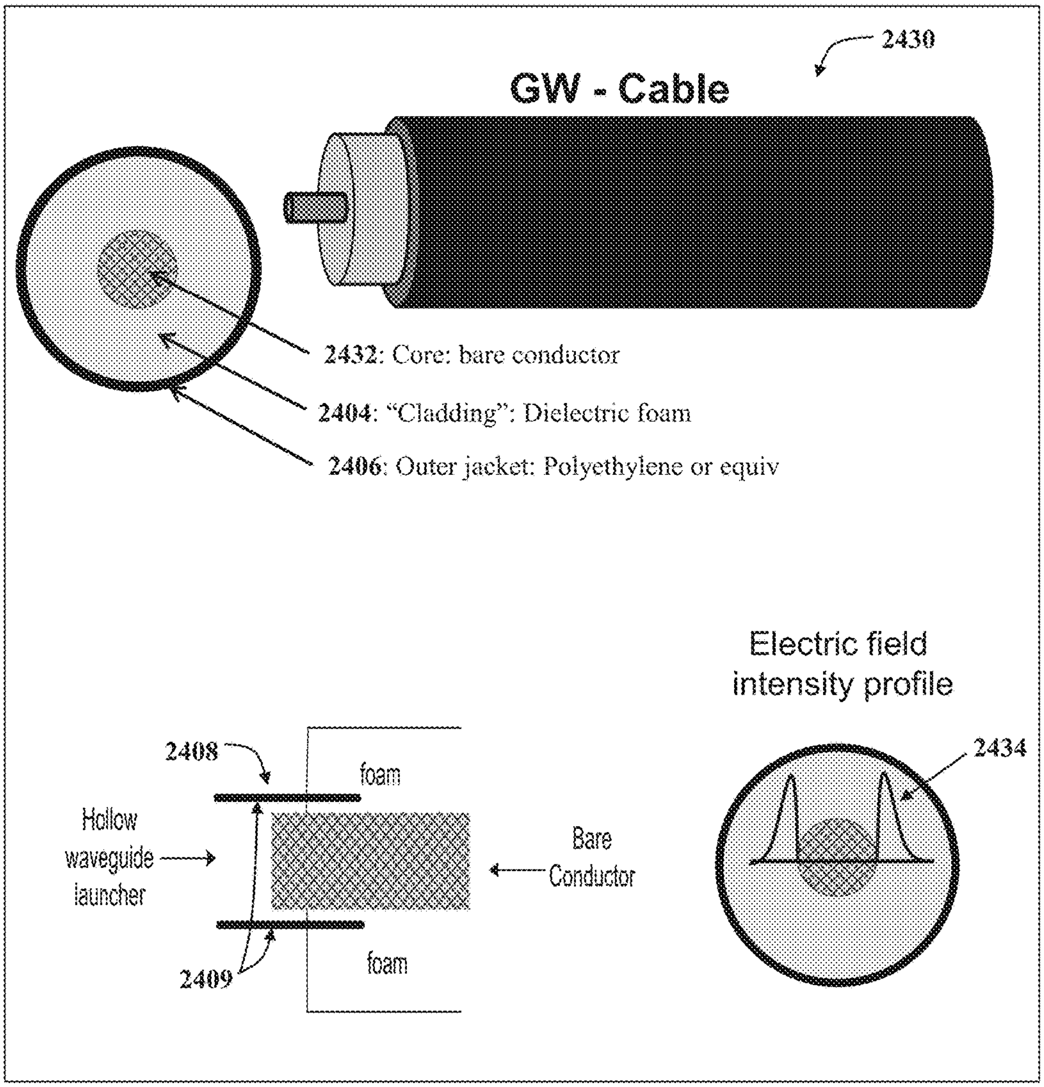

FIG. 24C depicts a transmission medium 2430 that differs from the transmission mediums 2400 and 2420 of FIGS. 24A and 24B, yet provides a further example of the transmission medium 125 presented in conjunction with FIG. 1. The transmission medium 2430 shows similar reference numerals for similar elements of the transmission mediums 2400 and 2420 of FIGS. 24A and 24B, respectively. In contrast to the transmission mediums 2400 and 2420, the transmission medium 2430 comprises a bare (or uninsulated) conductor 2432 surrounded in whole or in part by the dielectric foam 2404 and the jacket 2406, which can be constructed from the materials previously described. In an embodiment, the components of the transmission medium 2430 can be coaxially aligned (although not necessary). In an embodiment, a hollow waveguide 2408 having metal plates 2409 coupled to the bare conductor 2432 can be used to launch guided electromagnetic waves that substantially propagate on an outer surface of the bare conductor 2432, however other coupling devices described herein can likewise be employed. In an embodiment, the guided electromagnetic waves can be sufficiently guided by or bound by the bare conductor 2432 to guide the guided electromagnetic waves longitudinally along the bare conductor 2432. By adjusting operational parameters of the launcher, an operating frequency of the guided electromagnetic waves launched by the hollow waveguide 2408 can generate an electric field intensity profile 2434 that results in the guided electromagnetic waves being substantially confined within the dielectric foam 2404 thereby preventing the guided electromagnetic waves from being exposed to an environment (e.g., water, soil, etc.) that adversely affects propagation of the electromagnetic waves via the transmission medium 2430.

It should be noted that the hollow launcher 2408 used with the transmission mediums 2400, 2420 and 2430 of FIGS. 24A, 24B and 24C, respectively, can be replaced with other launchers or coupling devices. Additionally, the propagation mode(s) of the electromagnetic waves for any of the foregoing embodiments can be fundamental mode(s), a non-fundamental (or asymmetric) mode(s), or combinations thereof.

Figure 25:
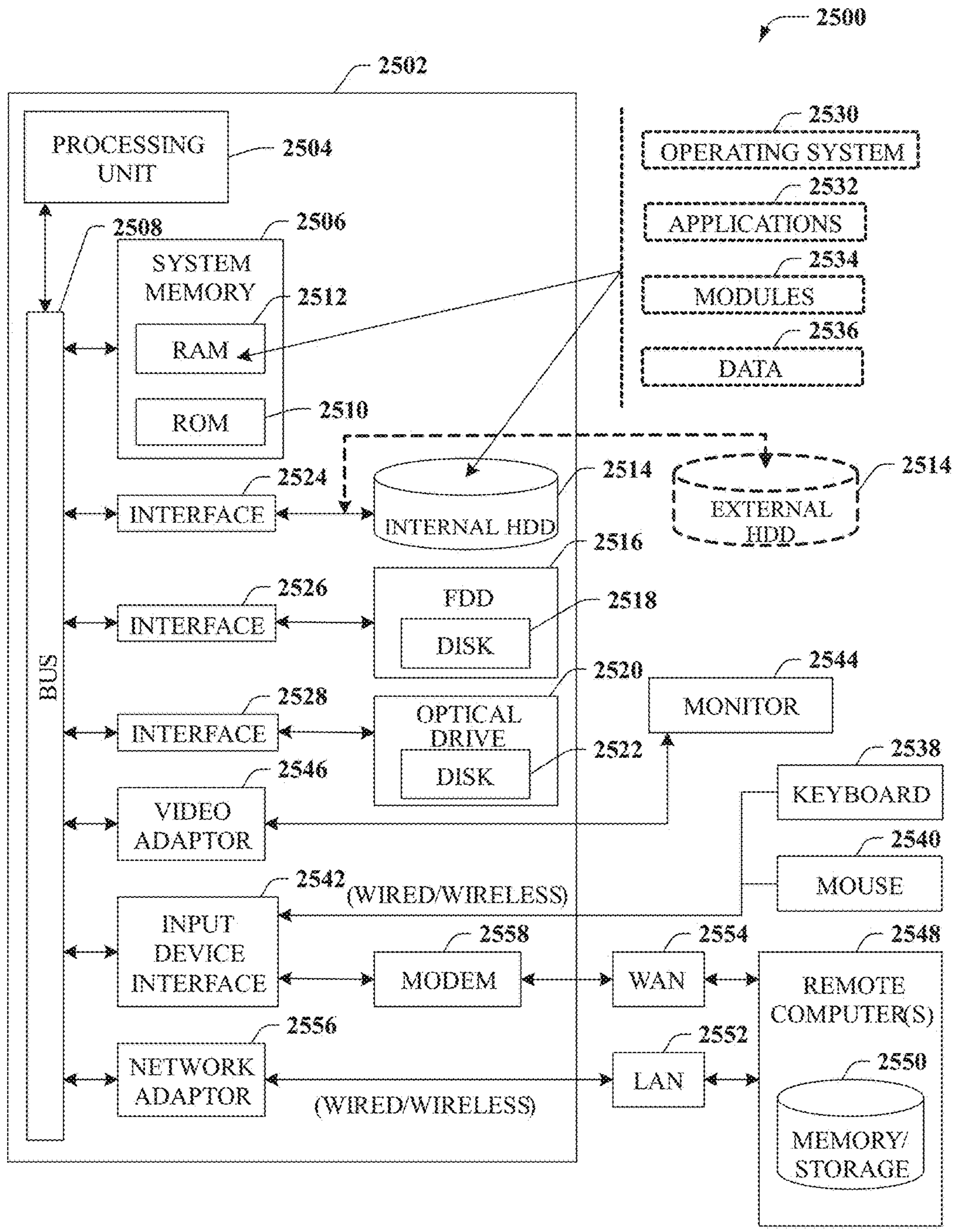
FIG. 25 is a block diagram of an example, non-limiting embodiment of a computing environment in accordance with various aspects described herein.

Referring now to FIG. 25, there is illustrated a block diagram of a computing environment in accordance with various aspects described herein. In order to provide additional context for various embodiments of the embodiments described herein, FIG. 25 and the following discussion are intended to provide a brief, general description of a suitable computing environment 2500 in which the various embodiments of the subject disclosure can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes processor as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 25, the example environment 2500 for transmitting and receiving signals via or forming at least part of a base station (e.g., base station devices 1504, macrocell site 1502, or base stations 1614) or central office (e.g., central office 1501 or 1611). At least a portion of the example environment 2500 can also be used for transmission devices 101 or 102. The example environment can comprise a computer 2502, the computer 2502 comprising a processing unit 2504, a system memory 2506 and a system bus 2508. The system bus 2508 couples system components including, but not limited to, the system memory 2506 to the processing unit 2504. The processing unit 2504 can be any of various commercially available processors. Dual microprocessors and other multiprocessor architectures can also be employed as the processing unit 2504.

The system bus 2508 can be any of several types of bus structure that can further interconnect to a memory bus (with or without a memory controller), a peripheral bus, and a local bus using any of a variety of commercially available bus architectures. The system memory 2506 comprises ROM 2510 and RAM 2512. A basic input/output system (BIOS) can be stored in a non-volatile memory such as ROM, erasable programmable read only memory (EPROM), EEPROM, which BIOS contains the basic routines that help to transfer information between elements within the computer 2502, such as during startup. The RAM 2512 can also comprise a high-speed RAM such as static RAM for caching data.

The computer 2502 further comprises an internal hard disk drive (HDD) 2514 (e.g., EIDE, SATA), which internal hard disk drive 2514 can also be configured for external use in a suitable chassis (not shown), a magnetic floppy disk drive (FDD) 2516, (e.g., to read from or write to a removable diskette 2518) and an optical disk drive 2520, (e.g., reading a CD-ROM disk 2522 or, to read from or write to other high capacity optical media such as the DVD). The hard disk drive 2514, magnetic disk drive 2516 and optical disk drive 2520 can be connected to the system bus 2508 by a hard disk drive interface 2524, a magnetic disk drive interface 2526 and an optical drive interface 2528, respectively. The interface 2524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 2512, comprising an operating system 2530, one or more application programs 2532, other program modules 2534 and program data 2536. All or portions of the operating system, applications, modules, and/or data can also be cached in the RAM 2512. The systems and methods described herein can be implemented utilizing various commercially available operating systems or combinations of operating systems. Examples of application programs 2532 that can be implemented and otherwise executed by processing unit 2504 include the diversity selection determining performed by transmission device 101 or 102.

A user can enter commands and information into the computer 2502 through one or more wired/wireless input devices, e.g., a keyboard 2538 and a pointing device, such as a mouse 2540. Other input devices (not shown) can comprise a microphone, an infrared (IR) remote control, a joystick, a game pad, a stylus pen, touch screen or the like. These and other input devices are often connected to the processing unit 2504 through an input device interface 2542 that can be coupled to the system bus 2508, but can be connected by other interfaces, such as a parallel port, an IEEE 1394 serial port, a game port, a universal serial bus (USB) port, an IR interface, etc.

A monitor 2544 or other type of display device can be also connected to the system bus 2508 via an interface, such as a video adapter 2546. It will also be appreciated that in alternative embodiments, a monitor 2544 can also be any display device (e.g., another computer having a display, a smart phone, a tablet computer, etc.) for receiving display information associated with computer 2502 via any communication means, including via the Internet and cloud-based networks. In addition to the monitor 2544, a computer typically comprises other peripheral output devices (not shown), such as speakers, printers, etc.

The computer 2502 can operate in a networked environment using logical connections via wired and/or wireless communications to one or more remote computers, such as a remote computer(s) 2548. The remote computer(s) 2548 can be a workstation, a server computer, a router, a personal computer, portable computer, microprocessor-based entertainment appliance, a peer device or other common network node, and typically comprises many or all of the elements described relative to the computer 2502, although, for purposes of brevity, only a memory/storage device 2550 is illustrated. The logical connections depicted comprise wired/wireless connectivity to a local area network (LAN) 2552 and/or larger networks, e.g., a wide area network (WAN) 2554. Such LAN and WAN networking environments are commonplace in offices and companies, and facilitate enterprise-wide computer networks, such as intranets, all of which can connect to a global communications network, e.g., the Internet.

When used in a LAN networking environment, the computer 2502 can be connected to the local network 2552 through a wired and/or wireless communication network interface or adapter 2556. The adapter 2556 can facilitate wired or wireless communication to the LAN 2552, which can also comprise a wireless AP disposed thereon for communicating with the wireless adapter 2556.

When used in a WAN networking environment, the computer 2502 can comprise a modem 2558 or can be connected to a communications server on the WAN 2554 or has other means for establishing communications over the WAN 2554, such as by way of the Internet. The modem 2558, which can be internal or external and a wired or wireless device, can be connected to the system bus 2508 via the input device interface 2542. In a networked environment, program modules depicted relative to the computer 2502 or portions thereof, can be stored in the remote memory/storage device 2550. It will be appreciated that the network connections shown are example and other means of establishing a communications link between the computers can be used.

The computer 2502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 26:
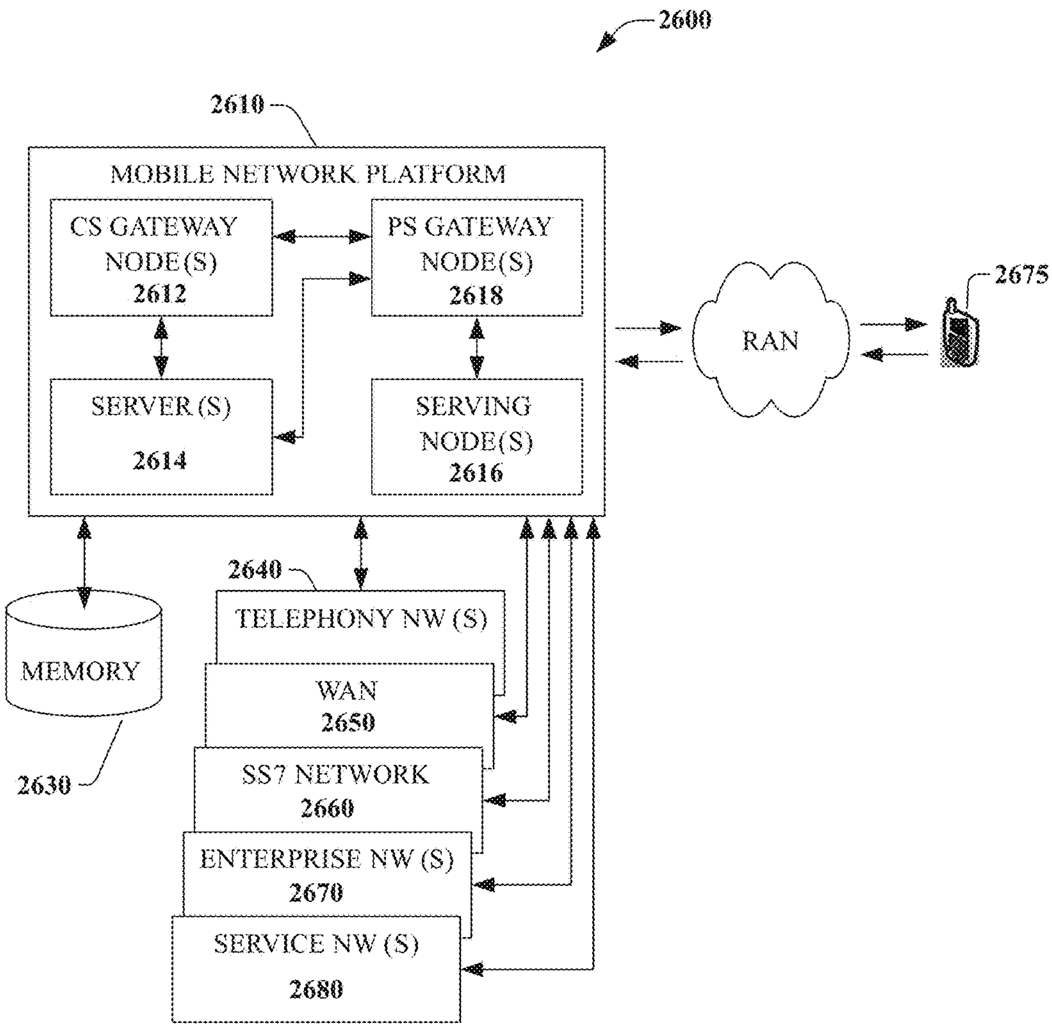
FIG. 26 is a block diagram of an example, non-limiting embodiment of a mobile network platform in accordance with various aspects described herein.

FIG. 26 presents an example embodiment 2600 of a mobile network platform 2610 that can implement and exploit one or more aspects of the disclosed subject matter described herein. In one or more embodiments, the mobile network platform 2610 can generate and receive signals transmitted and received by base stations (e.g., base station devices 1264, macrocell site 1262, or base stations 1614), central office (e.g., central office 1261 or 1611), or transmission device 101 or 102 associated with the disclosed subject matter. Generally, wireless network platform 2610 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 2610 can be included in telecommunications carrier networks, and can be considered carrier-side components as discussed elsewhere herein. Mobile network platform 2610 comprises CS gateway node(s) 2612 which can interface CS traffic received from legacy networks like telephony network(s) 2640 (e.g., public switched telephone network (PSTN), or public land mobile network (PLMN)) or a signaling system #7 (SS7) network 2670. Circuit switched gateway node(s) 2612 can authorize and authenticate traffic (e.g., voice) arising from such networks. Additionally, CS gateway node(s) 2612 can access mobility, or roaming, data generated through SS7 network 2670; for instance, mobility data stored in a visited location register (VLR), which can reside in memory 2630. Moreover, CS gateway node(s) 2612 interfaces CS-based traffic and signaling and PS gateway node(s) 2618. As an example, in a 3GPP UMTS network, CS gateway node(s) 2612 can be realized at least in part in gateway GPRS support node(s) (GGSN). It should be appreciated that functionality and specific operation of CS gateway node(s) 2612, PS gateway node(s) 2618, and serving node(s) 2616, is provided and dictated by radio technology (ies) utilized by mobile network platform 2610 for telecommunication.

In addition to receiving and processing CS-switched traffic and signaling, PS gateway node(s) 2618 can authorize and authenticate PS-based data sessions with served mobile devices. Data sessions can comprise traffic, or content(s), exchanged with networks external to the wireless network platform 2610, like wide area network(s) (WANs) 2650, enterprise network(s) 2670, and service network(s) 2680, which can be embodied in local area network(s) (LANs), can also be interfaced with mobile network platform 2610 through PS gateway node(s) 2618. It is to be noted that WANs 2650 and enterprise network(s) 2660 can embody, at least in part, a service network(s) like IP multimedia subsystem (IMS). Based on radio technology layer(s) available in technology resource(s) 2617, packet-switched gateway node(s) 2618 can generate packet data protocol contexts when a data session is established; other data structures that facilitate routing of packetized data also can be generated. To that end, in an aspect, PS gateway node(s) 2618 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 2600, wireless network platform 2610 also comprises serving node(s) 2616 that, based upon available radio technology layer(s) within technology resource(s) 2617, convey the various packetized flows of data streams received through PS gateway node(s) 2618. It is to be noted that for technology resource(s) 2617 that rely primarily on CS communication, server node(s) can deliver traffic without reliance on PS gateway node(s) 2618; for example, server node(s) can embody at least in part a mobile switching center. As an example, in a 3GPP UMTS network, serving node(s) 2616 can be embodied in serving GPRS support node(s) (SGSN).

For radio technologies that exploit packetized communication, server(s) 2614 in wireless network platform 2610 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 2610. Data streams (e.g., content(s) that are part of a voice call or data session) can be conveyed to PS gateway node(s) 2618 for authorization/authentication and initiation of a data session, and to serving node(s) 2616 for communication thereafter. In addition to application server, server(s) 2614 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 2610 to ensure network's operation and data integrity in addition to authorization and authentication procedures that CS gateway node(s) 2612 and PS gateway node(s) 2618 can enact. Moreover, provisioning server(s) can provision services from external network(s) like networks operated by a disparate service provider; for instance, WAN 2650 or Global Positioning System (GPS) network(s) (not shown). Provisioning server(s) can also provision coverage through networks associated to wireless network platform 2610 (e.g., deployed and operated by the same service provider), such as the distributed antennas networks shown in FIG. 1(*s*) that enhance wireless service coverage by providing more network coverage. Repeater devices such as those shown in FIGS. 7, 8, and 9 also improve network coverage in order to enhance subscriber service experience by way of UE 2675.

It is to be noted that server(s) 2614 can comprise one or more processors configured to confer at least in part the functionality of macro network platform 2610. To that end, the one or more processor can execute code instructions stored in memory 2630, for example. It is should be appreciated that server(s) 2614 can comprise a content manager 2615, which operates in substantially the same manner as described hereinbefore.

In example embodiment 2600, memory 2630 can store information related to operation of wireless network platform 2610. Other operational information can comprise provisioning information of mobile devices served through wireless platform network 2610, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 2630 can also store information from at least one of telephony network(s) 2640, WAN 2650, enterprise network(s) 2670, or SS7 network 2660. In an aspect, memory 2630 can be, for example, accessed as part of a data store component or as a remotely connected memory store.

In order to provide a context for the various aspects of the disclosed subject matter, FIG. 26, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 27:
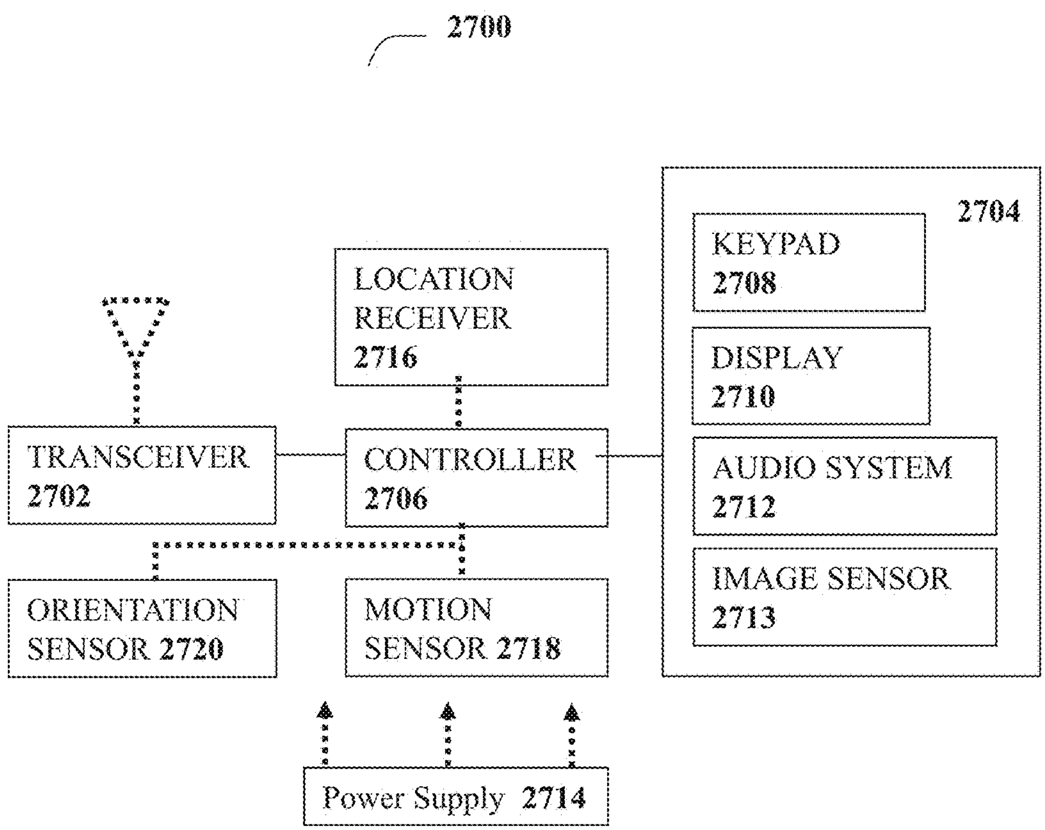
FIG. 27 is a block diagram of an example, non-limiting embodiment of a communication device in accordance with various aspects described herein.

FIG. 27 depicts an illustrative embodiment of a communication device 2700. The communication device 2700 can serve as an illustrative embodiment of devices such as mobile devices and in-building devices referred to by the subject disclosure (e.g., in FIGS. 15, 16A and 16B).

The communication device 2700 can comprise a wireline and/or wireless transceiver 2702 (herein transceiver 2702), a user interface (UI) 2704, a power supply 2714, a location receiver 2716, a motion sensor 2718, an orientation sensor 2720, and a controller 2706 for managing operations thereof. The transceiver 2702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 2702 can also be adapted to support circuit-switched wireline access technologies (such as PSTN), packet-switched wireline access technologies (such as TCP/IP, VoIP, etc.), and combinations thereof.

The UI 2704 can include a depressible or touch-sensitive keypad 2708 with a navigation mechanism such as a roller ball, a joystick, a mouse, or a navigation disk for manipulating operations of the communication device 2700. The keypad 2708 can be an integral part of a housing assembly of the communication device 2700 or an independent device operably coupled thereto by a tethered wireline interface (such as a USB cable) or a wireless interface supporting for example Bluetooth®. The keypad 2708 can represent a numeric keypad commonly used by phones, and/or a QWERTY keypad with alphanumeric keys. The UI 2704 can further include a display 2710 such as monochrome or color LCD (Liquid Crystal Display), OLED (Organic Light Emitting Diode) or other suitable display technology for conveying images to an end user of the communication device 2700. In an embodiment where the display 2710 is touch-sensitive, a portion or all of the keypad 2708 can be presented by way of the display 2710 with navigation features.

The display 2710 can use touch screen technology to also serve as a user interface for detecting user input. As a touch screen display, the communication device 2700 can be adapted to present a user interface having graphical user interface (GUI) elements that can be selected by a user with a touch of a finger. The touch screen display 2710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 2710 can be an integral part of the housing assembly of the communication device 2700 or an independent device communicatively coupled thereto by a tethered wireline interface (such as a cable) or a wireless interface.

The UI 2704 can also include an audio system 2712 that utilizes audio technology for conveying low volume audio (such as audio heard in proximity of a human ear) and high volume audio (such as speakerphone for hands free operation). The audio system 2712 can further include a microphone for receiving audible signals of an end user. The audio system 2712 can also be used for voice recognition applications. The UI 2704 can further include an image sensor 2713 such as a charged coupled device (CCD) camera for capturing still or moving images.

The power supply 2714 can utilize common power management technologies such as replaceable and rechargeable batteries, supply regulation technologies, and/or charging system technologies for supplying energy to the components of the communication device 2700 to facilitate long-range or short-range portable communications. Alternatively, or in combination, the charging system can utilize external power sources such as DC power supplied over a physical interface such as a USB port or other suitable tethering technologies.

The location receiver 2716 can utilize location technology such as a global positioning system (GPS) receiver capable of assisted GPS for identifying a location of the communication device 2700 based on signals generated by a constellation of GPS satellites, which can be used for facilitating location services such as navigation. The motion sensor 2718 can utilize motion sensing technology such as an accelerometer, a gyroscope, or other suitable motion sensing technology to detect motion of the communication device 2700 in three-dimensional space. The orientation sensor 2720 can utilize orientation sensing technology such as a magnetometer to detect the orientation of the communication device 2700 (north, south, west, and east, as well as combined orientations in degrees, minutes, or other suitable orientation metrics).

The communication device 2700 can use the transceiver 2702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 2706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 2700.

Other components not shown in FIG. 27 can be used in one or more embodiments of the subject disclosure. For instance, the communication device 2700 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In the subject specification, terms such as "store," "storage," "data store," data storage," "database," and substantially any other information storage component relevant to operation and functionality of a component, refer to "memory components," or entities embodied in a "memory"

or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. For example, artificial intelligence can be used in optional training controller 230 evaluate and select candidate frequencies, modulation schemes, MIMO modes, and/or guided wave modes in order to maximize transfer efficiency. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A utilities management system, comprising:

a processing system that includes a processor;

a guided wave transceiver that transmits and receives communications by electromagnetic waves at a physical interface of a transmission medium, wherein the electromagnetic waves are guided by the transmission medium and propagate without utilizing an electrical return path; and a memory that stores executable instructions that, when executed by the processing system, facilitate performance of operations, the operations comprising:

receiving via the guided wave transceiver a plurality of utility status signals from a plurality of utility sensors located at a plurality of supervised sites;

generating utility control data based on the plurality of utility status signals;

generating at least one control signal for transmission via the guided wave transceiver to at least one of the plurality of supervised sites, wherein the at least one control signal includes at least one utility deployment instruction based on the utility control data;

predicting a power outage by:

determining a power outage likelihood value based on input from at least one sensor;

comparing the power outage likelihood value to a power outage likelihood threshold;

predicting the power outage in response to the power outage likelihood value comparing unfavorably to the power outage likelihood threshold; and generating, in response to the predicting the power outage, power outage warning data that indicates a predicted power outage; and transmitting the power outage warning data, via the guided wave transceiver, to the plurality of supervised sites.

2. The utilities management system of claim 1, wherein the utilities management system is implemented in conjunction with a supervisory control and data acquisition (SCADA) system.

3. The utilities management system of claim 1, wherein the at least one of the plurality of supervised sites is a home, wherein at least one of the plurality of utility sensors located in the home is coupled with a home automation controller, and wherein the at least one utility deployment instruction is executed by the home automation controller.

4. The utilities management system of claim 3, wherein the at least one control signal is sent to the home and includes an instruction to turn off appliances of the home.

5. The utilities management system of claim 1, wherein the operations further comprise:

receiving via the guided wave transceiver an emergency notification signal;

wherein the generating the utility control data is further based on the emergency notification signal.

6. The utilities management system of claim 1, wherein the at least one control signal includes an instruction for the at least one of the plurality of supervised sites to switch from a primary power source to a secondary power source.

7. The utilities management system of claim 6, wherein the secondary power source includes at least one of: a battery or a solar panel.

8. The utilities management system of claim 6, wherein the operations further comprise:

determining a primary power consumption level based on the plurality of utility status signals; and comparing the primary power consumption level to a primary power load threshold;

wherein the instruction to switch from the primary power source to the secondary power source is based on the primary power consumption level comparing unfavorably to the primary power load threshold.

9. The utilities management system of claim 1, wherein a subset of the plurality of utility sensors monitors a power line, and wherein the transmission medium that guides the electromagnetic waves includes the power line.

10. The utilities management system of claim 9, wherein one of the subset of the plurality of utility sensors is coupled to an intermediate guided wave transceiver, wherein the intermediate guided wave transceiver transmits at least one of the plurality of utility status signals corresponding to the one of the subset of the plurality of utility sensors to the utilities management system as a first plurality of the electromagnetic waves, wherein the at least one control signal is received by the intermediate guided wave transceiver as a second plurality of the electromagnetic waves, wherein the intermediate guided wave transceiver is a waypoint of a transmission path of the at least one control signal to the at least one of the plurality of supervised sites, and wherein the intermediate guided wave transceiver repeats second plurality of the electromagnetic waves for transmission along the transmission medium to a next guided wave transceiver of a remainder of the transmission path.

11. The utilities management system of claim 1, wherein the utility control data is generated by utilizing a supervisory control algorithm based on the plurality of utility status signals to optimize utility consumption across the plurality of supervised sites.

12. A method for use by a utilities management system that includes a processor and a guided wave transceiver, the method comprising:

receiving, via the guided wave transceiver, a first plurality of electromagnetic waves, guided by at least one transmission medium and propagating without utilizing an electrical return path, wherein the first plurality of electromagnetic waves includes a plurality of utility status signals sent from a plurality of utility sensors located at a plurality of supervised sites;

generating utility control data based on the plurality of utility status signals;

generating a second plurality of electromagnetic waves for transmission via the guided wave transceiver, wherein the second plurality of electromagnetic waves is guided by the at least one transmission medium and propagating without utilizing the electrical return path, and wherein the second plurality of electromagnetic waves includes at least one control signal that includes at least one utility deployment instruction for at least one of the plurality of supervised sites based on the utility control data;

predicting a power outage by:

determining a power outage likelihood value based on input from at least one sensor;

comparing the power outage likelihood value to a power outage likelihood threshold;

predicting the power outage in response to the power outage likelihood value comparing unfavorably to the power outage likelihood threshold; and generating, in response to the predicting the power outage, power outage warning data that indicates a predicted power outage; and transmitting the power outage warning data, via the guided wave transceiver, to the plurality of supervised sites.

13. The method of claim 12, wherein the utilities management system is implemented in conjunction with a supervisory control and data acquisition (SCADA) system.

14. The method of claim 12, wherein the at least one of the plurality of supervised sites is a home, wherein at least one of the plurality of utility sensors located in the home is coupled with a home automation controller, and wherein the at least one utility deployment instruction is executed by the home automation controller.

15. The method of claim 14, wherein the at least one control signal is sent to the home and includes an instruction to turn off appliances of the home.

16. The method of claim 12, further comprising:

receiving via the guided wave transceiver an emergency notification signal;

wherein the generating the utility control data is further based on the emergency notification signal.

17. The method of claim 12, wherein the at least one control signal includes an instruction for the at least one of the plurality of supervised sites to switch from a primary power source to a secondary power source.

18. The method of claim 17, wherein the secondary power source includes at least one of: a battery or a solar panel.

19. The method of claim 17, further comprising:

determining a primary power consumption level based on the plurality of utility status signals; and comparing the primary power consumption level to a primary power load threshold;

wherein the instruction to switch from the primary power source to the secondary power source is based on the primary power consumption level comparing unfavorably to the primary power load threshold.

20. A utilities management system, comprising:

means for receiving a first plurality of electromagnetic waves at a physical interface of a transmission medium, wherein the first plurality of electromagnetic waves includes a plurality of utility status signals from a plurality of utility of sensors located at a plurality of supervised sites;

means for generating utility control data based on the plurality of utility status signals;

means for generating a second plurality of electromagnetic waves that includes at least one control signal for transmission to at least one of the plurality of supervised sites, wherein the at least one control signal includes at least one utility deployment instruction based on the utility control data;

means for predicting a power outage by:

determining a power outage likelihood value based on input from at least one sensor;

comparing the power outage likelihood value to a power outage likelihood threshold;

predicting the power outage in response to the power outage likelihood value comparing unfavorably to the power outage likelihood threshold; and generating, in response to the predicting the power outage, power outage warning data that indicates a predicted power outage; and means for transmitting the power outage warning data to the plurality of supervised sites via a third plurality of electromagnetic waves;

wherein the first plurality of electromagnetic waves, the third plurality of electromagnetic waves and the second plurality of electromagnetic waves are guided by the transmission medium and propagate without utilizing an electrical return path.

* * * * *